US011897567B2

(12) United States Patent
Wattrus et al.

(10) Patent No.: US 11,897,567 B2
(45) Date of Patent: Feb. 13, 2024

(54) MOUNTING INTERFACES, DEVICES THEREWITH, ACCESSORIES THEREFOR, AND METHODS OF MANUFACTURE AND USE THEREOF

(71) Applicant: HAMMERHEAD NAVIGATION INC., Brooklyn, NY (US)

(72) Inventors: Laurence John Wattrus, Santa Monica, CA (US); Evan Charles Huggins, Fairfield, IA (US); Robert David Martinez, San Francisco, CA (US); Zakery Allen Koster, Brooklyn, NY (US); Paul Thomas Reamey, Brooklyn, NY (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/928,209

(22) PCT Filed: May 28, 2021

(86) PCT No.: PCT/US2021/034730
§ 371 (c)(1),
(2) Date: Nov. 28, 2022

(87) PCT Pub. No.: WO2021/243133
PCT Pub. Date: Dec. 2, 2021

(65) Prior Publication Data
US 2023/0211846 A1 Jul. 6, 2023

Related U.S. Application Data

(63) Continuation-in-part of application No. 16/501,141, filed on May 28, 2020, now Pat. No. 11,554,827.

(51) Int. Cl.
*B62J 9/21* (2020.01)
*B62J 9/02* (2006.01)
(Continued)

(52) U.S. Cl.
CPC ................. *B62J 9/02* (2013.01); *B62J 50/22* (2020.02); *B62J 50/225* (2020.02);
(Continued)

(58) Field of Classification Search
CPC ..... B62J 45/00; B62J 9/21; B62J 50/22; B62J 50/225; F16B 2/10; F16M 13/022; F16M 2200/06; F16M 11/041
See application file for complete search history.

(56) References Cited

U.S. PATENT DOCUMENTS 5,226,340 A * 7/1993 Takeda ..................... B62J 11/19
74/551.8
5,332,183 A * 7/1994 Kagayama ................. B62J 6/03
248/223.41
(Continued)

FOREIGN PATENT DOCUMENTS

JP 2013087862 5/2013

*Primary Examiner* — Monica E Millner

(57) ABSTRACT

Generally, this disclosure enables various mounting interfaces, devices therewith, accessories therefor, and methods of manufacture and use thereof. In particular, these mounting interfaces include a latch configured to engage with a detent of an accessory (e.g., a smartphone, a dedicated navigation device, a storage container, a drinking bottle) in order to (a) allow the accessory to be easily mounted thereon and unmounted therefrom and (b) hold the accessory sufficiently securely when the accessory is mounted thereon.

20 Claims, 123 Drawing Sheets

(51) Int. Cl.
    *B62J 50/22*    (2020.01)
    *F16M 13/02*    (2006.01)
    *F16M 11/04*    (2006.01)
    *B62J 50/21*    (2020.01)

(52) U.S. Cl.
    CPC ........ *F16M 11/041* (2013.01); *F16M 13/022* (2013.01); *F16M 2200/06* (2013.01)

(56) References Cited

U.S. PATENT DOCUMENTS

| | | | |
|---|---|---|---|
| 6,711,966 B2 * | 3/2004 | Chuang | B62J 6/03 |
| | | | 74/551.8 |
| 8,998,048 B1 | 4/2015 | Wu | |
| 9,402,016 B1 | 7/2016 | Hidalgo | |
| 10,422,474 B2 * | 9/2019 | Bacallao | B62B 3/1428 |
| 10,703,429 B2 * | 7/2020 | Fiedler | F16M 13/02 |
| 11,029,734 B2 | 6/2021 | Hawkins | |
| 11,303,143 B2 | 4/2022 | Taylor | |
| 2003/0106974 A1 * | 6/2003 | Guertin | B62J 9/27 |
| | | | 248/230.5 |
| 2004/0204169 A1 * | 10/2004 | Goradesky | H04B 1/3877 |
| | | | 455/575.1 |
| 2008/0314941 A1 * | 12/2008 | Knych | H04B 1/385 |
| | | | 224/191 |
| 2009/0032561 A1 * | 2/2009 | Dacko | B62J 11/00 |
| | | | 224/441 |
| 2010/0084527 A1 * | 4/2010 | Lau | F16M 11/041 |
| | | | 248/217.4 |
| 2014/0061270 A1 | 3/2014 | Richter | |
| 2014/0263509 A1 | 9/2014 | Oquendo | |
| 2015/0183478 A1 * | 7/2015 | Tate | B62J 11/00 |
| | | | 29/428 |
| 2015/0351531 A1 | 12/2015 | Dalton | |
| 2016/0368557 A1 | 12/2016 | Downes | |
| 2018/0203488 A1 * | 7/2018 | Hawkins, III | B62J 45/20 |
| 2019/0382067 A1 * | 12/2019 | Mühle | B62M 6/90 |
| 2021/0249880 A1 * | 8/2021 | Taylor | H02J 7/02 |

* cited by examiner

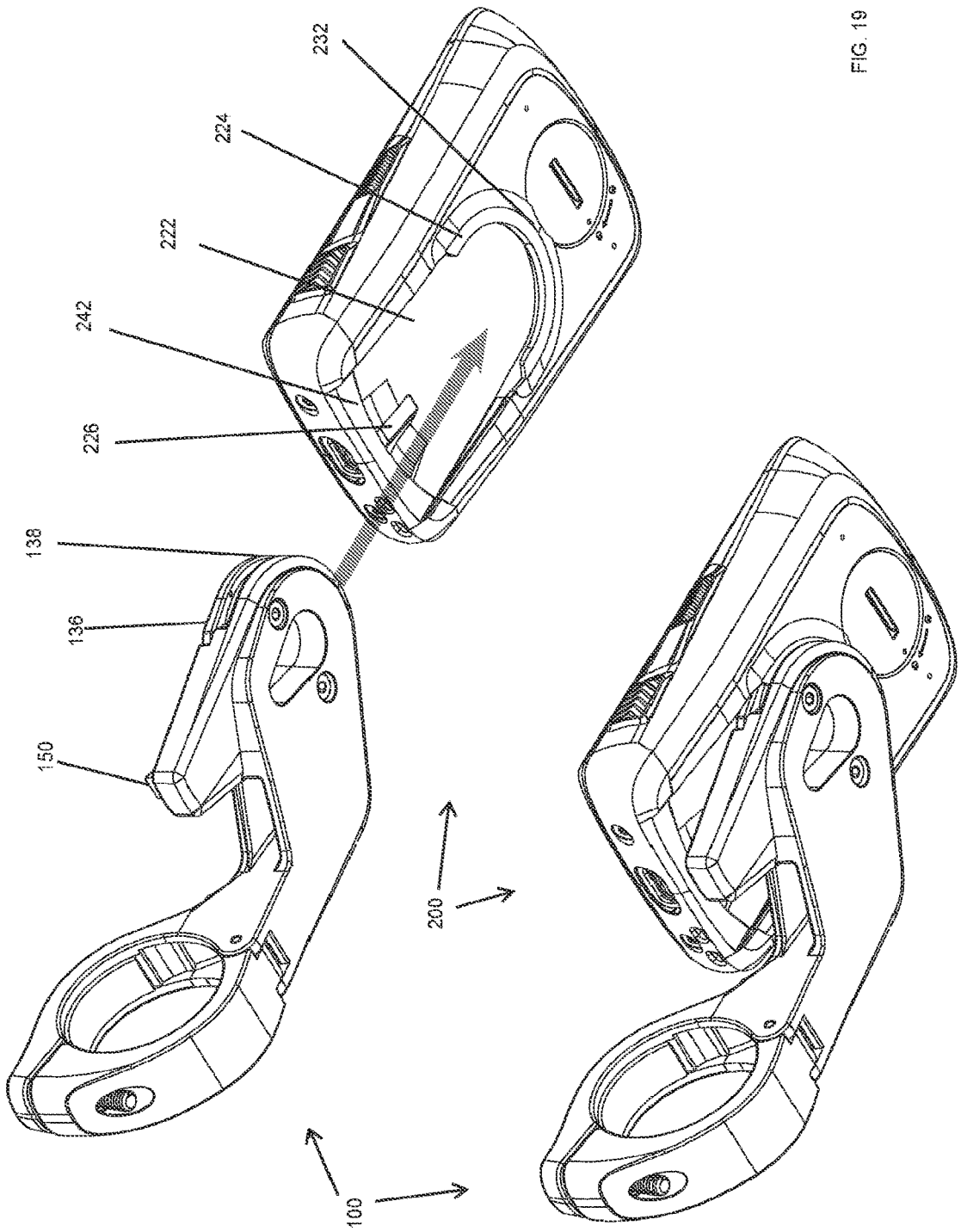

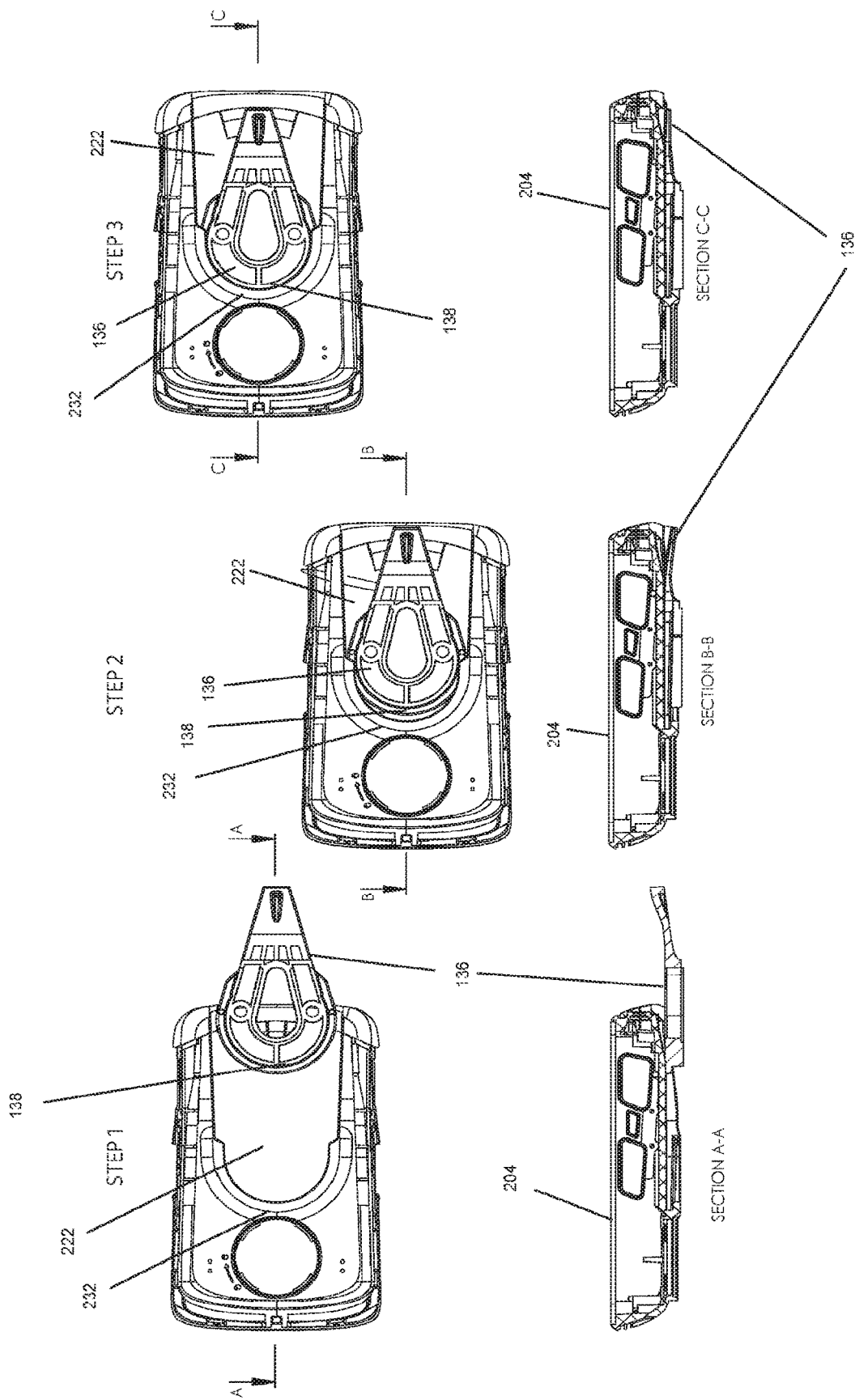

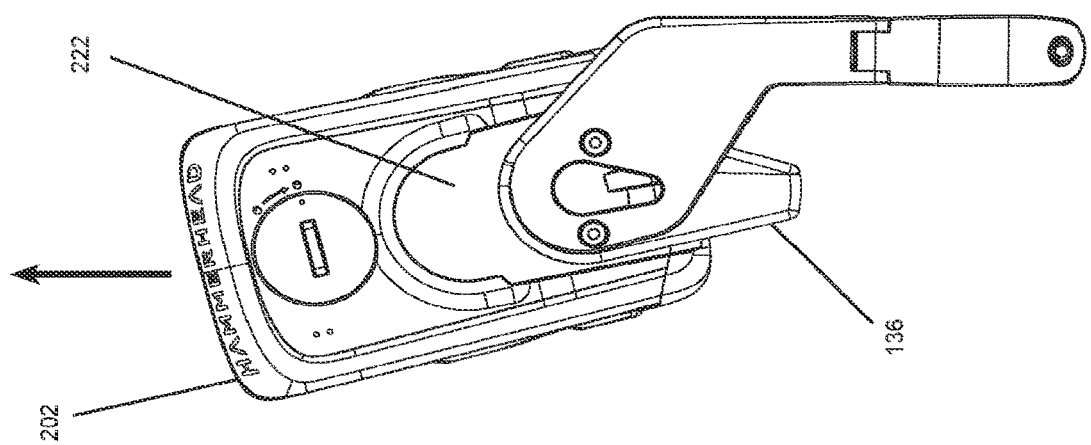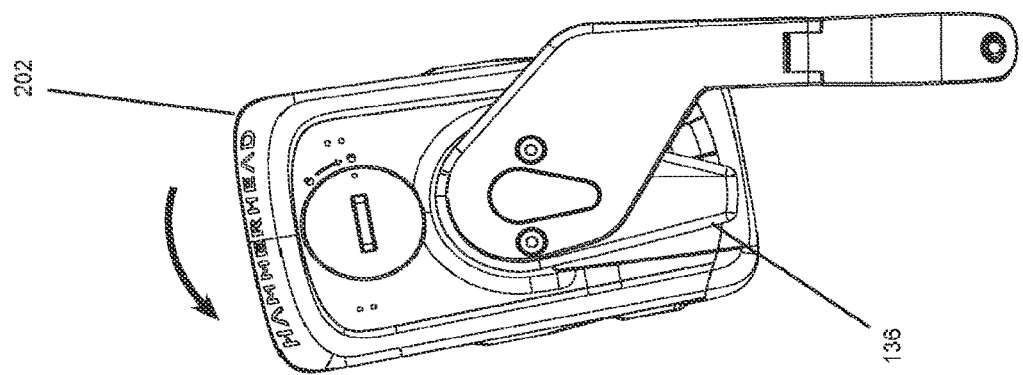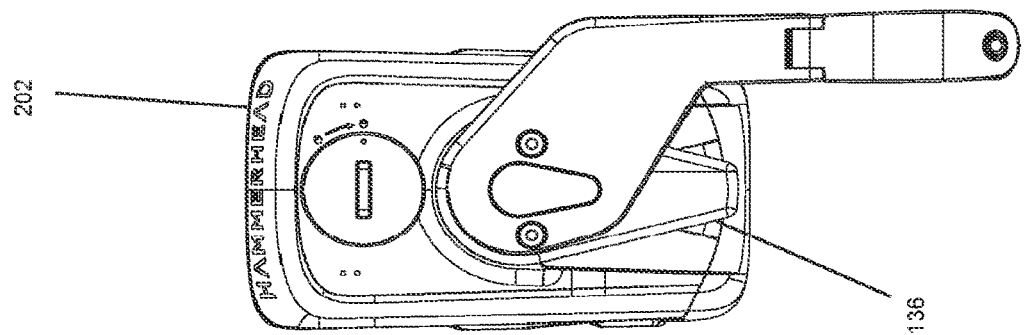

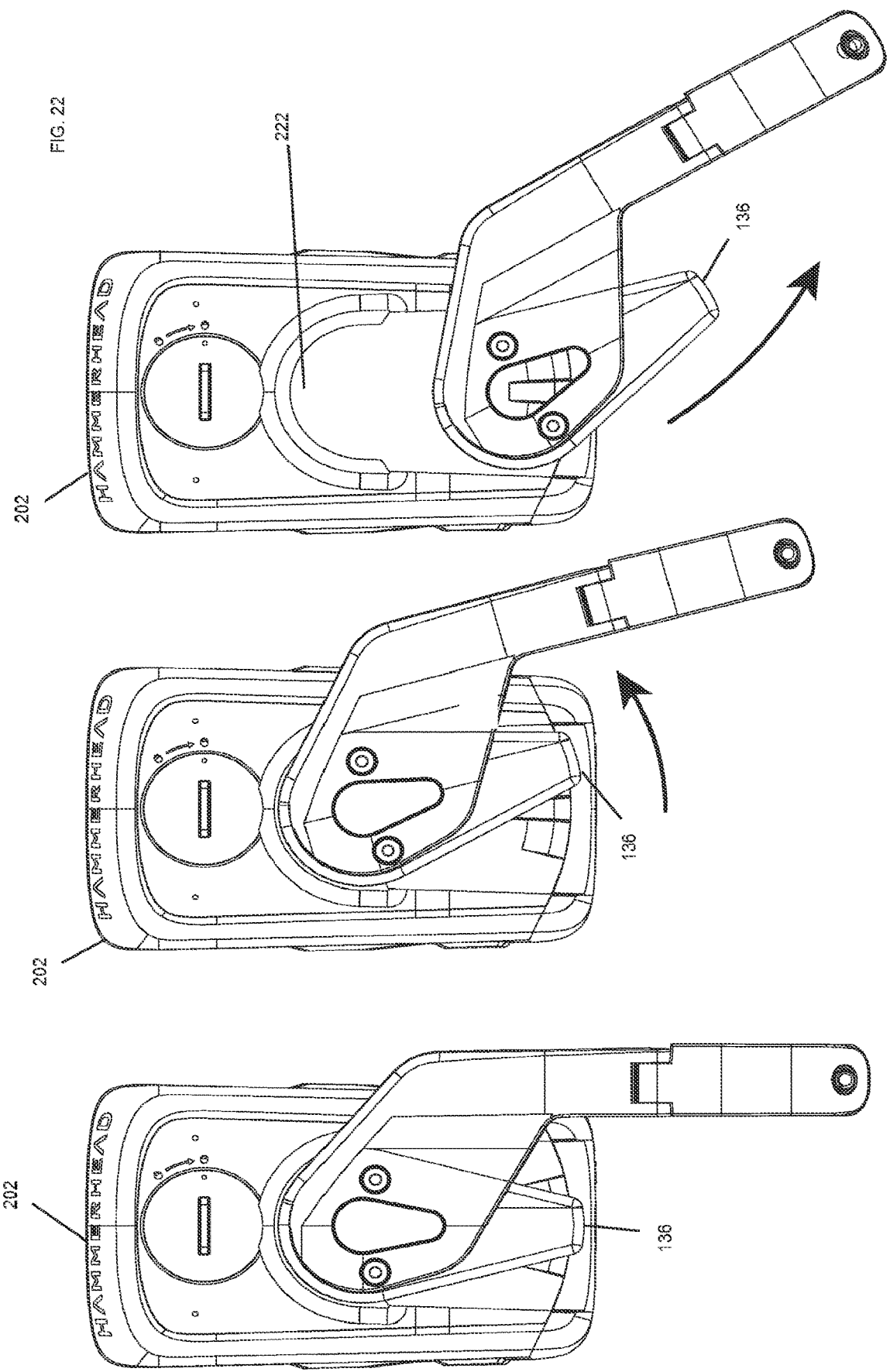

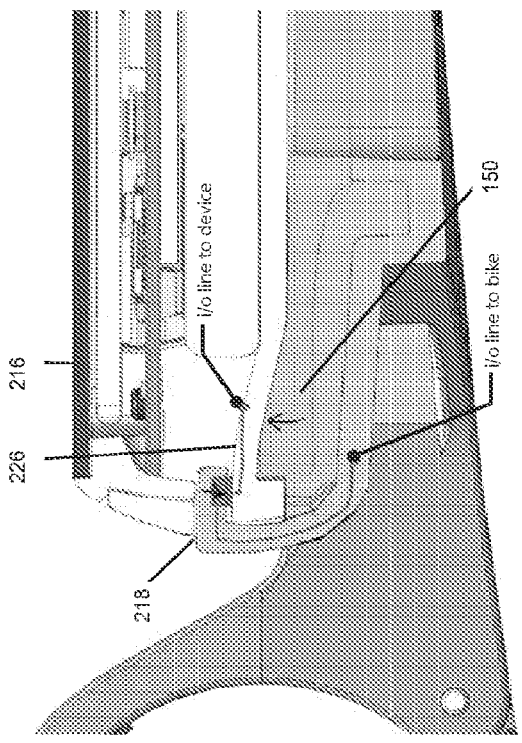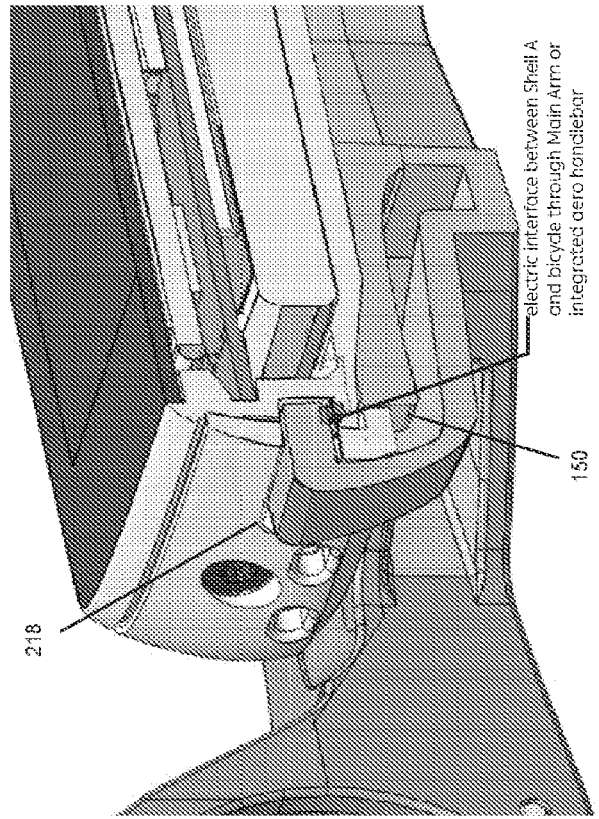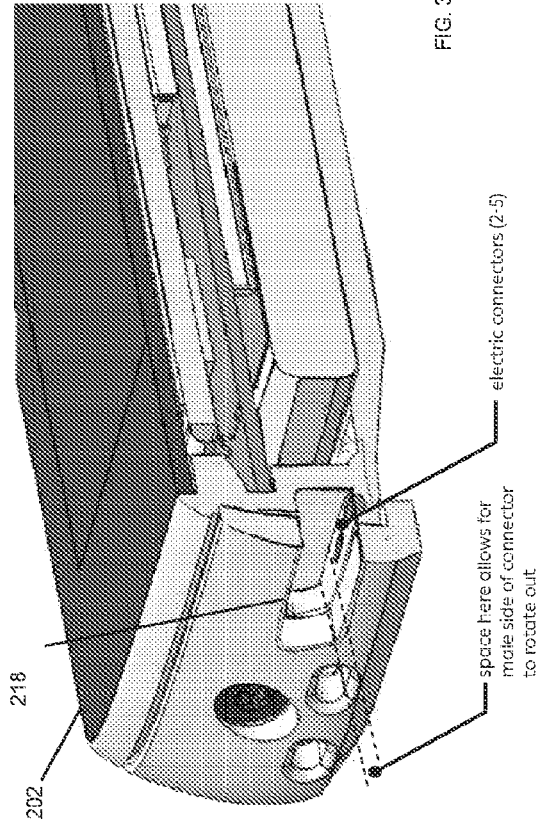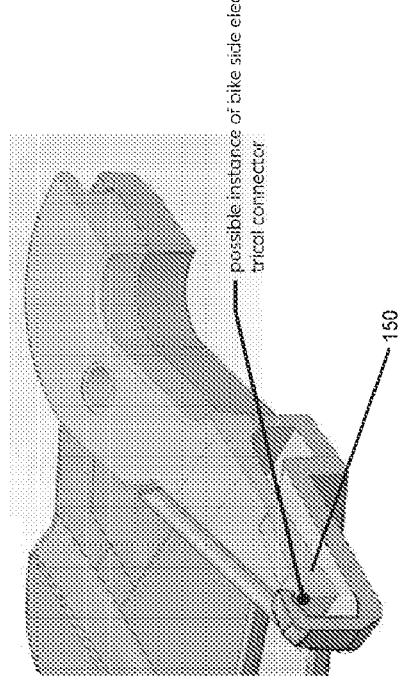
FIG. 34

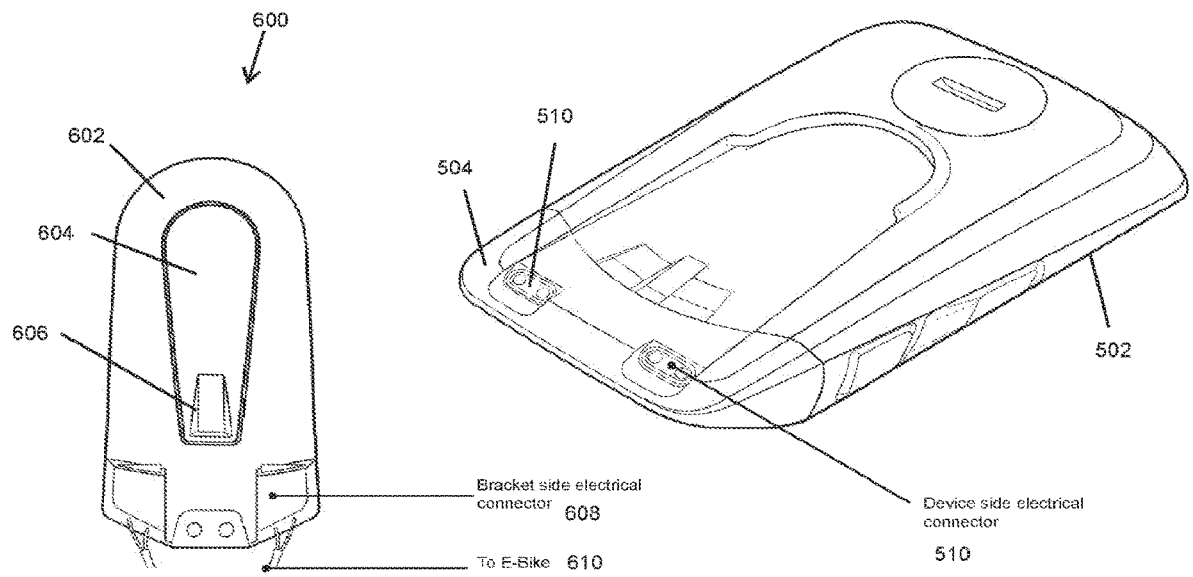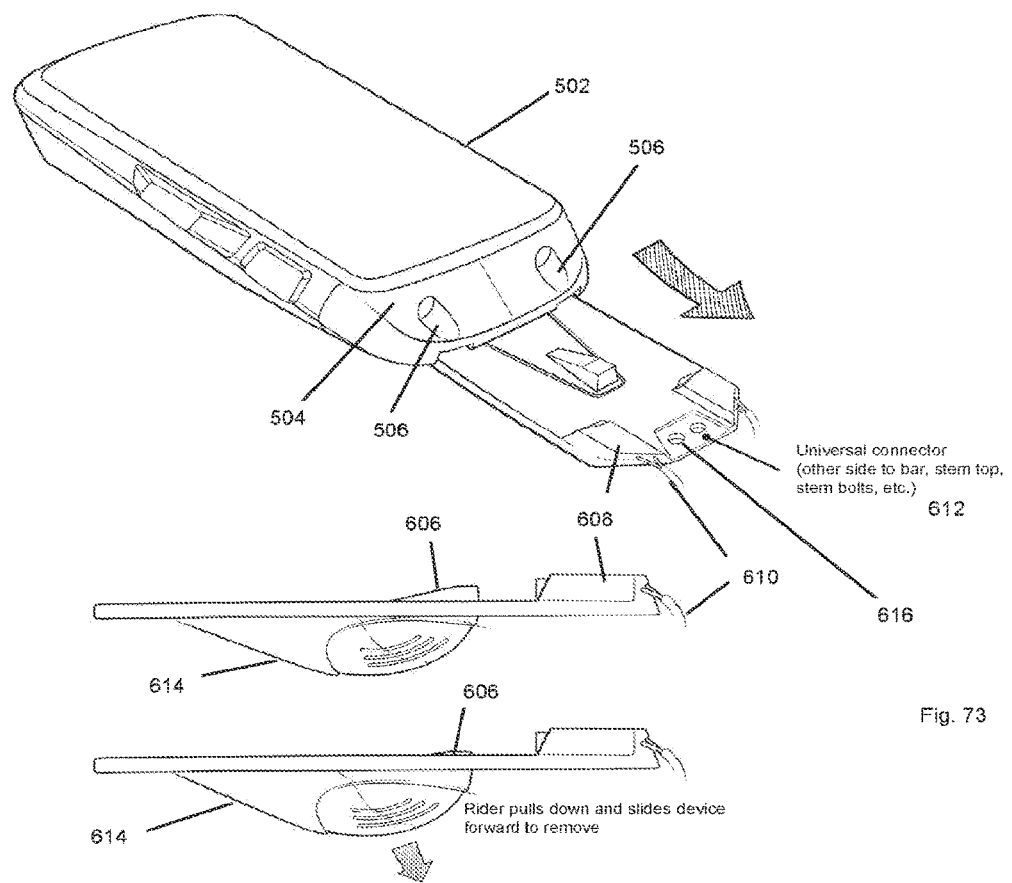
Fig. 73

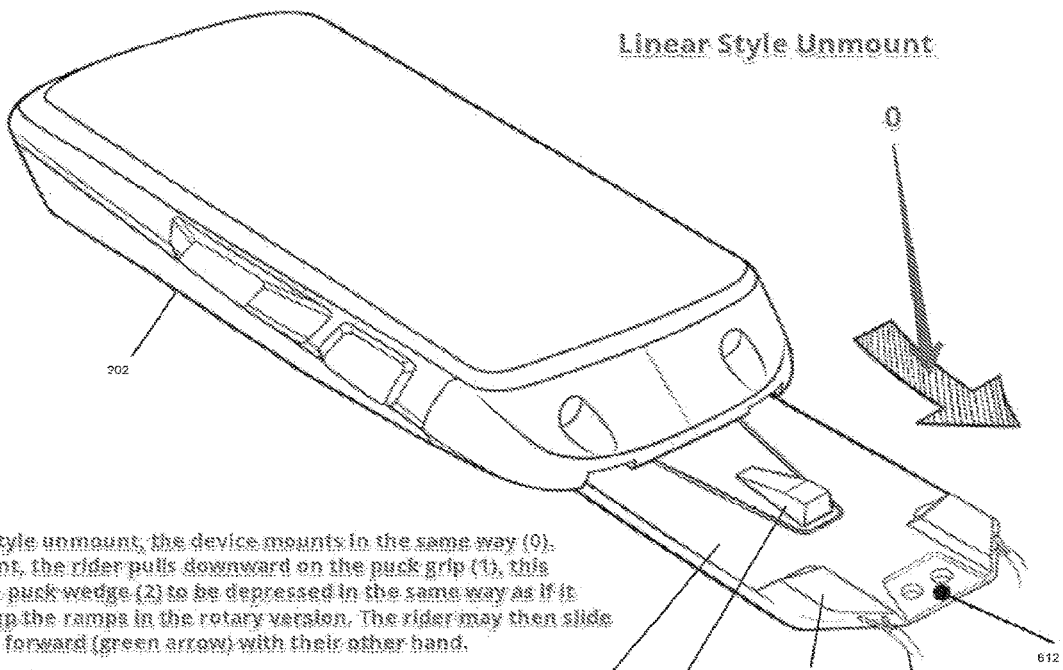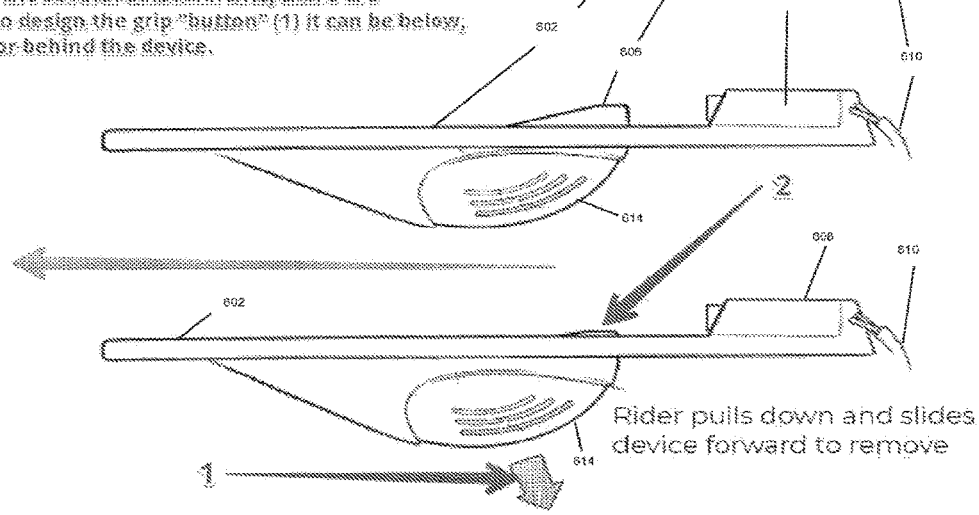

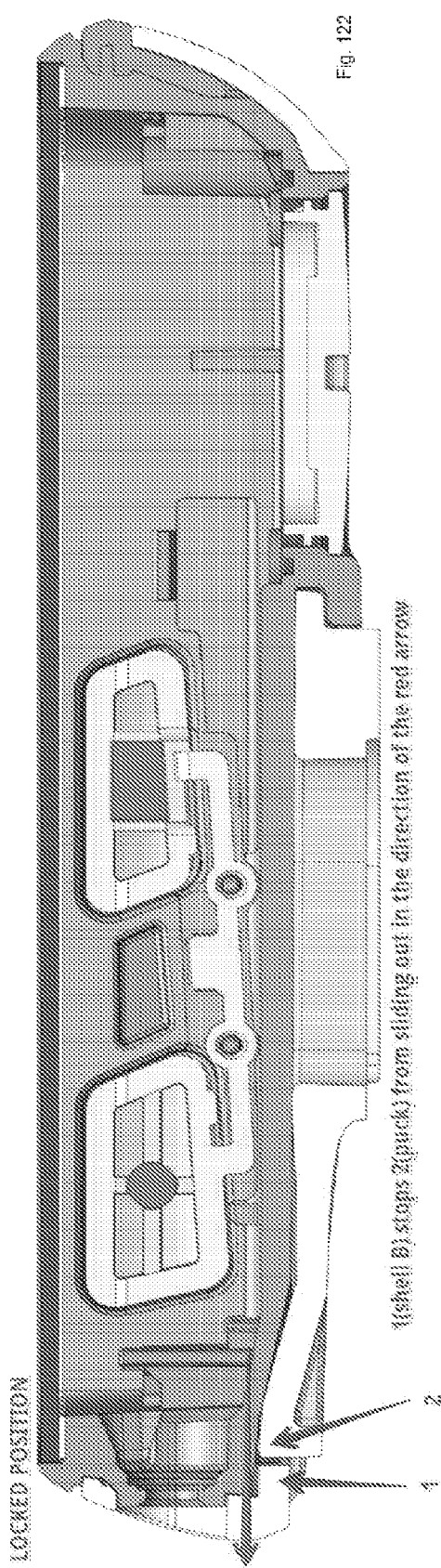

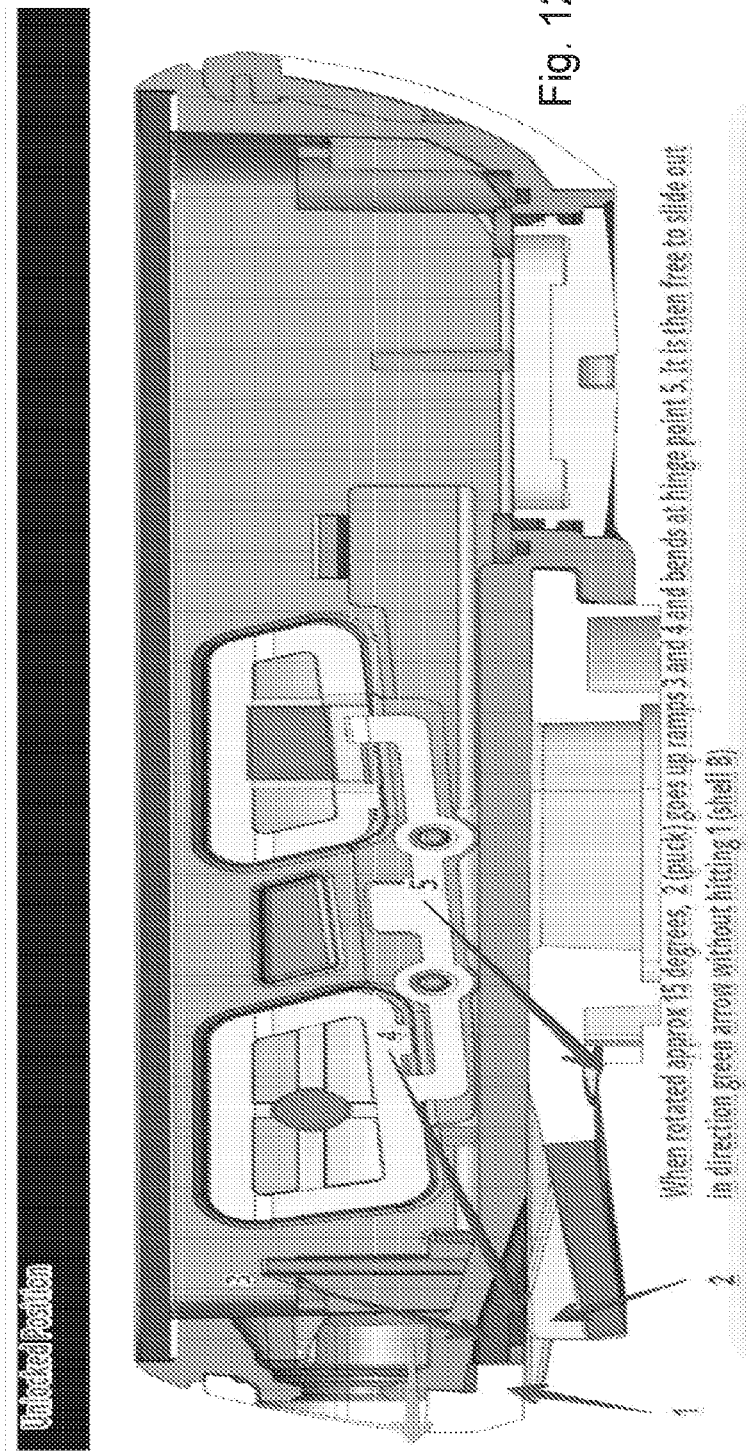

MOUNTING INTERFACES, DEVICES THEREWITH, ACCESSORIES THEREFOR, AND METHODS OF MANUFACTURE AND USE THEREOF

CROSS-REFERENCE TO RELATED PATENT APPLICATION

This patent application is a continuation-in-part of U.S. patent application Ser. No. 16/501,141 filed on 28 May 2020, which is incorporated by reference herein for all purposes.

TECHNICAL FIELD

This disclosure relates to mounting interfaces, devices therewith, accessories therefor, and methods of manufacture and use thereof.

BACKGROUND

An outdoor bicycle may have a handlebar onto which a bracket may be secured. The bracket may have a mounting interface configured to engage with an accessory (e.g., a smartphone, a dedicated navigation device) such that the mounting interface can securely hold the accessory when the outdoor bicycle is ridden. However, the mounting interface may not allow the accessory to be easily mounted thereon and unmounted therefrom. Further, the mounting interface may not hold the accessory sufficiently securely when the outdoor bicycle is ridden, which may lead to the accessory falling off the bracket.

SUMMARY

Generally, this disclosure enables various mounting interfaces, devices therewith, accessories therefor, and methods of manufacture and use thereof. In particular, these mounting interfaces include a latch configured to engage with a detent of an accessory (e.g., a smartphone, a dedicated navigation device, a storage container, a drinking bottle) in order to (a) allow the accessory to be easily mounted thereon and unmounted therefrom and (b) hold the accessory sufficiently securely when the accessory is mounted thereon.

In an embodiment, a device comprising: a mounting interface including a latch and a plate hosting the latch, wherein the latch including a block with a ramp and a platform extending off the ramp, wherein the plate including an exterior surface, wherein the ramp extending between the exterior surface and the platform, wherein the mounting interface is configured to engage an accessory including a detent with a ramp complement and a platform complement extending off the ramp complement such that the latch engages the detent and the ramp progressively engages the ramp complement until the platform engages the platform complement based on the plate rectilinearly and guidably sliding into the accessory over the detent.

In an embodiment, a method comprising: causing a clamp to clamp onto a bar; causing an arm to extend from the clamp as the clamp clamps onto the bar; causing a mounting interface to be supported by the arm as the clamp clamps onto the bar, wherein the mounting interface including a latch and a plate hosting the latch, wherein the latch including a block with a ramp and a platform extending off the ramp, wherein the plate including an exterior surface, wherein the ramp extending between the exterior surface and the platform; and causing the mounting interface to engage an accessory including a detent with a ramp complement and a platform complement extending off the ramp complement such that the latch engages the detent and the ramp progressively engages the ramp complement until the platform engages the platform complement based on the plate rectilinearly and guidably sliding into the accessory over the detent.

In an embodiment, a device comprising: an accessory including a detent with a ramp complement and a platform complement extending off the ramp complement, wherein the accessory is configured to engage with a mounting interface including a latch and a plate hosting the latch, wherein the latch including a block with a ramp and a platform extending off the ramp, wherein the plate including an exterior surface, wherein the ramp extending between the exterior surface and the platform, wherein the detent is configured to engage the latch such that the ramp complement progressively engages the ramp until the platform complement engages the platform based on the plate rectilinearly and guidably sliding into the accessory over the detent when the accessory engages the mounting interface.

In an embodiment, a method comprising: causing an accessory to be accessed, wherein the accessory including a detent with a ramp complement and a platform complement extending off the ramp complement; and causing the accessory to be mounted onto a mounting interface including a latch and a plate hosting the latch, wherein the latch including a block with a ramp and a platform extending off the ramp, wherein the plate including an exterior surface, wherein the ramp extending between the exterior surface and the platform, wherein the ramp extending between the exterior surface and the platform, wherein the detent engaging the latch such that the ramp complement progressively engages the ramp until the platform complement engages the platform based on the plate rectilinearly and guidably sliding into the accessory over the detent while the accessory engaging the mounting interface.

In an embodiment, a method comprising: causing a housing to be accessed, wherein the housing including a front side with an electronic display and a back side with a detent, wherein the front side opposing the back side, wherein the detent including a ramp complement and a platform complement off the ramp complement; and causing the housing to be mounted onto a mounting interface including a latch and a plate hosting the latch, wherein the latch including a block with a ramp and a platform off the ramp, wherein the plate including an exterior surface, wherein the ramp extending between the exterior surface and the platform, wherein the ramp extending between the exterior surface and the platform, wherein the detent engaging the latch such that the ramp complement progressively engaging the ramp until the platform complement engaging the platform based on the plate rectilinearly and guidably sliding into the back side over the detent while the housing engaging the mounting interface.

In an embodiment, a system comprising: a mounting interface including a latch and a plate hosting the latch, wherein the latch including a block with a ramp and a platform extending off the ramp, wherein the plate including an exterior surface, wherein the ramp extending between the exterior surface and the platform; and an accessory including a detent with a ramp complement and a platform complement extending off the ramp complement, wherein the mounting interface is configured to engage the accessory such that the latch engages the detent and the ramp progressively engages the ramp complement until the platform engages the platform complement based on the plate rectilinearly and guidably sliding into the accessory over the detent.

In an embodiment, a kit comprising: a mounting interface including a latch and a plate hosting the latch, wherein the latch including a block with a ramp and a platform extending off the ramp, wherein the plate including an exterior surface, wherein the ramp extending between the exterior surface and the platform; and an accessory including a detent with a ramp complement and a platform complement extending off the ramp complement, wherein the mounting interface is configured to engage the accessory such that the latch engages the detent and the ramp progressively engages the ramp complement until the platform engages the platform complement based on the plate rectilinearly and guidably sliding into the accessory over the detent.

In an embodiment, a device comprising: a bar; and a mounting interface coupled to the bar, wherein the mounting interface including a latch and a plate hosting the latch, wherein the latch including a block with a ramp and a platform extending off the ramp, wherein the plate including an exterior surface, wherein the ramp extending between the exterior surface and the platform, wherein the mounting interface is configured to engage an accessory including a detent with a ramp complement and a platform complement extending off the ramp complement such that the latch engages the detent and the ramp progressively engages the ramp complement until the platform engages the platform complement based on the plate rectilinearly and guidably sliding into the accessory over the detent.

DESCRIPTION OF DRAWINGS

FIGS. 19-20 show a set of view of the bracket of FIGS. 1-9 being mounted to the accessory of FIGS. 10-17 or vice versa according to this disclosure.

FIGS. 21-24 show a set of views of the bracket of FIGS. 1-9 being unmounted from the accessory of FIGS. 10-17 or vice versa according to this disclosure.

FIGS. 34-35 show a set of views for communication of electrical energy or data via the bracket of FIGS. 1-9 to or from the accessory of FIGS. 10-17 while the bracket holds the accessory as per FIGS. 18 and 25 according to this disclosure.

FIGS. 63-80 show a set of views of an embodiment of an accessory and a bracket, where the accessory includes a set of ports configured for power and data transfer to or from a vehicle (e.g., a battery or a data source of a mobile bicycle, a motorcycle, a jet-ski, an e-bike), and the bracket is configured to enable such power and data transfer to or from a vehicle (e.g., a battery or a data source of a mobile bicycle, a motorcycle, a jet-ski, an e-bike) according to this disclosure.

FIGS. 91-97 show a set of views of an embodiment of the bracket of FIGS. 73-80 secured to the bar of FIGS. 26-33 and not configured to enable power and data transfer according to this disclosure.

FIG. 121 shows a set of views of an embodiment of an accessory and a bracket, where the accessory includes a set of ports configured for power and data transfer, and the bracket is configured to enable such power and data transfer according to this disclosure.

FIG. 122 shows a cross-sectional profile view of an embodiment of a bracket of FIGS. 1-9 being locked or otherwise engaging with an accessory of FIGS. 10-17 according to this disclosure.

FIG. 123 shows a cross-sectional profile view of an embodiment of a bracket of FIGS. 1-9 being unlocked or otherwise disengaging with an accessory of FIGS. 10-17 according to this disclosure.

DETAILED DESCRIPTION

Figure 1:
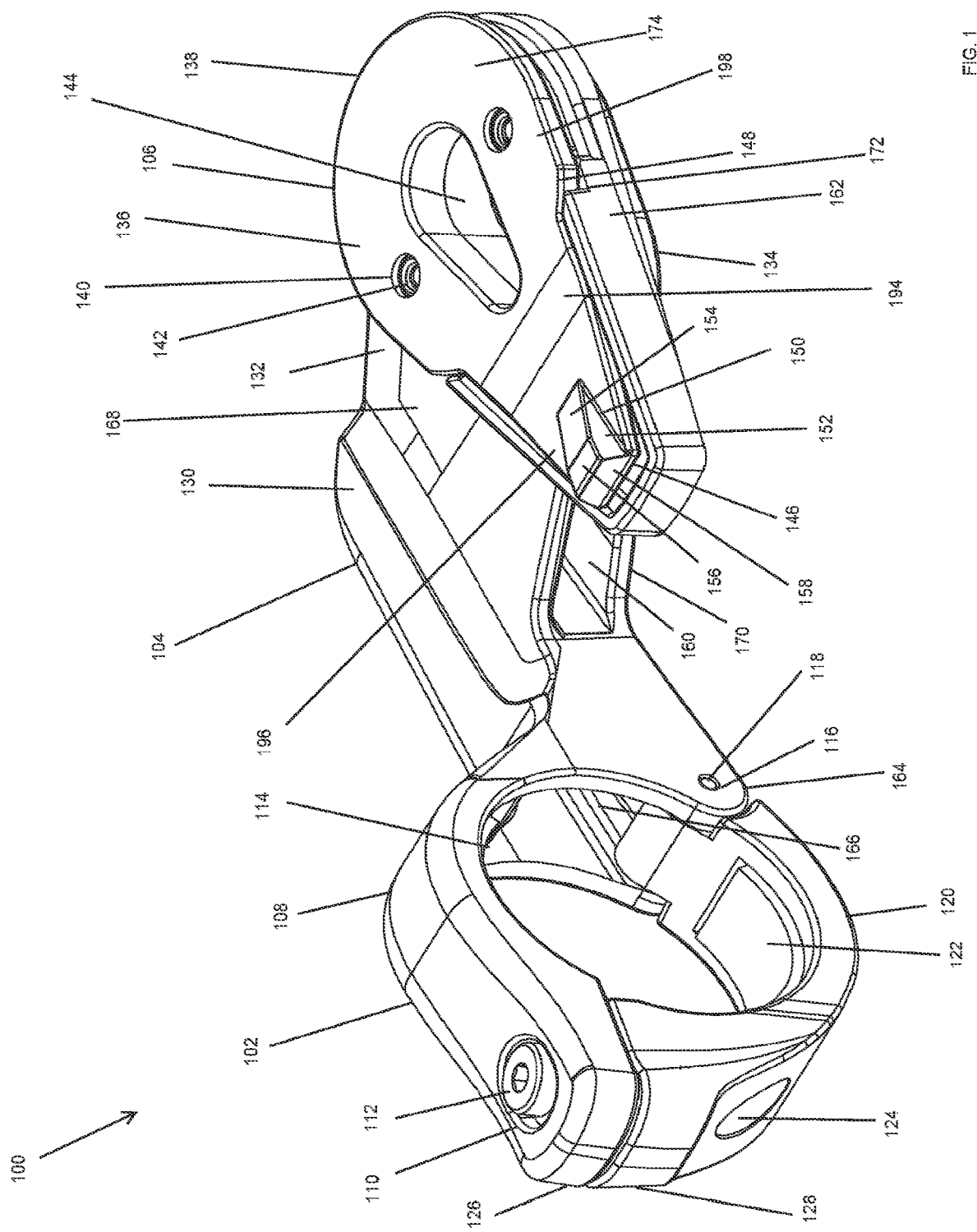
FIGS. 1-9 show a set of views of an embodiment of a bracket with a mounting interface according to this disclosure.
Figure 2:
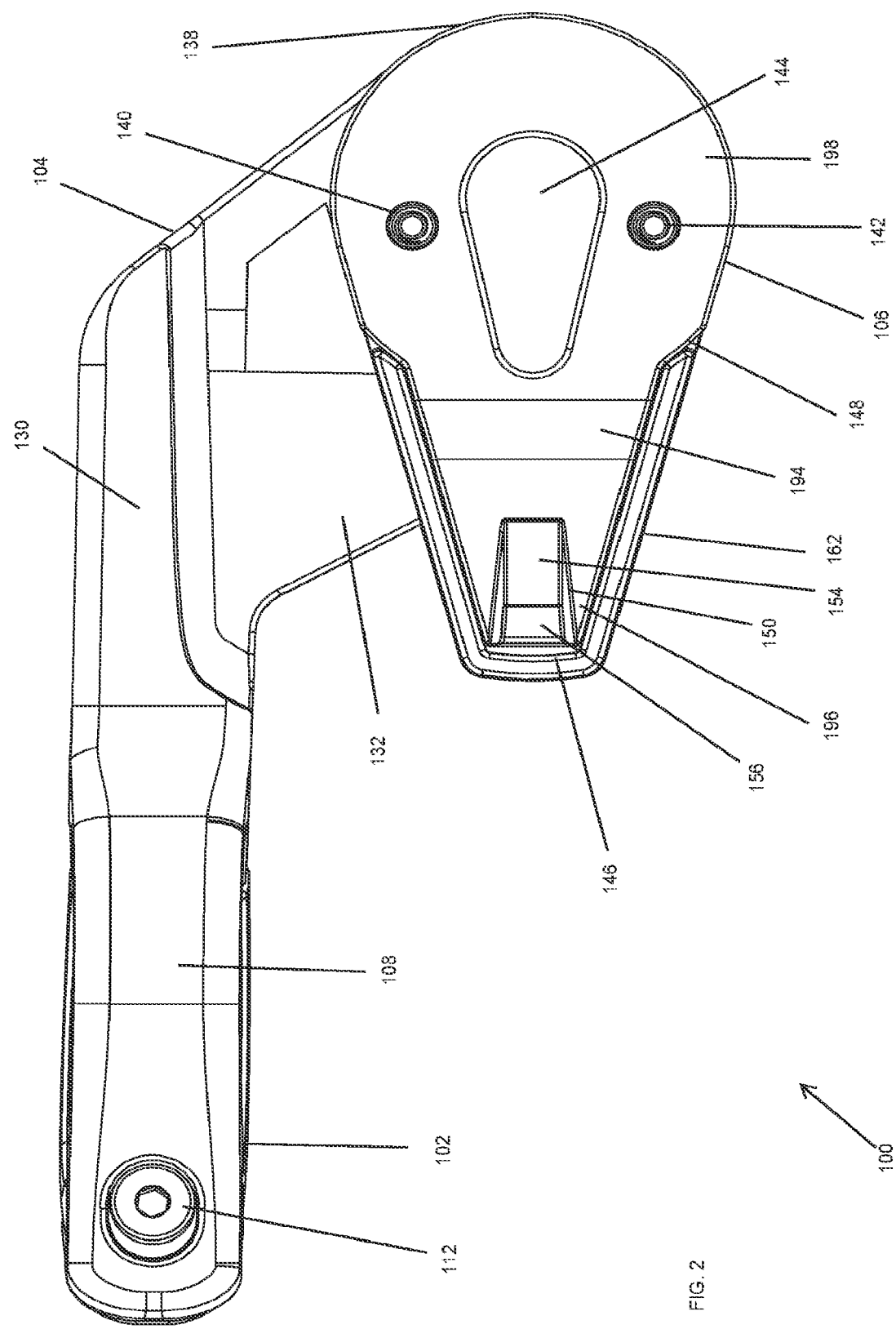
Figure 3:
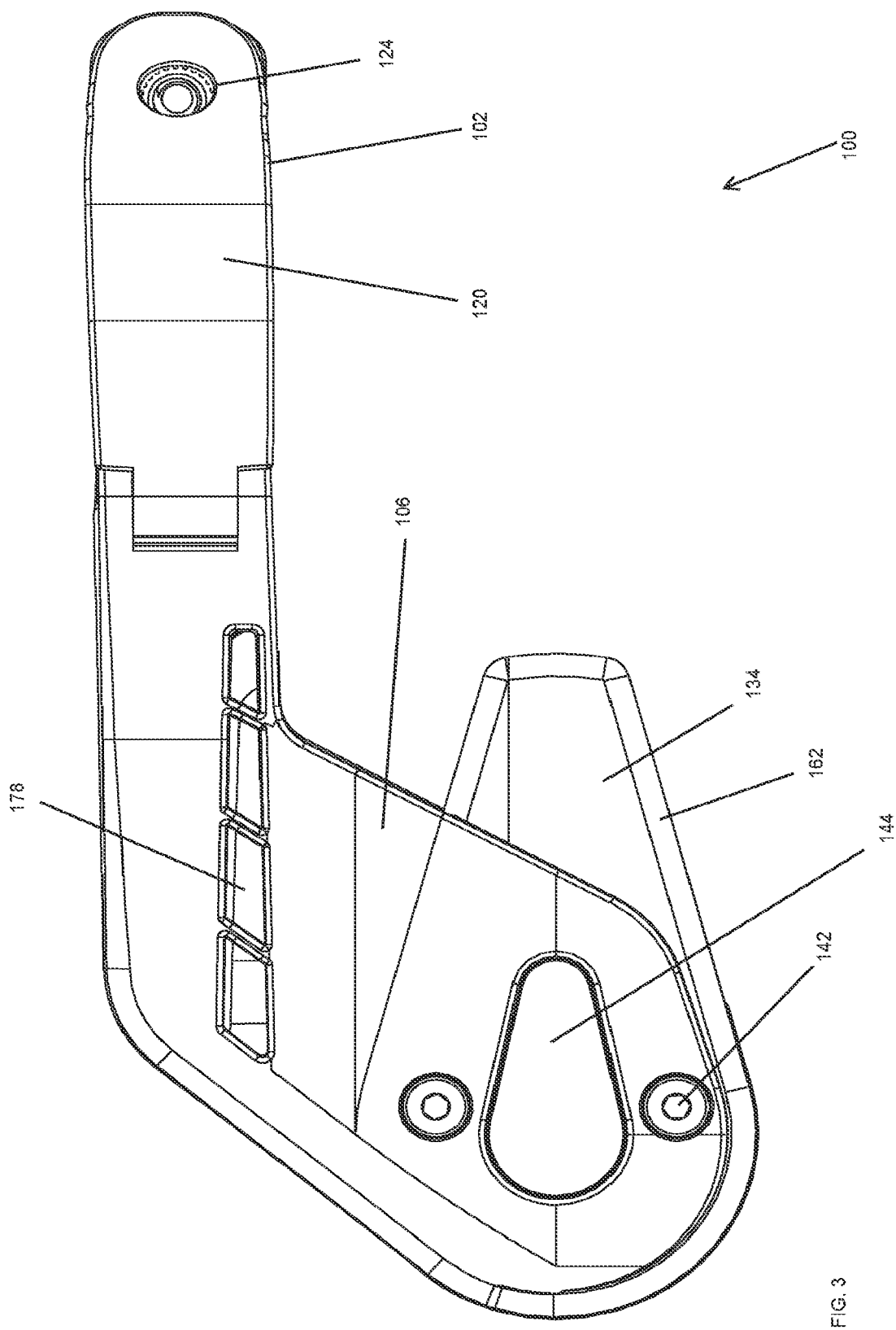
Figure 4:
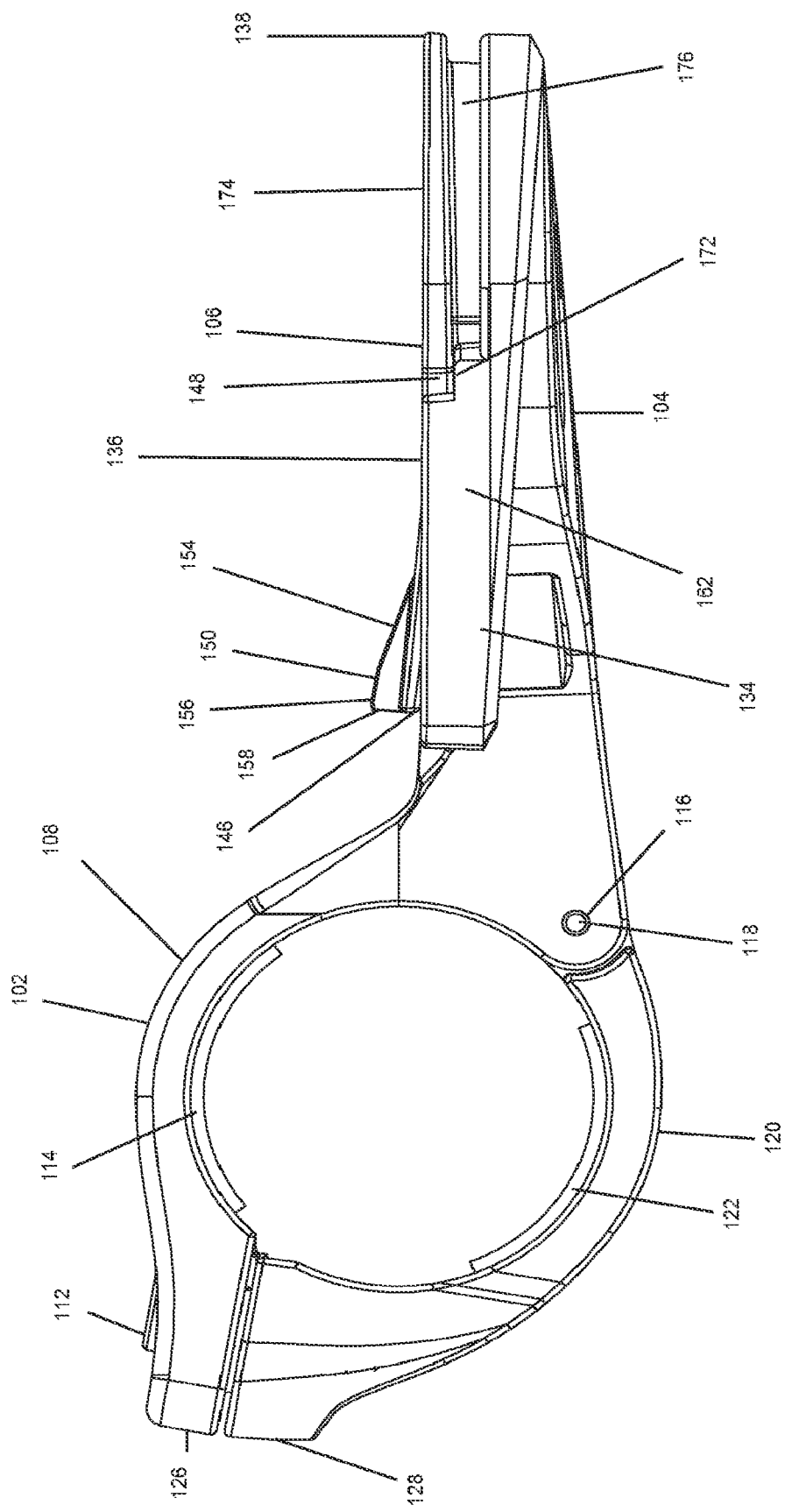
Figure 5:
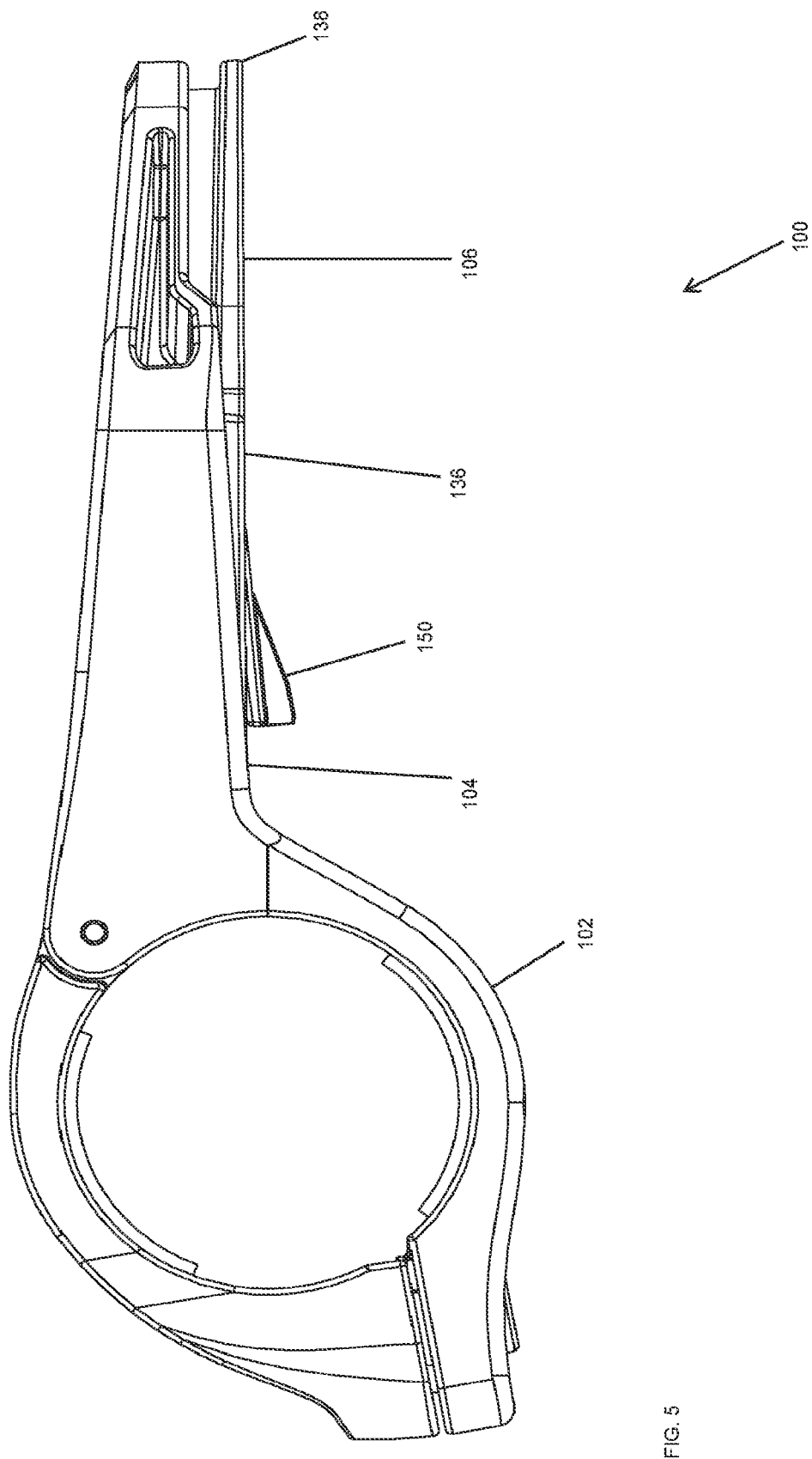
Figure 6:
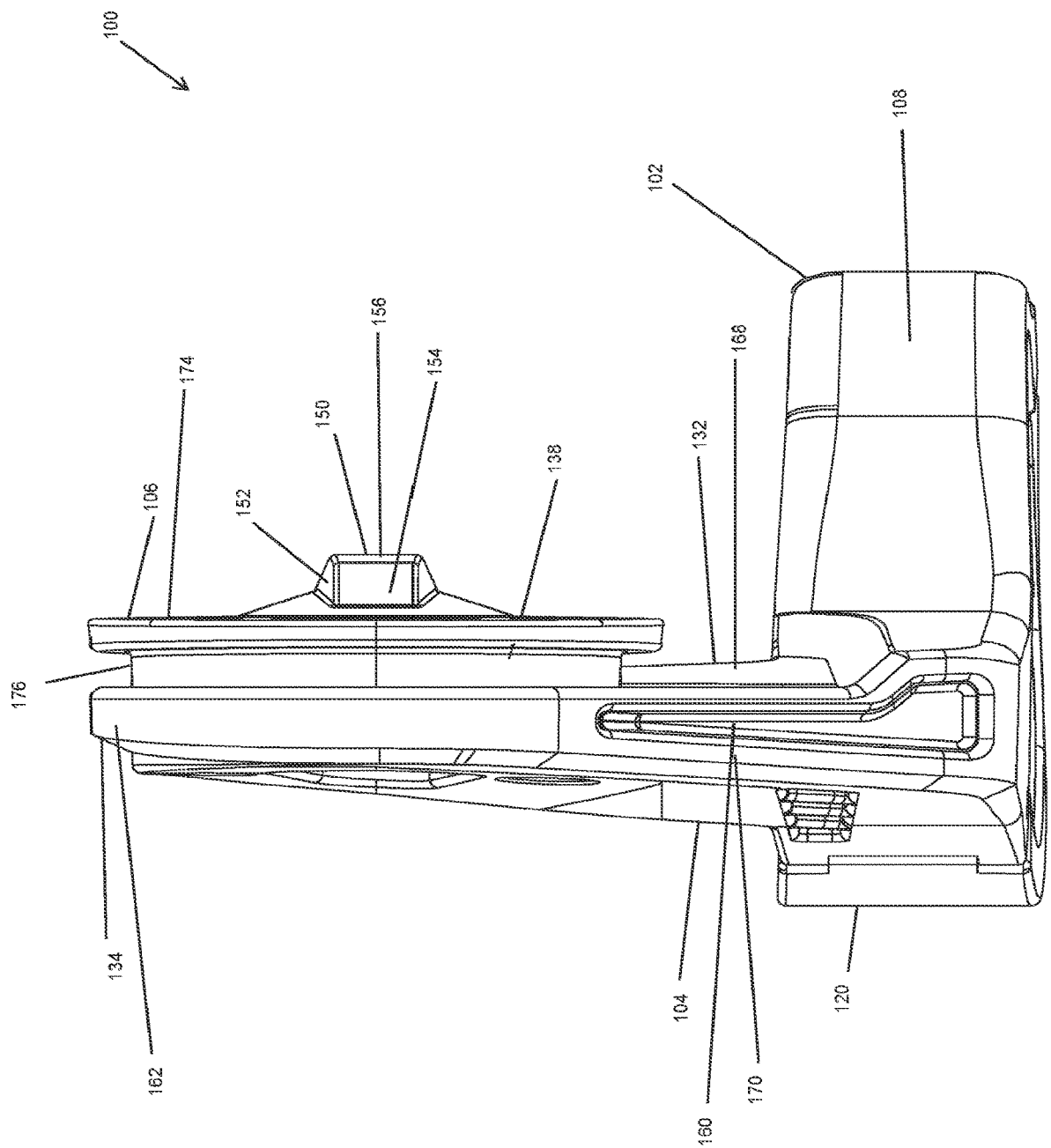
Figure 7:
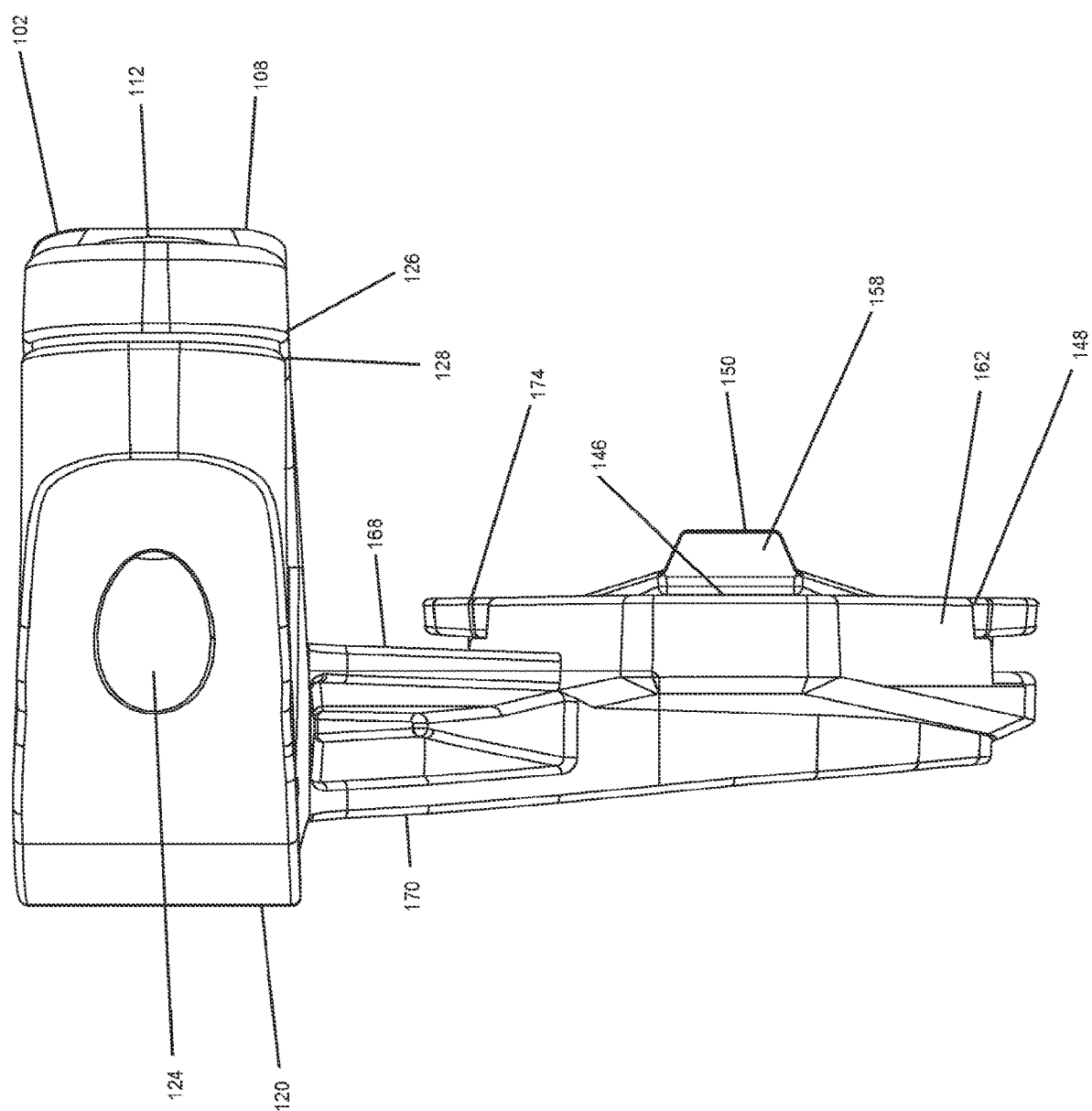
Figure 8:
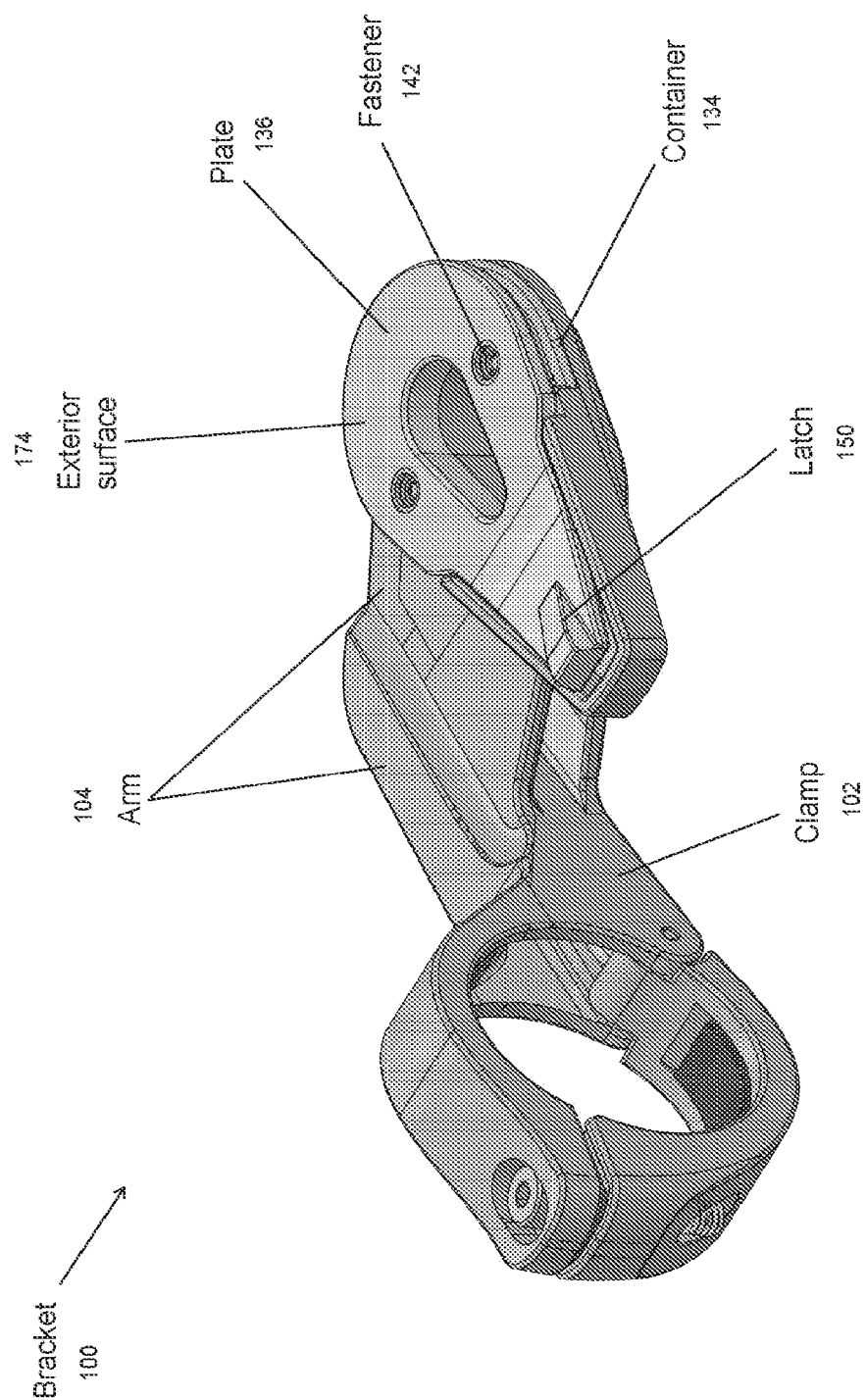
Figure 9:
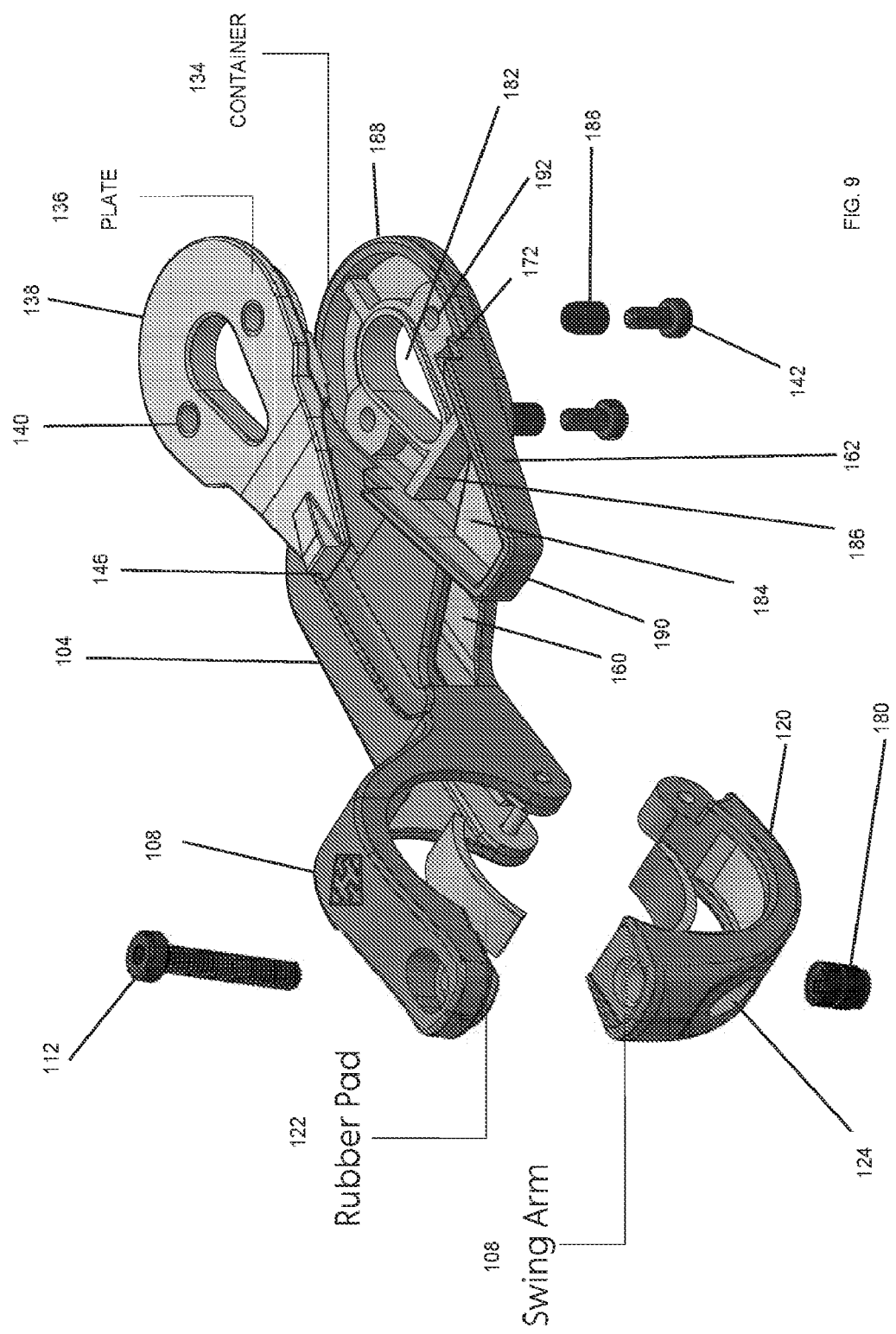
Figure 10:
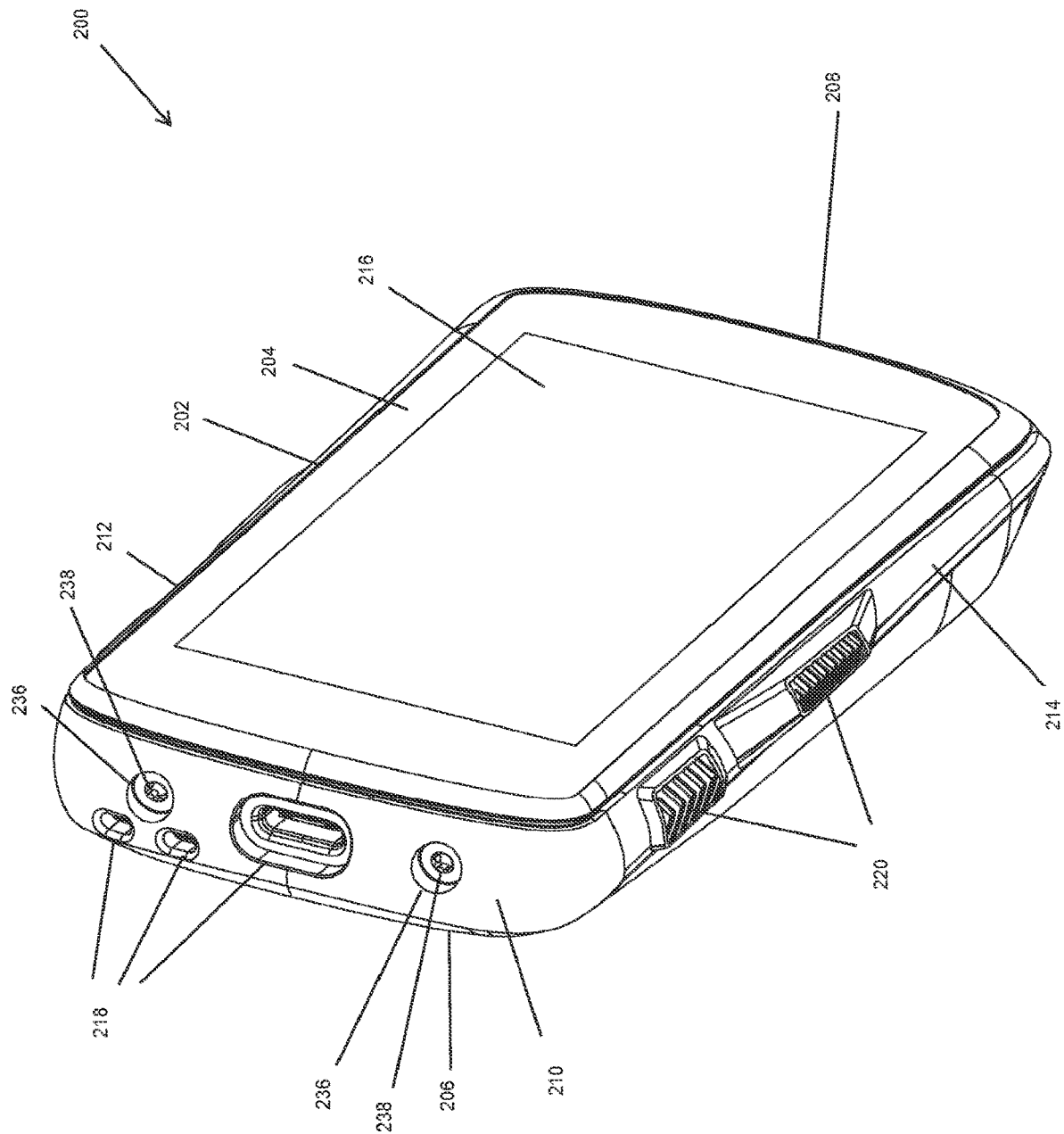
FIGS. 10-17 shows a set of views of an embodiment of an accessory with a side configured for engagement with the mounting interface of FIGS. 1-9 according to this disclosure.
Figure 11:
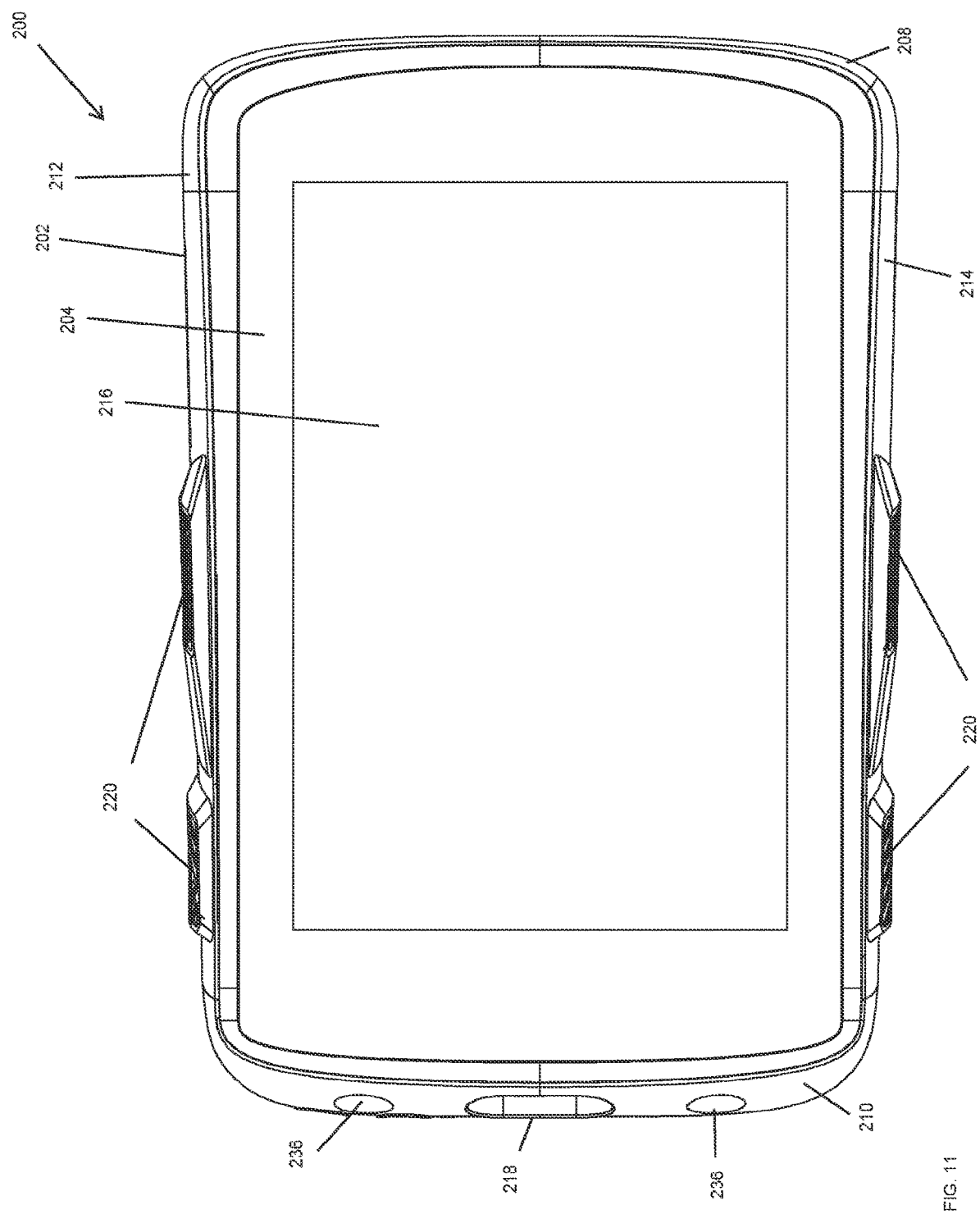
Figure 12:
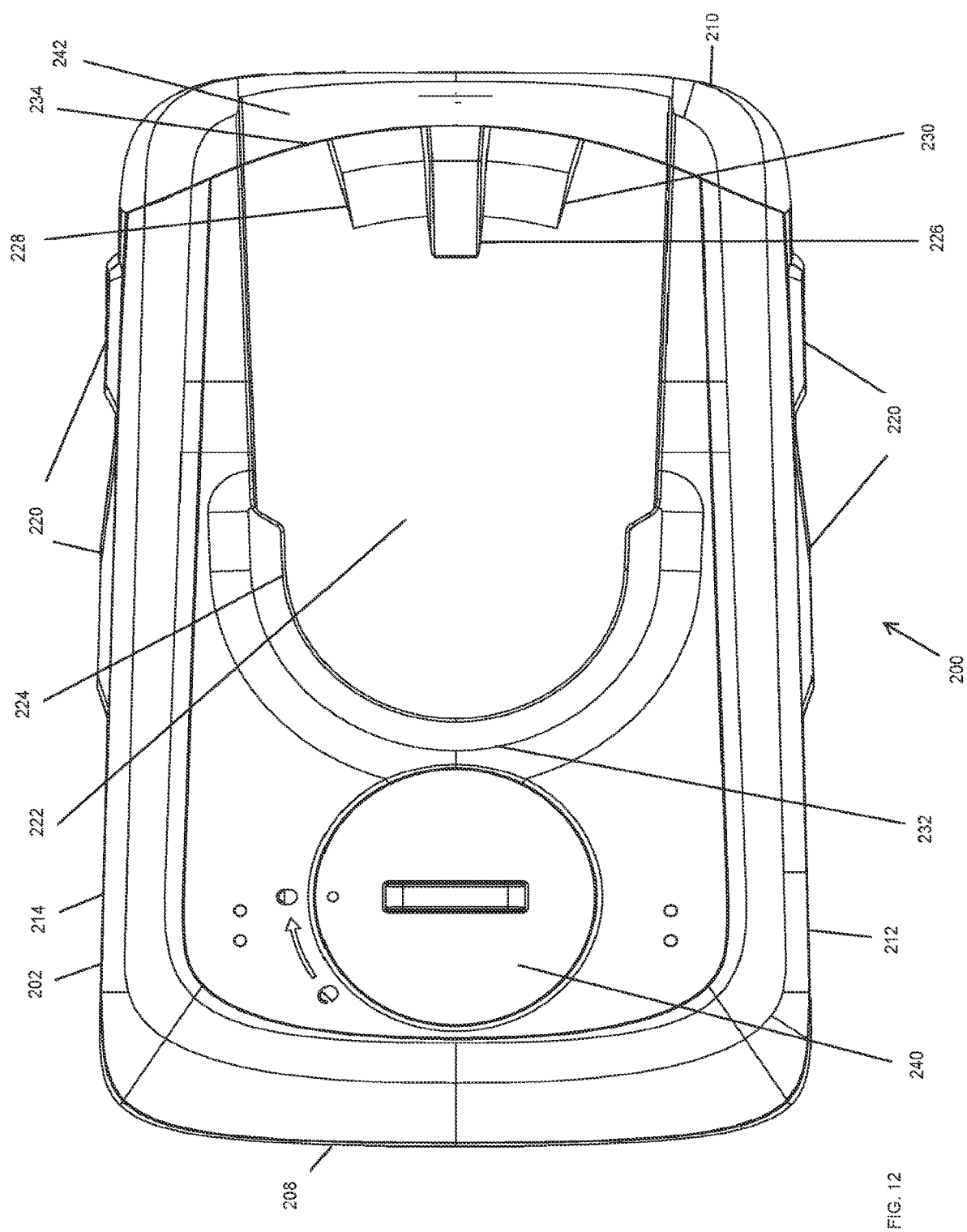
Figure 13:
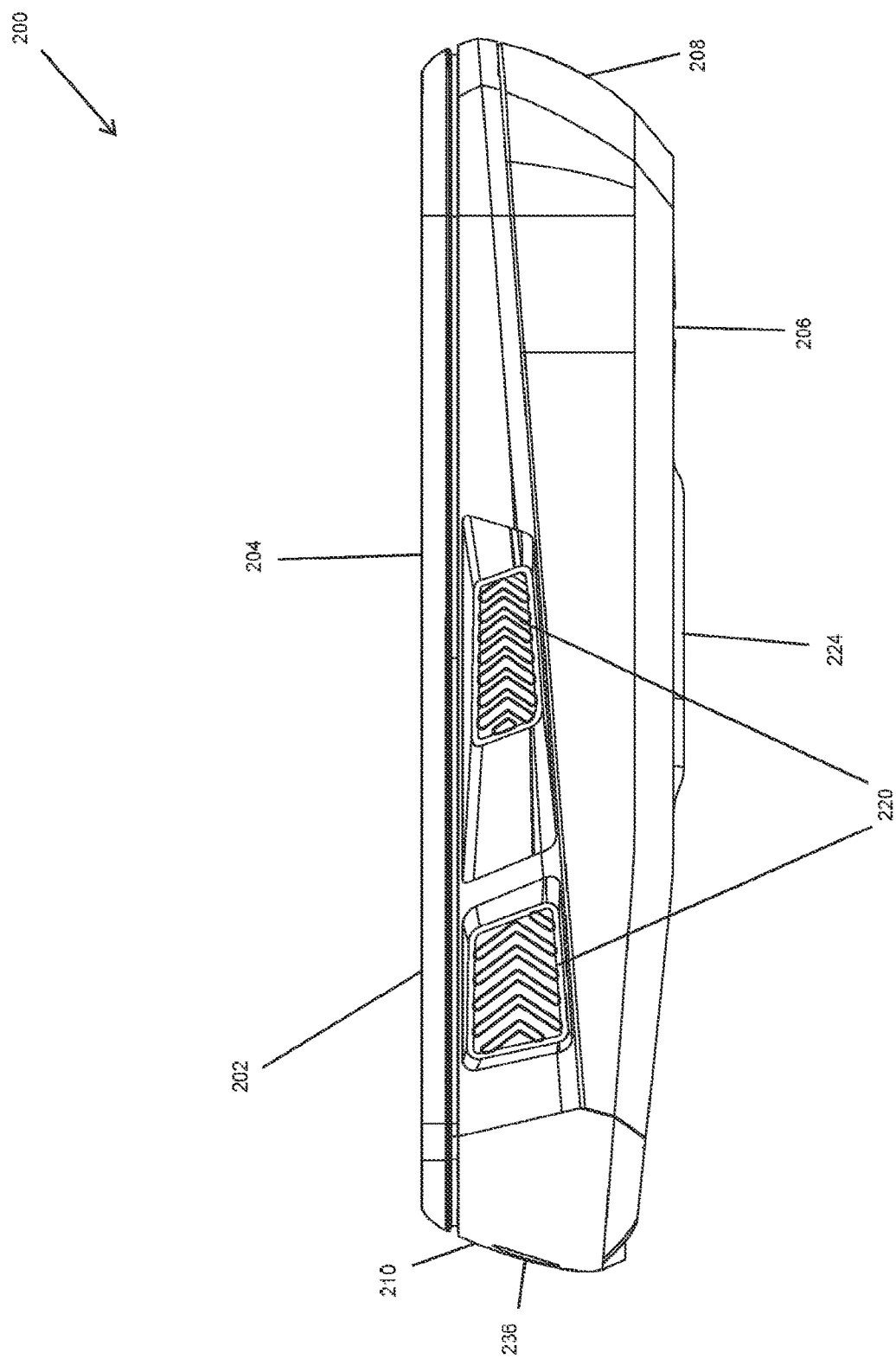
Figure 14:
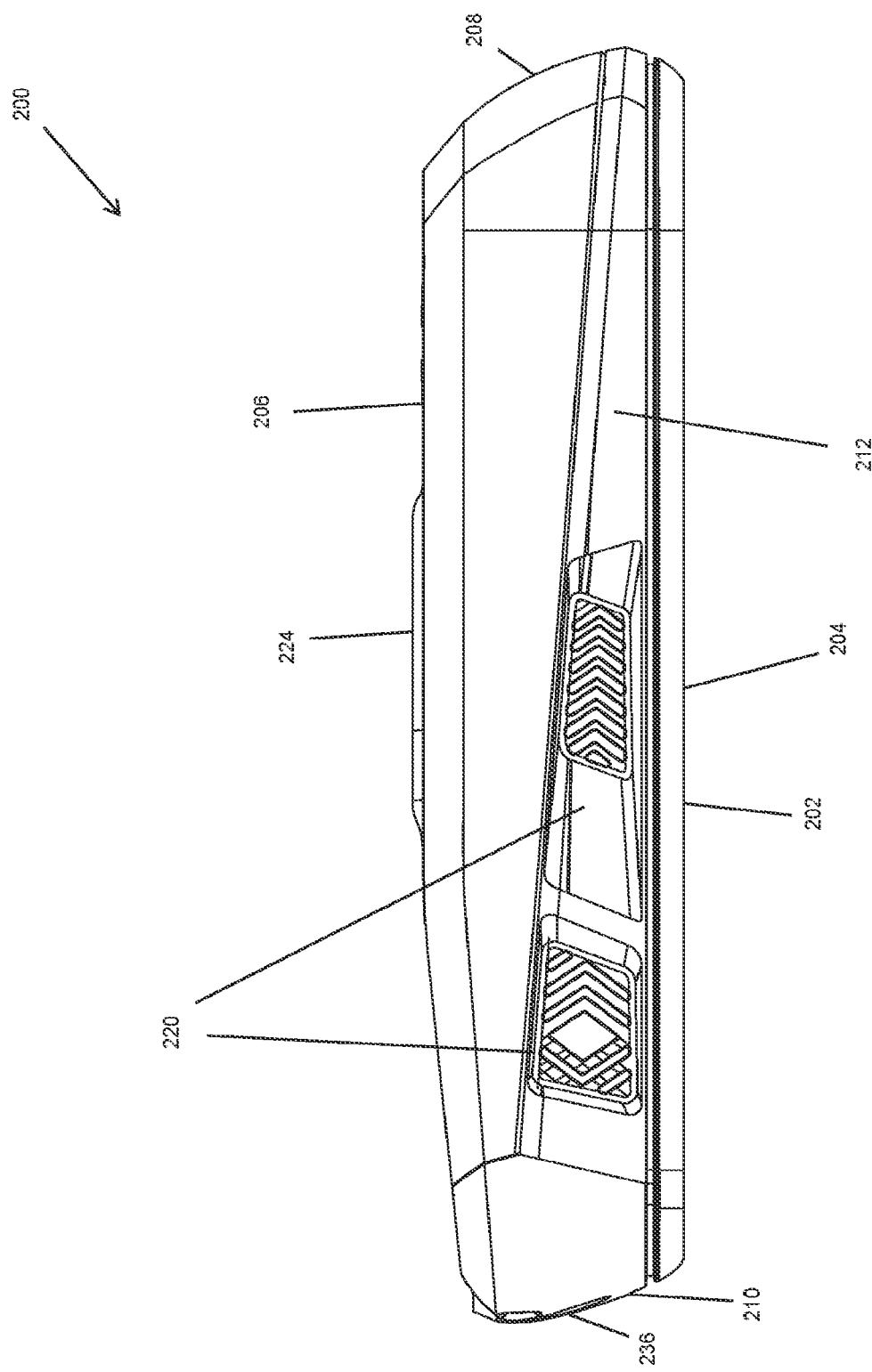
Figure 15:
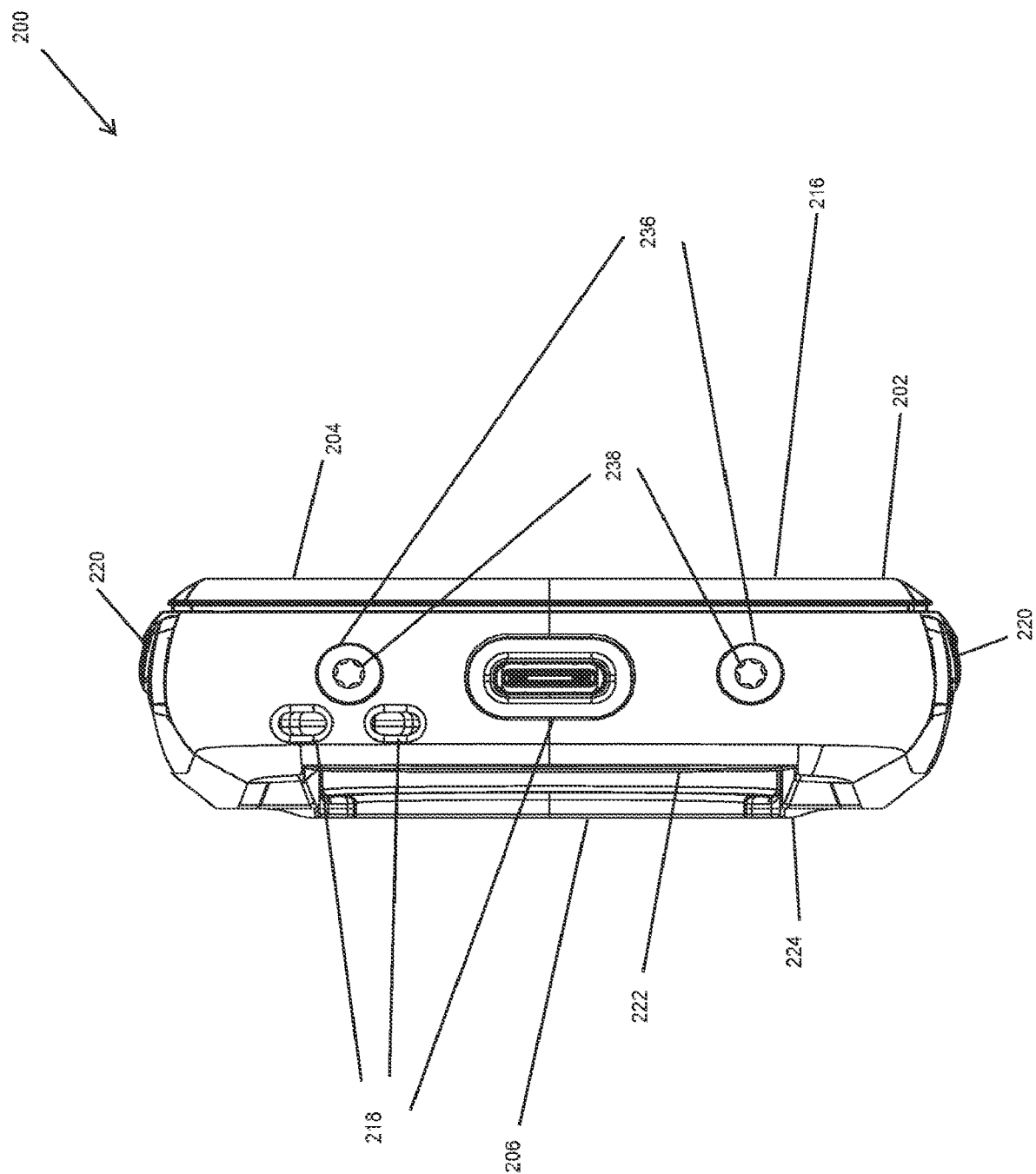
Figure 16:
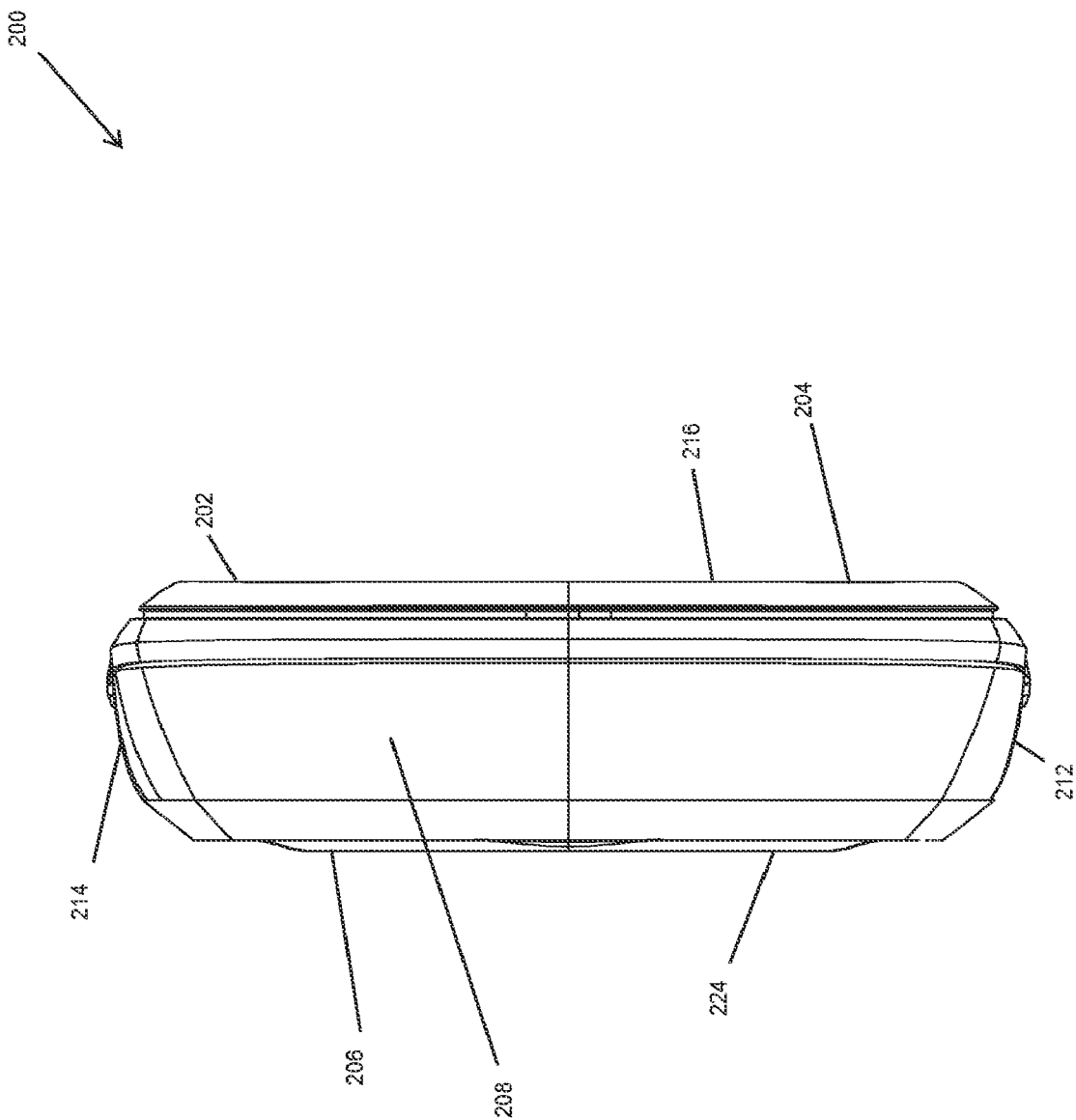
Figure 17:
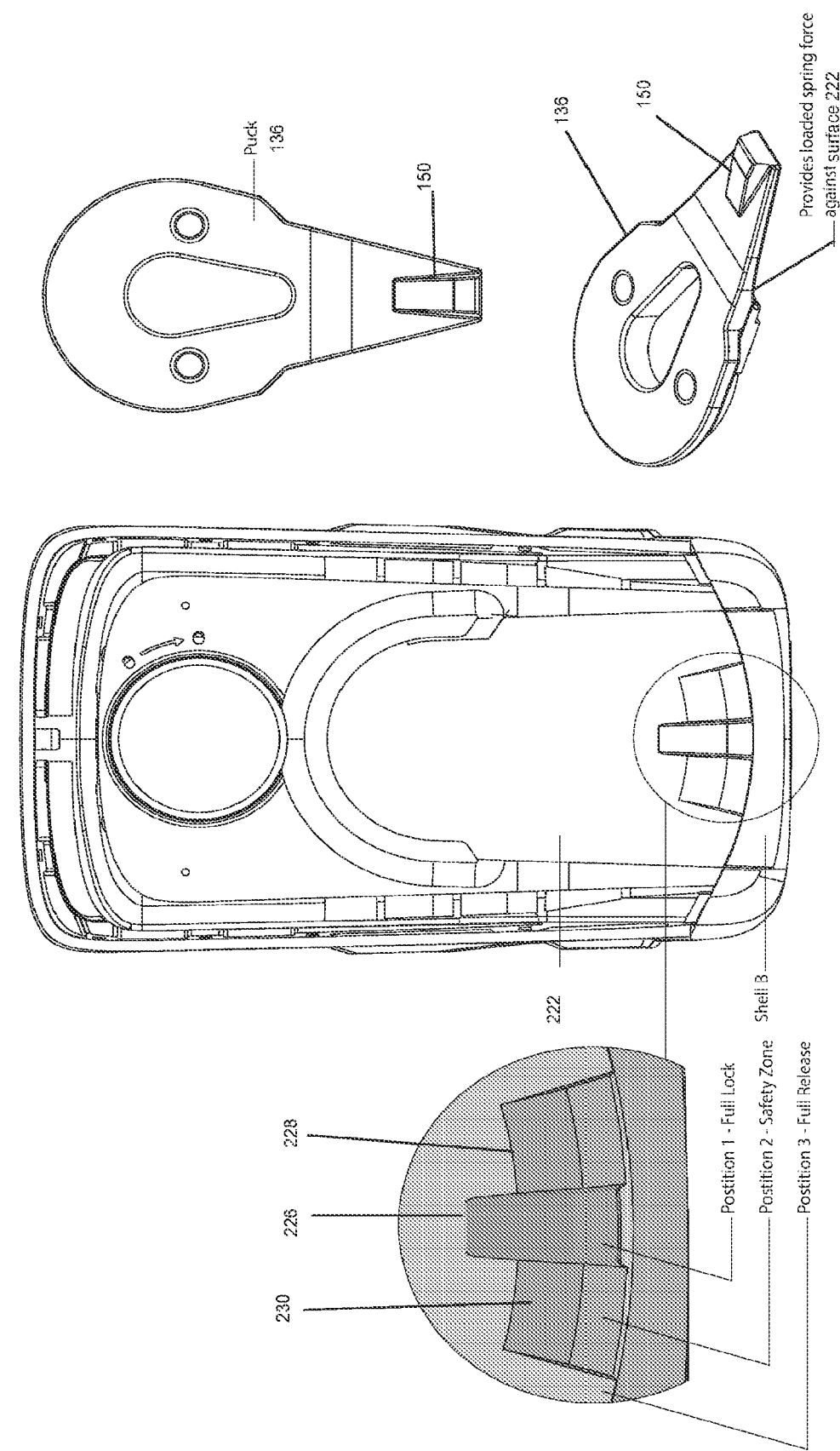

Generally, this disclosure enables various mounting interfaces, devices therewith, accessories therefor, and methods of manufacture and use thereof. In particular, these mounting interfaces include a latch configured to engage with a detent of an accessory (e.g., a smartphone, a dedicated navigation device, a storage container, a drinking bottle) in order to (a) allow the accessory to be easily mounted thereon and unmounted therefrom and (b) hold the accessory sufficiently securely when the accessory is mounted thereon. Note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense, unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

FIGS. 1-9 show a set of views of an embodiment of a bracket with a mounting interface according to this disclosure. In particular, a bracket 100 includes a clamp 102, an arm 104, and a mounting interface 106. The arm 104 extends (e.g., spans) between the clamp 102 and the mounting interface 106 such the arm 104 connects the clamp 102 and the mounting interface 106. Note that the clamp 102 or the arm 104 can be omitted. For example, the mounting interface 106 can be directly secured to the clamp 102 without the arm 104 or the arm 104 can extend from another device without the clamp 102 or the mounting interface 106 can be a surface (e.g., horizontal, vertical, diagonal).

The clamp 102 includes an arm 108 (e.g., plastic, metal), which is rigid (e.g., unable to be manually bent by-hand), solid (but can be perforated), and smooth (but can be textured, rough, or knurled). The arm 108 includes an end portion 126 hosting an opening 110, which may be threaded. The arm 108 includes an end portion 164 hosting a pair of openings 116 that oppose each other on the arm 108. The end portion 126 opposes the end portion 164. The arm 108 arcuately extends (e.g., C-shape, U-shape) between the end portion 126 and the end portion 164. The arm 108 includes a pad 114 (e.g., rubber, shape memory, elastic, resilient) extending between the end portion 126 and the end portion 164, although the pad 114 can be omitted. The arm 108 includes a cavity 166 leading into the arm 104, although the cavity 166 can be omitted.

The clamp 102 includes an arm 120 (e.g., plastic, metal), which is rigid (e.g., unable to be manually bent by-hand), solid (but can be perforated), and smooth (but can be textured, rough, or knurled). The arm 120 includes a pair of horns 118 (or a pin) extending into the pair of openings 116 such that the pair of hors 118 pivotally secures the arm 120 to the arm 108 and the arm 120 can pivot (e.g., swing, rotate) from a closed position to an open position relative to the arm 108 (e.g., when pivoted by a user) and such that the arm 120 can pivot (e.g., swing, rotate) from the open position to the closed position relative to the arm 108 (e.g., when pivoted by a user). The arm 120 includes a pad 122 (e.g., rubber, shape memory, elastic, resilient) that faces the pad 114 when the arm 120 is positioned in the closed position, although the pad 122 can be omitted. The arm 120 includes an end portion 128 hosting an opening 124, which may be threaded, distal to the pair of horns 118.

When the arm 120 is positioned (e.g., pivoted, swung, rotated) in the closed position such that the end portion 126 and the end portion 128 are in contact with each other, the arm 108 hosts a bolt 112 (or a screw) having a body fastenably extending into the opening 110 and the opening 124 to keep the arm 120 positioned in the closed position. The bolt 112 has a head extending from the body, where the head is configured for a hex driver, but other configurations are possible (e.g., slot, cross). There may be a nut 180 extending within the opening 124 and fastening onto the body of the bolt 112. However, the opening 110 and the opening 124 may be threaded and the body of the bolt 112 may be fastening to the opening 110 and the opening 124, without using the nut 180. As such, if the bolt 112 is fastenably driven (e.g., a screwdriver, a wrench, an electric drill, a hex driver, a ratchet) into the opening 112 and the opening 124, then the bolt 112 may keep the arm 120 positioned in the closed position such that the end portion 126 and the end portion 128 are in contact with each other. Such fastening of the bolt 112 may control how much of a clamping force the arm 102 or the arm 120 can exert or apply onto a bar (e.g. a frame, a handlebar, an integrated handlebar, a stem, an integrated barstem) when the clamp 102 is clamped onto the bar such that (a) the bar extends between the arm 108 and the arm 120, (b) the bar extends between the pad 114 and the pad 122, or (c) the pad 114 and the pad 122 are in contact with the bar. Note that the clamping force may be moderated by the pad 114 or the pad 122, if present, in order not to damage the bar.

The arm 104 includes a sub-arm 130 (e.g., plastic, metal) and a sub-arm 132 (e.g., plastic, metal). The sub-arm 130 is rigid (e.g., unable to be manually bent by-hand), solid (but can be perforated), and smooth (but can be textured, rough, or knurled). The sub-arm 132 is rigid (e.g., unable to be manually bent by-hand), solid (but can be perforated), and smooth (but can be textured, rough, or knurled). The sub-arm 130 is longitudinally co-aligned with the arm 108 or the arm 120. The sub-arm 130 includes a set of wells 178, which can operate as a set of heat sinks or a set of aerodynamic enhancers, although the set of wells 178 can be omitted. The sub-arm 132 laterally extends from the sub-arm 130 and avoids longitudinal co-alignment with the arm 108 or the arm 120. The sub-arm 130 is monolithic with the arm 108, although assembly (e.g., fastening, adhering, mating, interlocking) therewith possible. The sub-arm 132 is monolithic with the sub-arm 130, although assembly (e.g., fastening, adhering, mating, interlocking) therewith is possible. The sub-arm 130 cantileveredly extends from the arm 108. The sub-arm 132 cantileveredly extends from the sub-arm 130. The sub-arm 132 includes an upper deck 168 and a lower deck 170 spaced apart from each other such that an open space 160 extends therebetween. Note that the sub-arm 132 can avoid the upper deck 168 and the lower deck 170 such that the sub-arm 132 is a single deck, thereby avoiding the open space 160.

The mounting interface 106 includes a container 134 (e.g., plastic, metal) having a sidewall 162 and an inner cavity 184 enclosed by the sidewall 162. The inner cavity 184 is partitioned into a set of compartments by a set of partitions 186 (e.g., a set of walls). However, note that the set of partitions 186 may be omitted and there may be a single compartment defining the inner cavity 184. Likewise, the inner cavity 184 may be omitted (e.g., the container 134 may be an internally solid piece). Note that the container 134 can be omitted.

The sidewall 162 is rigid (e.g., unable to be manually bent by-hand), solid (but can be perforated), and smooth (but can be textured, rough, or knurled). The sidewall 162 includes a pair of stepped portions 172. The sub-arm 132 extends from the sidewall 162, external to and away from the inner cavity 184, such that the arm 104 extends from the container 134 and supports the container 134. The sub-arm 132 and the sidewall 162 are monolithic, but can be an assembly (e.g., fastening, mating, adhering, interlocking). The container 134 avoids movement (e.g., rotation, pivoting, swinging, sliding) relative to the sub-arm 132, but such movement relative to the sub-arm 132 may be possible. Note that the container 134 can be omitted.

The container 134 includes an end portion 188 and an end portion 190 opposing the end portion 188. The inner cavity 184 extends between the end portion 188 and the end portion 190. The end portion 188 includes an outwardly arcuate edge, but this edge can be inwardly arcuate, rectilinear, sinusoidal, zigzag, pulsated, or cornered (e.g., sharp, rounded). The container 134 tapers in shape, narrowing in width, from the end portion 188 towards the end portion 190. The container 134 has a teardrop shape or a flying wedge shape, although other shapes (e.g., square, rectangular, oval, circular) are possible, as further described below.

The container 134 has a pair of openings 192 extending between the end portion 188 and the end portion 190. The pair of openings 192 oppose each other. The pair of openings 192 extend between the pair of stepped portions 172 and the end portion 188. Note that the pair of openings 192 can be omitted.

The container 134 includes an opening 182 extending between the pair of openings 192. The opening 182 extends between the end portion 188 and the end portion 190 between the pair of openings 192. The opening 182 is symmetrical, has a closed shape, and positioned central on the container 134 between the end portion 188 and the end portion 190. However, the opening 182 can be asymmetrical, have an open shape, or be positioned non-central on the container 134 between the end portion 188 and the end portion 190. The opening 182 extends between the pair of openings 192 when the pair of openings 192 is present. The opening 182 tapers in shape, narrowing in width, in a direction from the end portion 188 towards the end portion 190. The opening 182 has a teardrop shape or a flying wedge shape, although other shapes (e.g., square, rectangular, oval, circular) are possible.

The mounting interface 106 includes a plate 136 (e.g., plastic, metal) supported by the sidewall 162 such that the plate 136 extends over and covers the inner cavity of the container 134, while the plate 136 rests on the sidewall 162. The plate 136 is longitudinally co-aligned with the sub-arm 130, although this can be omitted. When the container 134 is omitted, the plate 136 extends from the arm 104, which can be via the sub-arm 132.

The plate 136 can be a single plate or a set of plates positioned immediately adjacent to each other, and thereby forming the plate 136. The plate 136 is rigid (e.g., unable to be manually bent by-hand), solid (but can be perforated), and smooth (but can be textured, rough, or knurled). The plate 136 includes an end portion 138 and an end portion 146 opposing the end portion 138. The end portion 138 can be proximate to or overlapping with the end portion 188. The end portion 146 can be proximate to or overlapping with the end portion 190. The end portion 138 includes an outwardly arcuate edge, but this edge can be inwardly arcuate, rectilinear, sinusoidal, zigzag, pulsated, or cornered (e.g., sharp, rounded). As such, the end portion 138 forms a retention area, which can be together with or include the sidewall 162. The plate 136 tapers in shape, narrowing in width, from the end portion 138 towards the end portion 146. The plate 136 has a teardrop shape or a flying wedge shape, although other shapes (e.g., square, rectangular, oval, circular) are possible, as further described below.

The plate 136 has a pair of shoulder portions 148 extending between the end portion 138 and the end portion 146. The pair of shoulder portion 148 engage (e.g., contact, support) the pair of stepped portions 172. Note that the pair of shoulder portions 148 can be omitted.

The plate 136 has a pair of openings 140 extending between the end portion 138 and the end portion 146. The pair of openings 140 extend between the pair of stepped portions 172 and the end portion 138. The pair of openings 140 positionally correspond to the pair of openings 192.

The mounting interface 104 includes a pair of bolts 142 (or screws) fastenably extending through the pair of openings 192 into the pair of openings 140 or vice versa. In order to enhance fastening, there may be a pair of sleeves or nuts 188 used within the pair of openings 192 or the pair of openings 140, although the pair of sleeves or nuts 188 may be omitted. The pair of bolts 142 may be flush with or recessed within the pair of openings 192 or the pair of openings 140, although being non-flush with the pair of openings 192 or the pair of openings 140 is possible. As such, through the pair of openings 192 and the pair of openings 140, the pair of bolts 142 respectively fasten the plate 136 to the container 134 or vice versa. However, note that the pair of openings 140 or the pair of openings 192 or the pair of bolts 142 or the pair of sleeves or nuts 188 can be omitted. For example, the plate 136 can be secured to the container 134 or vice versa in other ways (e.g., mating, adhering, interlocking) without the pair of openings 140 or the pair of openings 192 or the pair of bolts 142 or the pair of sleeves or nuts 188.

The plate 136 has an opening 144, which is symmetrical, has a closed shape, and positioned central on the plate 136 between the end portion 138 and the end portion 146. However, the opening 144 can be asymmetrical, have an open shape, or be positioned non-central on the plate 136 between the end portion 138 and the end portion 146. The opening 144 extends between the pair of openings 140 when the pair of openings 140 is present. The opening 144 tapers in shape, narrowing in width, in a direction from the end portion 138 towards the end portion 146. The opening 144 has a teardrop shape or a flying wedge shape, although other shapes (e.g., square, rectangular, oval, circular) are possible. The container 134 may have an opening underneath the opening 144 and corresponding to the opening 144 in shape and size, although such opening can be omitted. Likewise, note that the opening 144 can be omitted.

The mounting interface includes a latch 150 (or a latch feature) and the plate 136 hosts the latch 150. The latch 150 is monolithic with the plate 136, but can be assembled (e.g., fastening, mating, interlocking, adhering) with the plate 136. The plate 136 tapers in shape, narrowing in width, towards the latch 150 from the end portion 138 towards the end portion 146.

The latch 150 is embodied as a block with a ramp 154 (or an inclined surface), a platform 156 extending off the ramp 154, and a back side 158 extending from the platform 156. The platform 156 extends between the ramp 154 and the back side 158. The latch 150 includes a pair of sidewalls 152 supporting the ramp 154 and the platform 156, while the pair of sidewalls 152 oppose each other. The back side 158 extends (e.g., spans) between the pair of sidewalls 152. Although the back side 158 has a trapezoidal silhouette or profile, this configuration can vary and the back side 158 can have a non-trapezoidal silhouette or profile (e.g., rectangular, square). Likewise, although the pair of sidewalls 152 have a triangular or trapezoidal silhouette or profile, this configuration can vary and the pair of sidewalls 152 can have a non-triangular or non-trapezoidal silhouette or profile (e.g. a V-shape). Note that the pair of sidewalls 152 can be omitted and the ramp 154 or the platform 156 can be supported by a pillar, a column, a frame, a lattice, or other suitable structures. For example, the ramp 154 or the platform 156 can form a T-shape with the pillar, the column, the frame, the lattice, or another suitable structure. Likewise, the back side 158 can be omitted.

The plate 136 includes an exterior surface 174 extending between the end portion 138 and the end portion 146. The exterior surface 174 encloses the latch 150, which can be from at least one side, two sides, three sides, four sides, five sides, six sides, or more, depending on how the plate 136 and the latch 150 are configured. The ramp 154 extends from and inclines away from the exterior surface 174 at an angle of about 90 degrees or less. For example, the angle can be about 60 degrees or less, about 45 degrees or less, about 30 degrees or less, about 15 degrees or less, or other inclusive angles, which can be varied as needed based on how much resistance is desired. The ramp 154 extends (e.g., spans) between the exterior surface 174 and the platform 156.

The plate 136 has a region 194 partitioning the plate 136 into an area 198 and an area 196 such that the region 194 is interposed between the area 198 and the area 196. The region 194 extends between the end portion 138 and the end portion 146 and between the opening 144 and the latch 150 and between the opening 144 and the end portion 146.

The area 198 includes the opening 144. The area 196 contains the latch 150 and cantileveredly extends from the region 194 over the inner cavity 184. As such, the region 194 is configured to enable resilient (e.g., like a spring or a shape-memory material) or elastic (e.g., like a spring or a shape-memory material) bending or flexing of the area 196 relative to the area 198. Therefore, the area 196 can resiliently or elastically bend or flex towards or away from the inner cavity 184, which may be enclosed by the sidewall 162. This modality of elastic or resilient bending or flexing can be similar to the region 194 operating as a living hinge (or an integral hinge or a flexure bearing) or the area 196 operating as a diving board. In contrast, the area 198 is stationary relative to the area 196 because the plate 136 is secured to the container 134 via the pair of bolts 142 fastenably extending through the pair of openings 192 and the pair of openings 142. Resultantly, since the area 196 hosts the latch 150 as the latch 150 is positioned between the living hinge 194 and the end portion 146, the latch 150 moves accordingly based on the area 196 elastically or resiliently bending or flexing relative to the area 198, whether towards the inner cavity 184 or away from the inner cavity 184, which may be enclosed by the sidewall 162. Note that when the container 134 is missing, then the area 196 can resiliently or elastically bend or flex relative to the area 198 over another structure or empty space.

Figure 119:
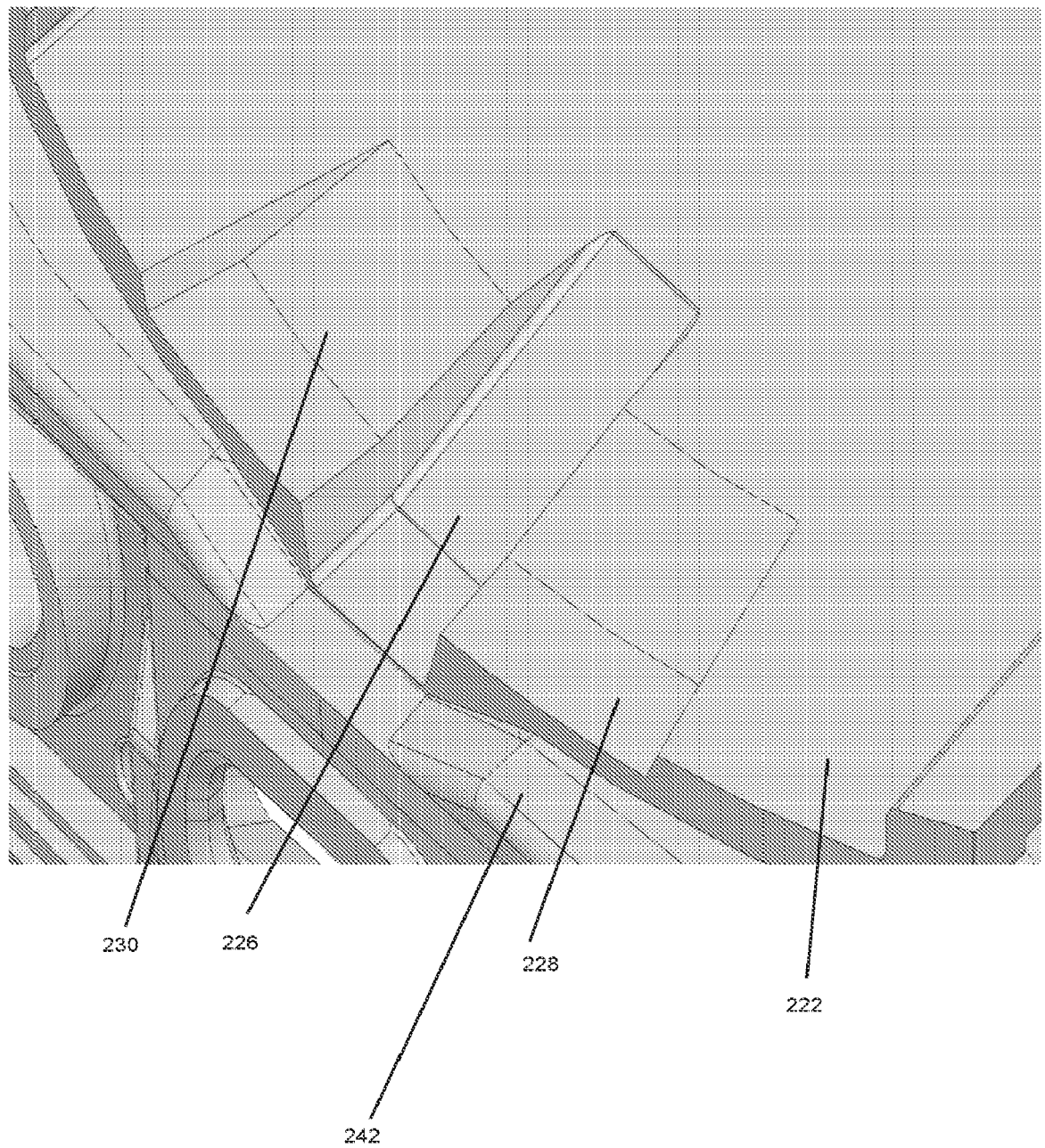
FIG. 119 shows an isometric view of an embodiment of a plate of FIGS. 10-17 where the plate includes a detent and a pair of recesses and the detent extends between the pair of recesses, is deeper than the pair of recesses, and is longer than the pair of recesses according to this disclosure.

FIGS. 10-17 shows a set of views of an embodiment of an accessory with a side configured for engagement with the mounting interface of FIGS. 1-9 according to this disclosure. FIG. 119 shows an isometric view of an embodiment of a plate of FIGS. 10-17 where the plate includes a detent and a pair of recesses and the detent extends between the pair of recesses, is deeper than the pair of recesses, and is longer than the pair of recesses according to this disclosure. In particular, an accessory 200 includes a housing 202 containing a processor, a memory, and a set of circuitry (e.g., a geolocation chip, a cellular chip, a Wi-Fi chip), where the processor is in communication with the memory and the set of circuitry. For example, the memory can store a set of instructions executable by the processor to enable a navigation application operative based on data from the set of circuitry, a cellular application based on data from the set of circuitry, a networking application based on data from the set of circuitry, or other suitable applications. The housing 202 may contain a battery, which may be rechargeable, to power the processor, the memory, and the set of circuitry.

The housing 202 includes a front side 204 (e.g., plastic, metal), a back side 206 (e.g., plastic, metal), a top side 208 (e.g., plastic, metal), a bottom side 210 (e.g., plastic, metal), a lateral side 212 (e.g., plastic, metal), and a lateral side 214 (e.g., plastic, metal). The housing 202 can be weather-proof, water-proof, sand-proof, or sweat-proof. The front side 204 opposes the back side 206. The top side 208 opposes the bottom side 210. The lateral side 212 opposes the lateral side 214. Each of the lateral side 212 and the lateral side 214 extends (e.g., spans) between the front side 204 and the back side 206 and between the top side 208 and the bottom side 210, thereby forming the housing 202. Each of the front side 204, the back side 206, the top side 208, the bottom side 210, the lateral side 212, and the lateral side 214 can be formed from a single or multiple parts. Note that at least one of the front side 204, the back side 206, the top side 208, the bottom side 210, the lateral side 212, and the lateral side 214 can be omitted.

The front side 204 includes a touchscreen 216, which can be haptic, liquid crystal, electrophoretic, or other suitable electronic displays, whether color or grayscale. The touchscreen 216 is in communication with the processor within the housing 202. For example, the memory can store a set of instructions executable by the processor to enable a navigation application operative via the touchscreen 216 based on data from the set of circuitry, a cellular application operative via the touchscreen 216 based on data from the set of circuitry, a networking application operative via the touchscreen 216 based on data from the set of circuitry, or other suitable applications. Note that the touchscreen 216 can be omitted.

The lateral side 212 and the lateral side 214 includes a set of user input elements 220 (e.g., buttons, sliders, knobs) in communication with the processor contained within the housing 202. The user input elements 220 can be configured to receive a set of user inputs (e.g., presses, slides, rotations) to operate the accessory 200. For example, the memory can store a set of instructions executable by the processor to enable a navigation application operative via the touchscreen 216 and the set of user input elements 220 based on data from the set of circuitry, a cellular application operative via the touchscreen 216 and the set of user input elements 220 based on data from the set of circuitry, a networking application operative via the touchscreen 216 and the set of user input elements 220 based on data from the set of circuitry, or other suitable applications. Note that the set of user input elements 220 can be omitted.

The housing 202 includes a set of ports 218 configured for data communication or energy transfer. The set of ports 218 can be in communication with the processor for various reasons. For example, the set of ports 218 can be used to upload, modify, delete, or erase a set of instructions stored on the memory. For example, the set of ports 218 can be used to recharge the battery contained within the housing 202.

The back side 206 includes a hatch 240, a surface 222, a lip 224, and a retainer area 242. The surface 222 extends between the hatch 240 and the retainer area 242. The lip 224 extends between the hatch 240 and the retainer area 242.

The hatch 240 is rotatable in a clockwise direction to be fastened to the back side 206 and rotatable in a counterclockwise direction to be unfastened from the back side 206. If the hatch 240 is fastened to the back side 206, then the hatch 240 is in a closed positioned. If the hatched is unfastened from the back side 206, then the hatch 240 is in an open position. While the hatch 240 is in the open position, the hatch 240 is detachable from the back side 206 and provides a physical access inside the housing 204. The physical access can be to the processor, the memory, the set of circuitry, or other suitable content contained within the housing 202 (e.g., for repair, upgrades). For example, if the housing 202 contains a slot for receiving a subscriber identity module (SIM) card for cellular communication, then the physical access may be to the slot. The hatch 204 may be tethered to the housing 202 via a line (e.g., a cord, a cable, a rope, a chain), which be positionable within the housing 204 when the hatch 204 is fastened to the back side 206. Note that the hatch 240 can be omitted.

The surface 222 extends between the lateral side 212 and the lateral side 214. The surface 222 includes an end portion 232 and an end portion 234. The surface 222 opposes the touchscreen 216. The surface 222 is flat and has a tapering shape, becoming narrower in width, from the end portion 234 towards the end portion 232, away from the retainer area 242, towards the hatch 240. However, note that such shaping is not required and the surface 222 can avoid tapering becoming narrower in width, from the end portion 234 towards the end portion 232, which can be towards the hatch 240.

The surface 222 includes a detent 226, a recess 228, and a recess 230 extending between the end portion 232 and the end portion 234. The detent 226 extends (e.g., interposes) between the recess 228 and the recess 230. The detent 226, the recess 228, and the recess 230 extend from the end portion 234, away from the retainer area 242, towards the end portion 232 and the hatch 240. The recess 228 and the recess 230 are identical to each other in shape and size, but this is not required. For example, the recess 228 and the recess 230 can differ from each other in shape or size.

The detent 226 depresses into the mounting surface 222. If the surface 222 has a line of longitudinal symmetry, then the line of longitudinal symmetry may centrally extend along the detent 226 between the recess 228 and the recess 230. The recess 228 depresses into the mounting surface 222. The recess 230 depresses into the mounting surface 222. The detent 226 depresses into the mounting surface 222 deeper than the recess 228 and the recess 230. Likewise, the detent 226 extends from the end portion 234 longer than the recess 228 and the recess 230. For example, the ramp complement can extend past each of the recess 228 and the recess 230. The detent 226 complements the latch 150 in shape, size, orientation, and other characteristics. For example, the detent 226 has a ramp complement complementing the ramp 154 in shape, size, orientation, and other characteristics, and a platform complement extending off the ramp complement complementing the platform 156 in shape, size, orientation, and other characteristics.

The lip 224 arcuately extends over the area 222 proximal to the end portion 232 such that the lip 224 is concave relative to the detent 226, the recess 228, and the recess 230. However, note that the lip 224 can non-arcuately (e.g., rectilinearly) extend over the area 222 as well. The lip 224 opposes the end portion 234, the detent 226, the recess 228, and the recess 230. The lip 224 arcuately and cantileveredly overhangs the surface 222, thereby forming or covering a set of tracks underneath the lip 224, such that the plate 136 can be guidably and slidably inserted into the set of tracks underneath the lip 224, while the plate 136 is rectilinearly moved over the surface 222 between the lateral side 212 and the lateral side 214, towards the end portion 242 or the hatch 240. The lip 224 extends between the hatch 240 and at least one of the detent 226, the recess 228, the recess 230, the end portion 234, or the retainer portion 242.

The retainer area 242 is flush with the surface 222, other than the detent 226, the recess 228, and the recess 230. Such configuration enables the latch 150 to engage the detent 226 against the retainer area 242 to secure the back side 206 to the plate 136 when the plate 136 is guidably and slidably inserted into the set of tracks underneath the lip 224, while the plate 136 is rectilinearly moved over the surface 222 between the lateral side 212 and the lateral side 214, towards the end portion 242 or the hatch 240. Likewise, such configuration enables the latch 150 to disengage the detent from the retainer area 242 to unsecure the back side 206 from the plate 136, whether rotationally or rectilinearly, as further described below. The retainer area 242 is monolithic with the bottom side 210, but can be assembled therewith (e.g., fastening, mating). However, note that the retainer area 242 can be omitted or the retainer area 242 can be non-flush with the surface 222.

The bottom side 210 includes a pair of openings 236 hosting a pair of bolts 238 (or screws) such that the pair of bolts 238 fasten the bottom side 210, which can include the retainer area 242, to the housing 202. Some of the ports 218 extend between the pair of openings 236 and the pair of bolts 238.

Although the accessory 200 is embodied as an electronic device (e.g., a dedicated navigation device, a smartphone), this form factor is not limiting. Rather, the accessory 200 can take various form factors. For example, some of such form factors include a smartphone, a tablet, a coffee mug, a water bottle, a base for a mirror, a mirror, a holder for a smartphone, a container with a first aid kit, a firearm holder, a firearm, or any other suitable accessory, whether bicycle related (e.g., stationary, mobile, outdoor) or not related to bicycles.

Figure 18:
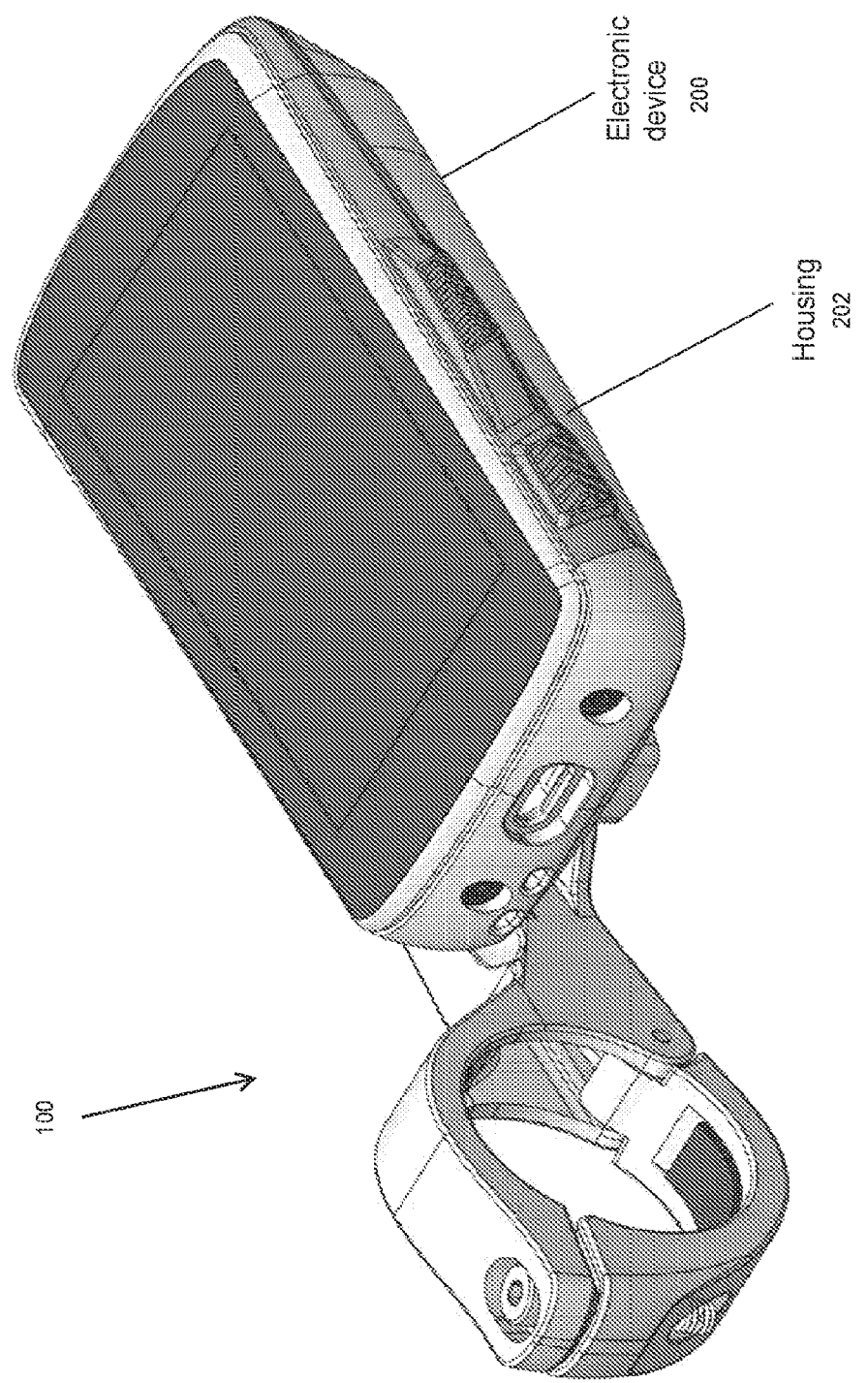
FIGS. 18 and 25 shows an isometric view of the bracket of FIGS. 1-9 engaging the accessory of FIGS. 10-17 according to this disclosure.
Figure 25:
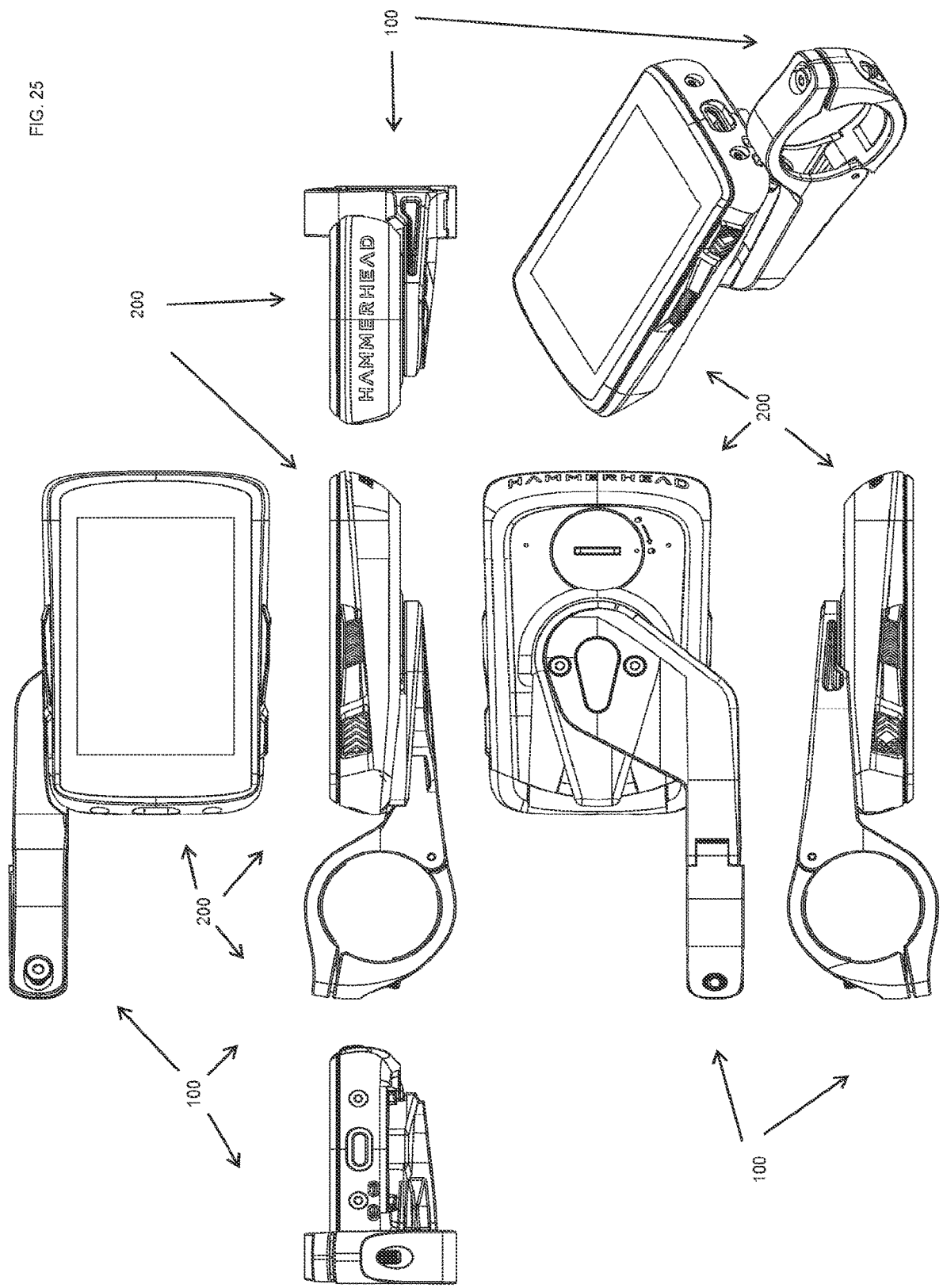

FIGS. 18 and 25 shows an isometric view of the bracket of FIGS. 1-9 engaging the accessory of FIGS. 10-17 according to this disclosure. FIG. 122 shows a cross-sectional profile view of an embodiment of a bracket of FIGS. 1-9 being locked or otherwise engaging with an accessory of FIGS. 10-17 according to this disclosure. In particular, the bracket 100 holds the accessory 200. How the accessory 200 is mounted onto the bracket 100 and unmounted from the bracket 100 is further described below.

FIGS. 19-20 show a set of view of the bracket of FIGS. 1-9 being mounted to the accessory of FIGS. 10-17 or vice versa according to this disclosure. In particular, the bracket 100 is handled such that the end portion 138 is oriented towards the end portion 232 in order to rectilinearly and guidably slide the plate 136 along a cross-sectional line A-A, a cross-sectional line B-B, or a cross-sectional line C-C, over the surface 222 towards the end portion 232 such that the end portion 138 rectilinearly and guidably slides underneath the lip 224, which can be via the set of tracks extending underneath the lip 224, until the latch 150 progressively engages the detent 226 between the recess 228 and the recess 230 and then locks against the retainer area 242, thereby enabling the area 196 to continuously apply or exert an elastic or resilient force onto the back side 206. This continuous application or exertion of the elastic or resilient force onto the back side 206 can occur based on the area 196 resiliently or elastically bending or flexing relative to the area 196 and the container 134. Such configuration enables to the ramp 154 to progressively engage the ramp complement between the recess 228 and the recess 230 until the platform 156 engages the platform complement between the recess 228 and the recess 230 based on the plate 136 rectilinearly and guidably sliding into the accessory 200 over each of the detent 226, the recess 228, and the recess 230. As further described below, the latch 150 can be immobile relative to the plate 136 (e.g., the plate 136 elastically or resiliently bends or flexes) or mobile relative to the plate 136 (e.g., the latch 150 retracts into the plate 136) when the plate 136 rectilinearly and guidably slides into the accessory 200 over the detent 226. Resultantly, the latch 150 can engage the detent 226 and the ramp 154 can progressively engage the ramp complement until the platform 156 engages the platform complement based on the plate 136 rectilinearly and guidably sliding into the accessory over the detent 226. The area 198, the opening 144, the pair of openings 140, and the region 194 also correspondingly move over the surface 222 when the plate 137 is rectilinearly and guidably slid towards the end portion 232. The latch 150 engages the detent 226 such that the plate 136 engages the lip 224 when the mounting interface 106 engages the accessory 200. Note that the latch 150 avoids engaging the recess 228 or the recess 230 when the plate 137 is rectilinearly and guidably slid towards the end portion 232.

Figure 120:
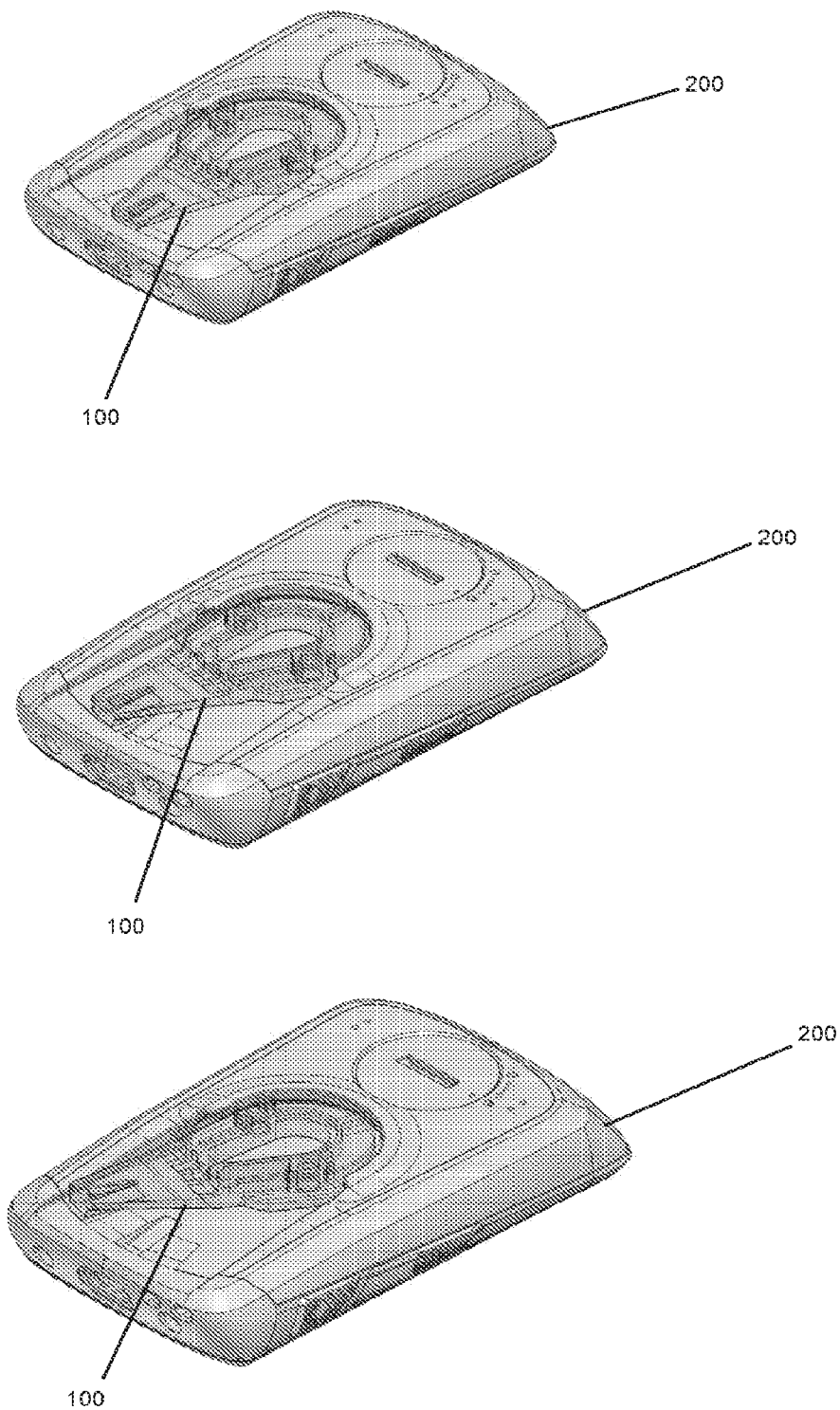
FIG. 120 shows a set of isometric views of an embodiment of a bracket of FIGS. 1-9 rotationally disengaging from an accessory of FIGS. 10-17 according to this disclosure.

FIGS. 21-24 show a set of views of the bracket of FIGS. 1-9 being unmounted from the accessory of FIGS. 10-17 or vice versa according to this disclosure. FIG. 120 shows a set of isometric views of an embodiment of a bracket of FIGS. 1-9 rotationally disengaging from an accessory of FIGS. 10-17 according to this disclosure. FIG. 123 shows a cross-sectional profile view of an embodiment of a bracket of FIGS. 1-9 being unlocked or otherwise disengaging with an accessory of FIGS. 10-17 according to this disclosure. In particular, the bracket 100 can be unmounted from the accessory 200 or vice versa based on the bracket 100 remaining stationary and the accessory 200 being moved or the accessory 200 being stationary and the bracket 100 being moved. Regardless, this enables the mounting interface 106 to disengage the accessory 200 based on the accessory 200 being laterally rotated about 30 degrees or less relative to the plate 136 such that the latch 154 does not extend over each of the detent 226, the recess 228, and the recess 230, or vice versa.

When bracket 100 is stationary and the accessory 200 is being moved, as shown in FIG. 21, then the housing 202 is rotated counterclockwise (or clockwise), while the end portion 138 extends underneath the lip 224 and the surface 222 faces the plate 136, until the latch 150 laterally disengages the detent 226 and avoids extending over each of the detent 226, the recess 228, and the recess 230. For example, the housing 202 can laterally rotate about 30 degrees or less off-center, as shown in FIG. 21, and enable a two-step release by the latch 150 passing over or past the detent 226 and one of the recess 228 or the recess 230. For example, this lateral rotation can include about 25, 20, 15, 10, 5, or less degrees off-center. Once this positioning occurs, the housing 202 is rectilinearly and guidably slid away over the surface 222, away from the end portion 232, the lip 224, and the hatch 240 until the housing 202 avoids extending over the plate 136. As such, the mounting interface 106 disengages from the accessory 200 based on the accessory 200 being laterally rotated relative to the plate 136 such that the latch 150 does not extend over the detent 226.

Figure 23:
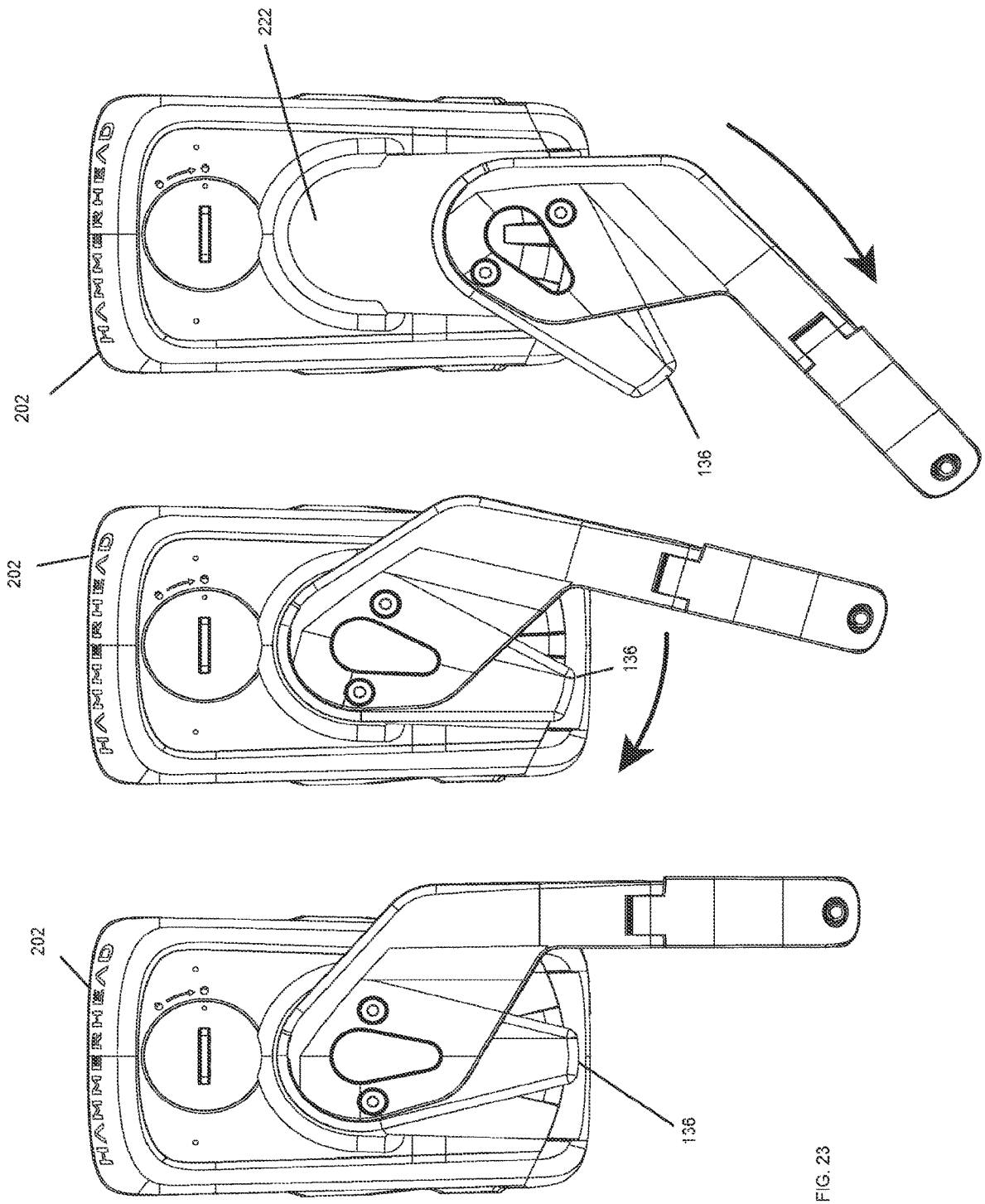
Figure 24:
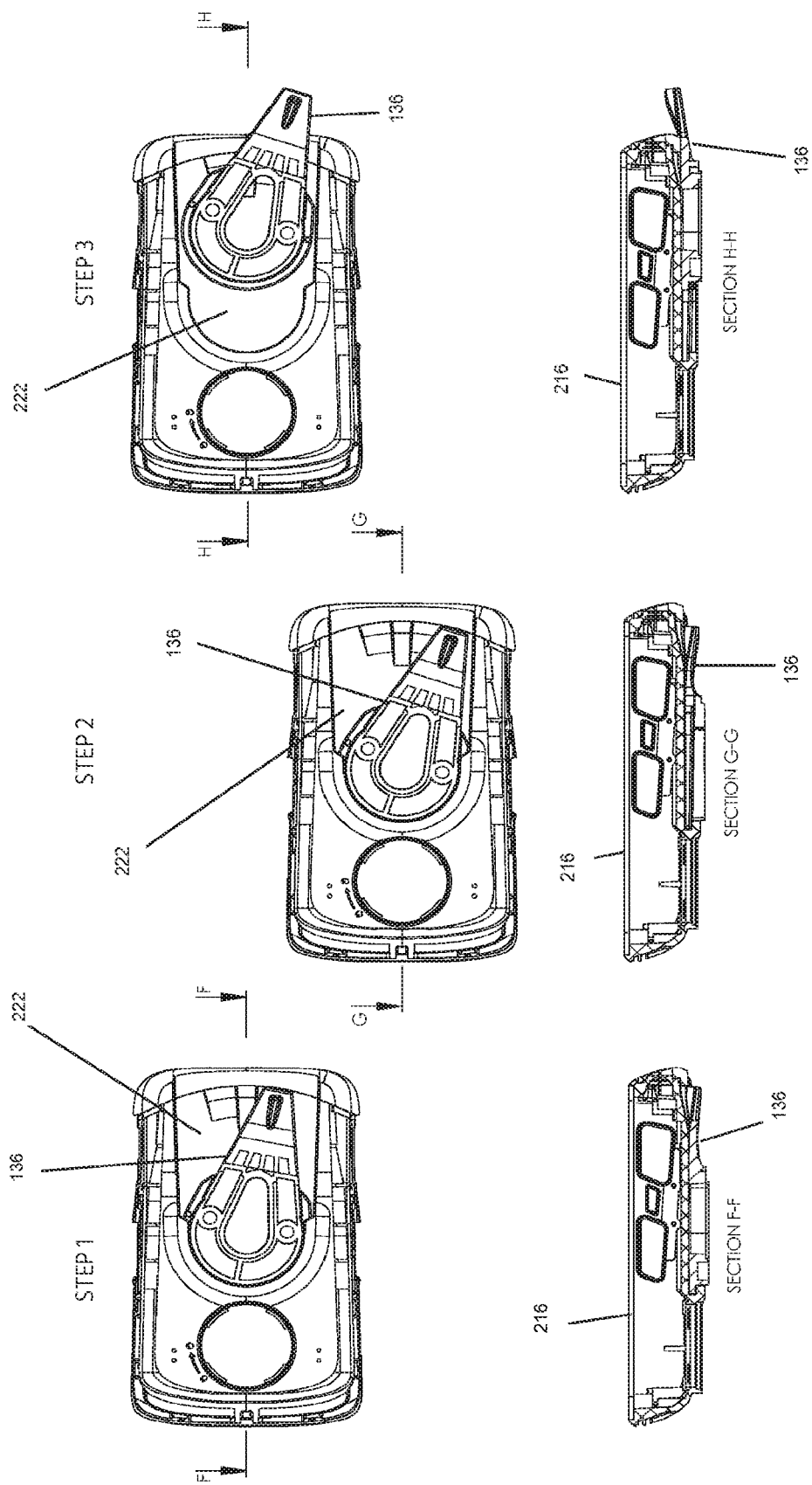

In contrast, the accessory 200 is stationary and the bracket 100 or the plate 136 is being moved, as shown in FIGS. 22-24 and 120. In these situations, the bracket 100 or the plate 136 is laterally rotated counterclockwise, as shown in FIG. 22, or clockwise, as shown in FIGS. 23-24 and 120, while the end portion 138 extends underneath the lip 224 and the surface 222 faces the plate 136, until the latch 150 laterally disengages the detent 226 and avoids extending over each of the detent 226, the recess 228, and the recess 230. For example, the plate 136 or the bracket 100 can rotate about 30 degrees or less off-center, as shown in FIG. 21, and enable a two-step release by the latch 150 passing over or past the detent 226 and one of the recess 228 or the recess 230. For example, this rotation can include about 25, 20, 15, 10, 5, or less degrees off-center. Once this positioning occurs, the plate 136 or the bracket 100 is rectilinearly and guidably slid away over the surface 222, away from the end portion 232, the lip 224, and the hatch 240 until the housing 202 avoids extending over the plate 136. As such, the mounting interface 106 disengages from the accessory 200 based on the accessory 200 being laterally rotated relative to the plate 136 such that the latch 150 does not extend over the detent 226.

FIGS. 26-33 show a set of views of the bracket of FIGS. 1-9 clamping a bar of a bicycle while the accessory of FIGS. 10-17 is mounted thereto according to FIGS. 19-20 and unmounted therefrom according to FIGS. 21-24 according to this disclosure. In particular, the clamp 102 clamps onto a bar 300 of a bicycle such that the bar 300 extends (e.g., interposed) between the arm 108 and the arm 120, while the bracket 100 extends over a wheel 302 of the bicycle. The plate 136 may avoid contact with the bar 300. For example, the bar 300 can be of a frame, a handlebar, an integrated handlebar, a stem, an integrated barstem, or any suitable bar, whether internally hollow or solid, whether cross-sectionally tubular, flat, top-hat shape, V-shape, D-shape, O-shape, 0-Shape, I-shape, U-shape, C-shape, or any other suitable shape.

Figure 26:
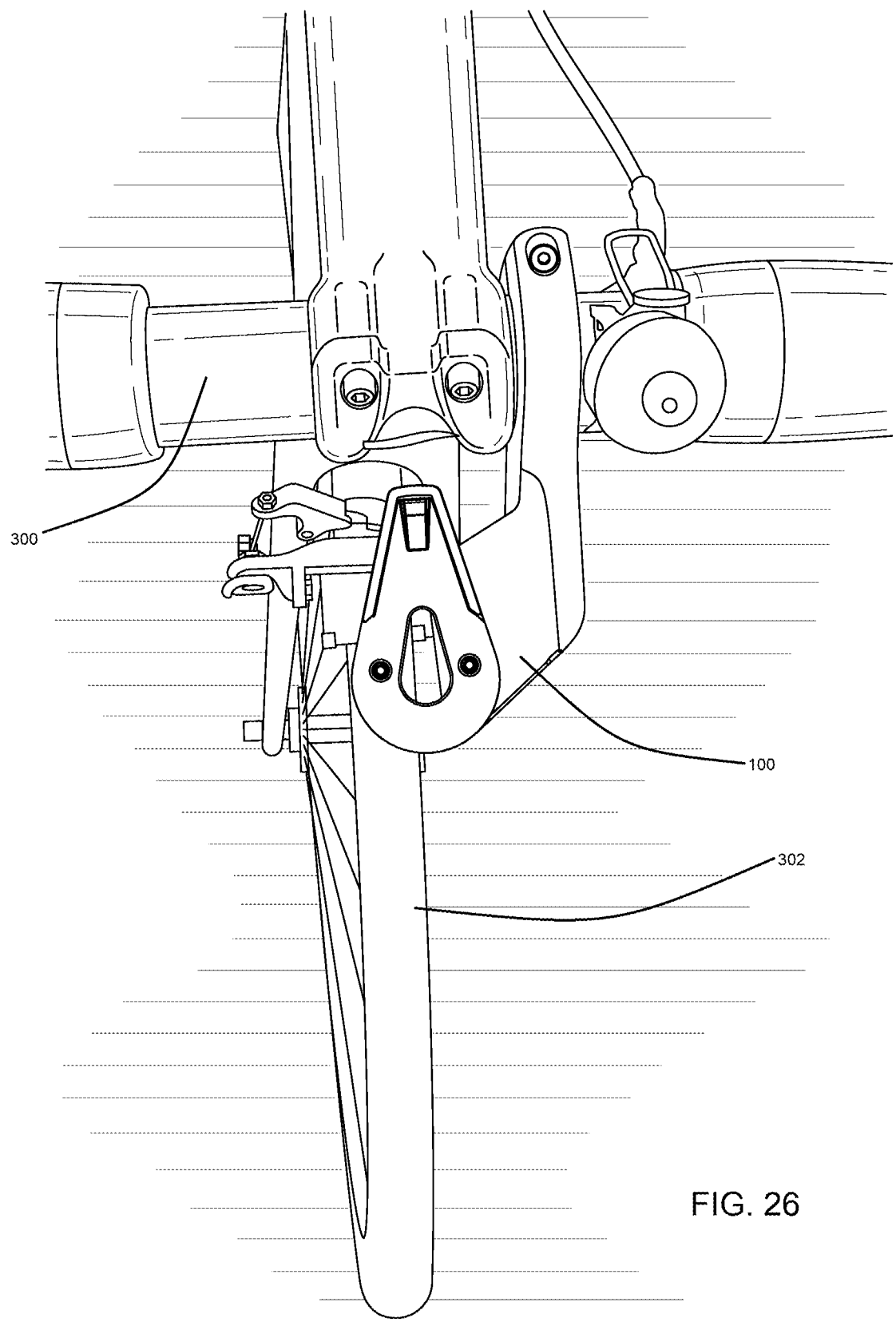
FIGS. 26-33 show a set of views of the bracket of FIGS. 1-9 clamping a bar of a bicycle while the accessory of FIGS. 10-17 is mounted thereto according to FIGS. 19-20 and unmounted therefrom according to FIGS. 21-24 according to this disclosure.
Figure 27:
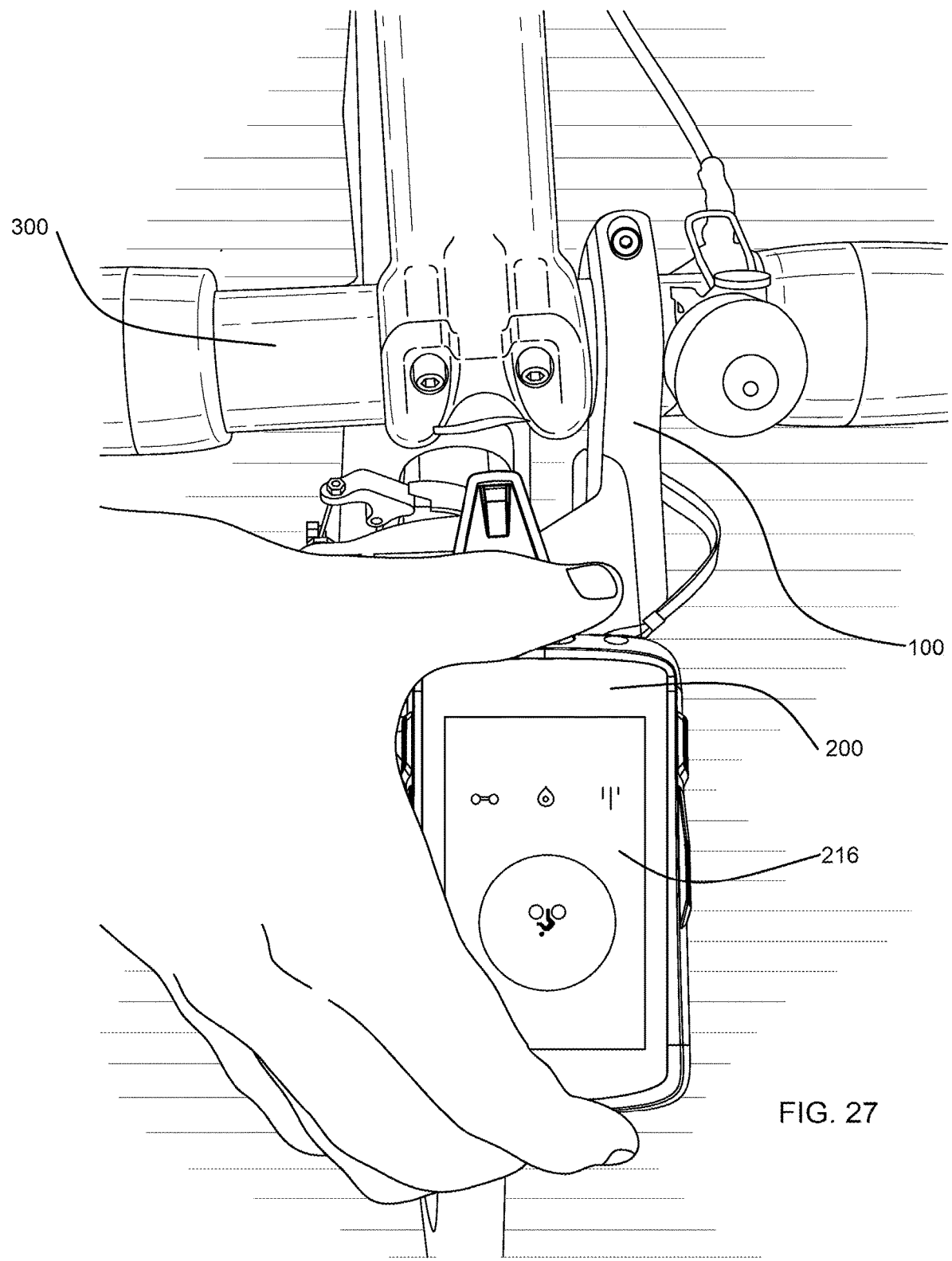
Figure 28:
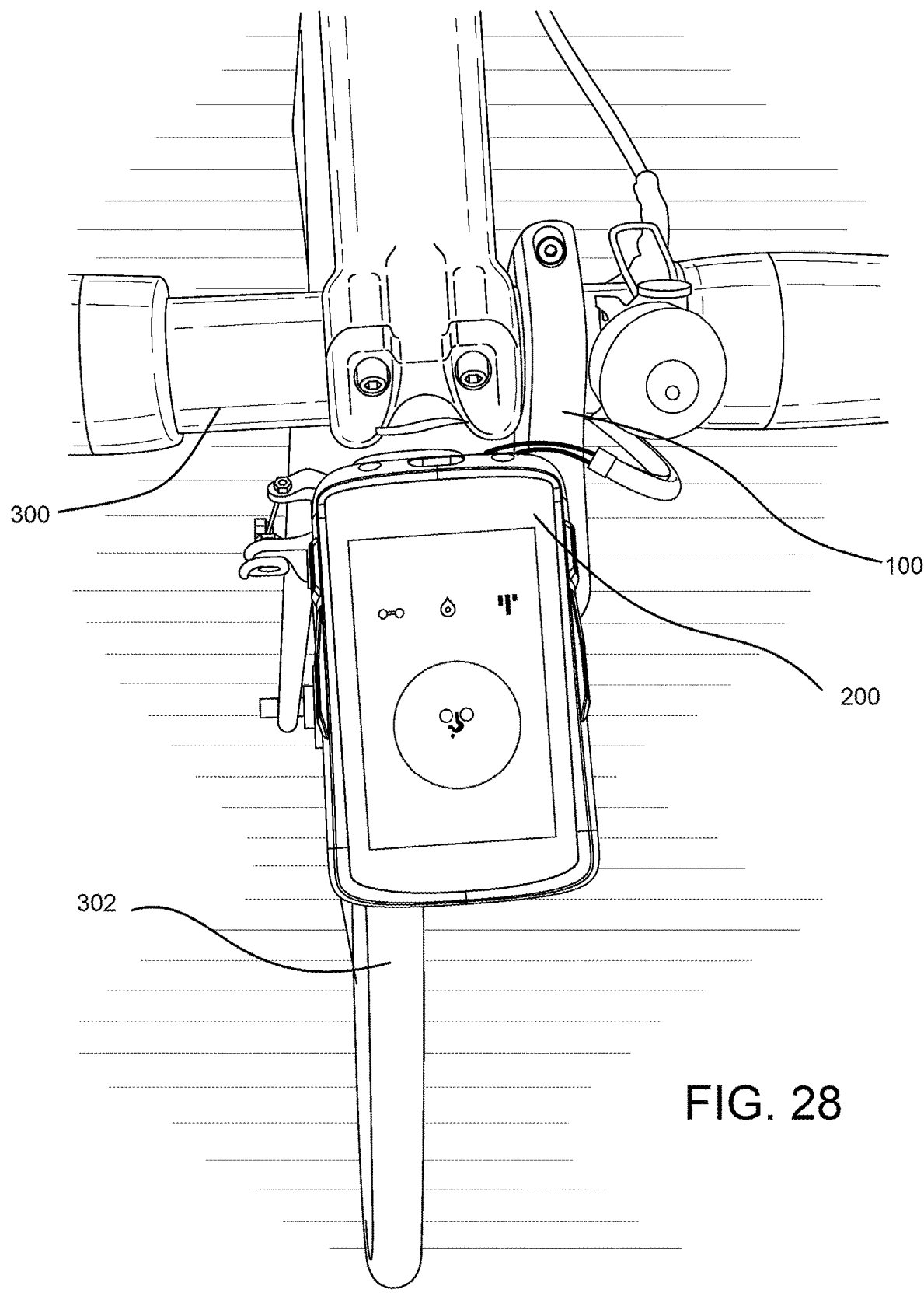
Figure 29:
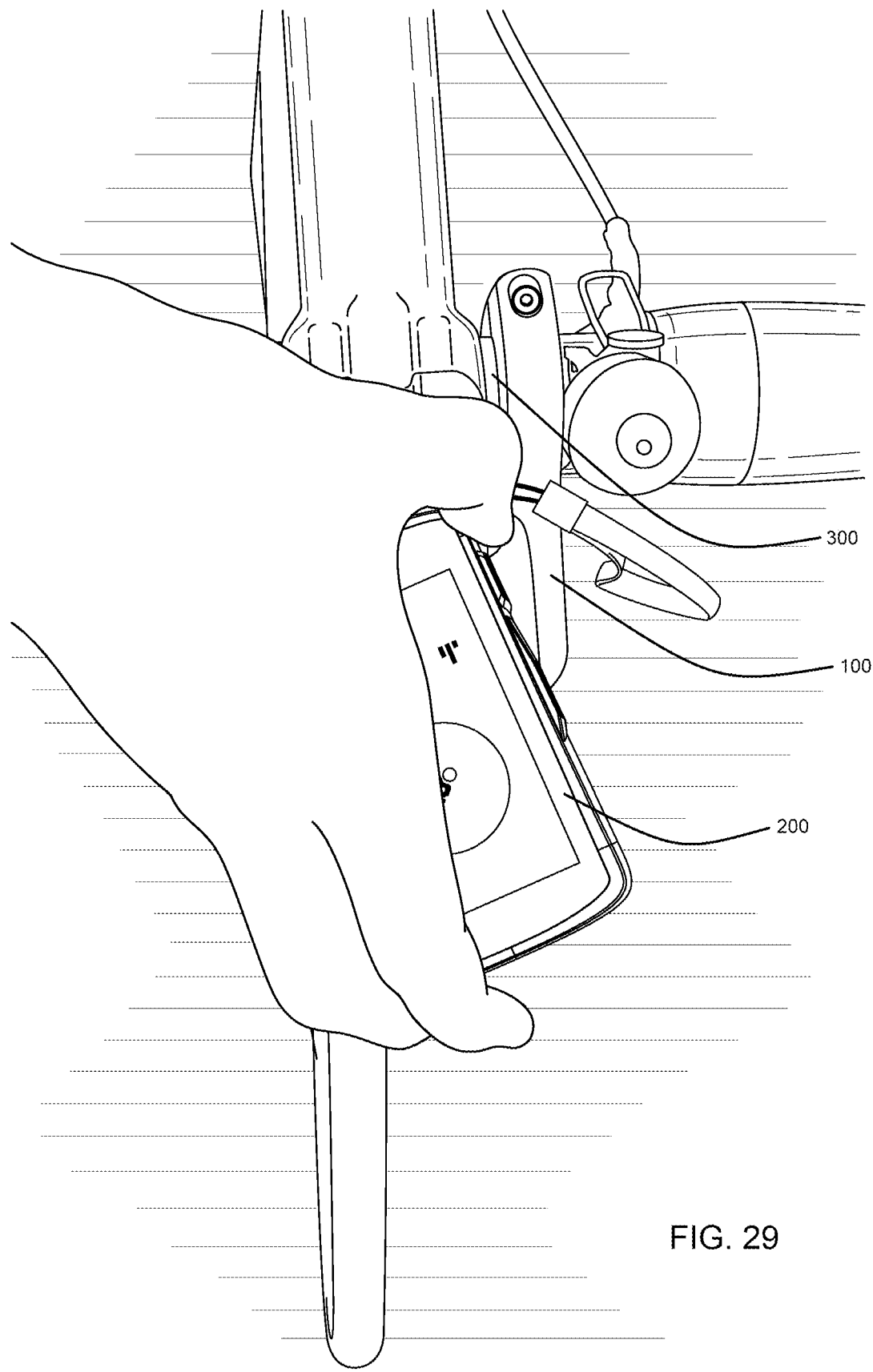
Figure 30:
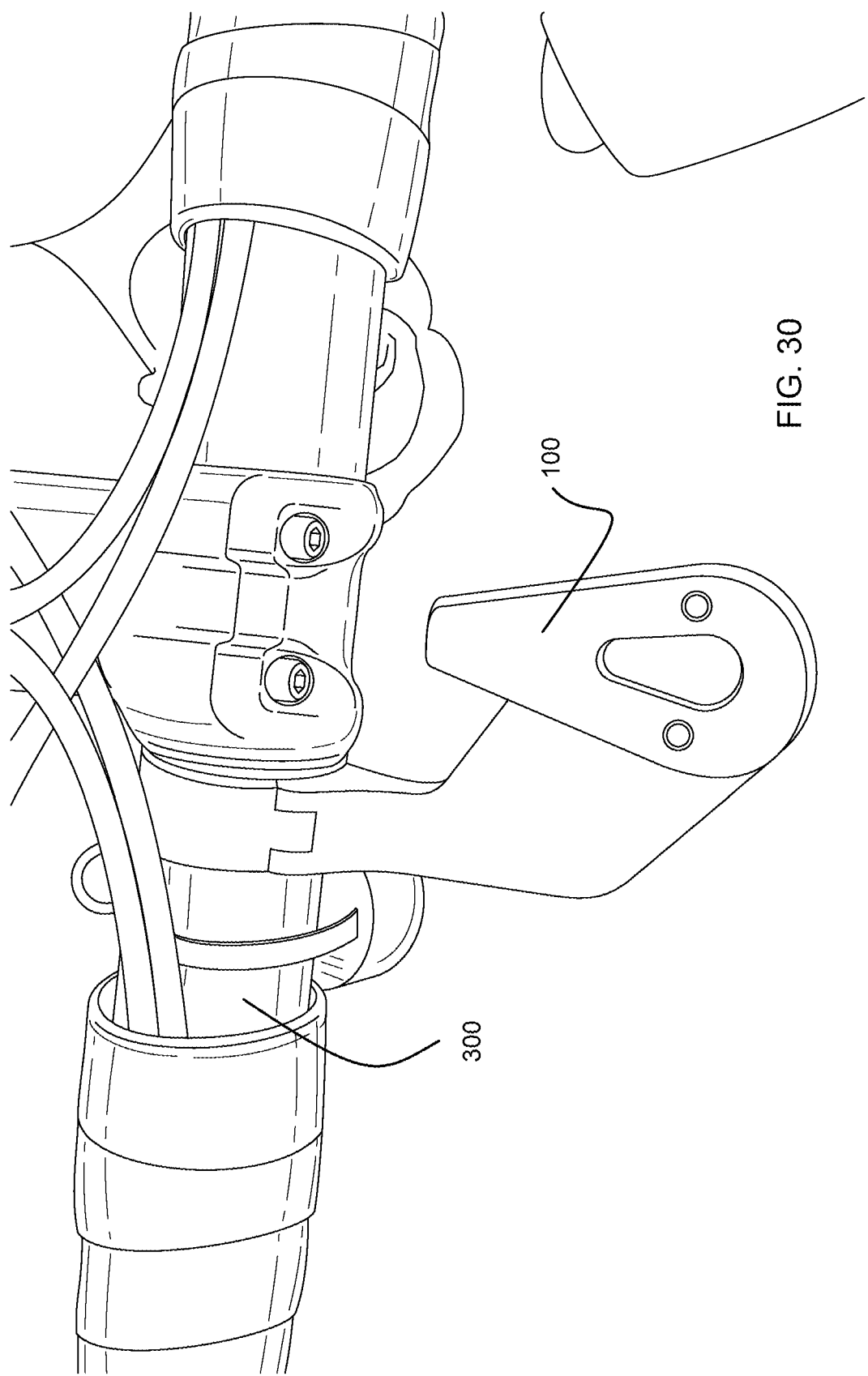
Figure 31:
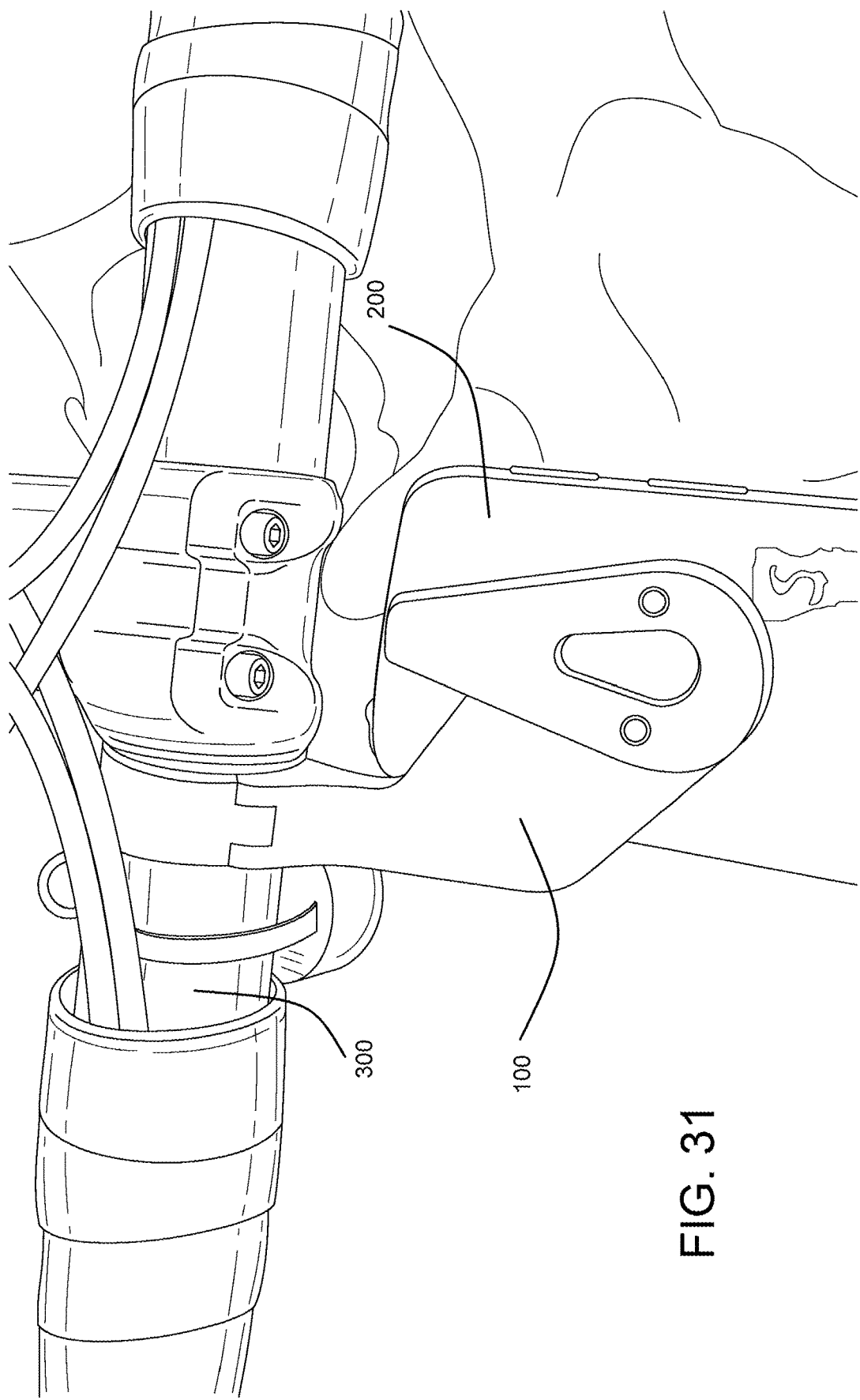
Figure 32:
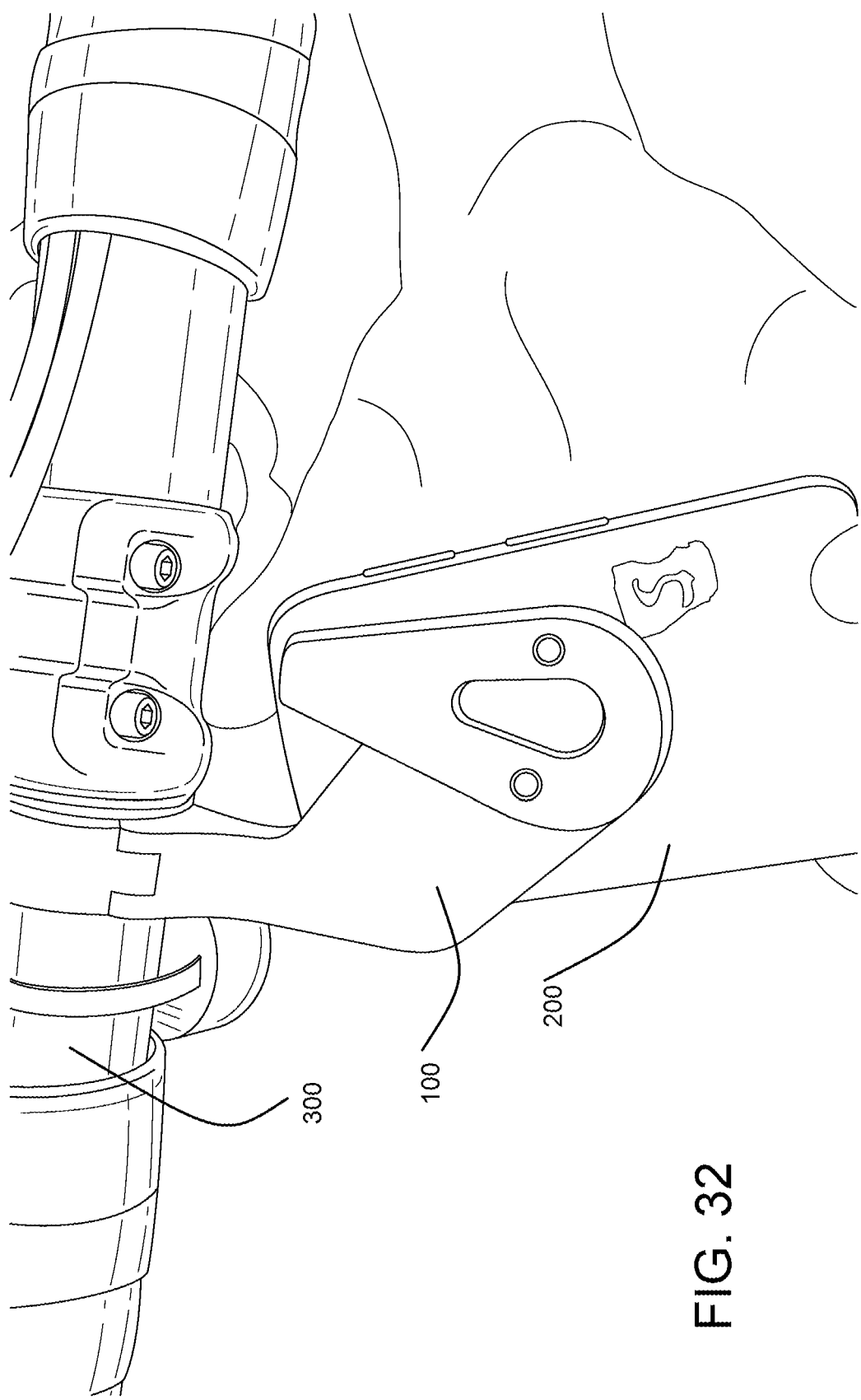
Figure 33:
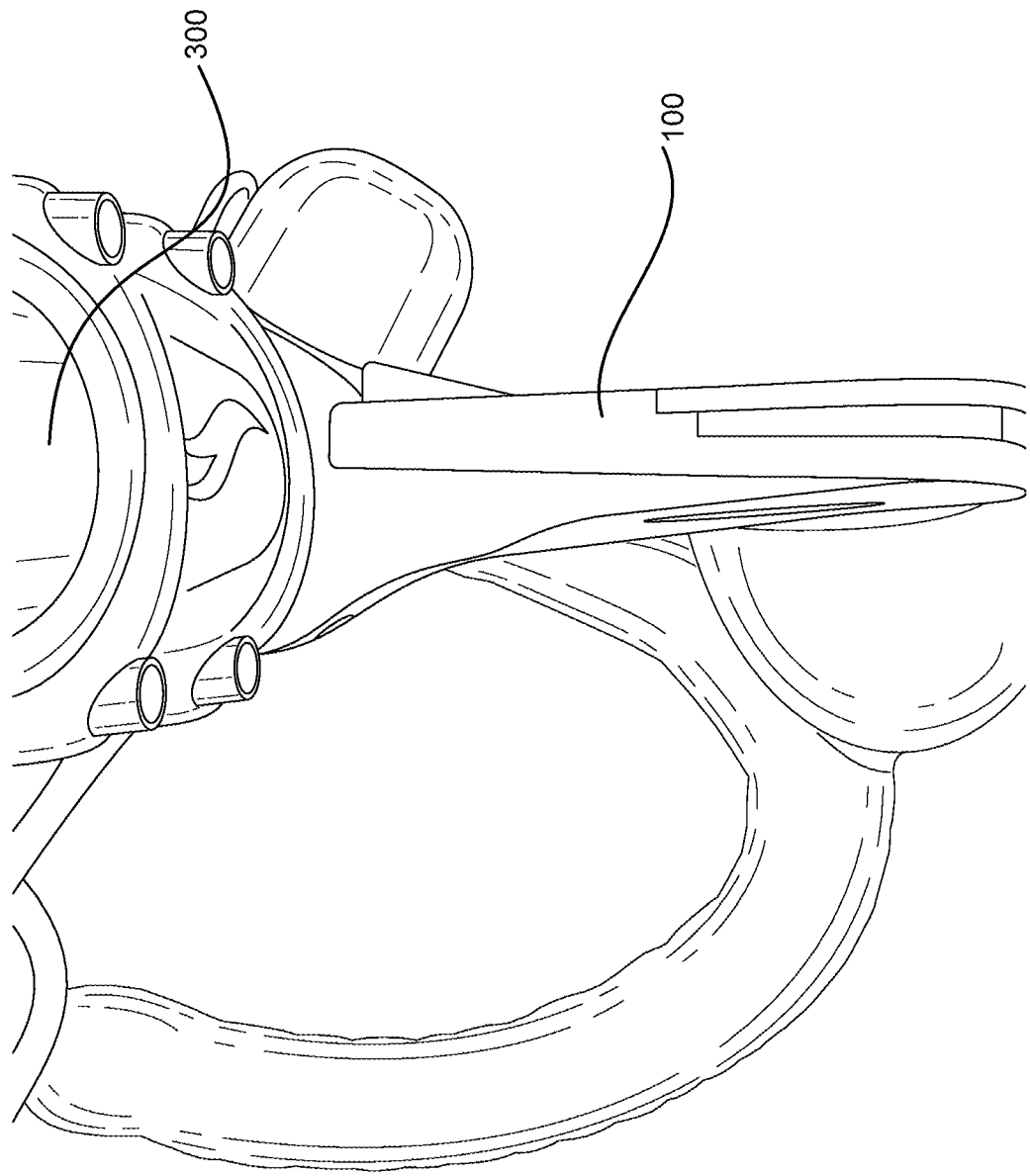

As shown in FIGS. 26-28, the bracket 100 is stationary relative to the accessory 200 and the accessory 200 is rectilinearly and guidably slid towards the bar 300 such that the plate 136 extends between the wheel 302 and the housing 202, while the surface 222 is moved over the plate 136 until the latch 150 engages the detent 226. In contrast, as shown in FIG. 29, the housing 202 is rotated less than about 30 degrees off-center relative to the bracket 100, while the bracket 100 is clamped onto the bar 300 and the end portion 138 extends underneath the lip 224 and the surface 222 faces the plate 136, until the latch 150 laterally disengages the detent 226 and avoids extending over each of the detent 226, the recess 228, and the recess 230. Once this positioning occurs, the housing 202 is rectilinearly and guidably slid away, while remaining oriented off-center, over the surface 222, away from the end portion 232, the lip 224, and the hatch 240 until the housing 202 avoids extending over the plate 136. Note that this disclosure is not limited to bicycles, whether stationary or mobile, and the bar 300 (or another suitable structure) can be included in any exercise device or any vehicle, whether land, aerial, or marine. Some examples of the exercise device include stationary bikes, weight lifting machines, treadmills, elliptical machines, rowing machines, ski machines, or others. Some examples of the vehicle include motorcycles, scooters, gliders, jet skis, canoes, yachts, catamarans, or others. Likewise, this disclosure is not limited to the bar 300 or handlebars and any bar, whether internally hollow or solid, whether cross-sectionally circular or cross-sectionally non-circular (e.g., square, pentagon, triangle, cross-section, V-shaped, polygonal, open-shaped, closed-shaped), whether longitudinally rectilinear or longitudinally non-rectilinear (e.g., circular, oval, sinusoidal, triangular, V-shaped, polygonal, open-shaped, closed-shaped), whether latticed, perforated, meshed, dimpled, knurled, or solid sidewall, can be used.

Figure 35:
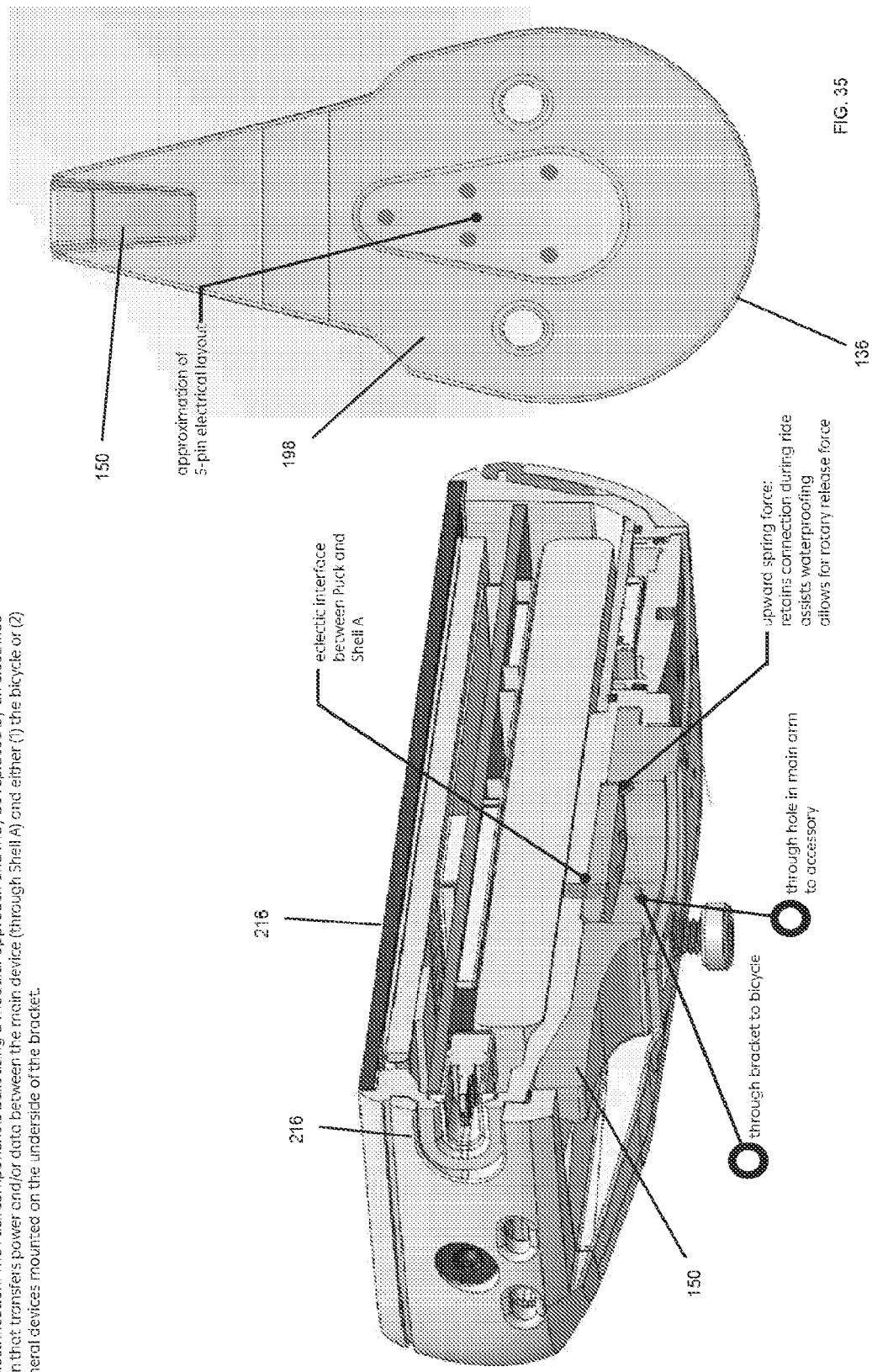

FIGS. 34-35 show a set of views for communication of electrical energy or data via the bracket of FIGS. 1-9 to or from the accessory of FIGS. 10-17 while the bracket holds the accessory as per FIGS. 18 and 25 according to this disclosure. In particular, the plate 136 can include an electrical contact or an electrical interface including the electrical contact or the latch 150 can include the electrical contact. The arm 104 or the container 136 can include an electrical contact or an electrical interface including the electrical contact. For example, with respect to electrification, the accessory 200 includes the port 218 (e.g., a central docking port) configured to designed to interface with a cycling technology system, which can include suitable sensors, monitors, batteries, data processors, lights, and any number of other subsystems. The port 218 may or may not be housed within an "aero" style integrated handlebar and stem. For example, if the port 218 is a universal serial bus (USB) type-C port, then rectilinear mounting, as disclosed herein, allows for docking into a USB type C or other power/data port in both stationary indoor bicycles and traditional outdoor bicycles. Likewise, a loaded tab latching system allows for linear un-mounting with the addition of a user actuated vertical release lever.

Figure 36:
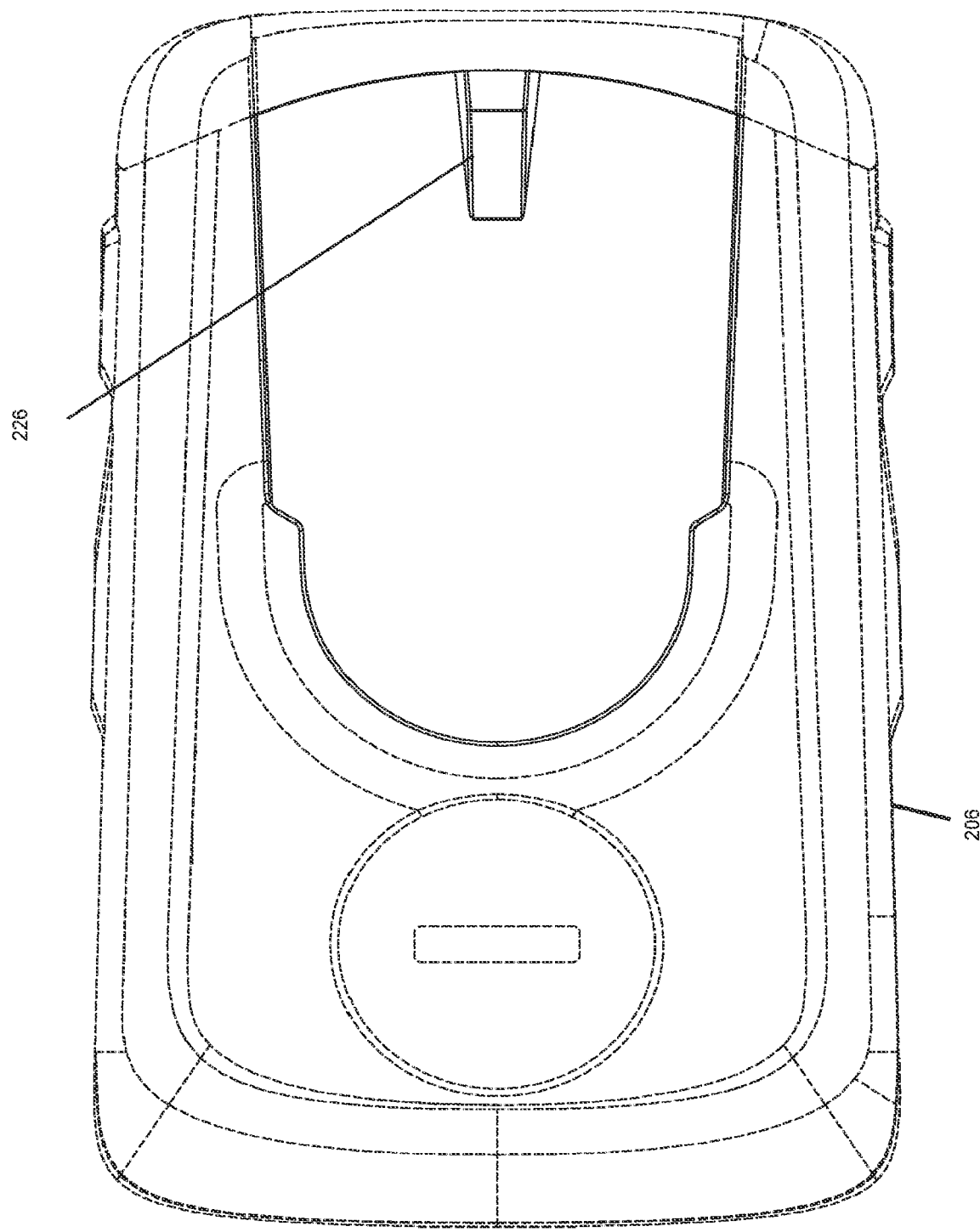
FIG. 36 shows a view of an embodiment of the accessory of FIGS. 10-17 having a detent but no recesses shown in FIGS. 10-17 according to this disclosure.

FIG. 36 shows a view of an embodiment of the accessory of FIGS. 10-17 having a detent but no recesses shown in FIGS. 10-17 according to this disclosure. In particular, note that the back side 206 does not include the recess 228 and the recess 230, but includes the detent 226.

Figure 37:
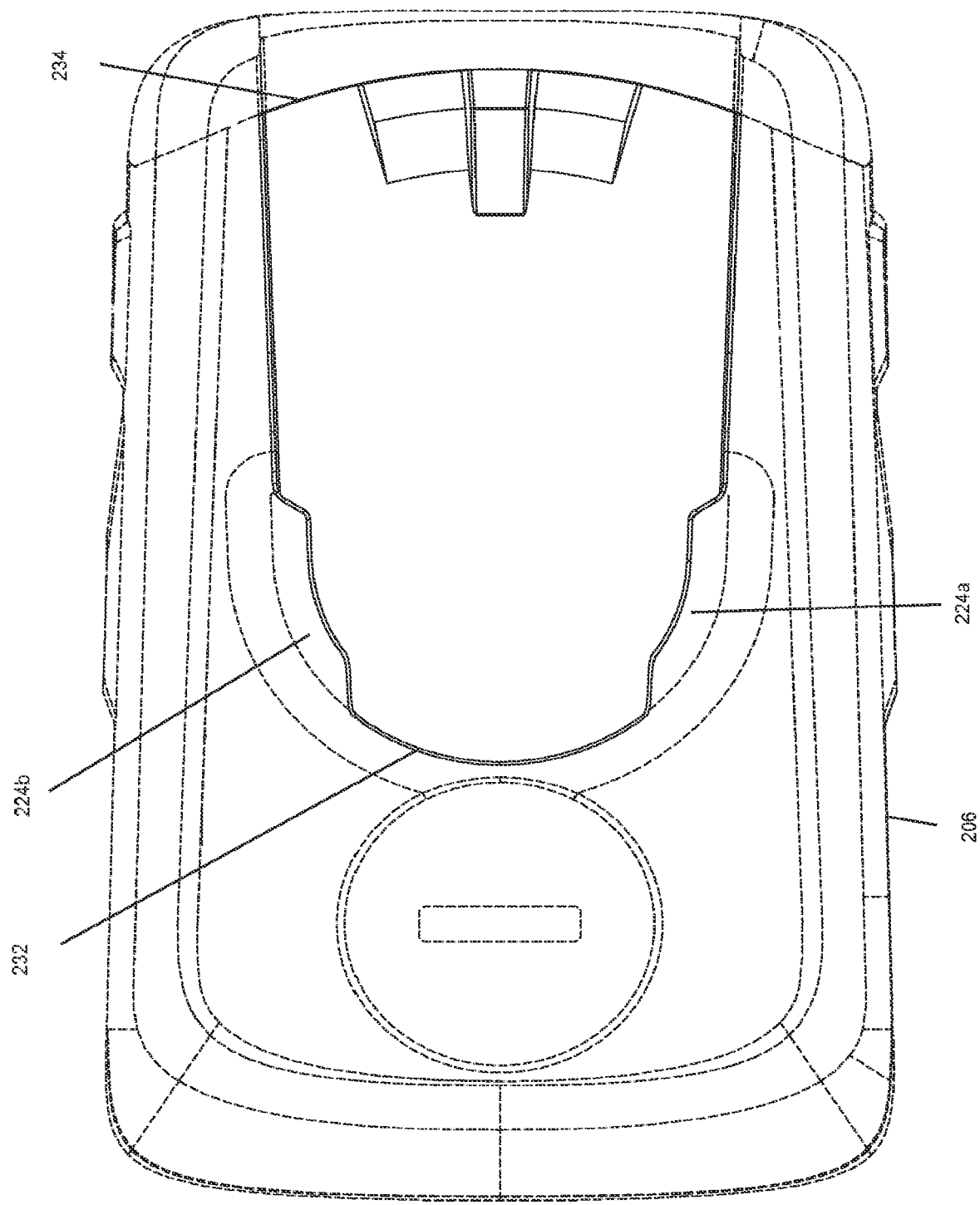
FIG. 37 shows a view of an embodiment of the accessory of FIGS. 10-17 having a pair of lips opposing each other according to this disclosure.

FIG. 37 shows a view of an embodiment of the accessory of FIGS. 10-17 having a pair of lips opposing each other according to this disclosure. In particular, note that the back side 206 has the lip 224 being formed by a pair of lips 224a, 224b that oppose each other along a central symmetrical axis of the back side 206. As such, the detent 226 does not longitudinally extend from the end portion 234 towards the pair of lips 224a, 224b. This configuration may have various technological benefits. For example, this configuration may decrease complexity of injection molding tool parts or use less materials than when the lip 224 is a single continuous piece.

Figure 38:
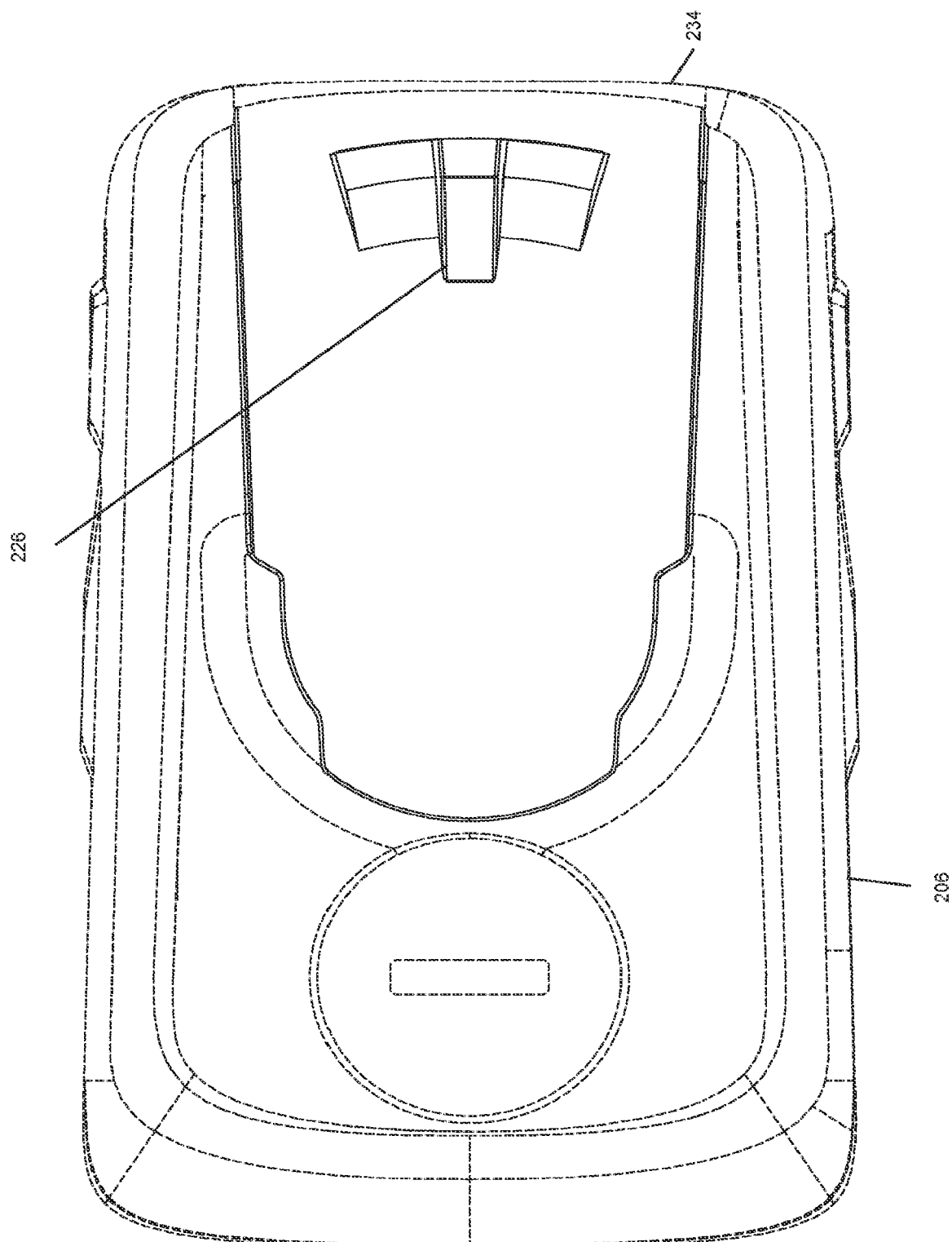
FIG. 38 shows a view of an embodiment of the accessory of FIG. 10-17 or 37 not having a retainer area or the accessory of FIG. 10-17 or 37 having a shell and a housing that are monolithic with each other according to this disclosure.

FIG. 38 shows a view of an embodiment of the accessory of FIG. 10-17 or 37 not having a retainer area or the accessory of FIG. 10-17 or 37 having a shell and a housing that are monolithic with each other according to this disclosure. In particular, note that the back side 206 does not have the retainer area 242, thereby moving the end portion 234 further from the detent 226. Note that the shell and the housing are monolithic with each other. For example, the shell (e.g., a shell B) of the accessory 200 and the housing 202 can be one part (e.g., one piece of material), rather than two parts.

Figure 39:
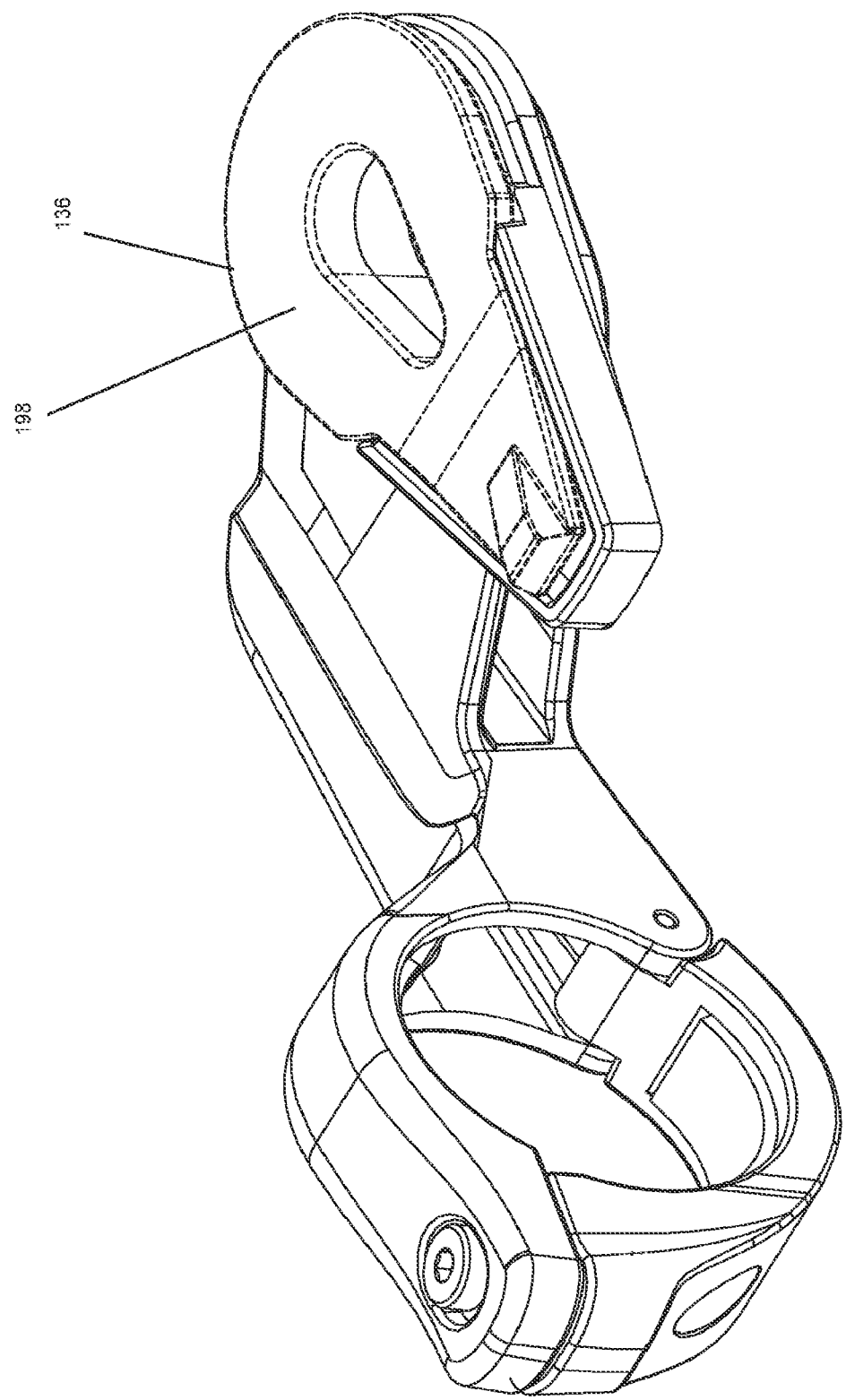
FIG. 39 shows a view of an embodiment of the bracket of FIGS. 1-9 where a plate does not have a pair of openings and the plate is secured to a container according to this disclosure.

FIG. 39 shows a view of an embodiment of the bracket of FIGS. 1-9 where a plate does not have a pair of openings and the plate is secured to a container according to this disclosure. In particular, the plate 136 does not have the pair of openings 140 in the area 198, but the plate 136 is secured to the container 134 (e.g., adhering, mating, magnetizing, fastening, interlocking).

Figure 40:
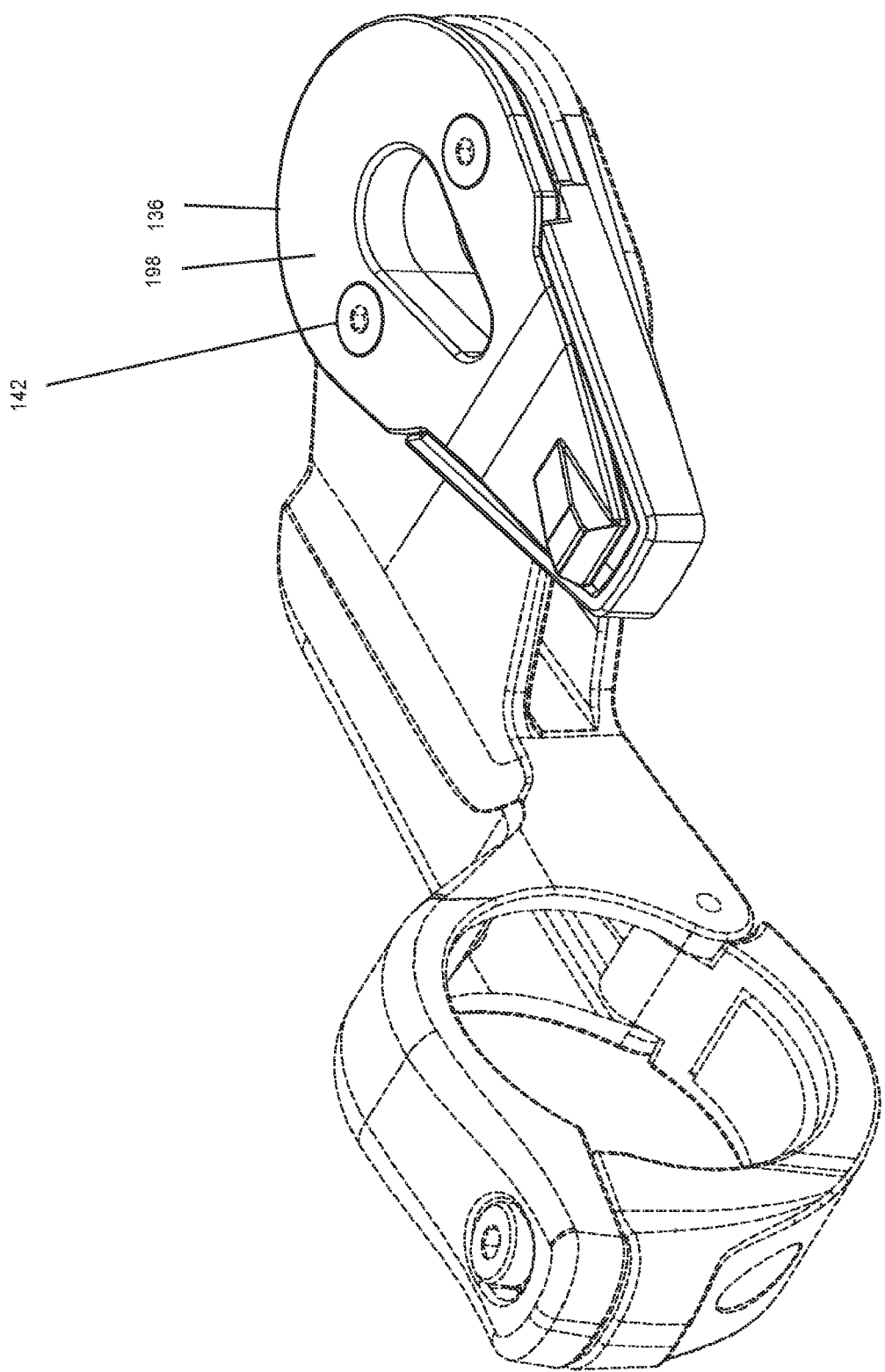
FIG. 40 shows a view of an embodiment of the bracket of FIGS. 1-9 where a pair of bolts is inserted from above the bracket rather than below and the pair of bolts is not recessed as shown in FIGS. 1-9 according to this disclosure.

FIG. 40 shows a view of an embodiment of the bracket of FIGS. 1-9 where a pair of bolts is inserted from above the bracket rather than below and the pair of bolts is not recessed as shown in FIGS. 1-9 according to this disclosure. In particular, the pair of bolts 142 is flush with the area 198 and is not recessed with respect to the area 198 or the plate 136. Further, note that the pair of bolts 142 is inserted from above the area 198, although insertion of the pair of bolts 142 from below the area 198 or omission of the pair of bolts 142 is possible.

Figure 41:
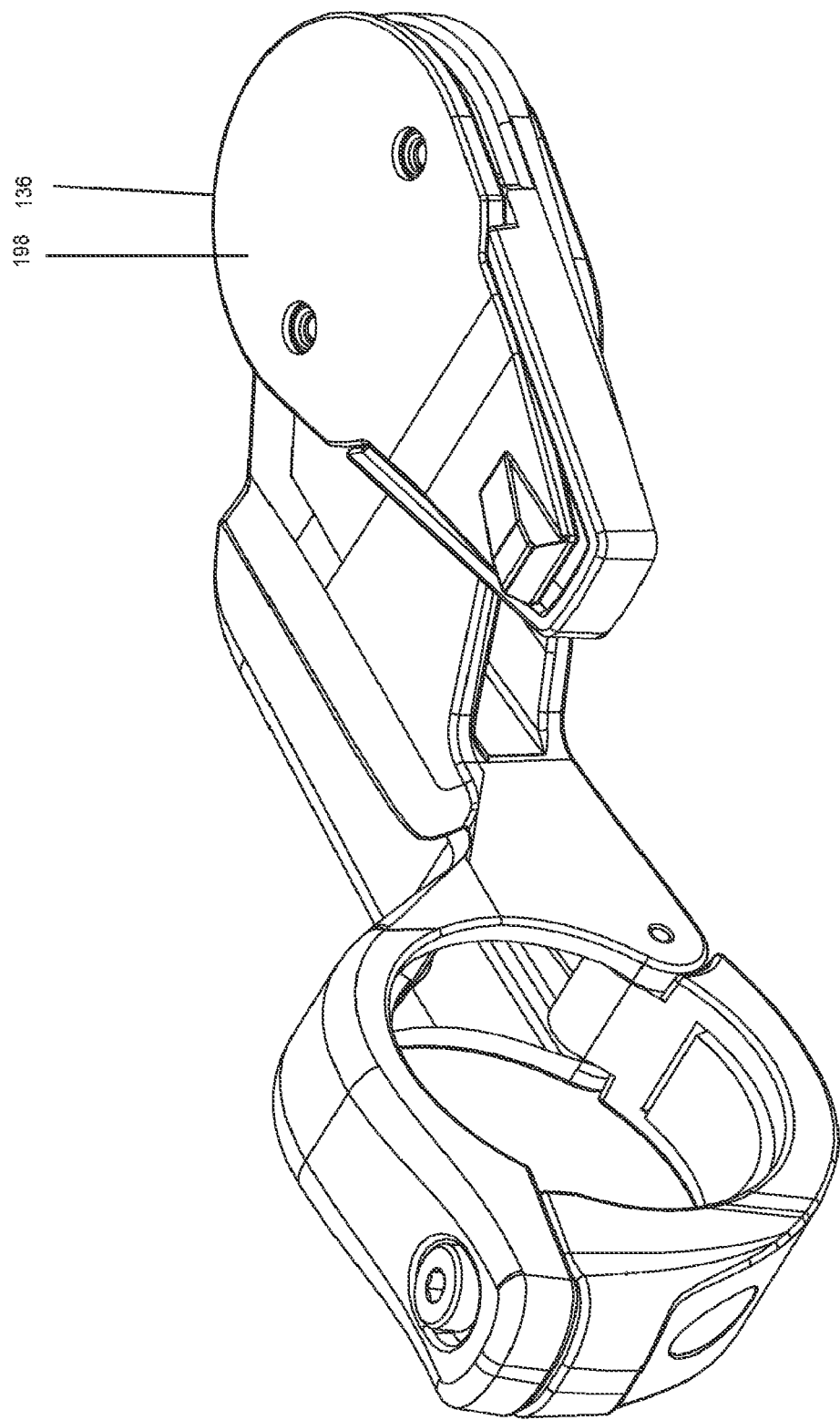
FIG. 41 shows a view of an embodiment of the bracket of FIGS. 1-9 where a plate does not have a central opening according to this disclosure.

FIG. 41 shows a view of an embodiment of the bracket of FIGS. 1-9 where a plate does not have a central opening according to this disclosure. In particular, the plate 136 or the area 198 does not have the opening 144.

FIGS. 42-62 shows a set of views of a set of embodiments of a bracket having a mounting interface according to this disclosure. In particular, a bracket 400 includes an arm 402 and a mounting interface 404 cantileveredly extending from the arm 402. The arm 402 includes a pair of openings 406 configured to receive a pair of bolts (or screws) for fastening the arm 402 onto another structure (e.g. a frame, a handlebar, an integrated handlebar, a stem, an integrated barstem).

Figure 42:
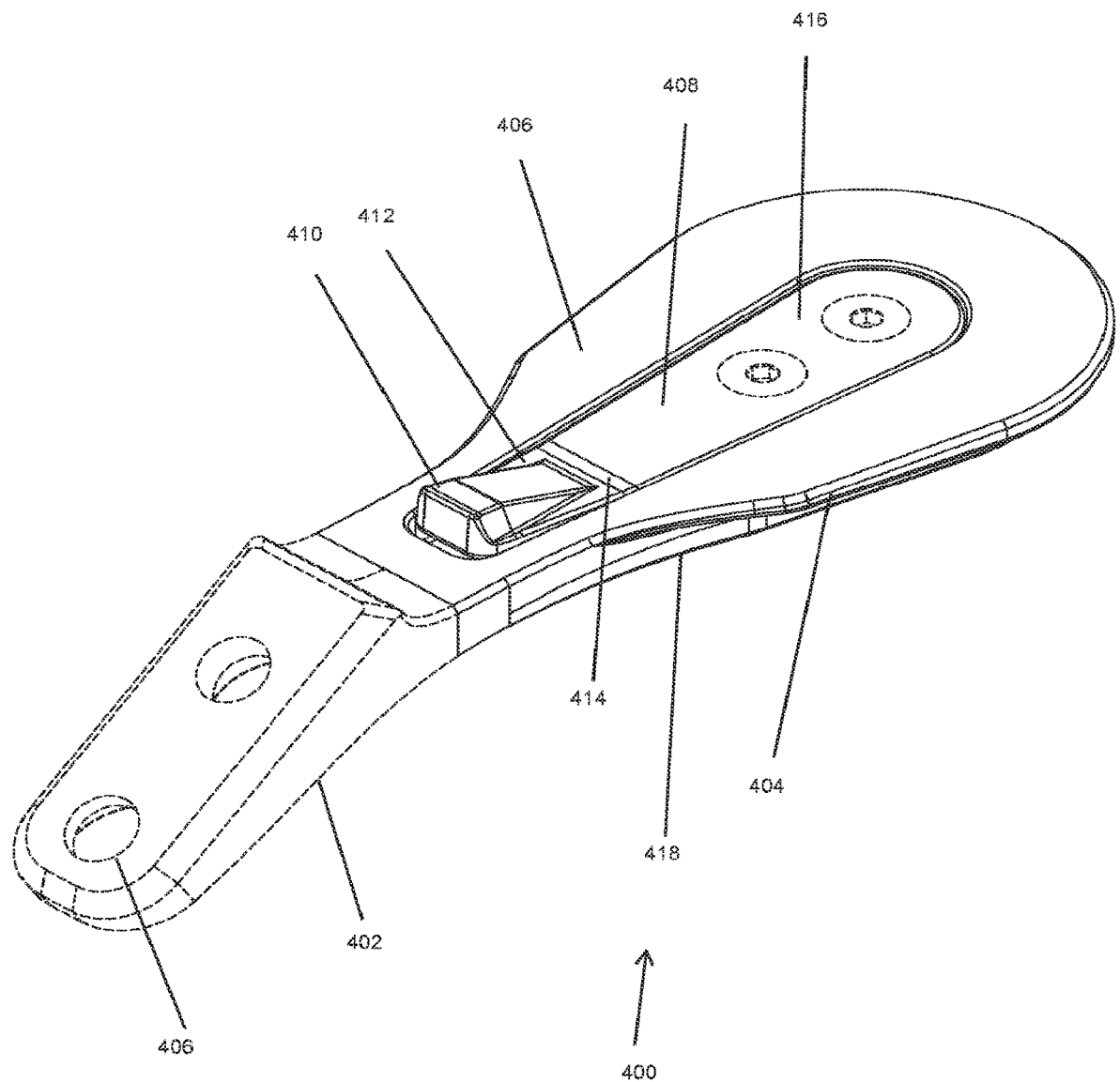
FIGS. 42-62 shows a set of views of a set of embodiments of a bracket having a mounting interface according to this disclosure.
Figure 43:
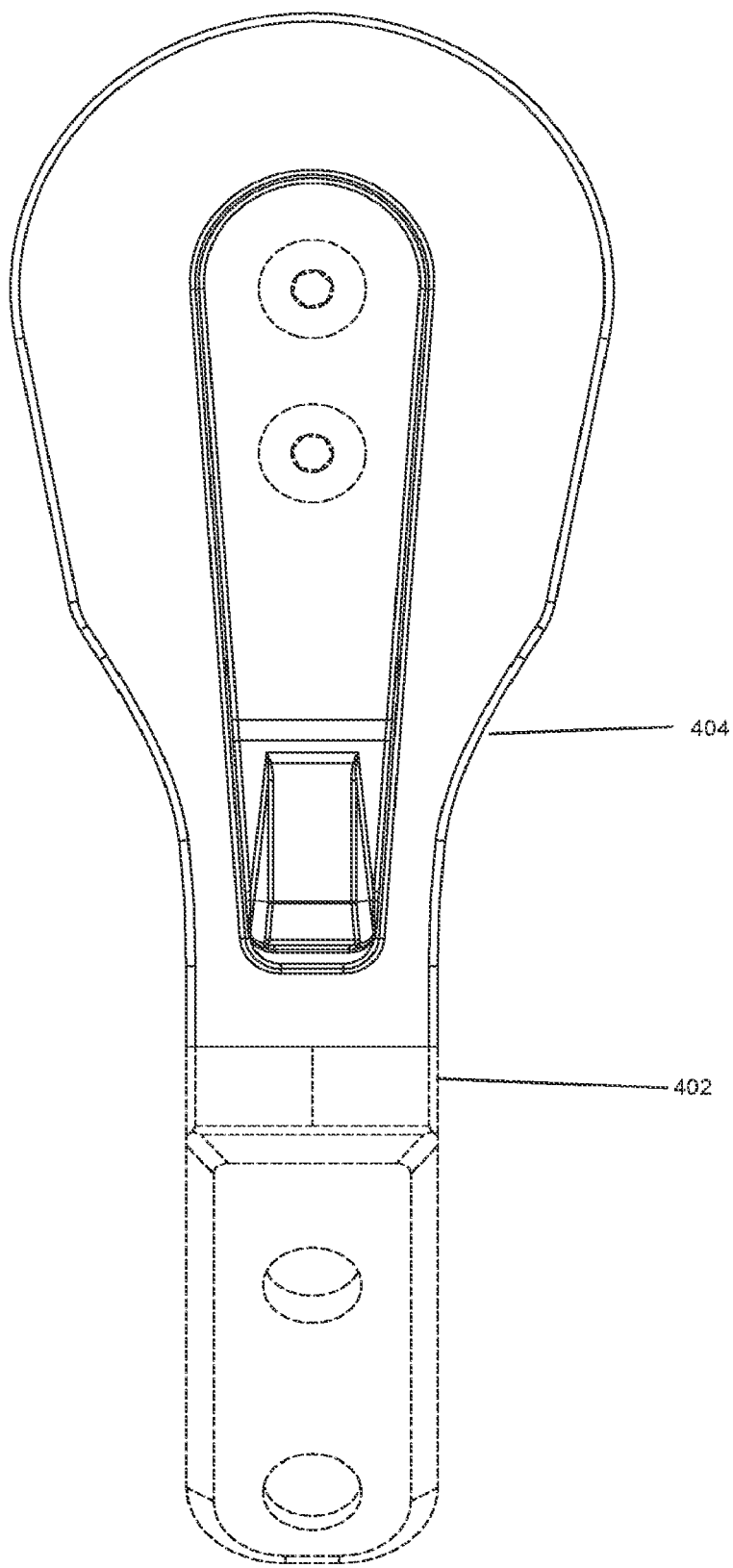
Figure 44:
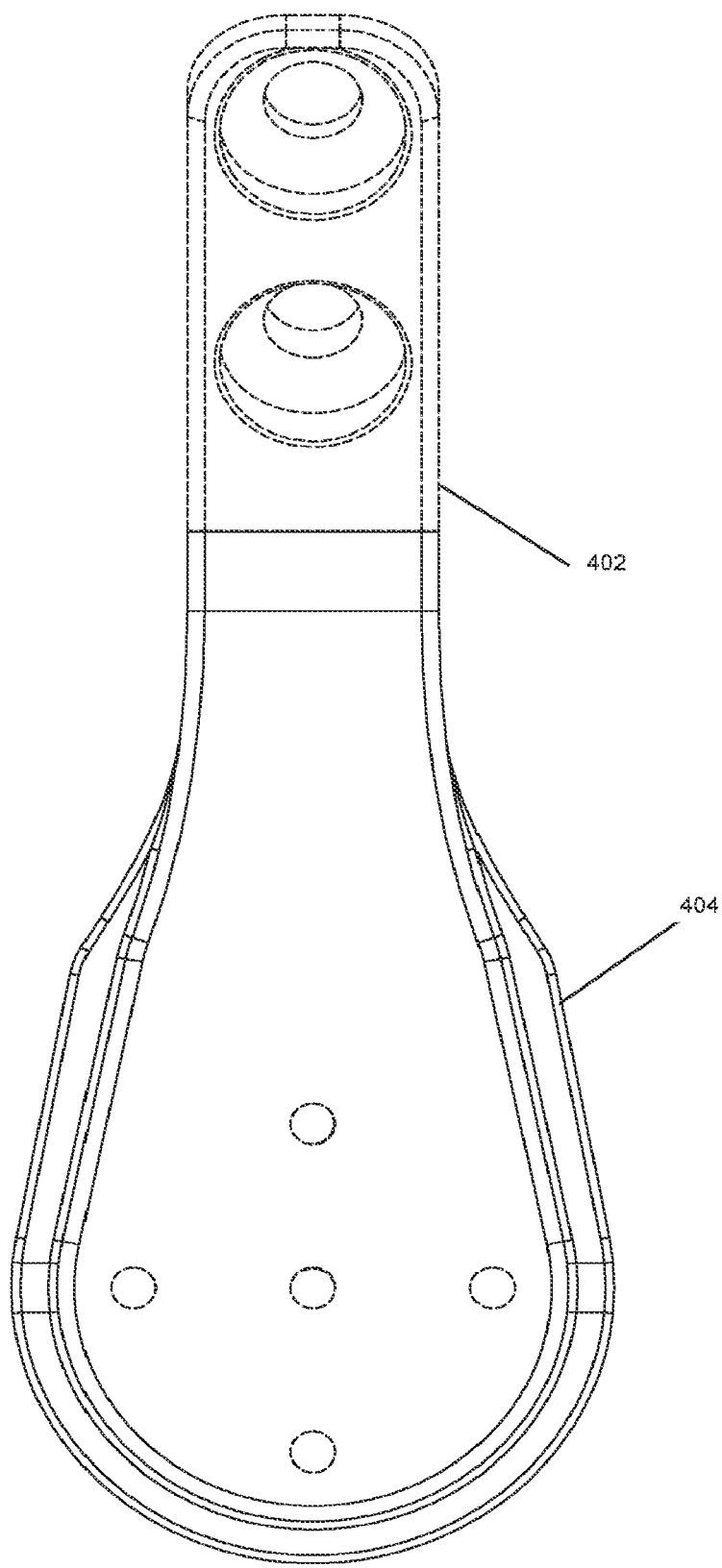
Figure 45:
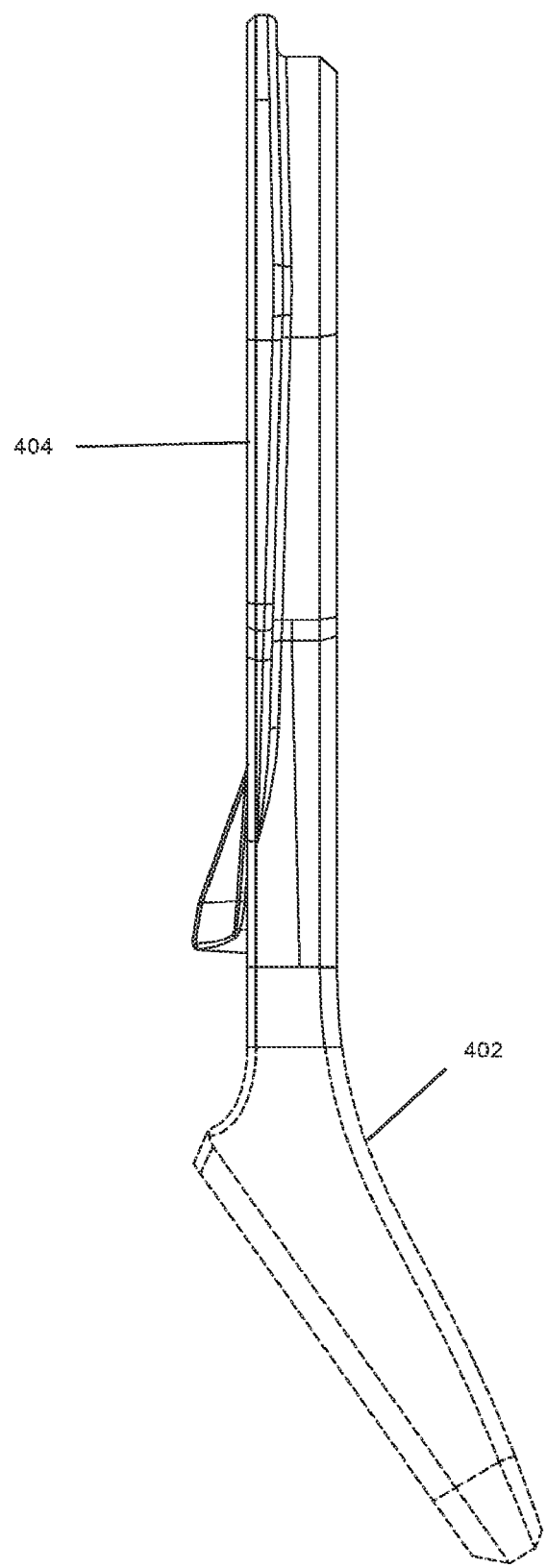
Figure 46:
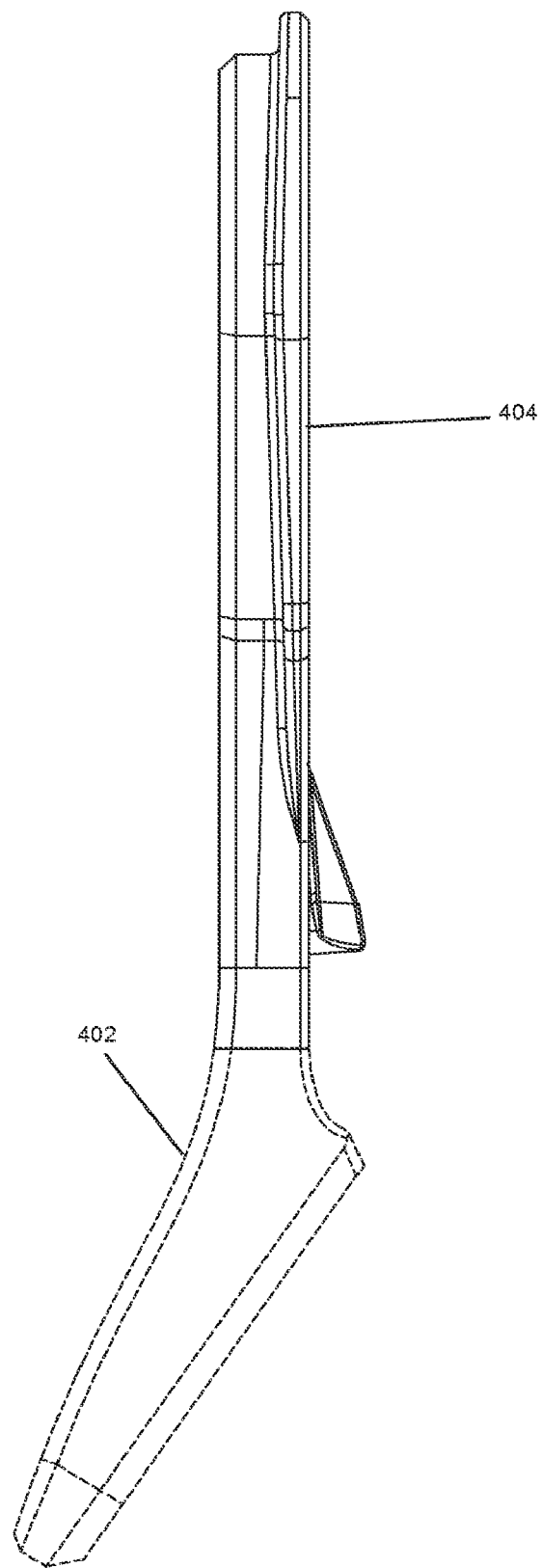
Figure 47:
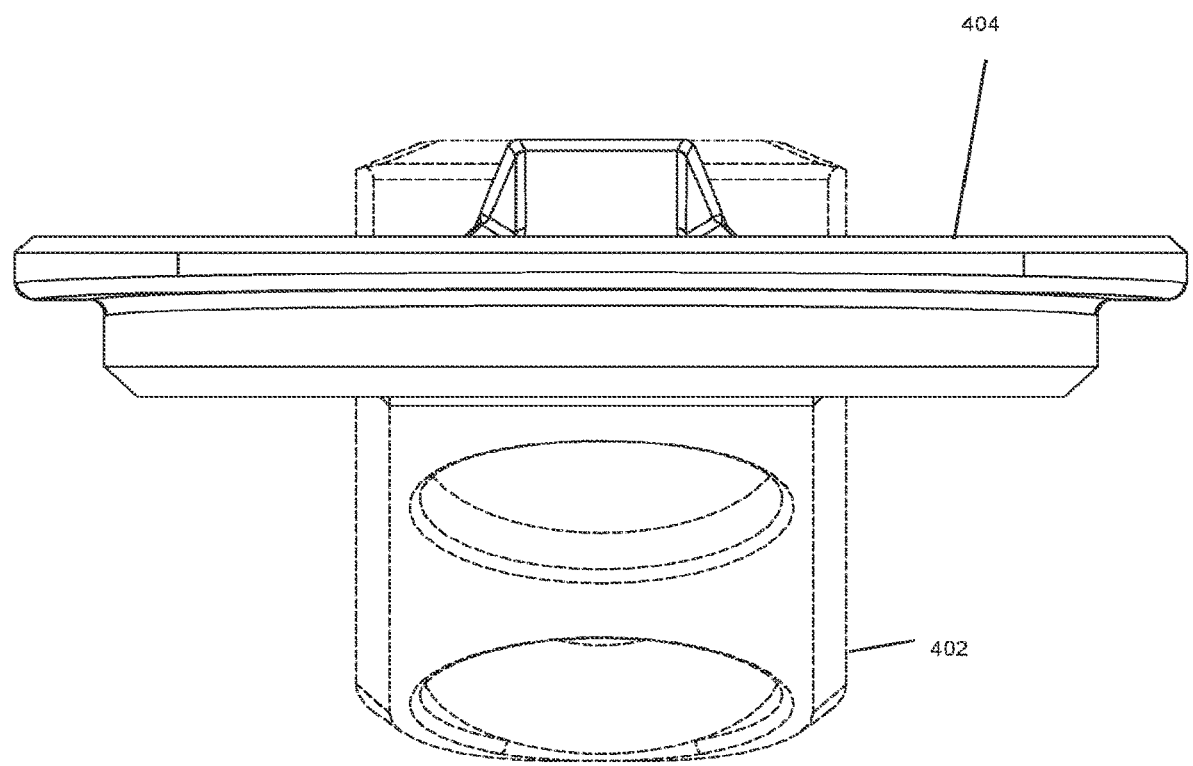
Figure 48:
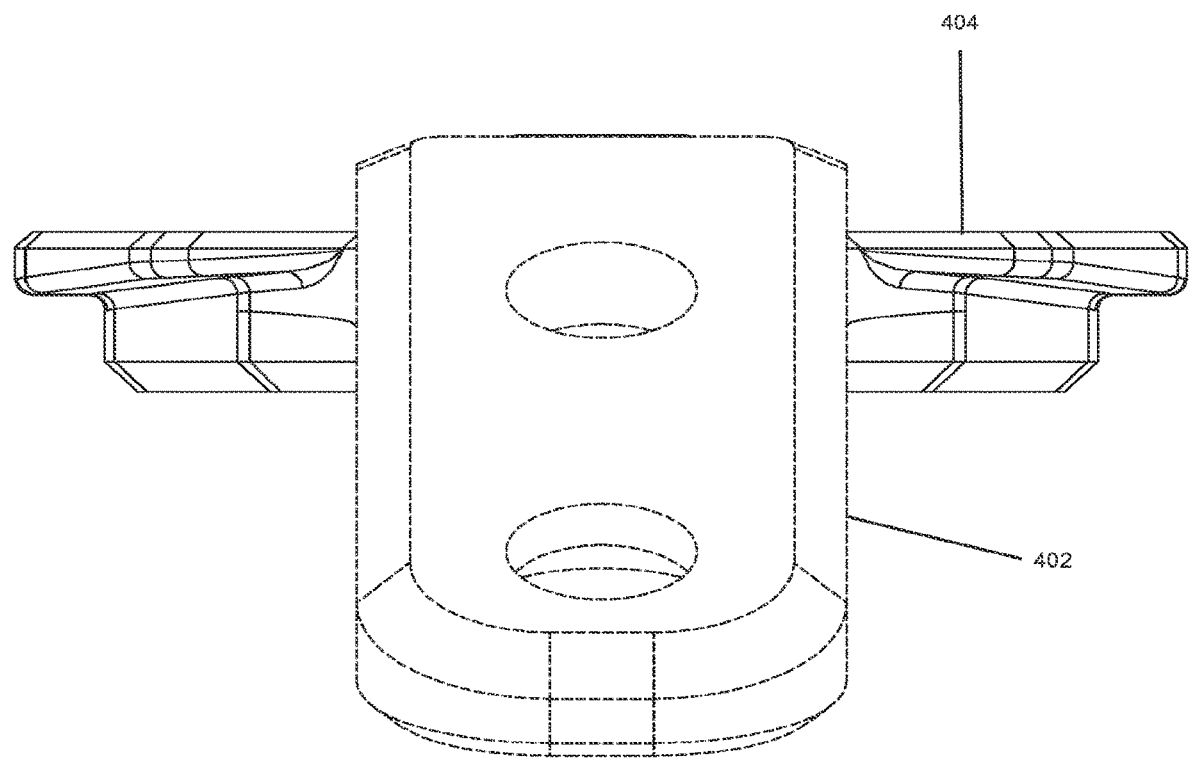
Figure 49:
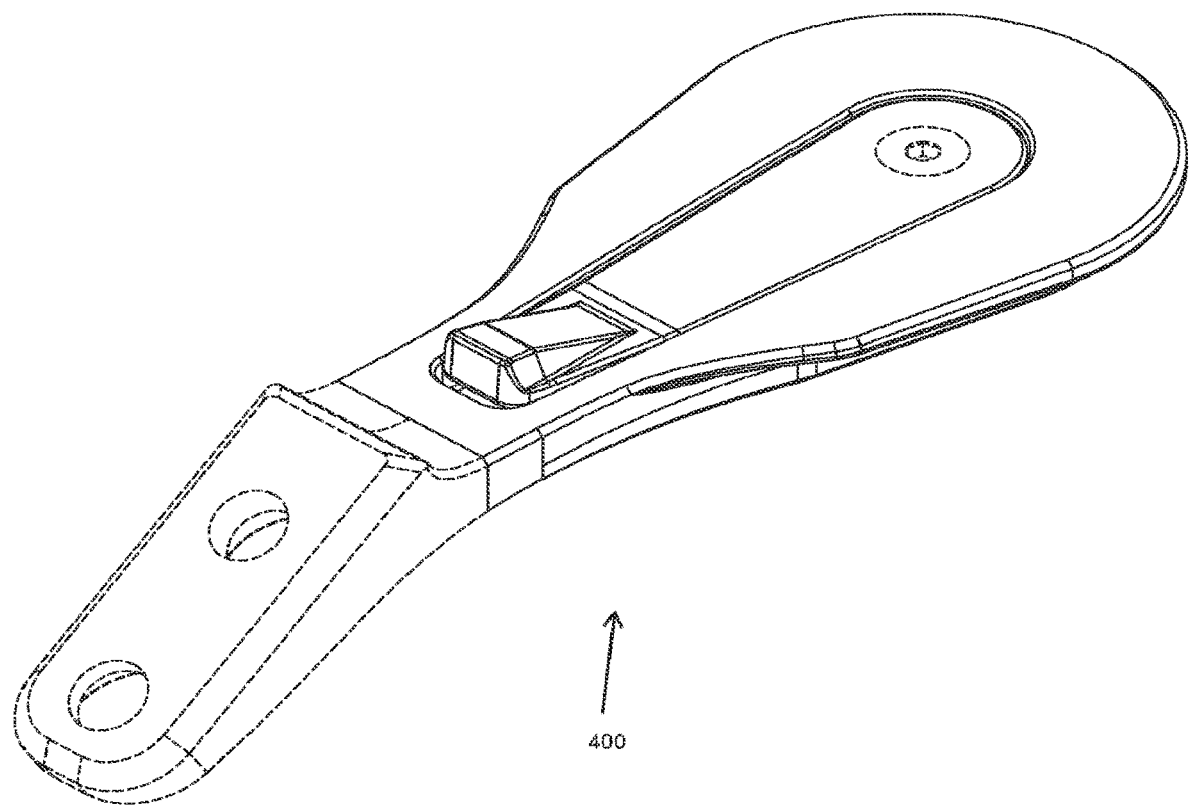
Figure 50:
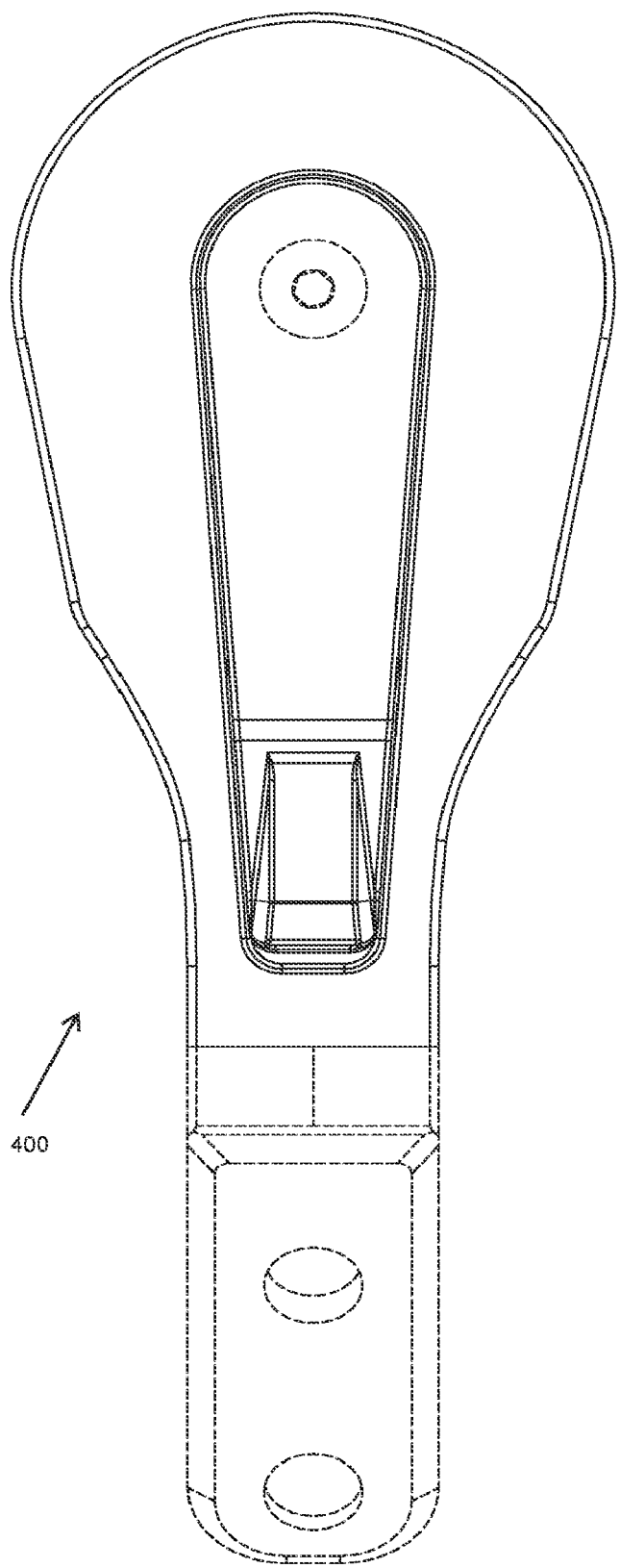
Figure 51:
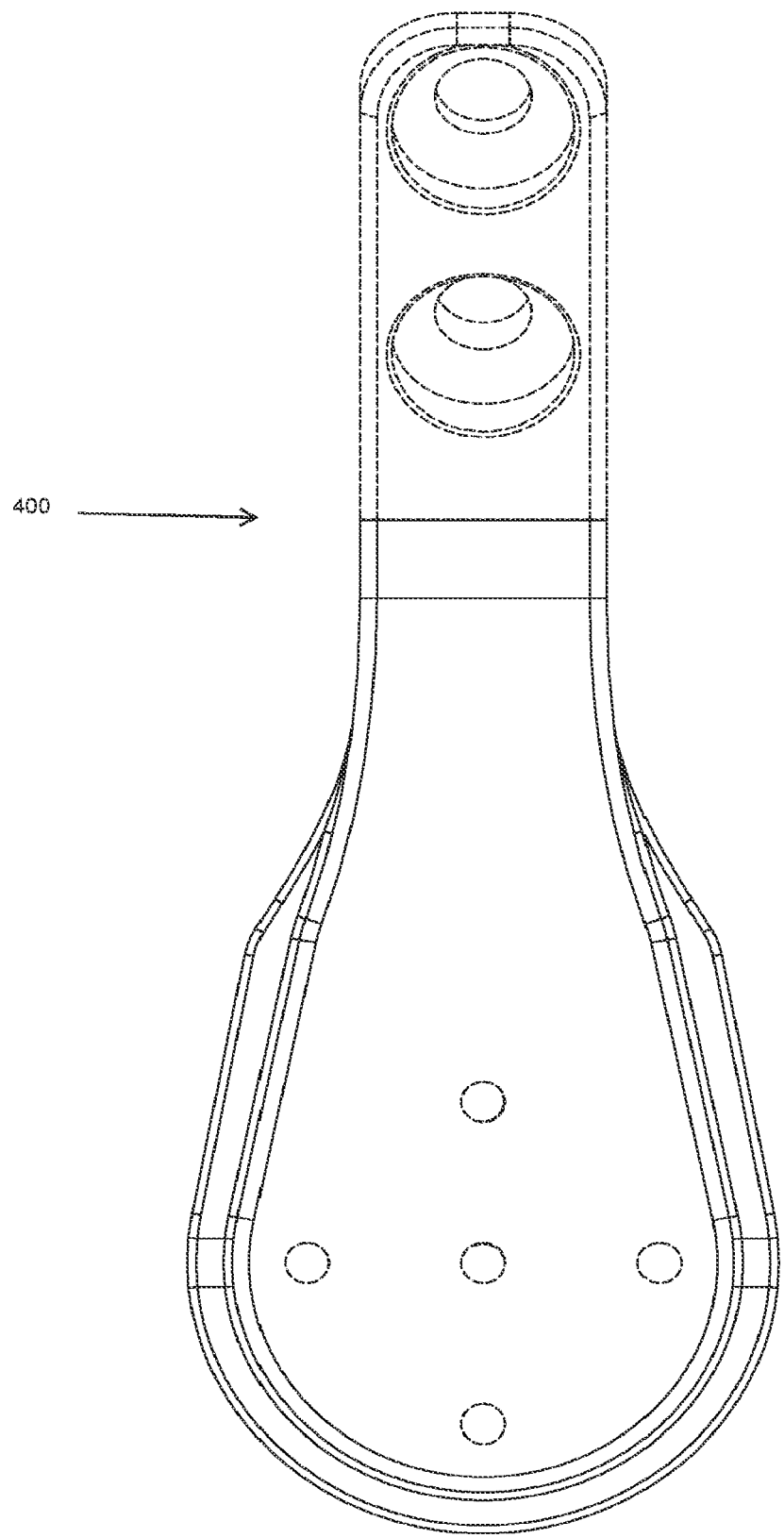
Figure 52:
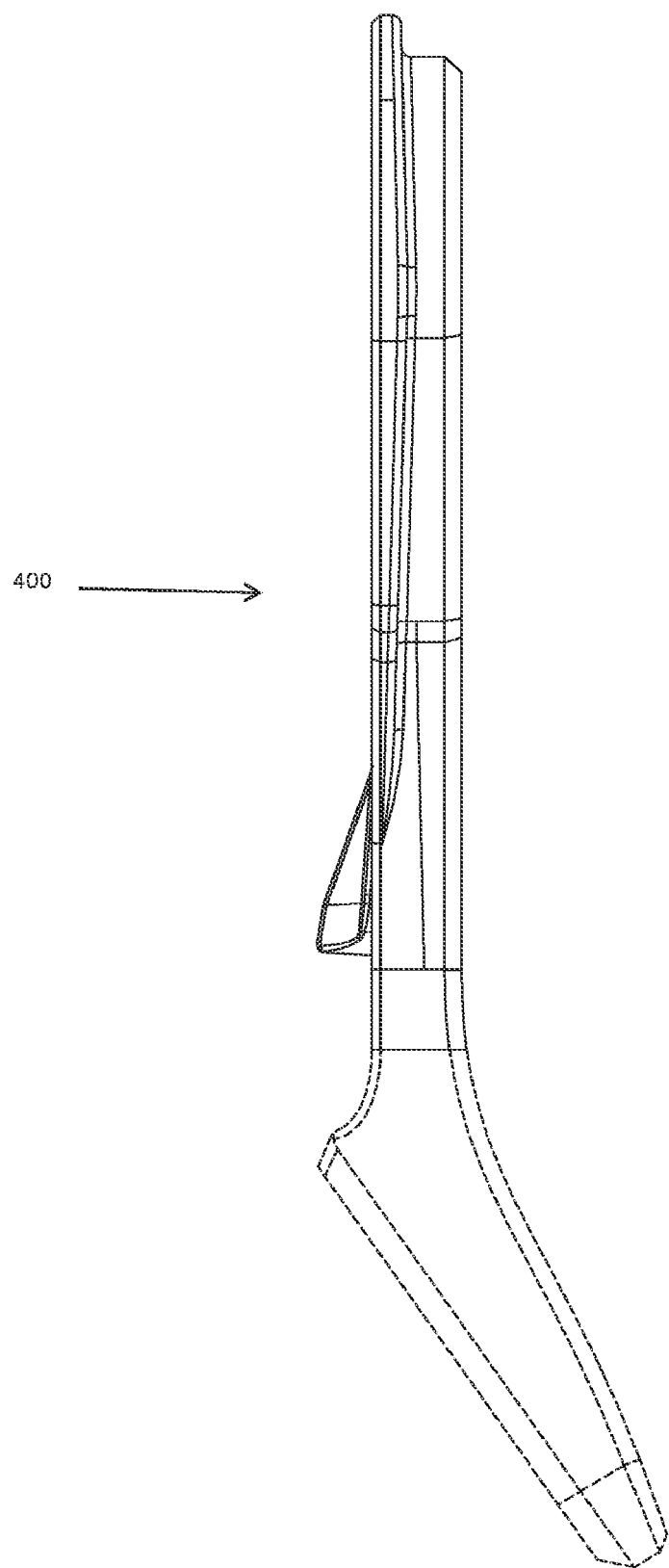
Figure 53:
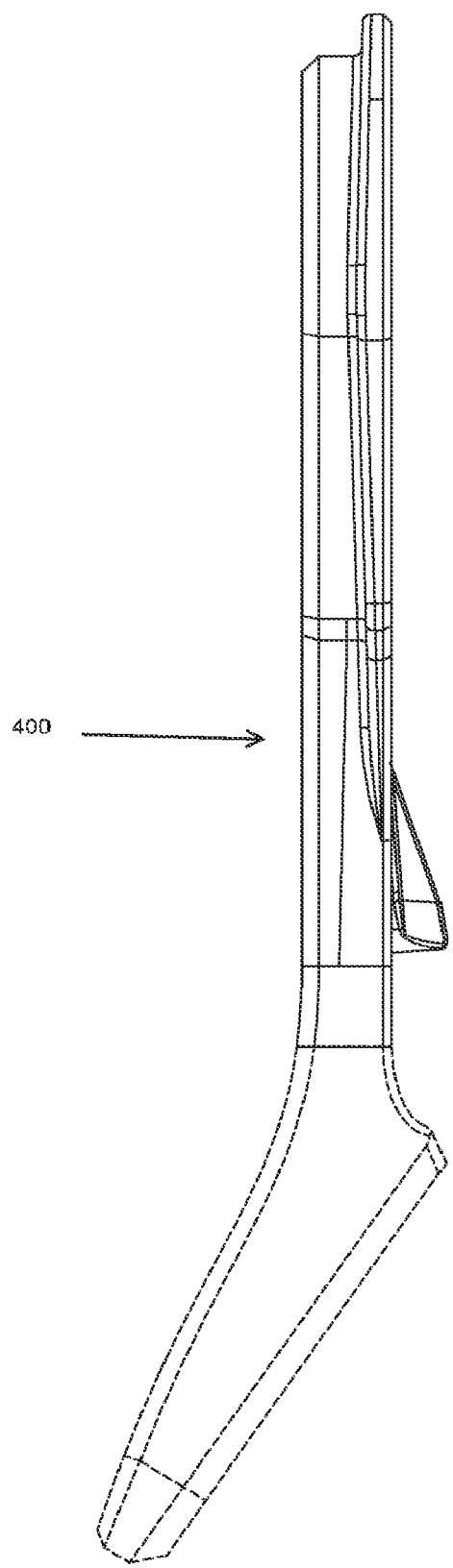
Figure 54:
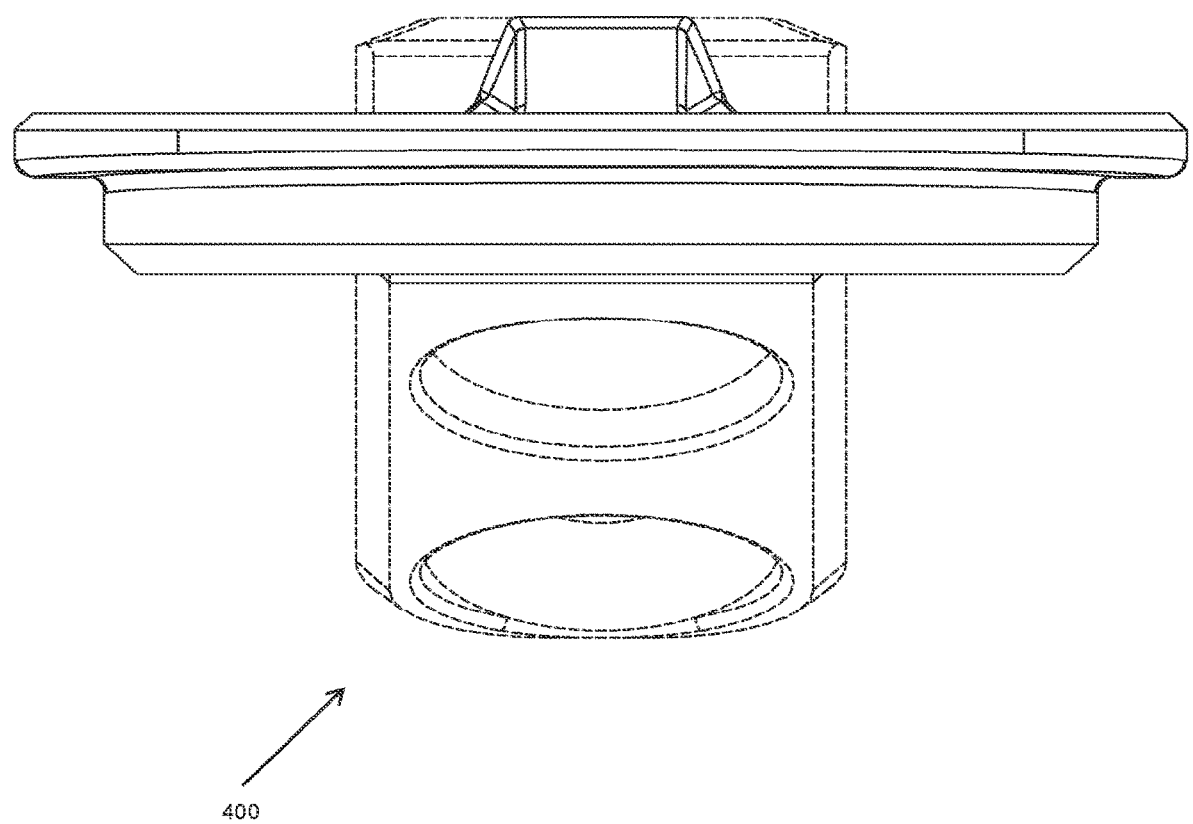
Figure 55:
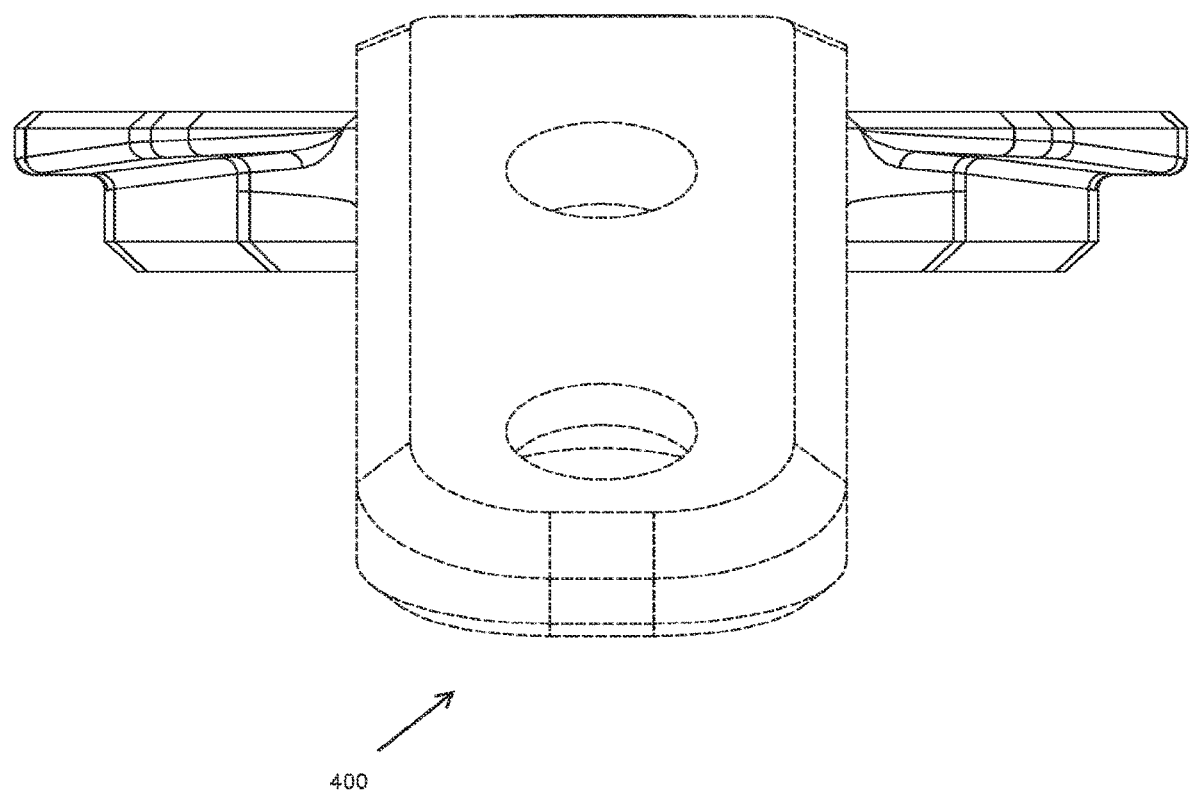
Figure 56:
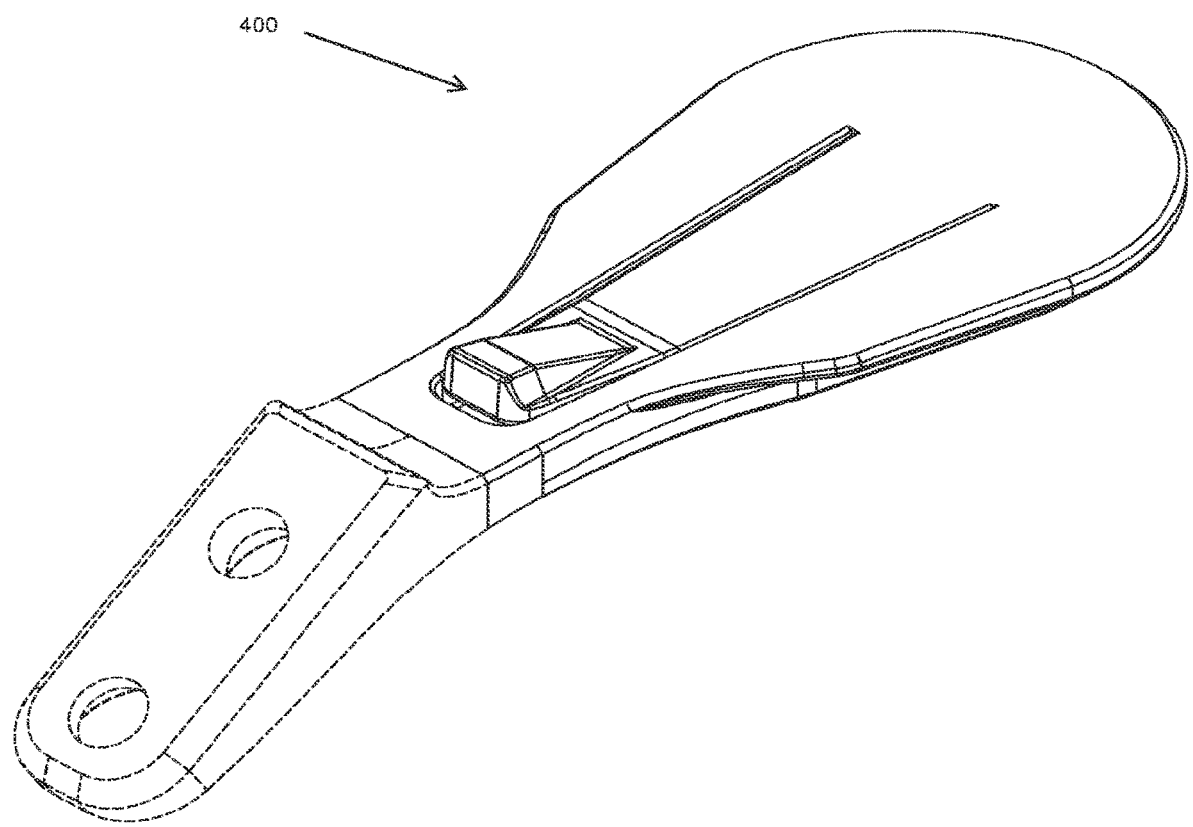
Figure 57:
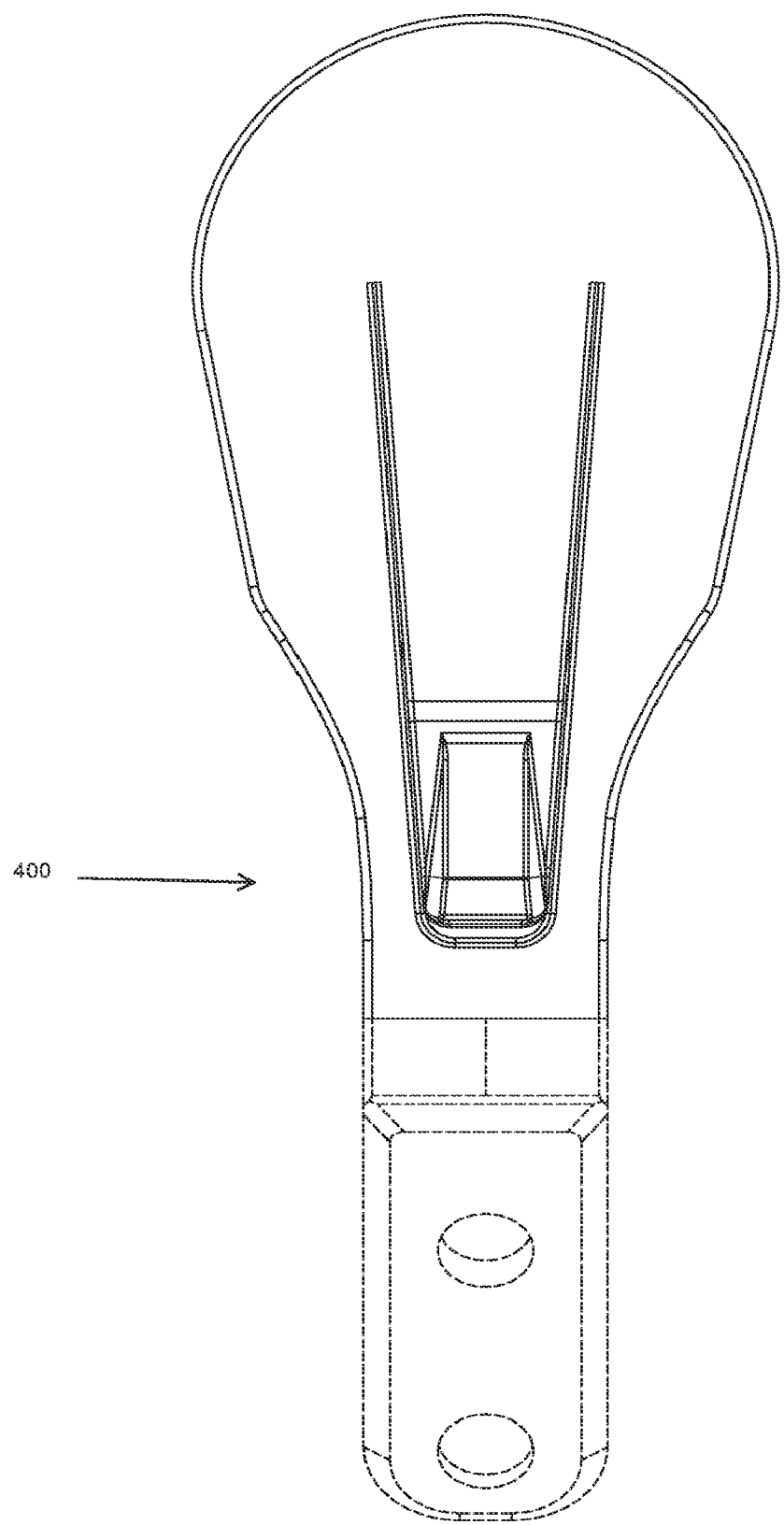
Figure 58:
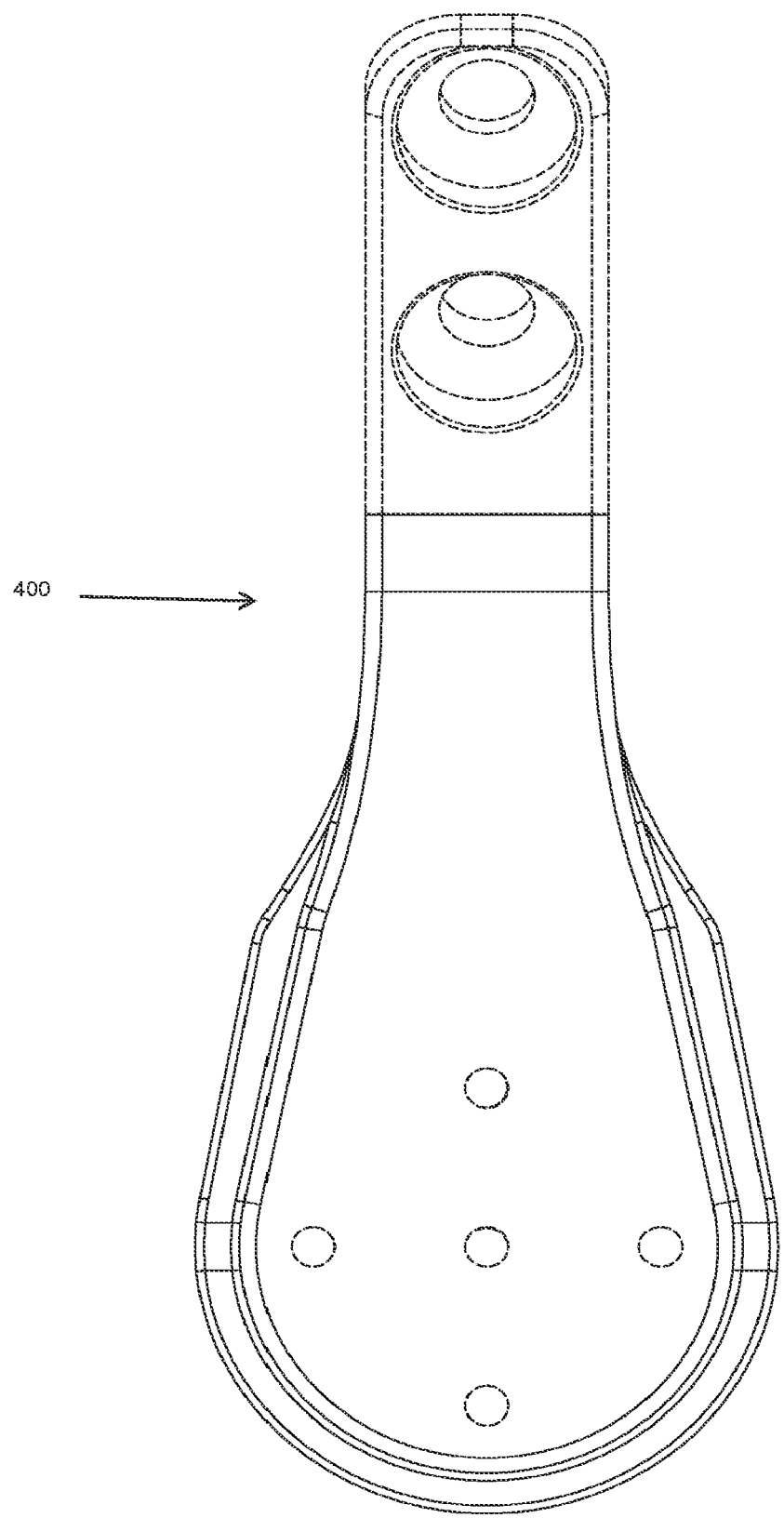
Figure 59:
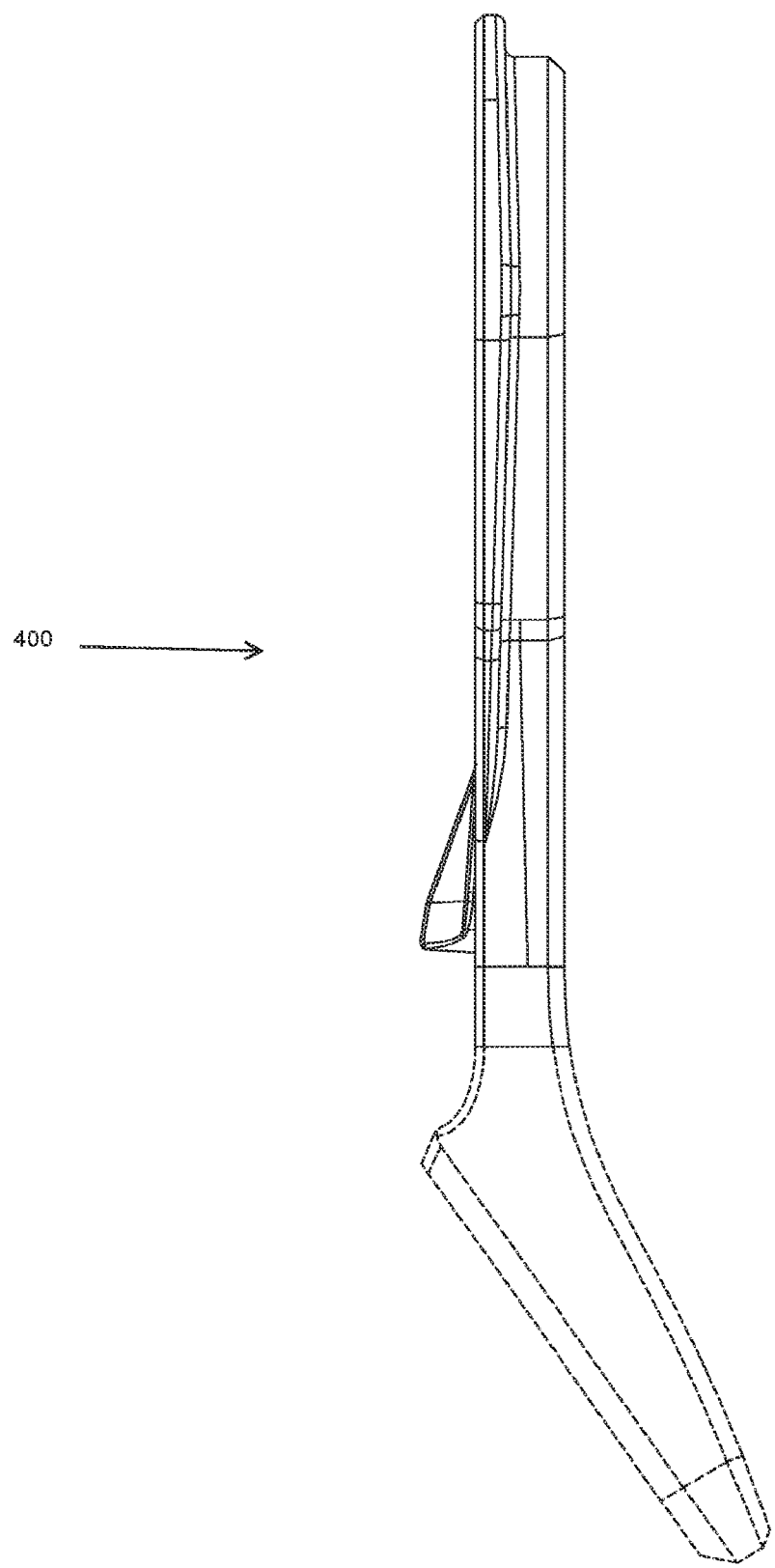
Figure 60:
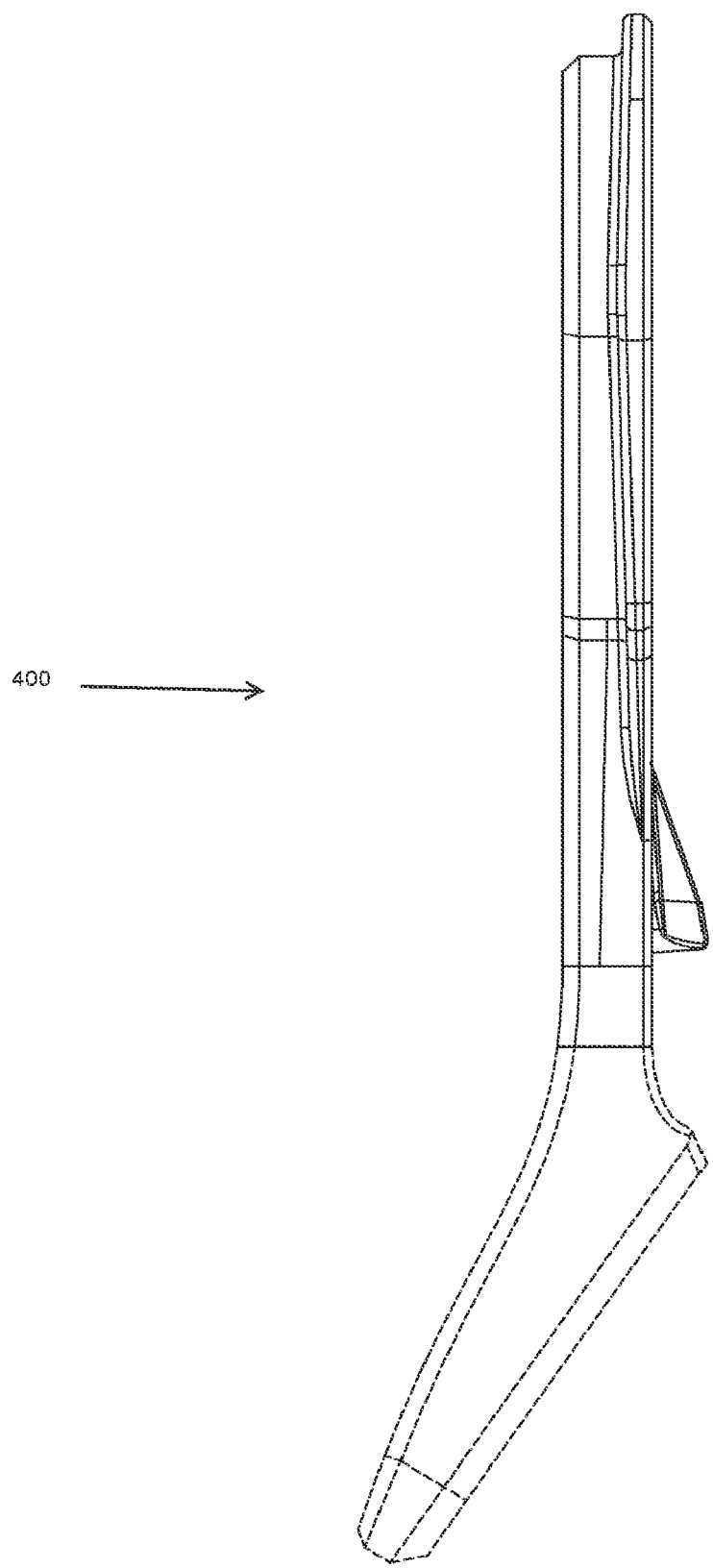
Figure 61:
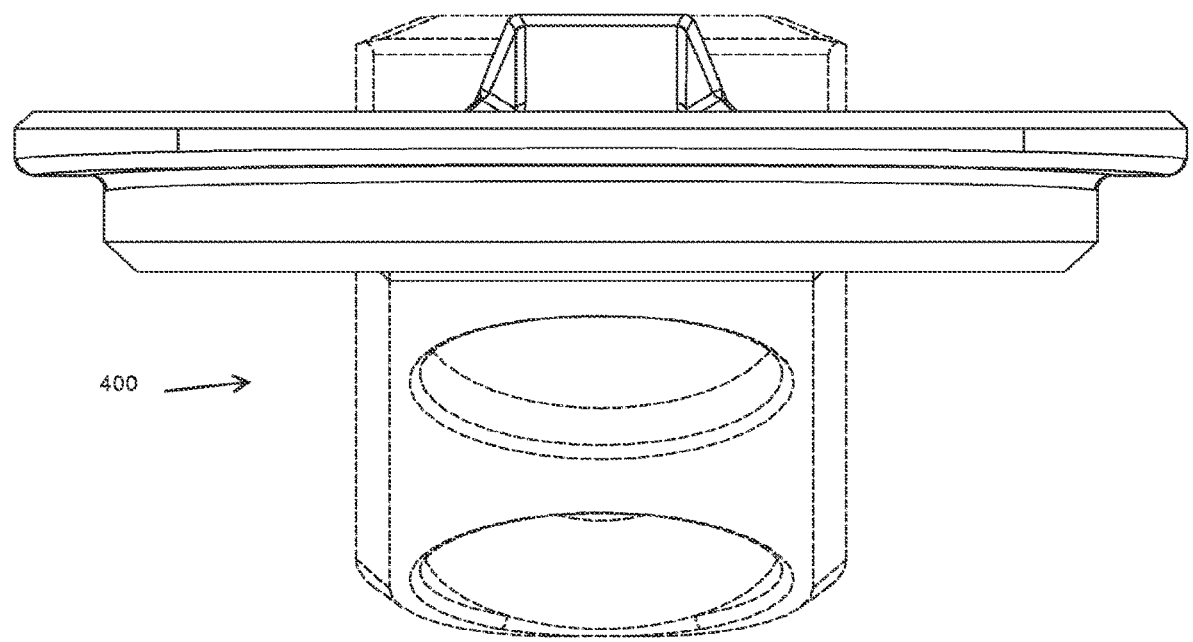
Figure 62:
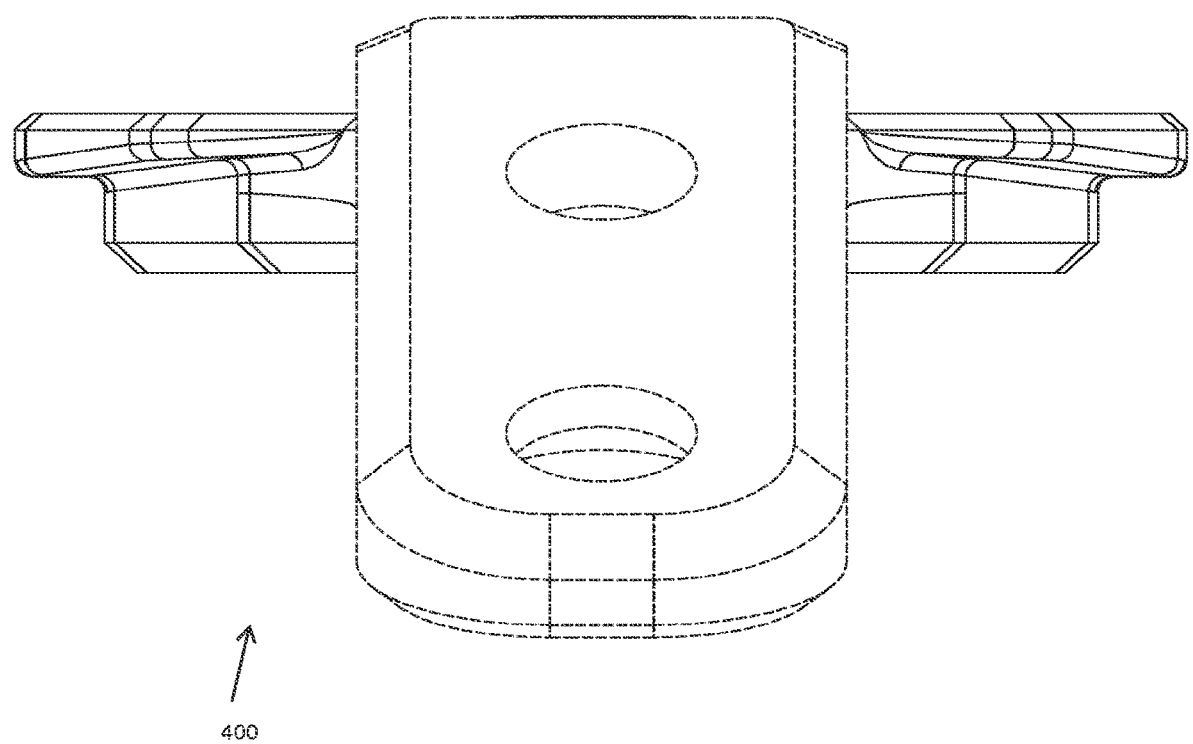
Figure 63:
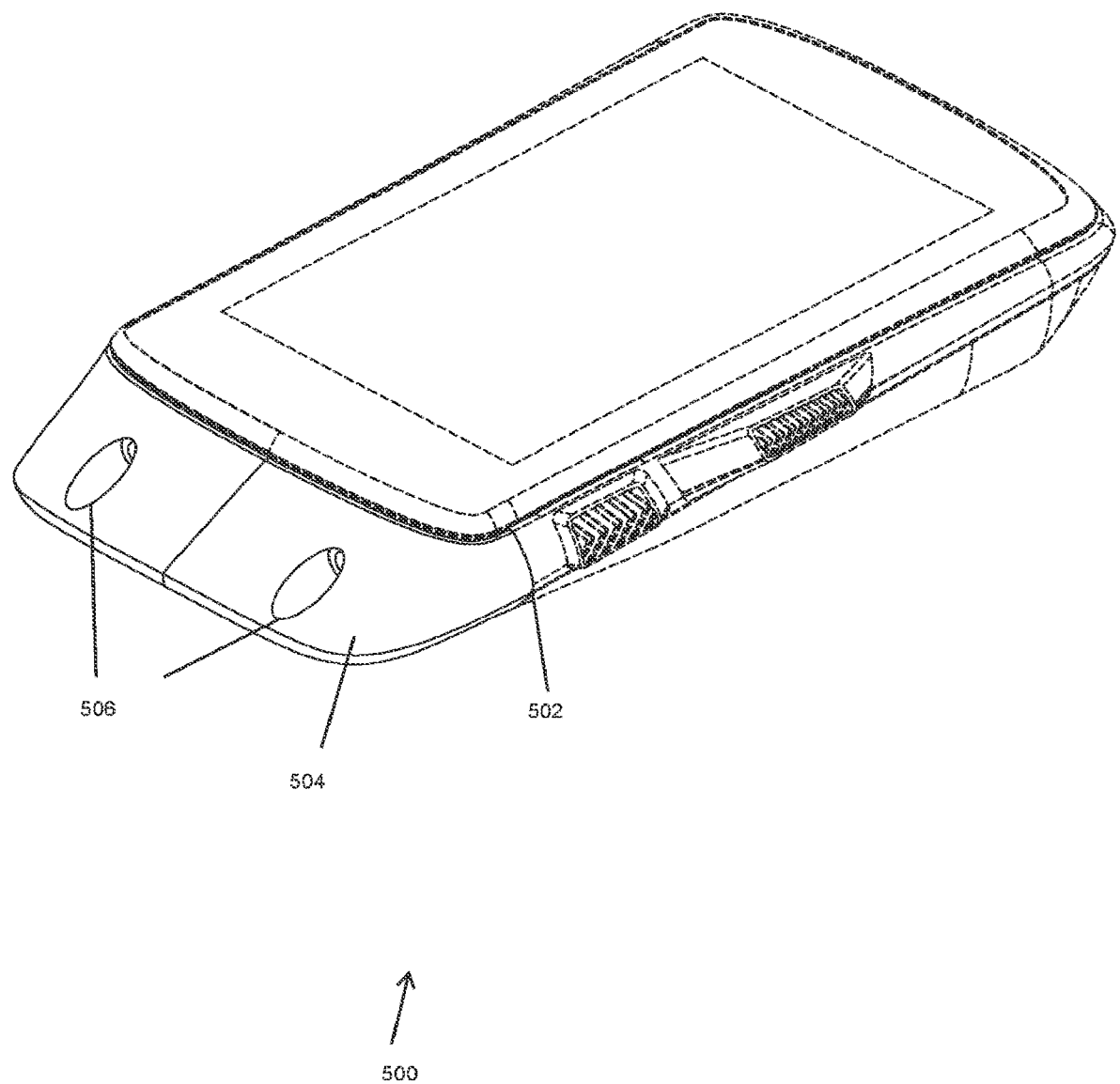
Figure 64:
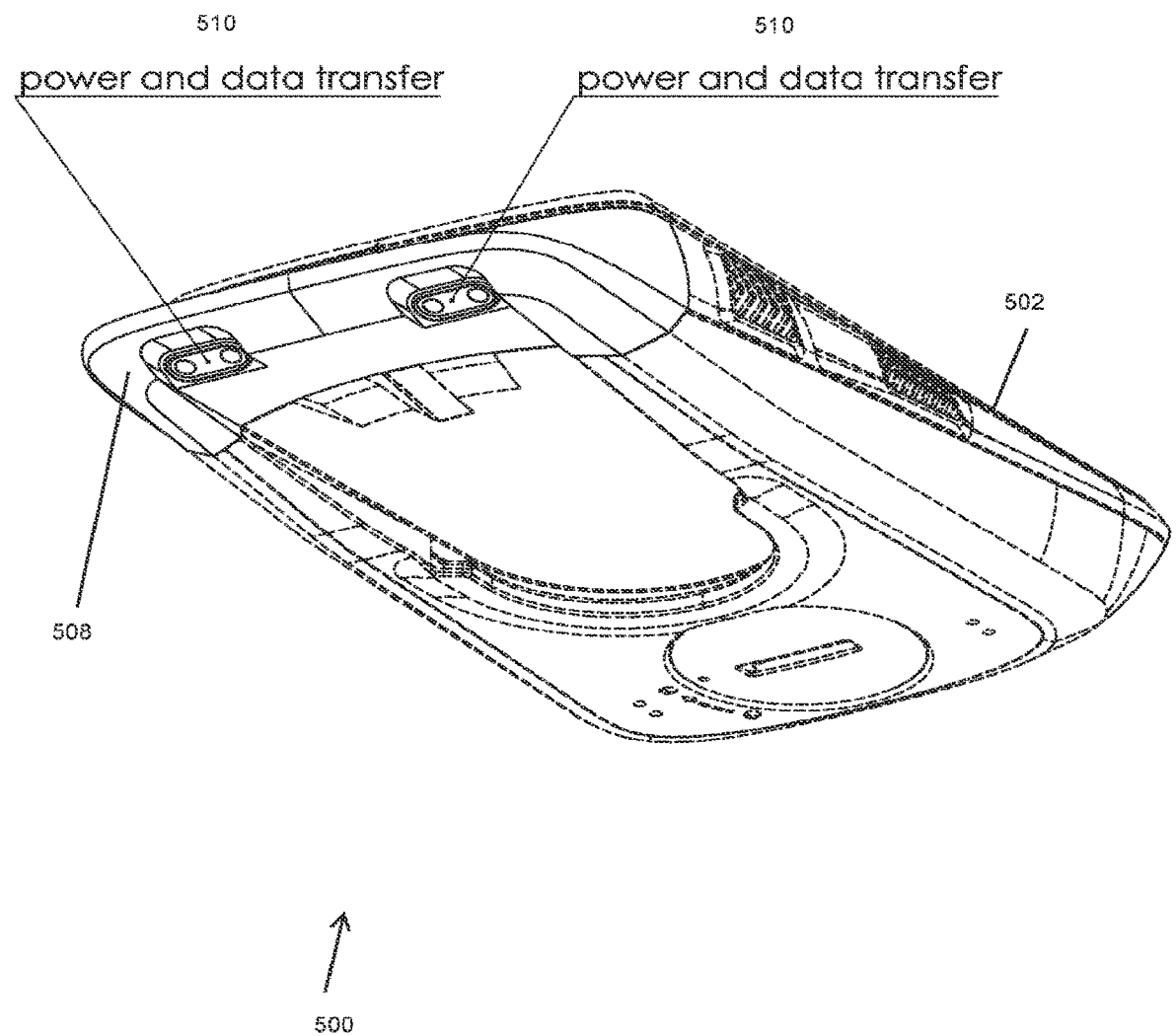
Figure 65:
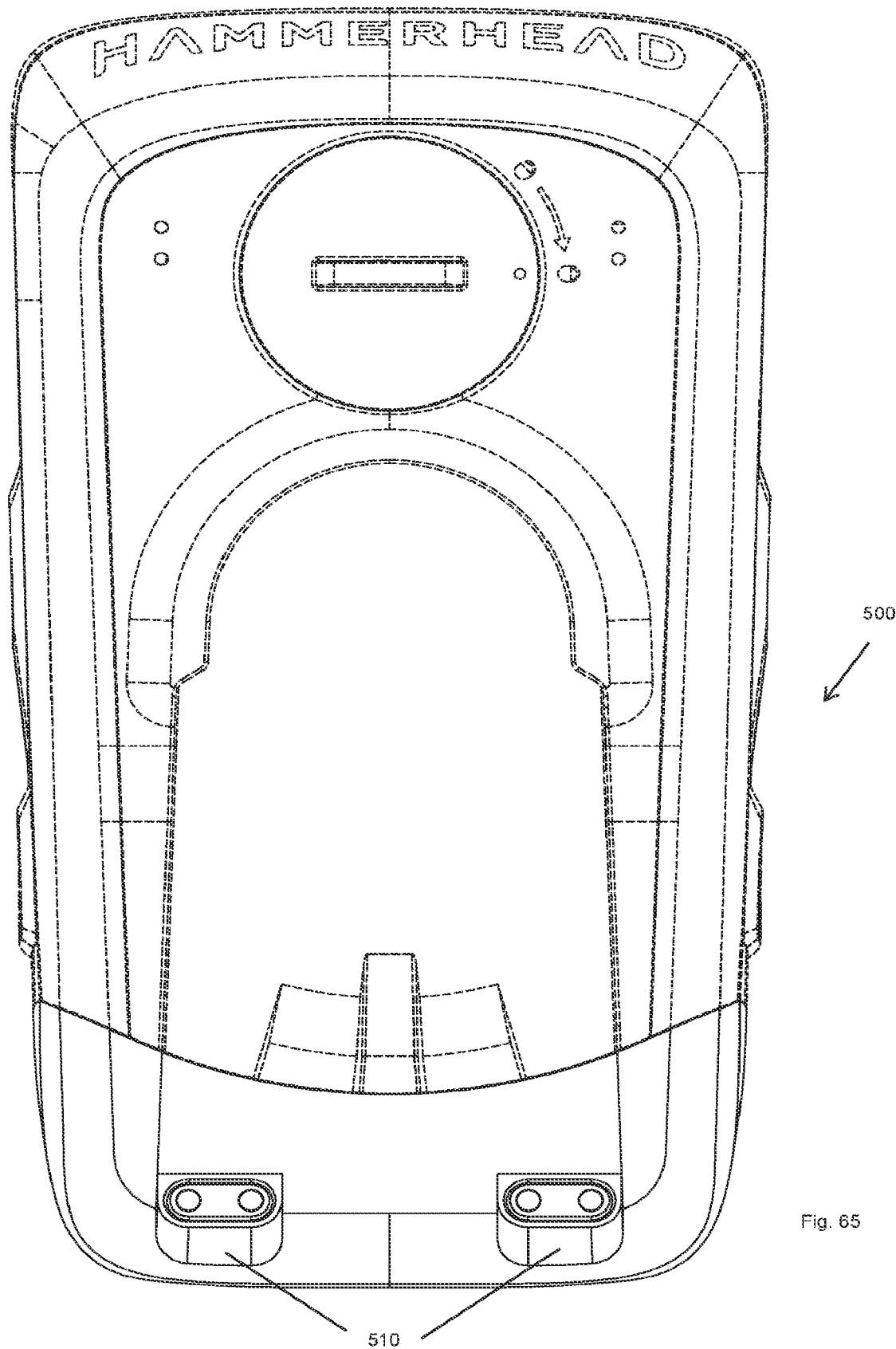
Figure 66:
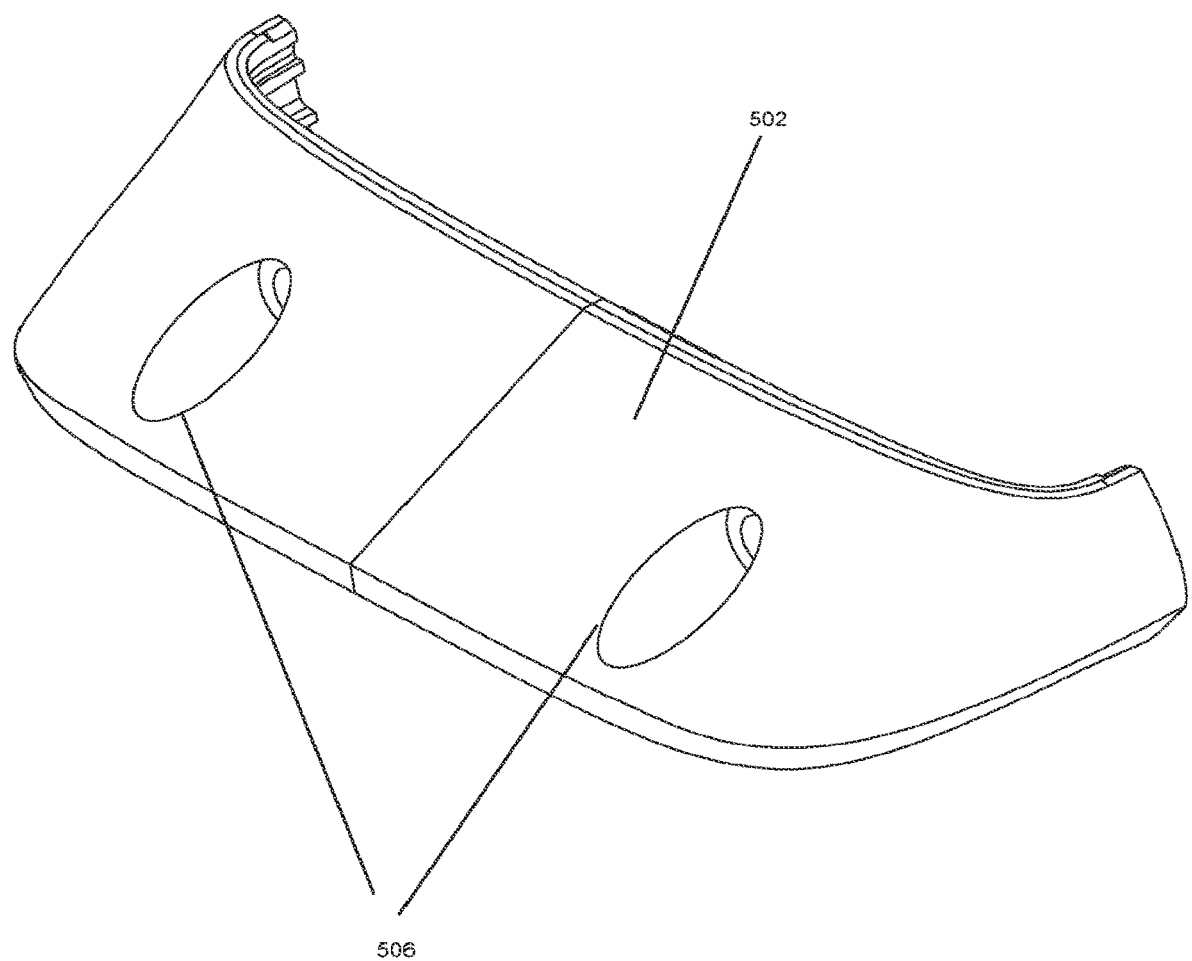

The mounting interface 404 is similar to the mounting interface 106. The mounting interface 404 can cantileveredly extend from the arm 402. The mounting interface 404 includes a plate 406, a plate 408, a latch 410, an area 412, an area 414, an area 416, and a container 418. The plate 406 is similar to the plate 136 and encloses the plate 408. The plate 406 tapers in shape, narrowing in width, towards the arm 402. The plate 406 extends over or is secured to the container 418. The container 418 is similar to the container 134, although the container 418 can be omitted, just like the container 134. The area 414 partitions the plate 408 into the area 412 and the area 416. The area 414 is similar to the region 194. The area 416 is similar to the area 198. The area 412 is similar to the area 416 and hosts the latch 410, which is similar to the latch 150. As such, the area 416 can resiliently or elastically bend or flex similar to the area 196. Therefore, the accessory 200 can be mounted onto the mounting interface 404 similarly how the accessory 200 is mounted onto the mounting interface 104. Likewise, the accessory 200 can be unmounted from the mounting interface 404 similarly how the accessory 200 is unmounted from the mounting interface 104. As such, the mounting interface 404 can disengage the accessory 200 such that the latch 410 disengages the detent 226, the platform 156 disengages the platform complement, and the ramp 154 progressively disengages the ramp complement based on the plate 406 rectilinearly and guidably sliding off the accessory 200 over the detent 226. Note that the plate 408 can be secured to the container 418 with a pair of bolts (or screws), as shown in FIG. 42, a single bolt (or screw), as shown in FIG. 49, or no bolts (or screws), as shown in FIG. 56 (e.g., mating, interlocking, adhering).

Figure 67:
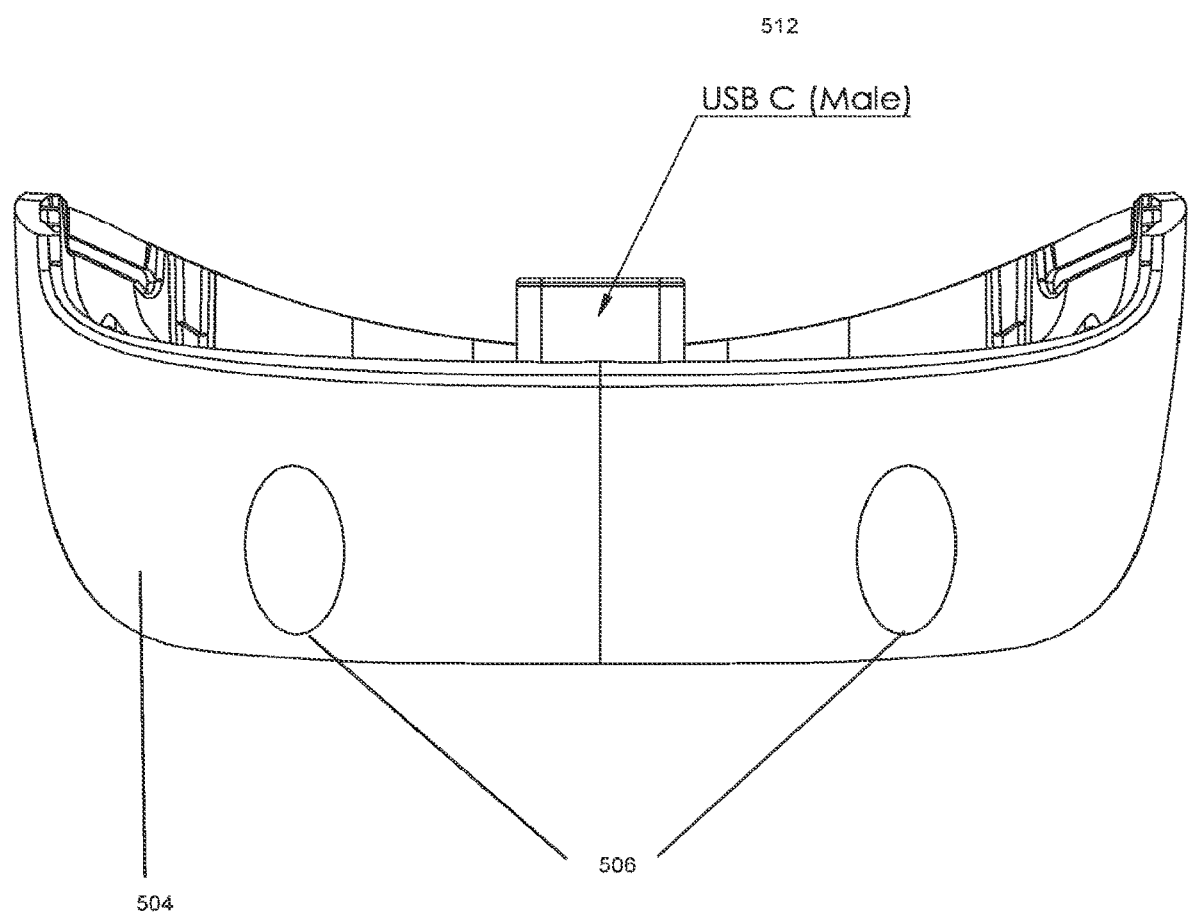
Figure 68:
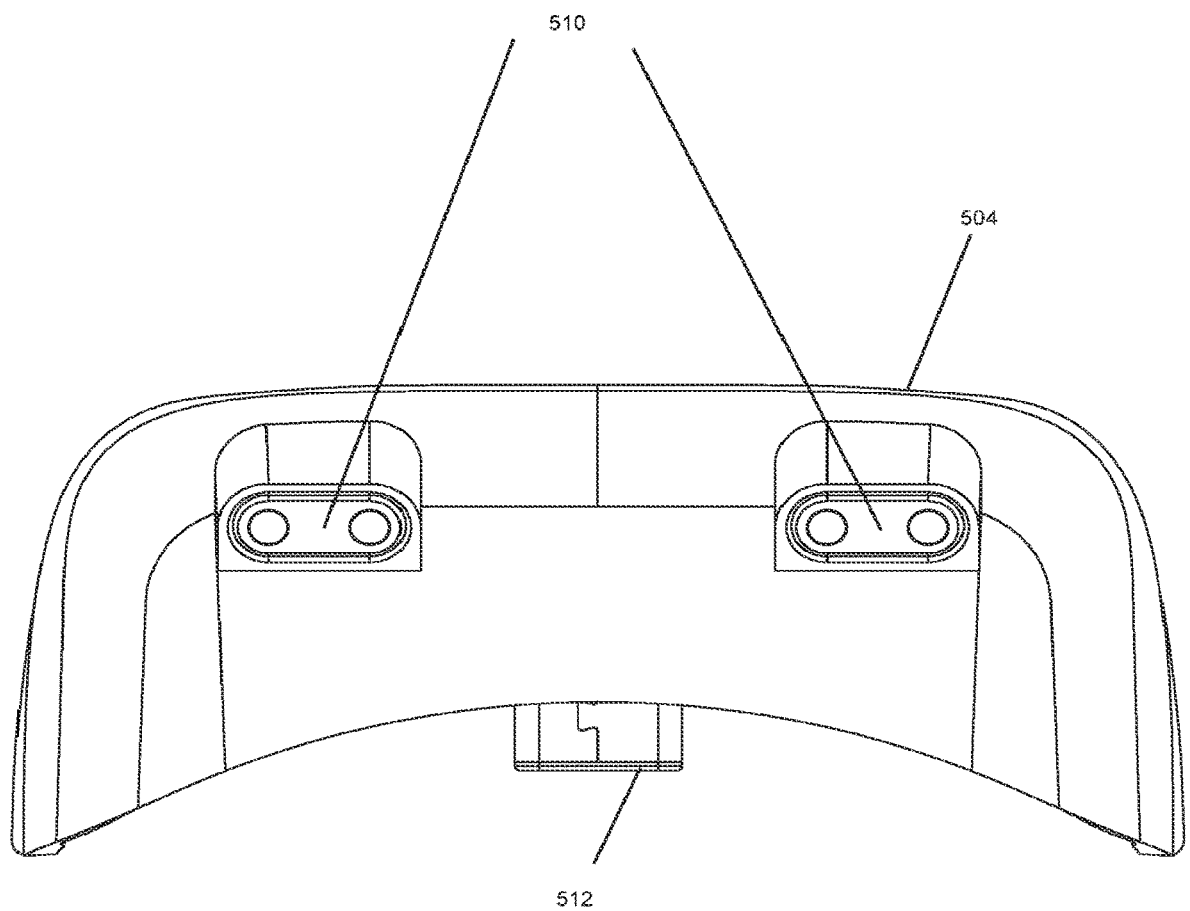
Figure 69:
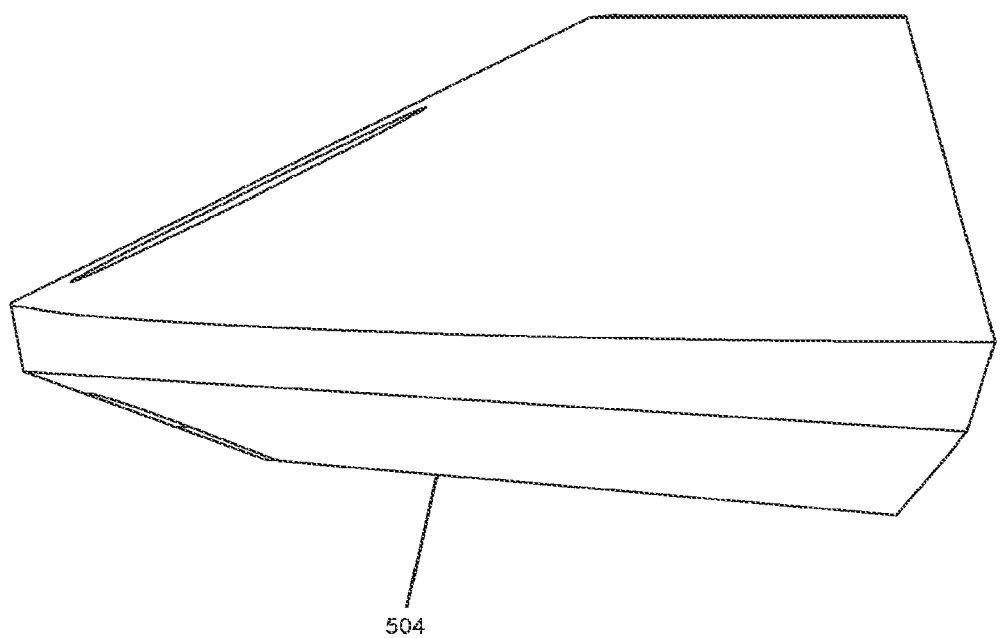
Figure 70:
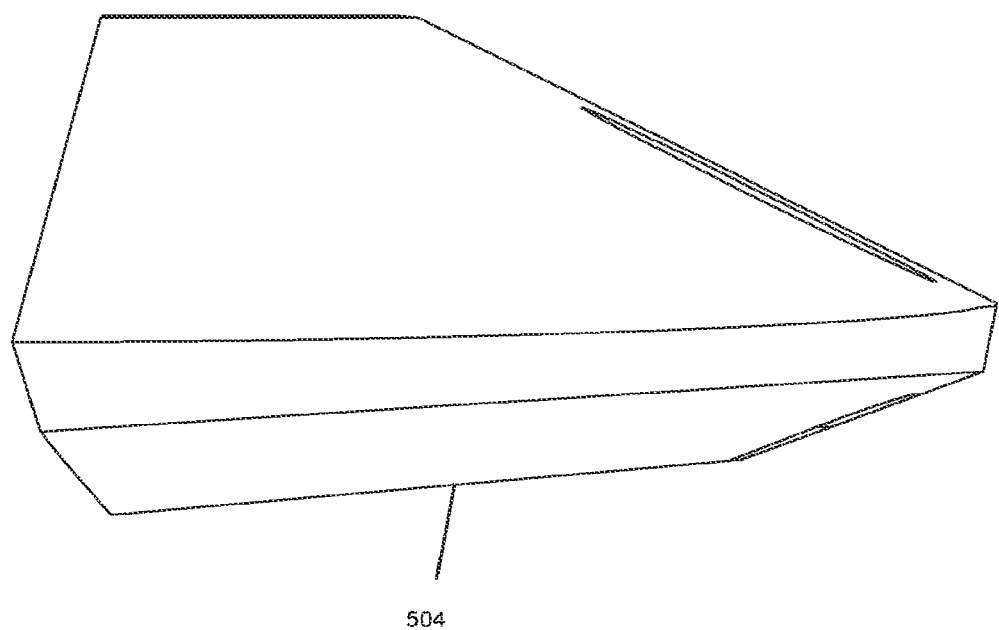
Figure 71:
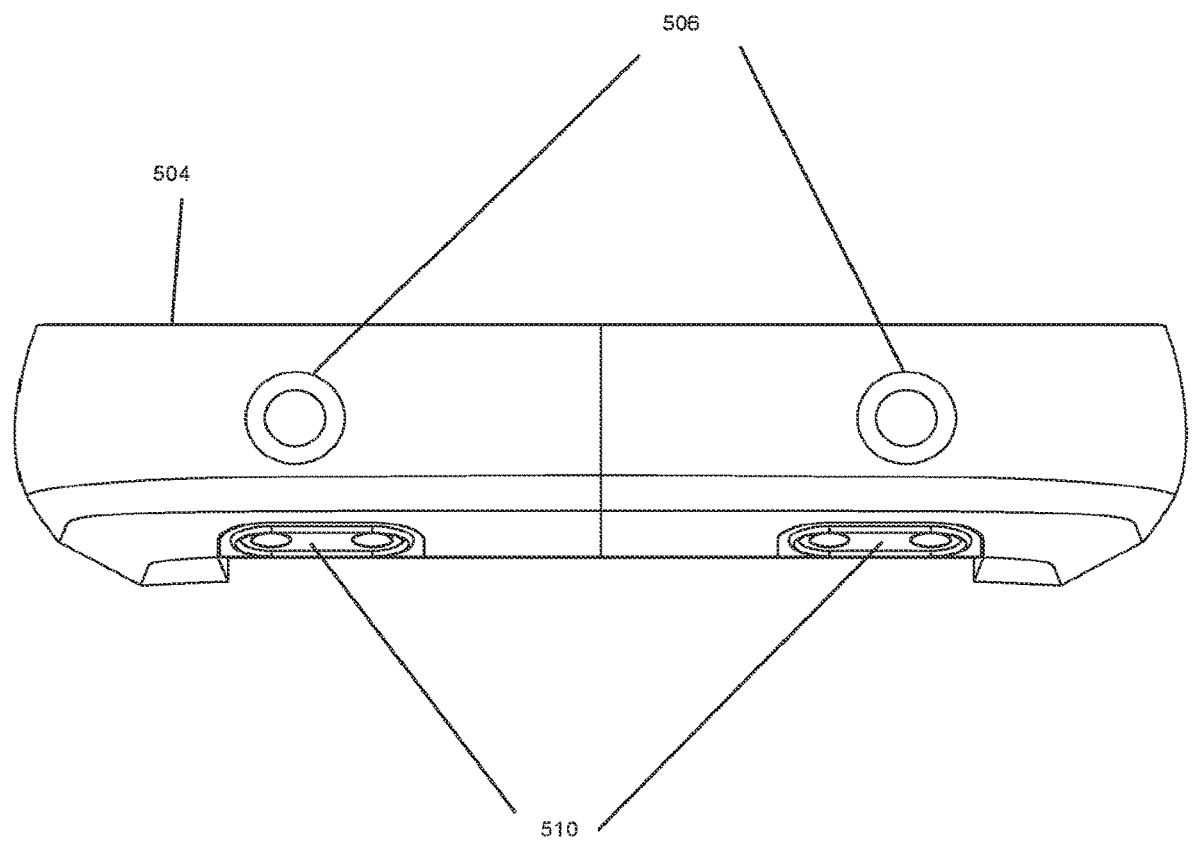
Figure 72:
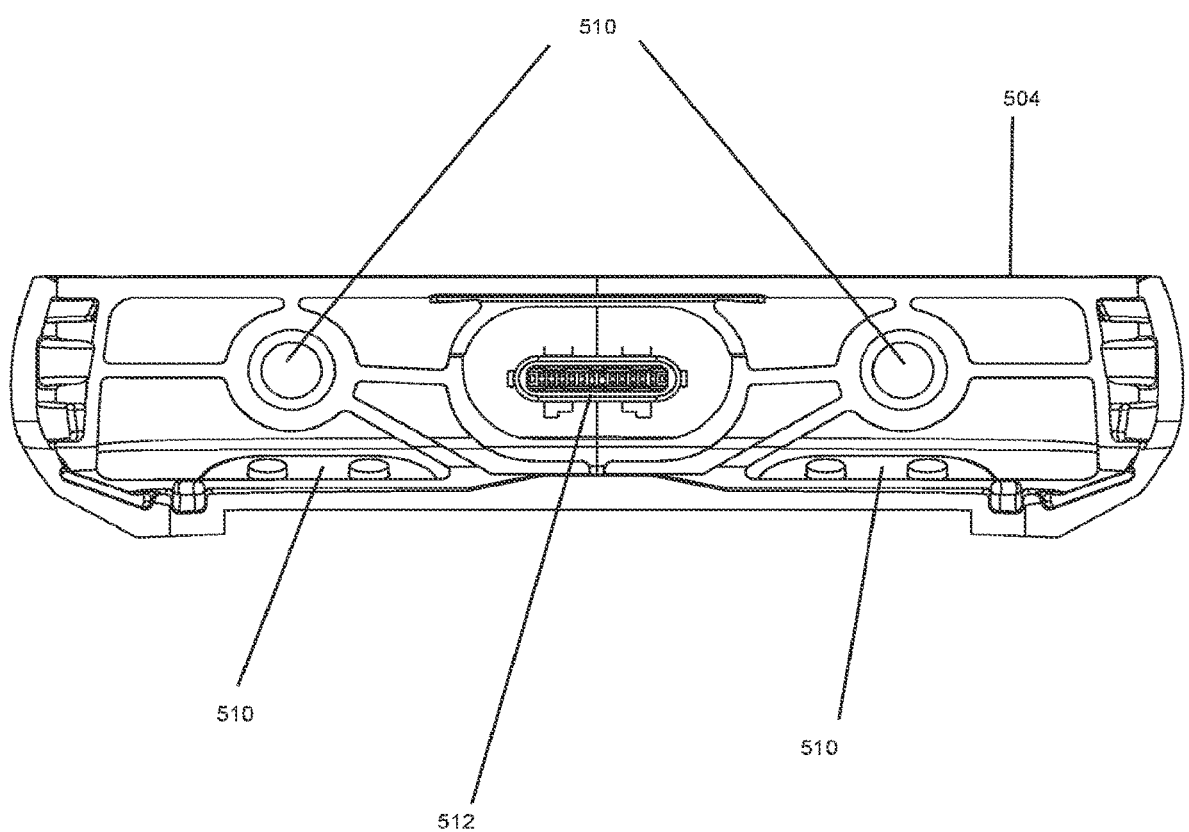
Figure 74:
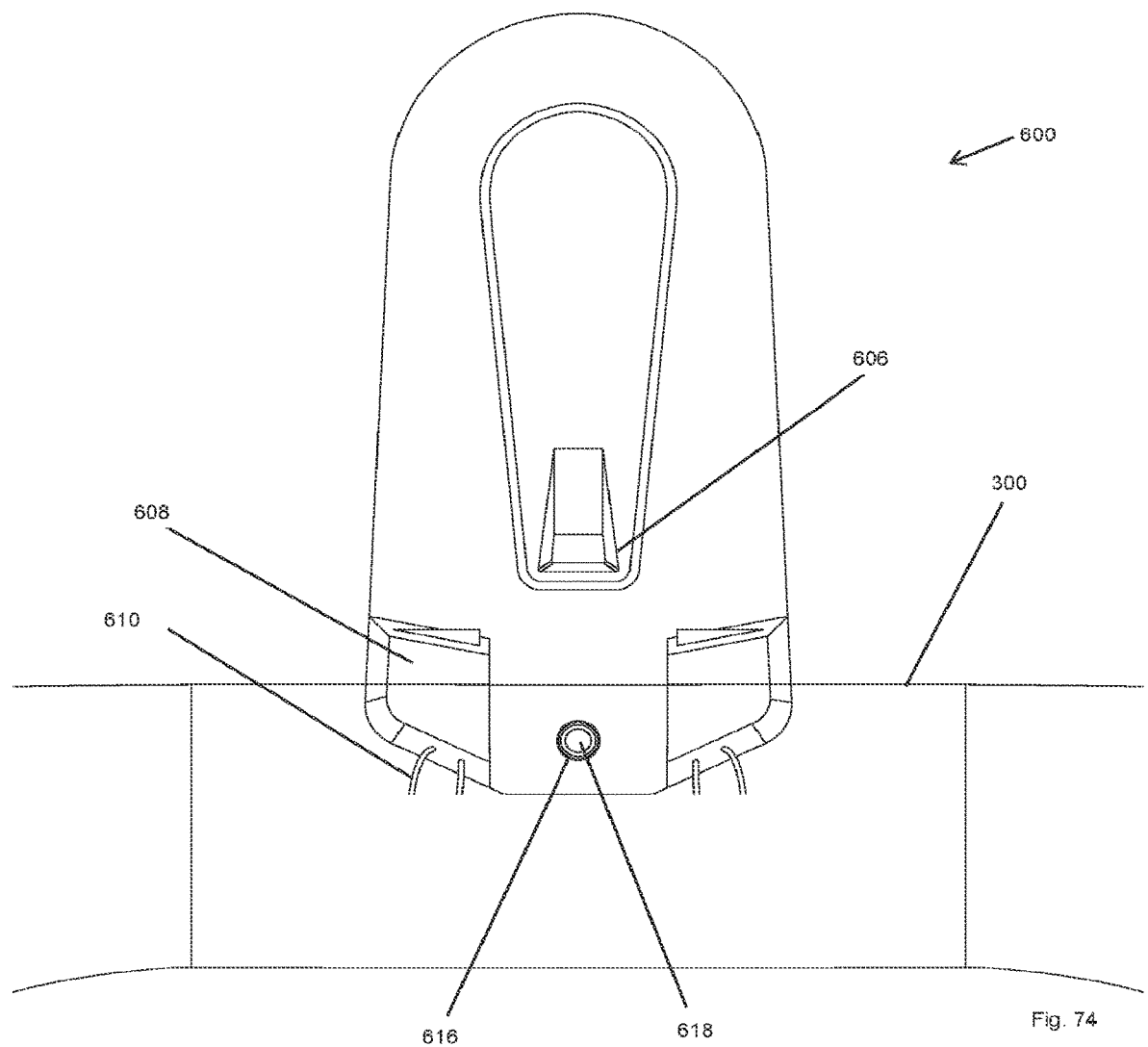
Figure 75:
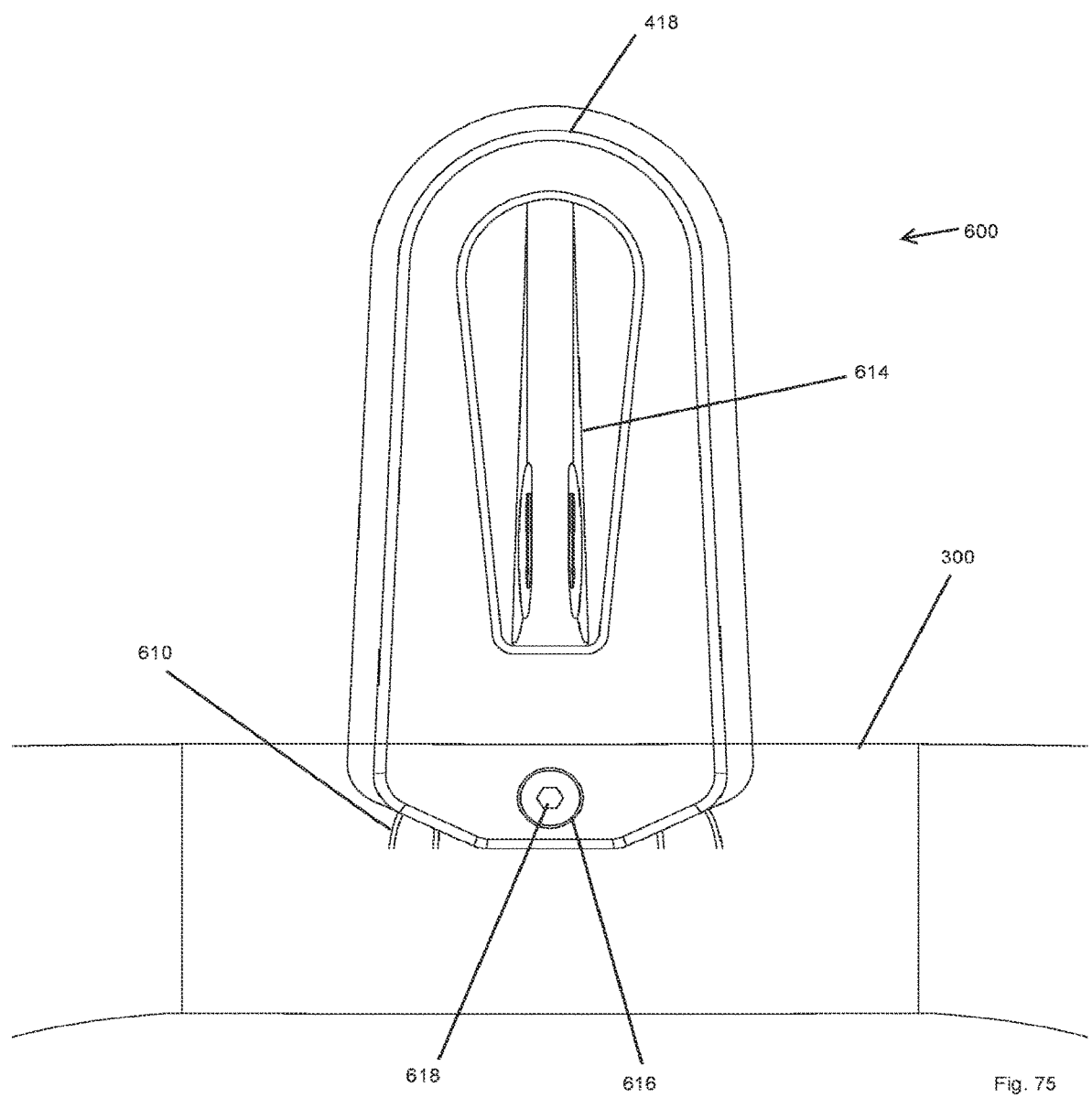
Figure 76:
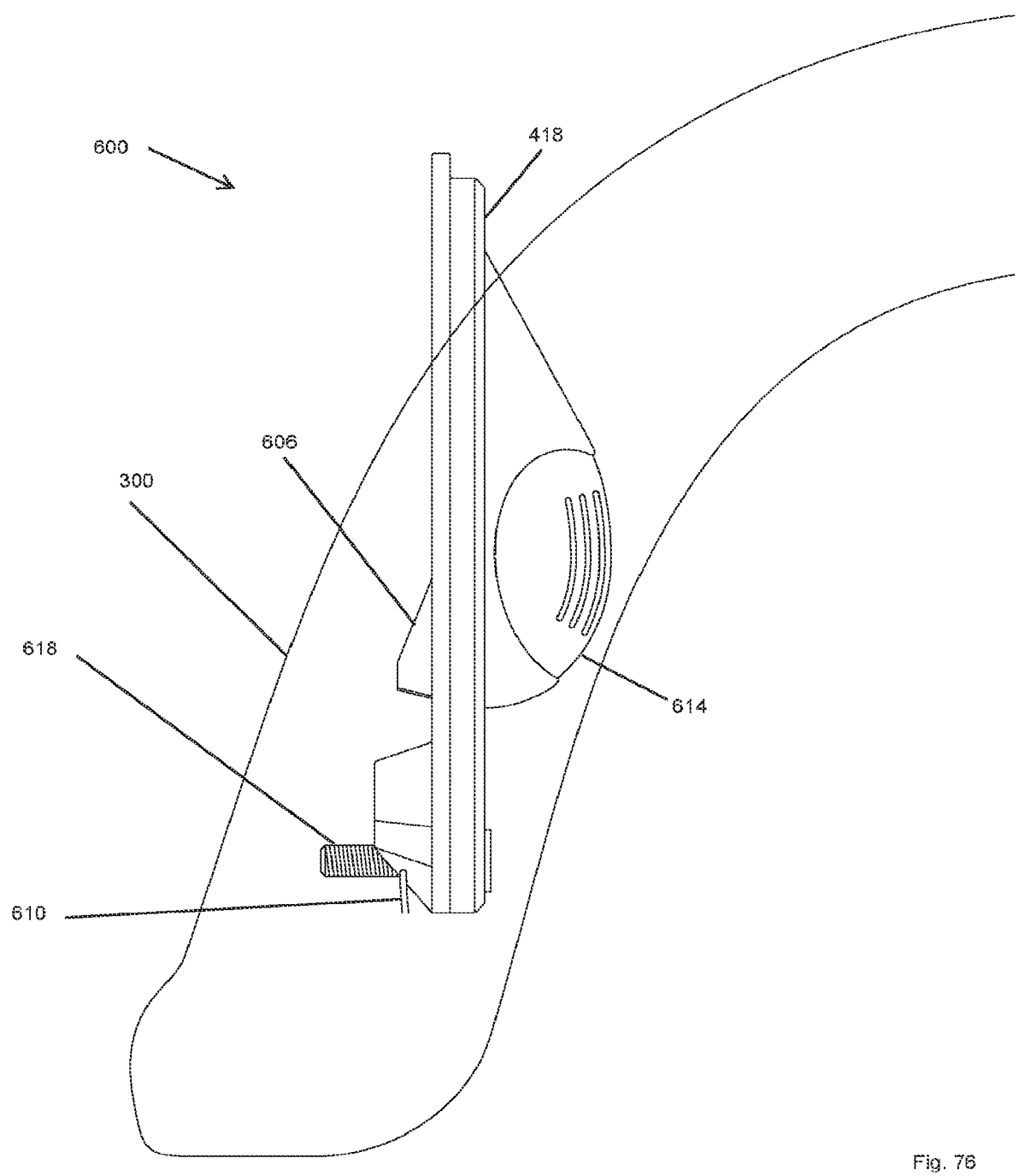
Figure 77:
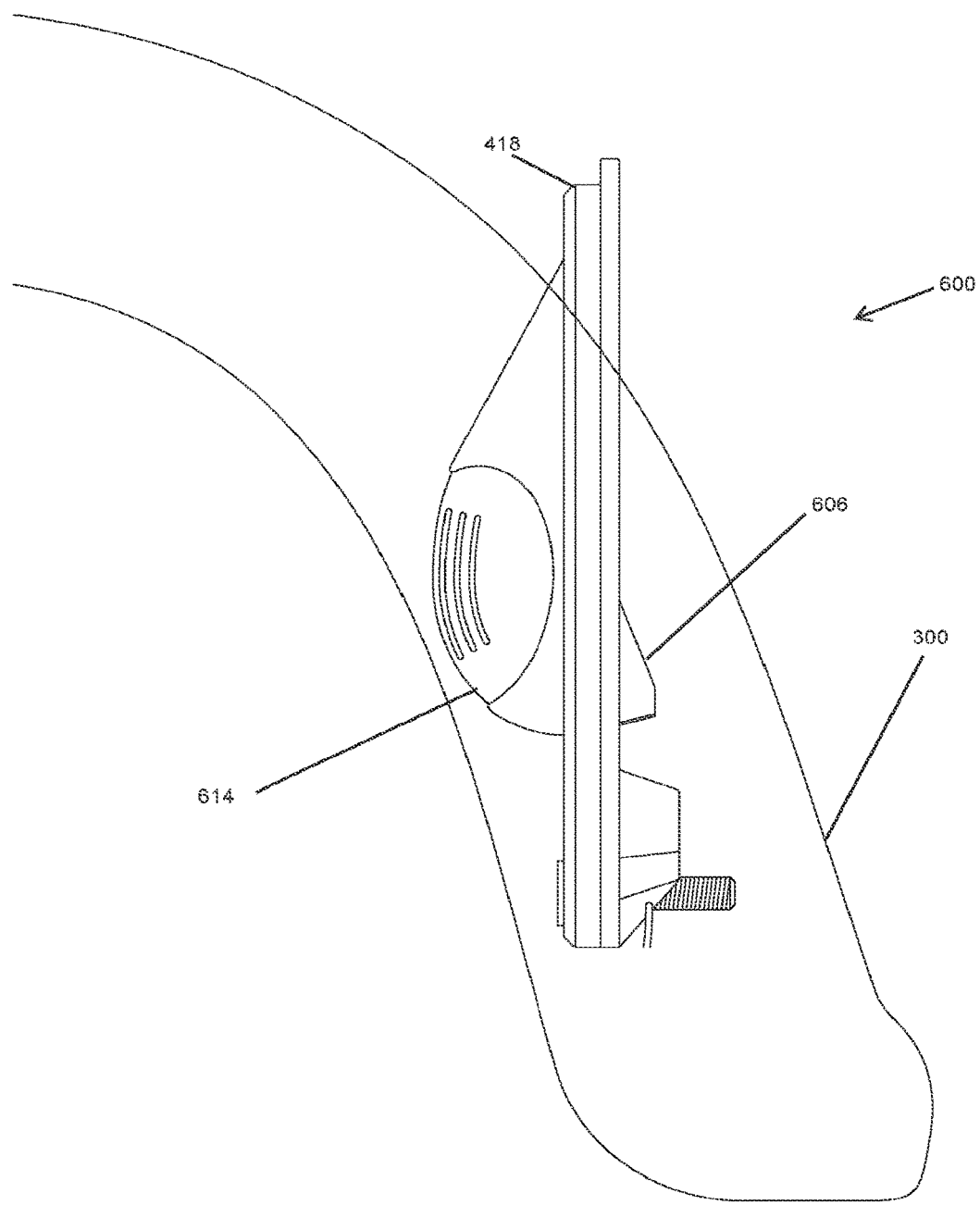
Figure 78:
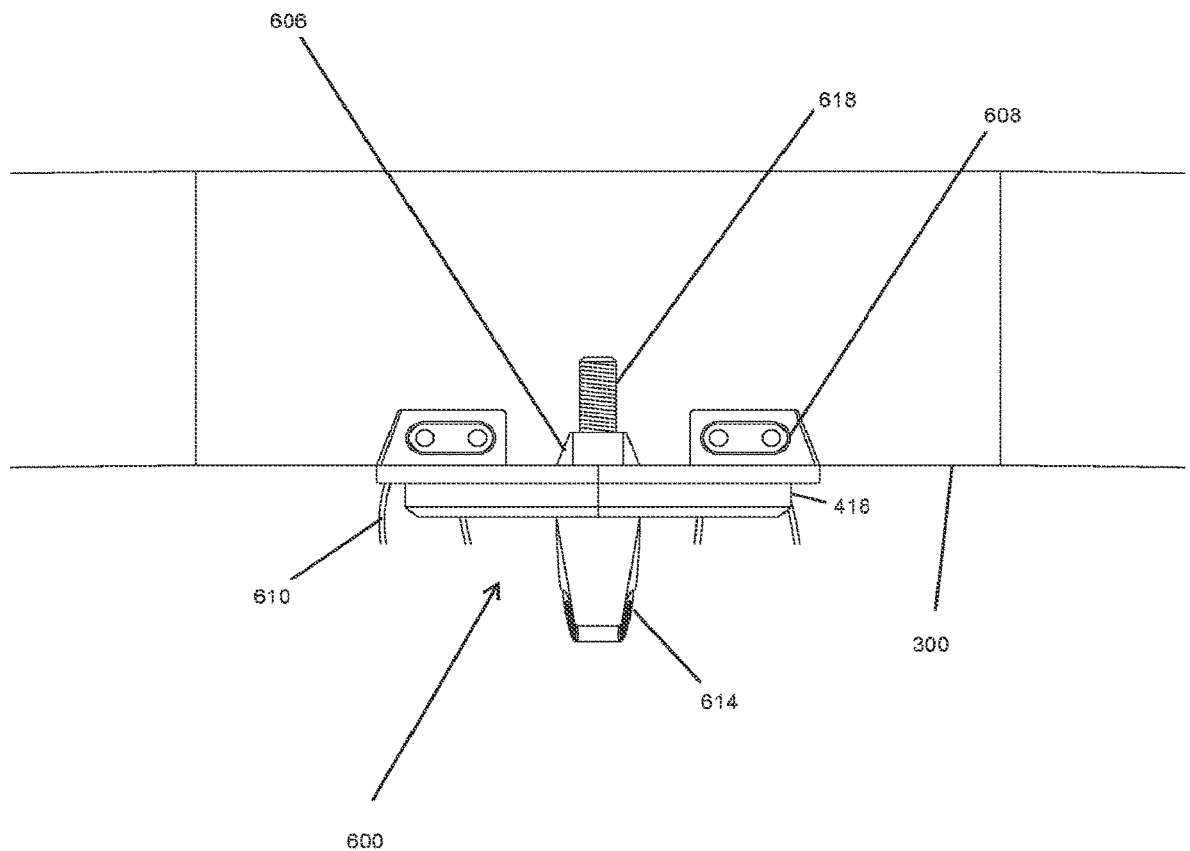
Figure 79:
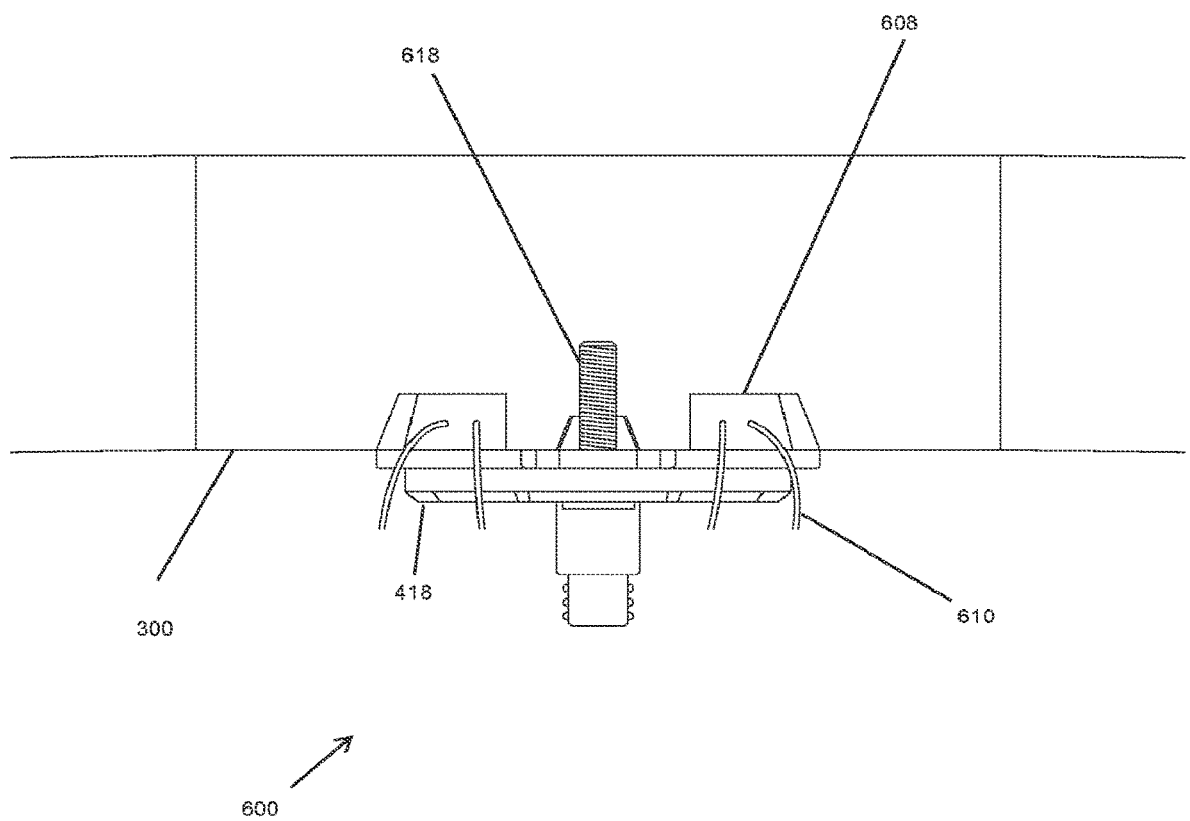
Figure 80:
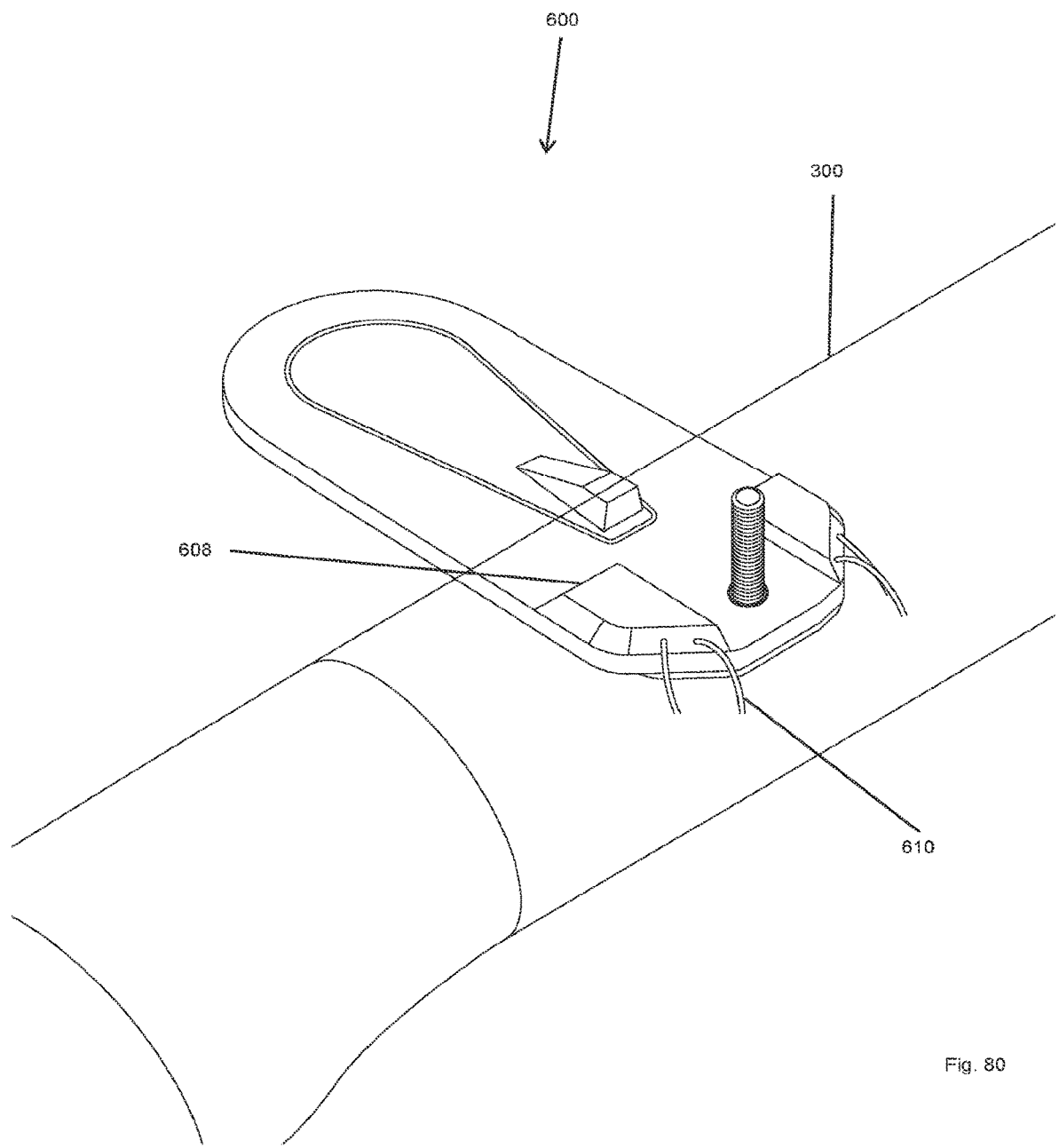
Figure 81:
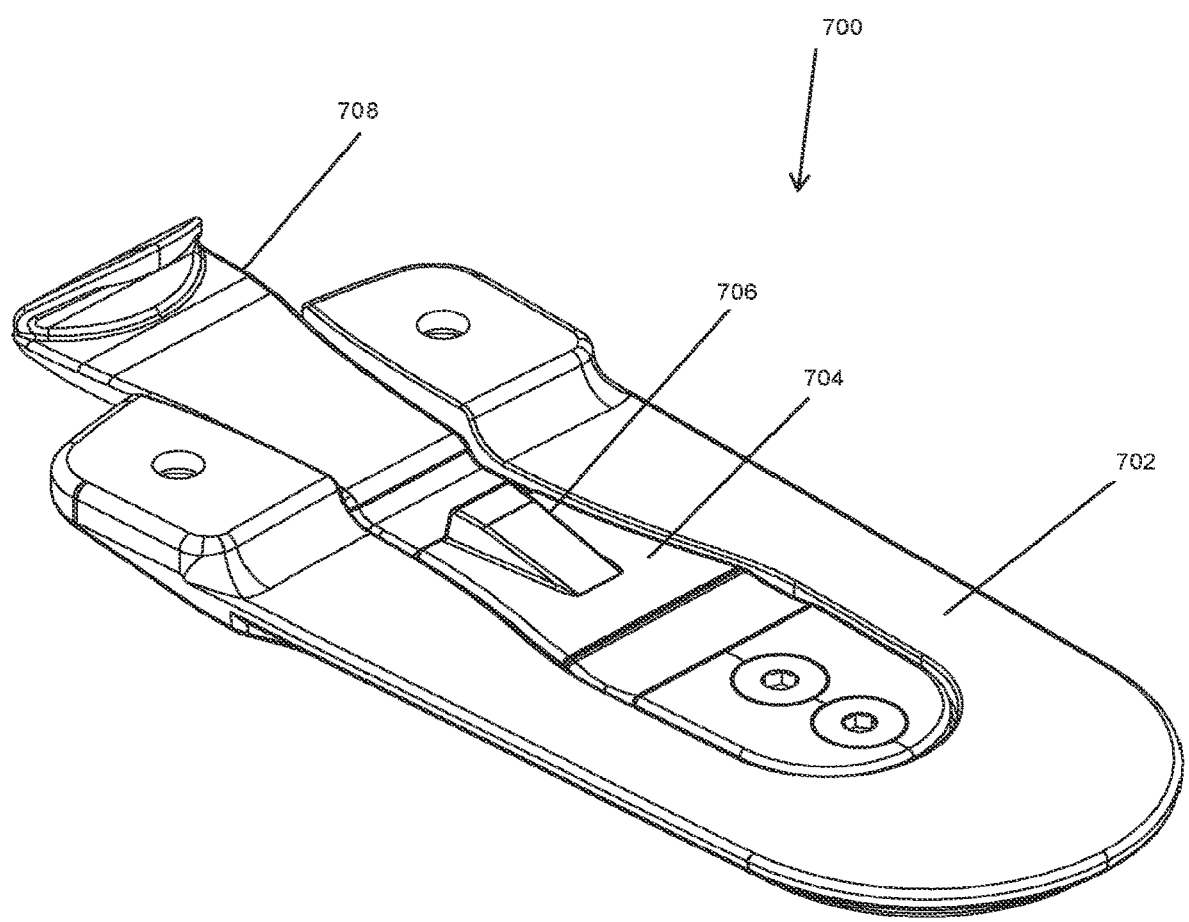
FIGS. 81-91 show a set of views of an embodiment of a bracket of FIGS. 42-62 where the bracket has a latched end portion for engaging with a handlebar of a vehicle according to this disclosure.
Figure 82:
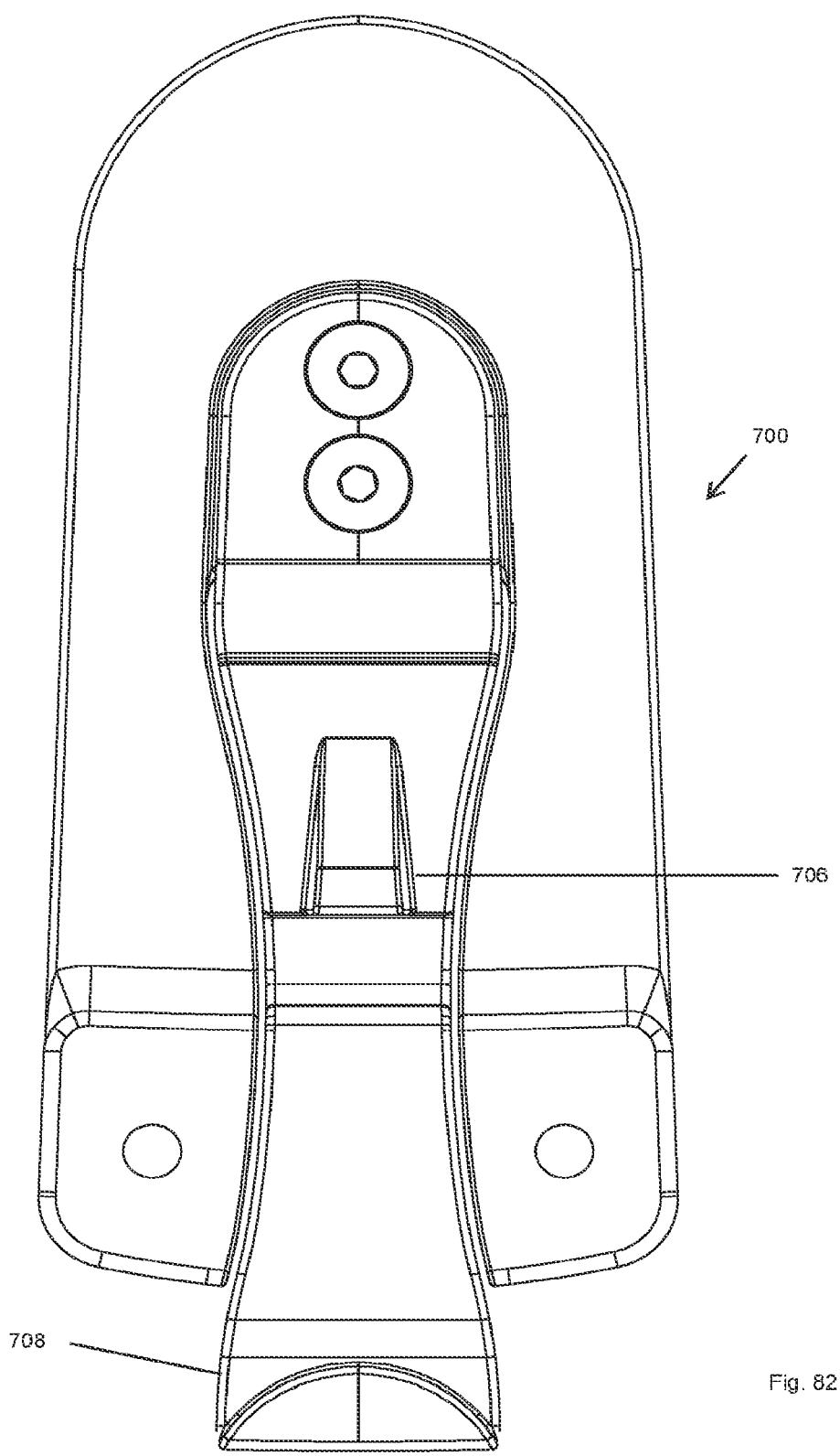
Figure 83:
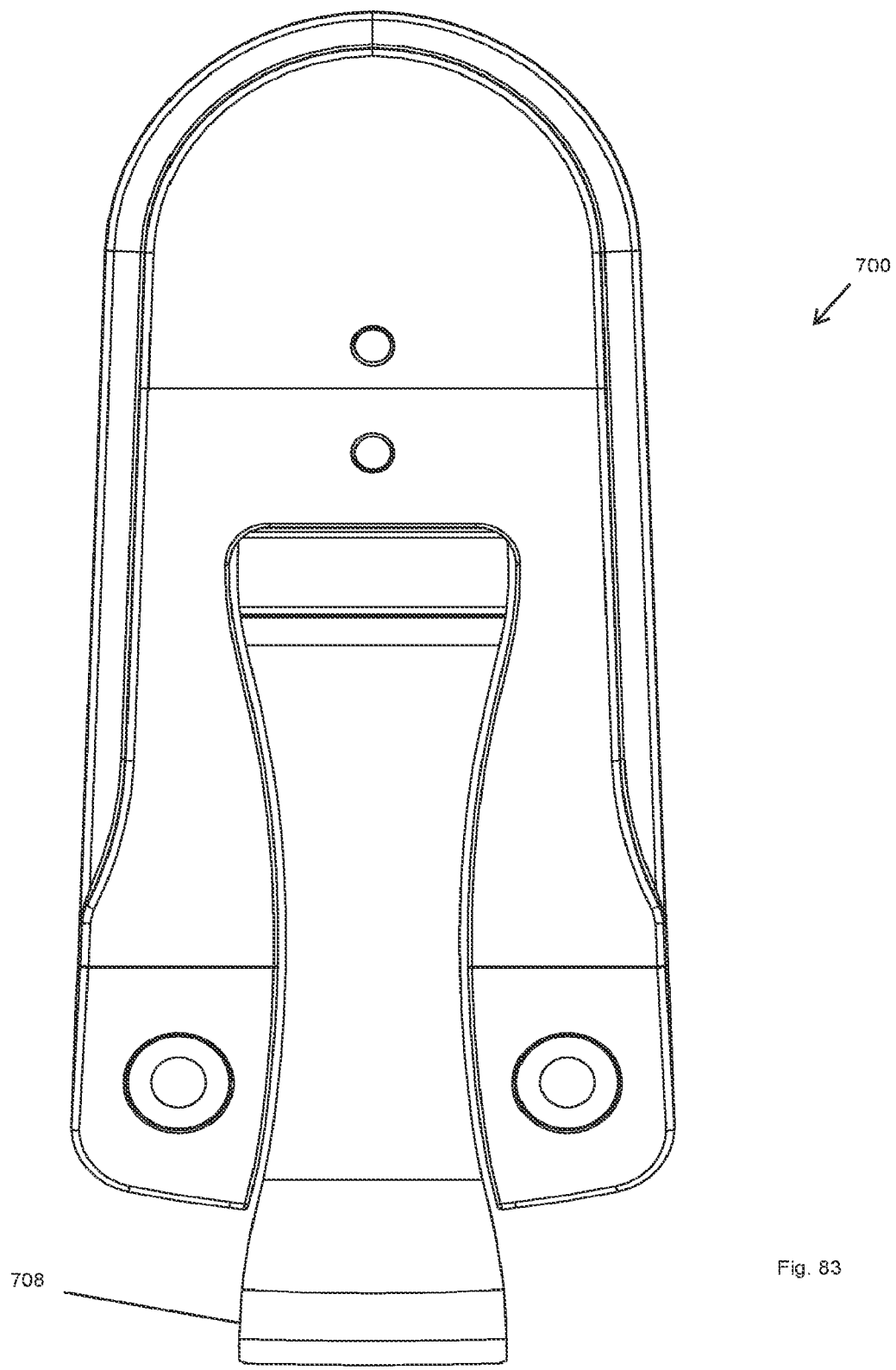
Figure 84:
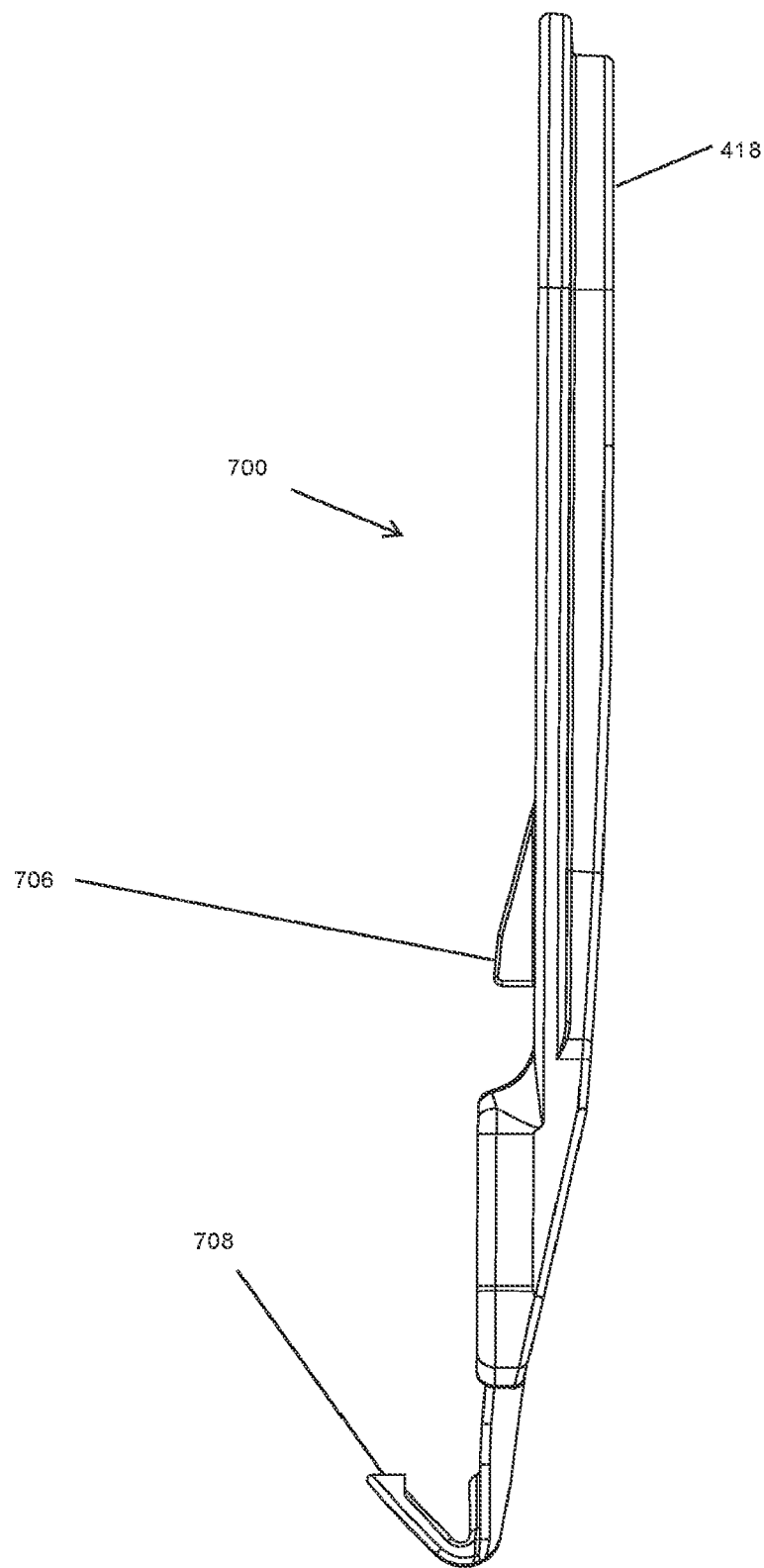
Figure 85:
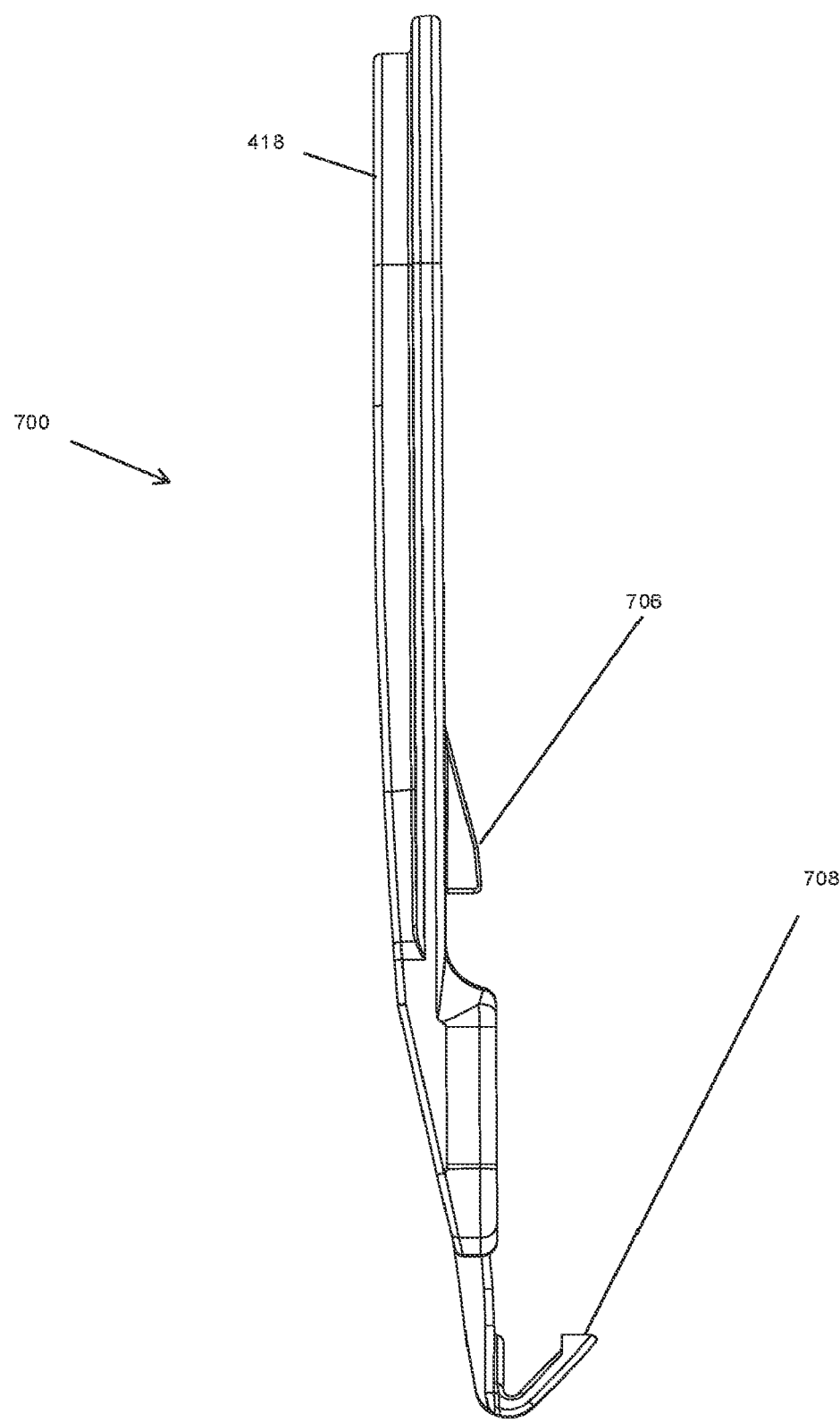
Figure 86:
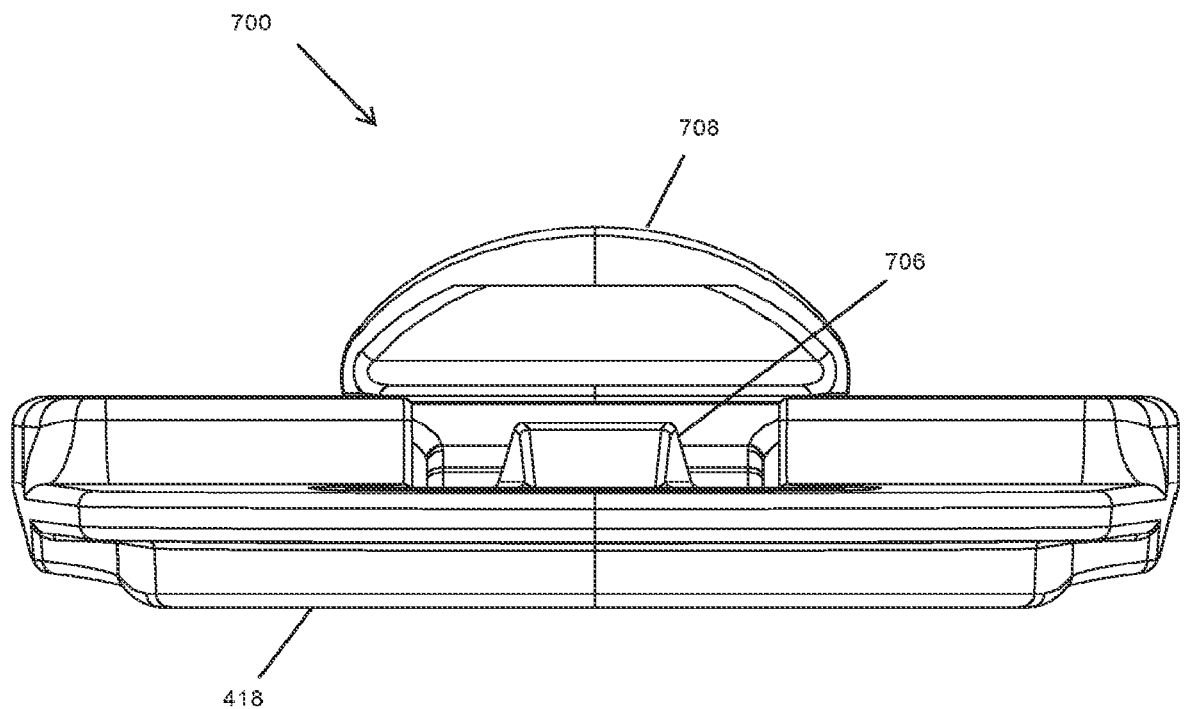
Figure 87:
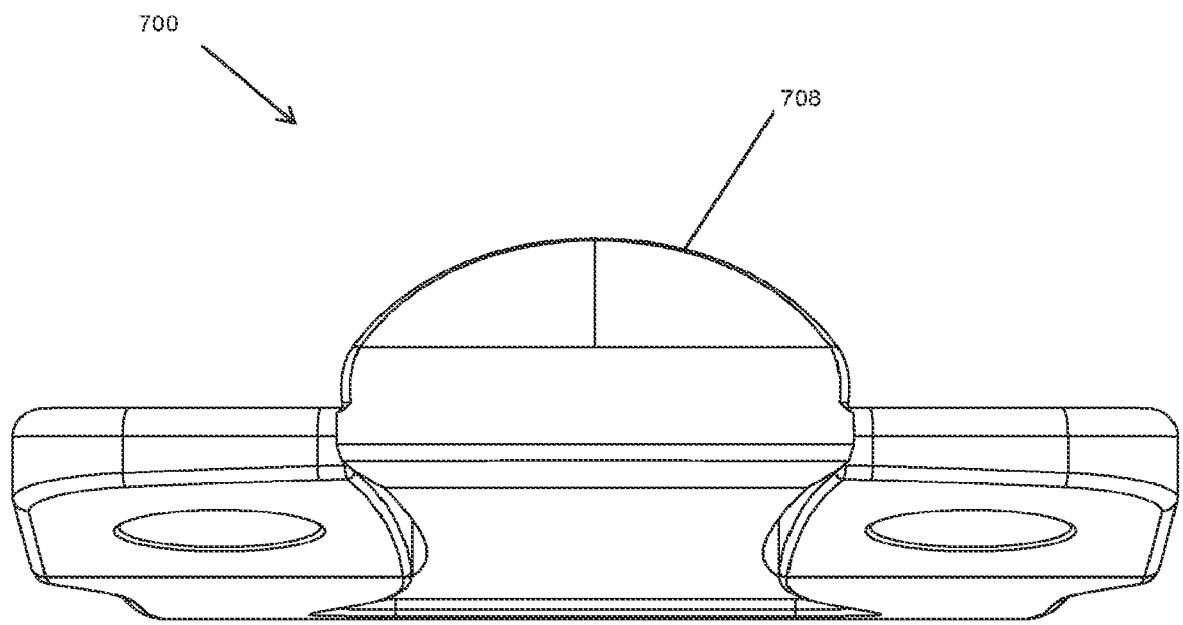

FIGS. 63-80 show a set of views of an embodiment of an accessory and a bracket, where the accessory includes a set of ports configured for power and data transfer to or from a vehicle (e.g., a battery or data source of a mobile bicycle, a motorcycle, a jet-ski, an e-bike), and the bracket is configured to enable such power and data transfer to or from a vehicle (e.g., a battery or a data source of a mobile bicycle, a motorcycle, a jet-ski, an e-bike) according to this disclosure. FIG. 121 shows a set of views of an embodiment of an accessory and a bracket, where the accessory includes a set of ports configured for power and data transfer, and the bracket is configured to enable such power and data transfer according to this disclosure. In particular, an accessory 500 is similar to the accessory 200. The accessory 500 includes a housing 502 having a bottom side 504 with a set of openings 506 and a back side 508 with a set of electrical connectors 510 configured for power and data transfer to or from a vehicle (e.g., a battery or a data source of a mobile bicycle, a motorcycle, a jet-ski, an e-bike). For example, there can be power transfer only, data transfer only, or power and data transfer. The bottom side 504 is beveled, but can be chamfered or neither. The set of openings 506 is configured to receive a set of bolts (or screws) for fastening the bottom side 504 to the housing 502. As shown in FIGS. 67-68, the bottom side 502 is removable from the accessory 500, thereby converting the accessory 500 into the accessory 200 of FIGS. 10-17. The bottom side 502 includes a male portion 512 having a port configuration (e.g., USB, USB-C, Lightening) configured for insertion into the port 218 (e.g., a central docking port as shown in FIG. 18) for enabling power or data transfer to or from the accessory 500 from or to a vehicle (e.g., a battery or a data source of a mobile bicycle, a motorcycle, a jet-ski, an e-bike). For example, there can be power transfer only, data transfer only, or power and data transfer.

The accessory 500 is configured to mount onto or unmount from a mounting interface 600, which can be similar to the mounting interface 104 or the mounting interface 404, as described above. The mounting interface 600 includes a plate 602, a plate 604, the container 418, a latch 606, a set of electrical connectors 608, a set of wires 610, a mechanical connector 612, and a user input element 614 (e.g., a lever, a button, a slider, a knob). The plate 602 is similar to the plate 406, the plate 604 is similar to the plate 408, and the latch 606 is similar to the latch 410. The plate 602 encloses the plate 604 and extends over the container 418. The plate 602 can be secured (e.g., fastened, mated, interlocked, adhered) to the container 418. The plate 602 extends over the container 418 and can be secured (e.g., fastened, mated, interlocked, adhered) to the container 418. The set of electrical connectors 608 is configured to engage or connect with the set of electrical connectors 510 when the platform 156 engages the platform complement based on the plate 602 rectilinearly and guidably sliding into the accessory 200 over the detent 226. This may enable power or data transfer to or from the accessory 500 via the mounting interface 600 from or to a vehicle (e.g., a battery or a data source of a mobile bicycle, a motorcycle, a jet-ski, an e-bike). For example, there can be power transfer only, data transfer only, or power and data transfer.

The plate 604 has an area (e.g., about ½ or about ⅓ or less of a surface area of the exterior surface 174 of the plate 604) hosting the latch 606, where the area is movable relative to rest of the plate 604 or the container 418. This movement can be elastically or resiliently flexible or bendable relative to rest of the plate or the container 418 such that the latch 606 moves accordingly, as described above. The user input element 614 is positioned such that the plate 604 extends between the latch 606 and the user input element 614. The area is movable based on a user input via the user input element 614 (e.g., when a user pulls on the user input element 614). For example, the user input element 614 can include a lever and the user input can include pushing the lever, pulling the lever, rotating the lever, squeezing the lever, pinching the lever, sliding the lever, or other forms of movement. For example, the latch 606 can retract into the plate 604 based on the plate 602 rectilinearly and guidably sliding into the accessory 200 over the detent 226. Note that reverse movement may happen when the lever is released or let go. Regardless, when the user input element 614 receives the user input, the area of the plate 604 hosting the latch 606 can move accordingly such that the latch 606 retracts into the plate 602 and vice versa. Likewise, when the user input element 614 is let go or reversibly moved, then the area of the plate 604 hosting the latch 606 can move accordingly such that the latch 606 retracts back from the plate 602. Resultantly, the mounting interface 600 includes a user interface configured to receive the user input and responsively move the latch 606 relative to the plate 602 or the plate 604 responsive to the user input in order to enable the mounting interface 600 to (a) engage the accessory 200 based on the plate 602 rectilinearly and guidably sliding into the accessory 200 over the detent 226 or (b) disengage the accessory 200 based on the detent 226 not extending over the latch 606.

The mounting interface 600 includes an opening 616 and a bolt 618 (or a screw). The mounting interface 600 is secured to the bar 300 via the bolt 618 fastenably extending through the opening 616 and the bar 300. Note that a nut may be used to fasten to the bolt 618. Likewise, note that the opening 616 and the bolt 618 may be omitted and the mounting interface 600 may secure to the bar 300 in other ways (e.g., adhering, mating, interlocking).

The set of wires 610 is configured for power or data transfer to or from the set of electrical connectors 608, as described above. For example, the set of wires 610 can receive power from a battery secured or hosted on a vehicle (e.g., a mobile bicycle, a jet ski, a motorcycle, an e-bike) or a stationary apparatus (e.g., a stationary bicycle, an exercise machine, a treadmill). For example, the set of wires 610 can enable power or data transfer between an apparatus or a vehicle (e.g., a bicycle, a motorcycle), through the mounting interface 600, and into the accessory 200. Further, the set of wires 610 can enable power or data transfer between the mounting interface 600 and the accessory 200 or a secondary device coupled (e.g., mechanically, electrically) or secured (e.g., magnetized, fastened, adhered, interlocked) to the mounting interface 600 or the accessory 200. For example, there can be power transfer only, data transfer only, or power and data transfer. As such, if the accessory 500 is rectilinearly and guidably slid onto the plate 602 towards the latch 606 such that the latch 606 progressively engages a detent, similarly to the detent 226, then the set of electrical connectors 510 correspondingly engages or connects with the set of electrical connectors 608 to enable the accessory 500 to send or receive data or power through the set of wires 610. This may occur while the mechanical connector 612, which may be a universal mechanical connector for a bar or a frame, is secured to another surface (e.g., via fastening therethrough with a bolt or a screw). For example, the bar or the frame can include the bar 300. Note that the mechanical connector 612 includes the opening 616 and the bolt 618, but can omit those as well. Likewise, the mechanical connector 612 may be omitted and the interface 600 may secure to the bar or the frame in other ways (e.g., adhering, interlocking, mating). Note that the pair of electrical connectors 608 and the pair of ports 510 can be omitted and there can be a single electrical connector 608 and a single port 510.

Figure 88:
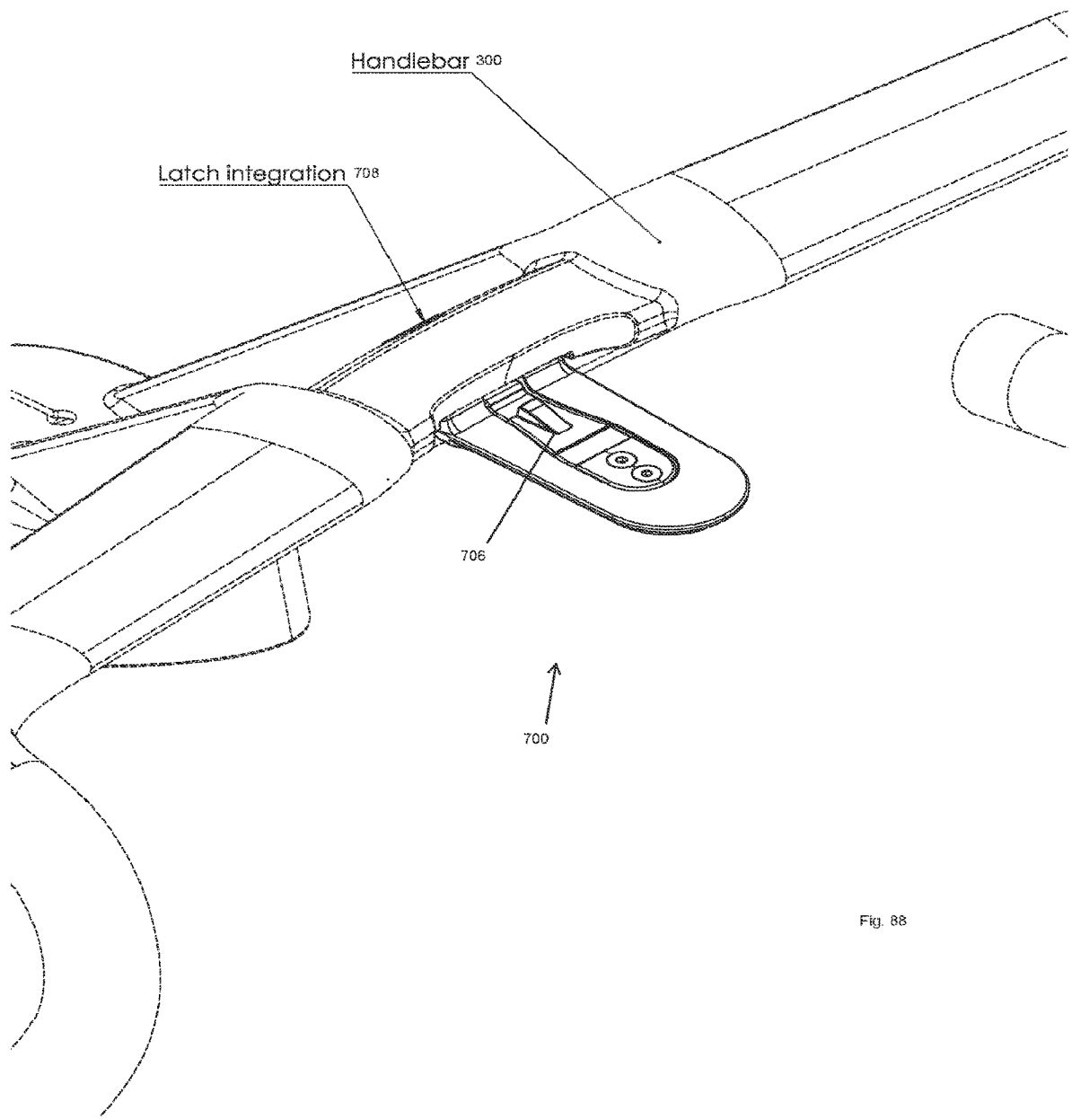
Figure 89:
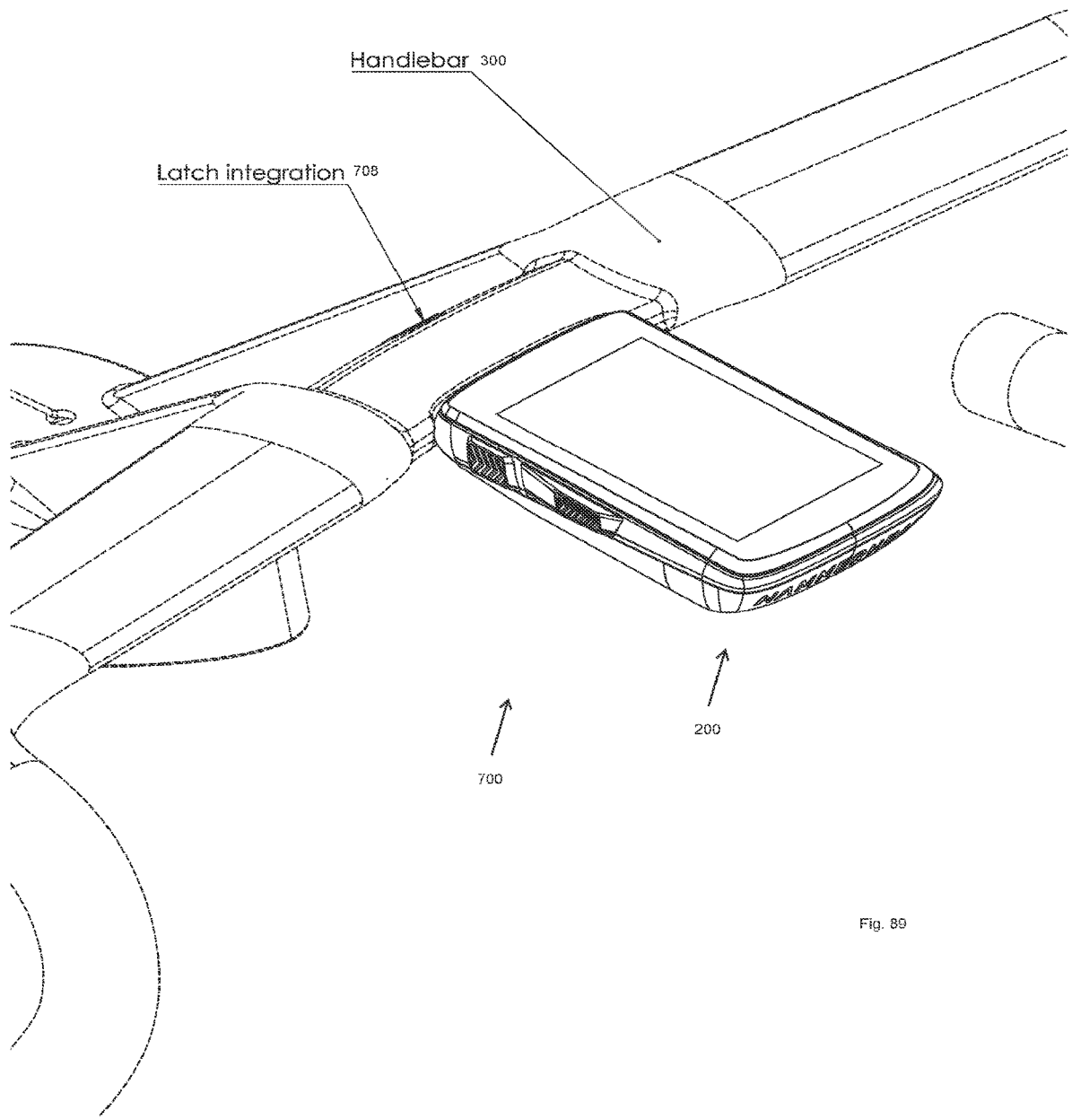
Figure 90:
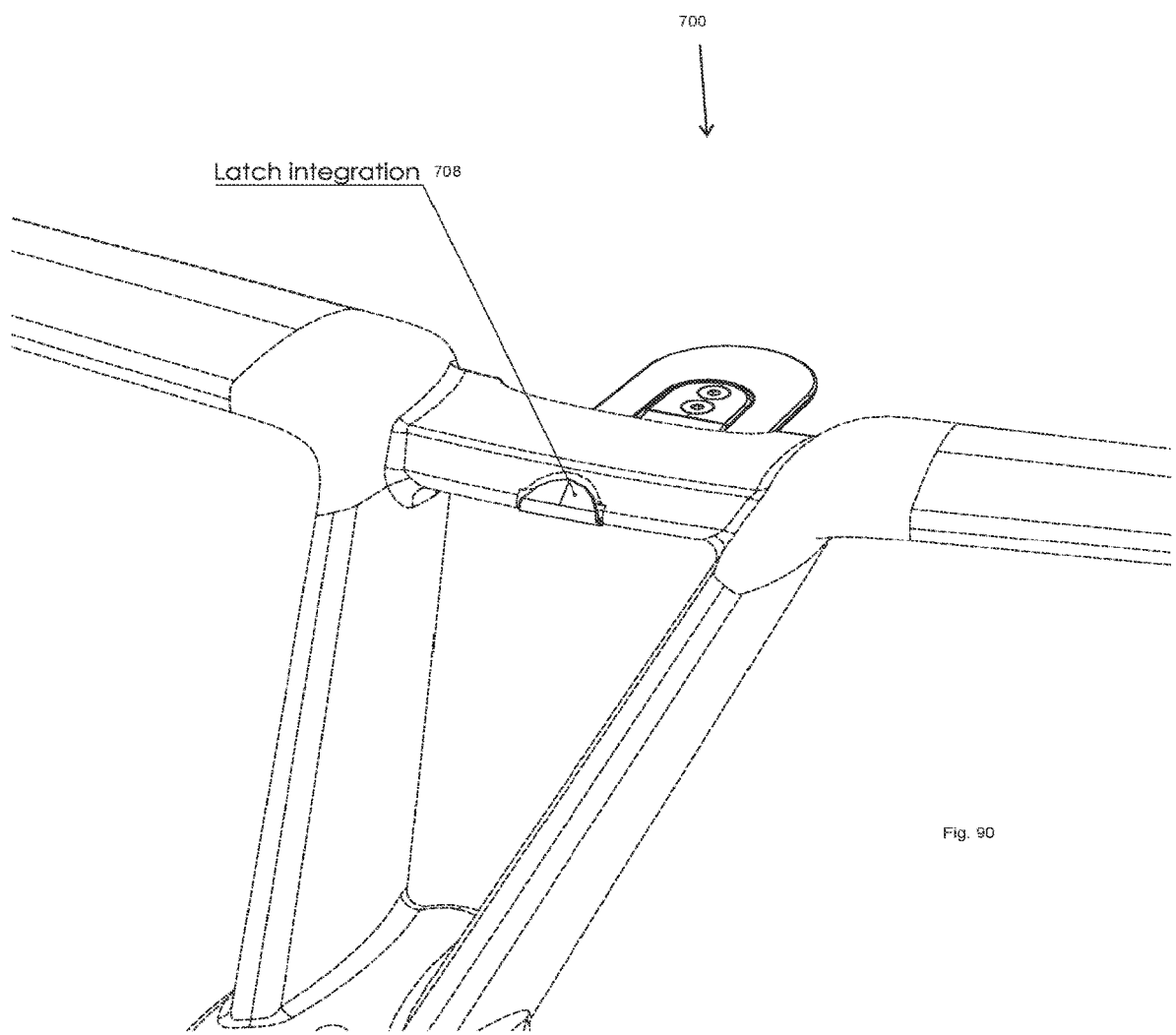
Figure 91:
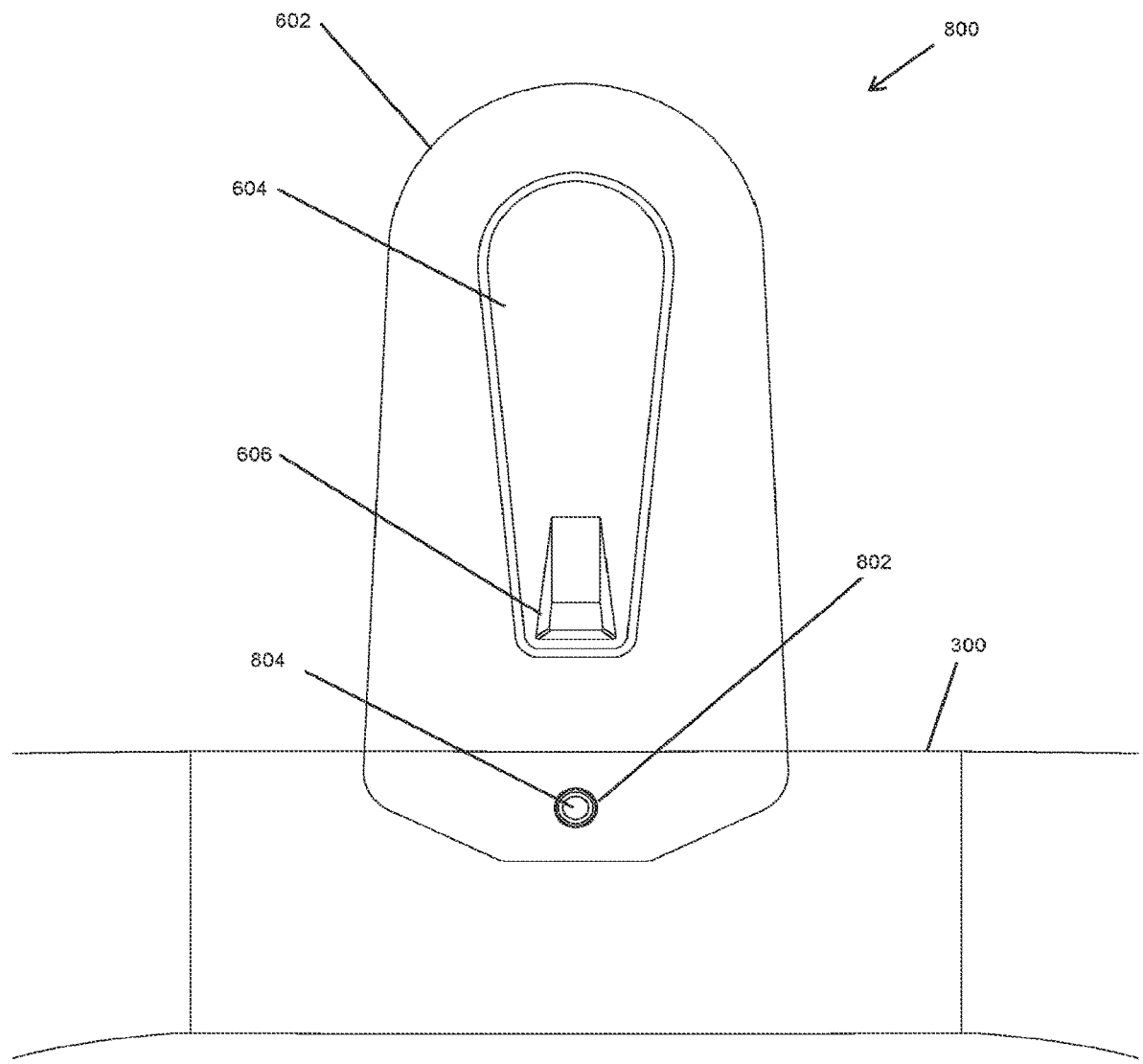
Figure 92:
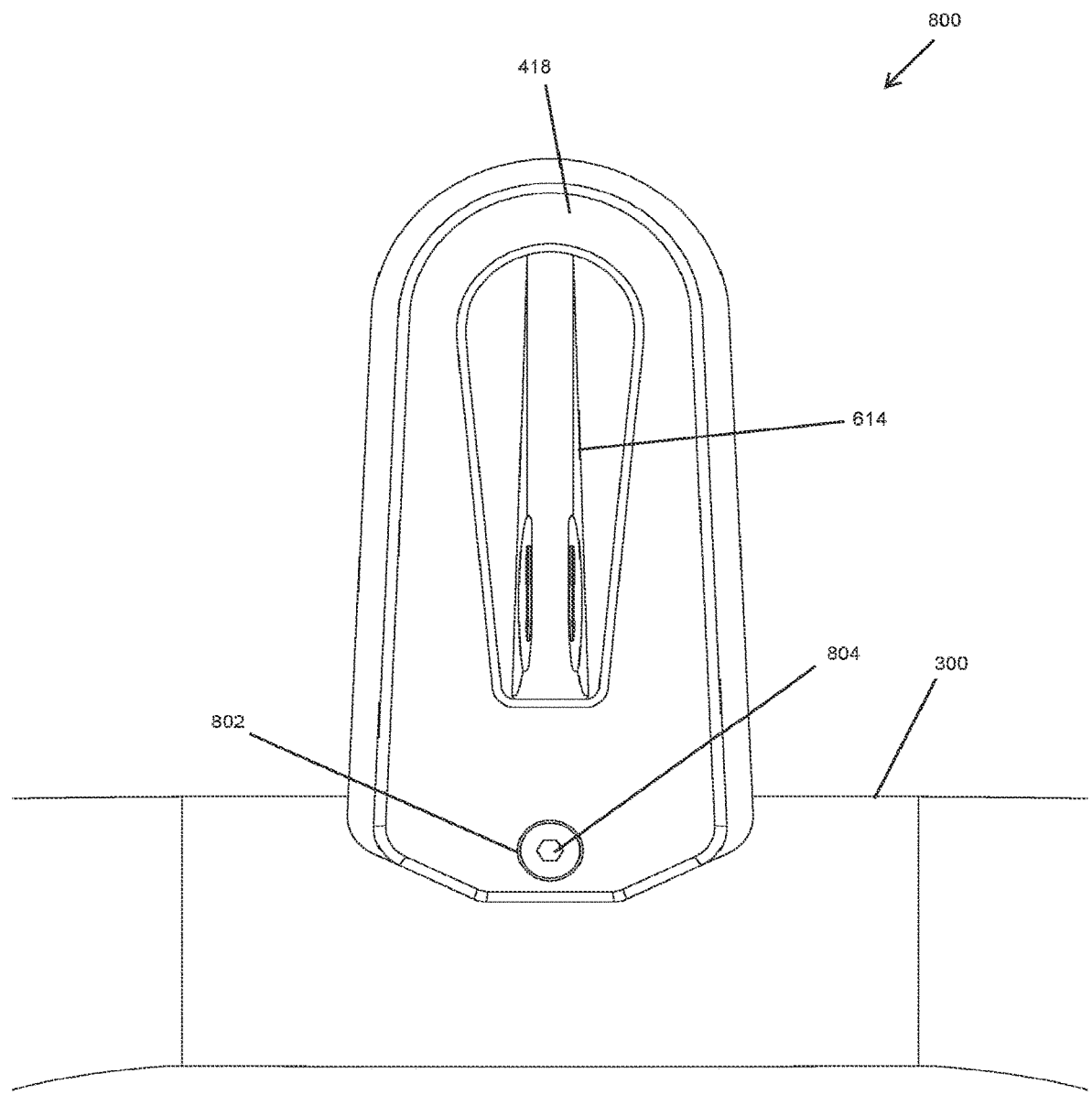
Figure 93:
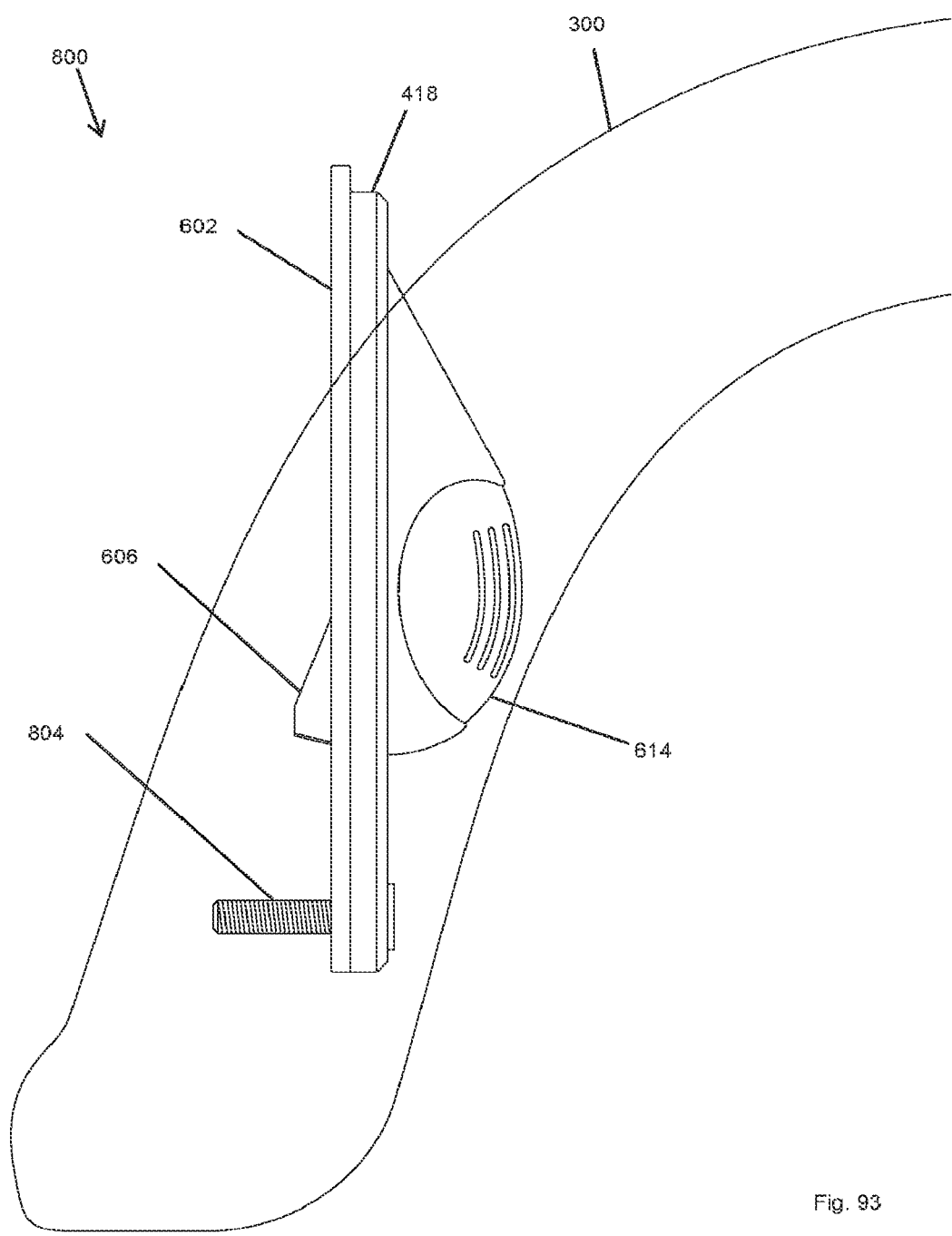
Figure 94:
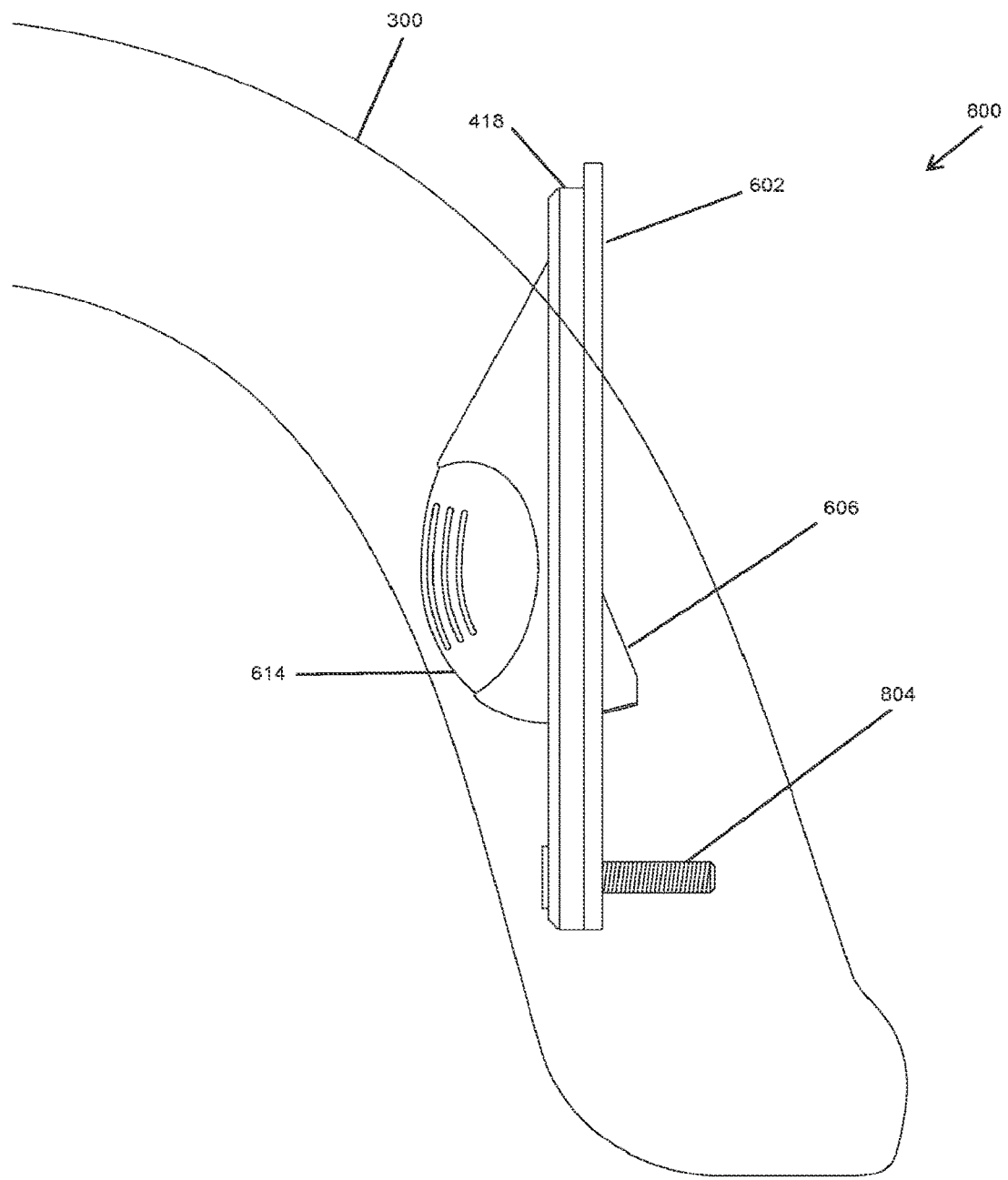
Figure 95:
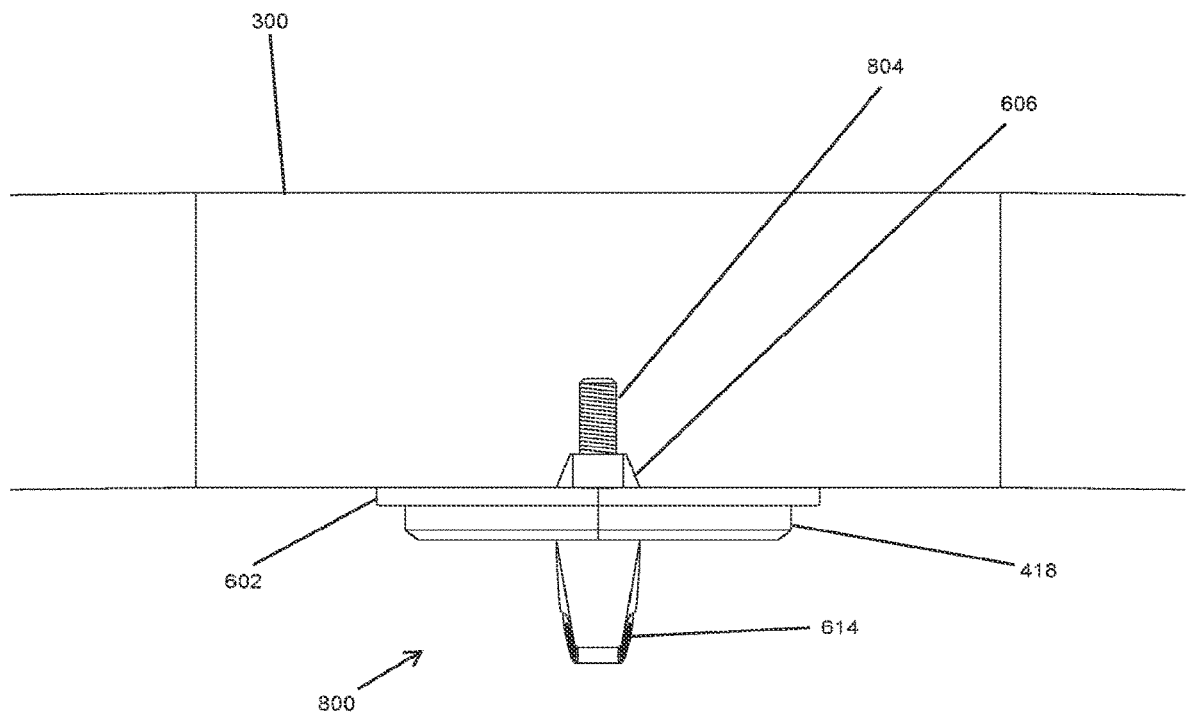
Figure 96:
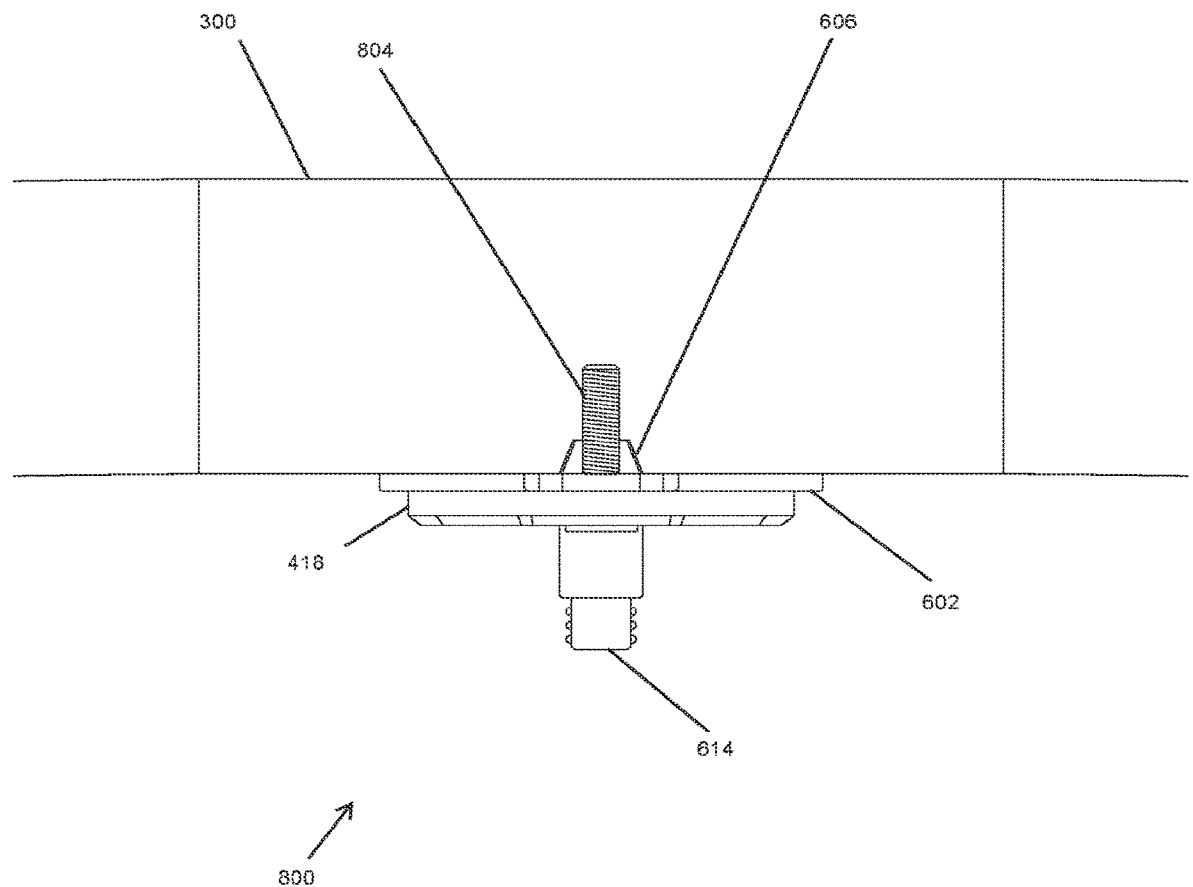
Figure 97:
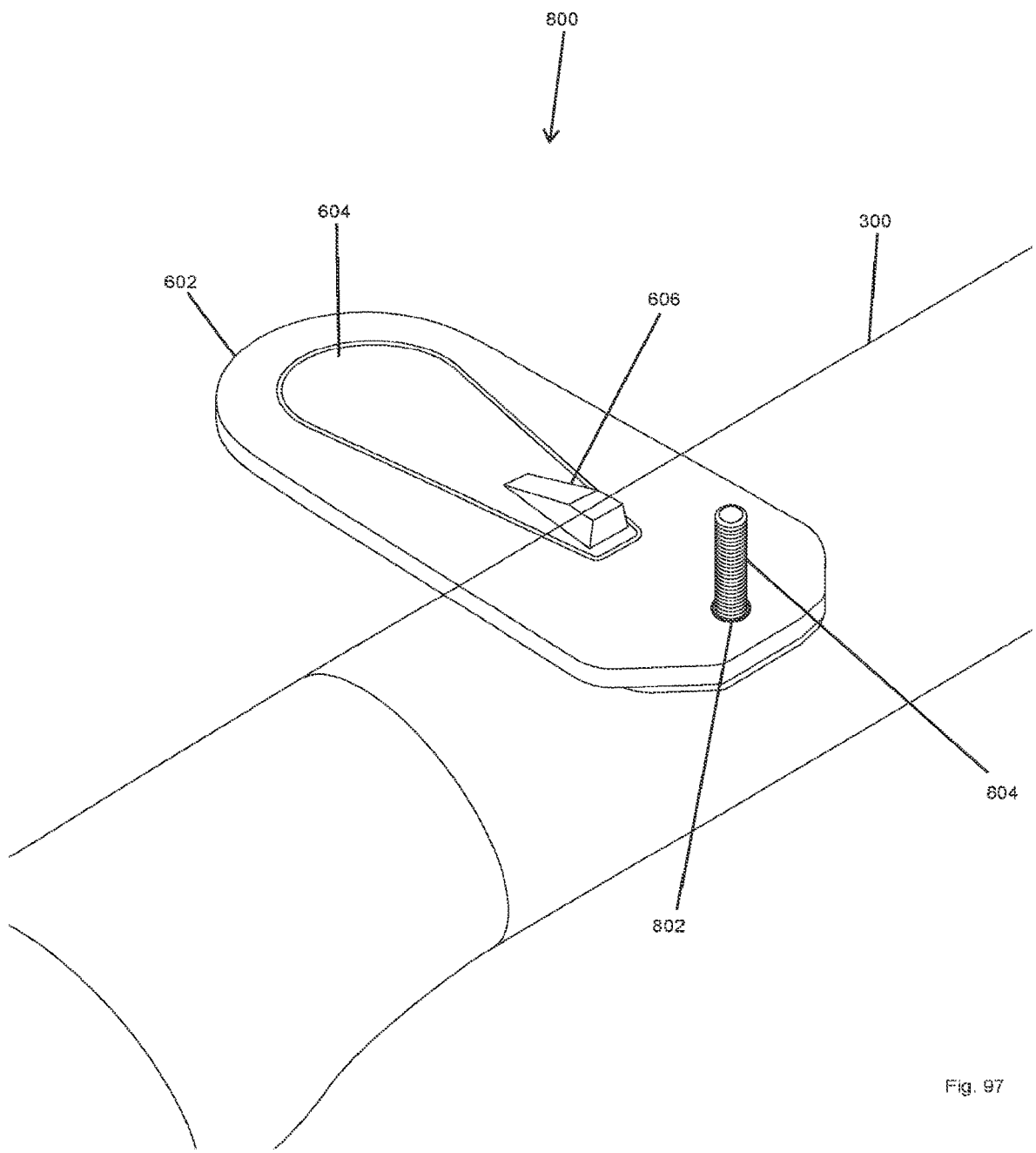
Figure 98:
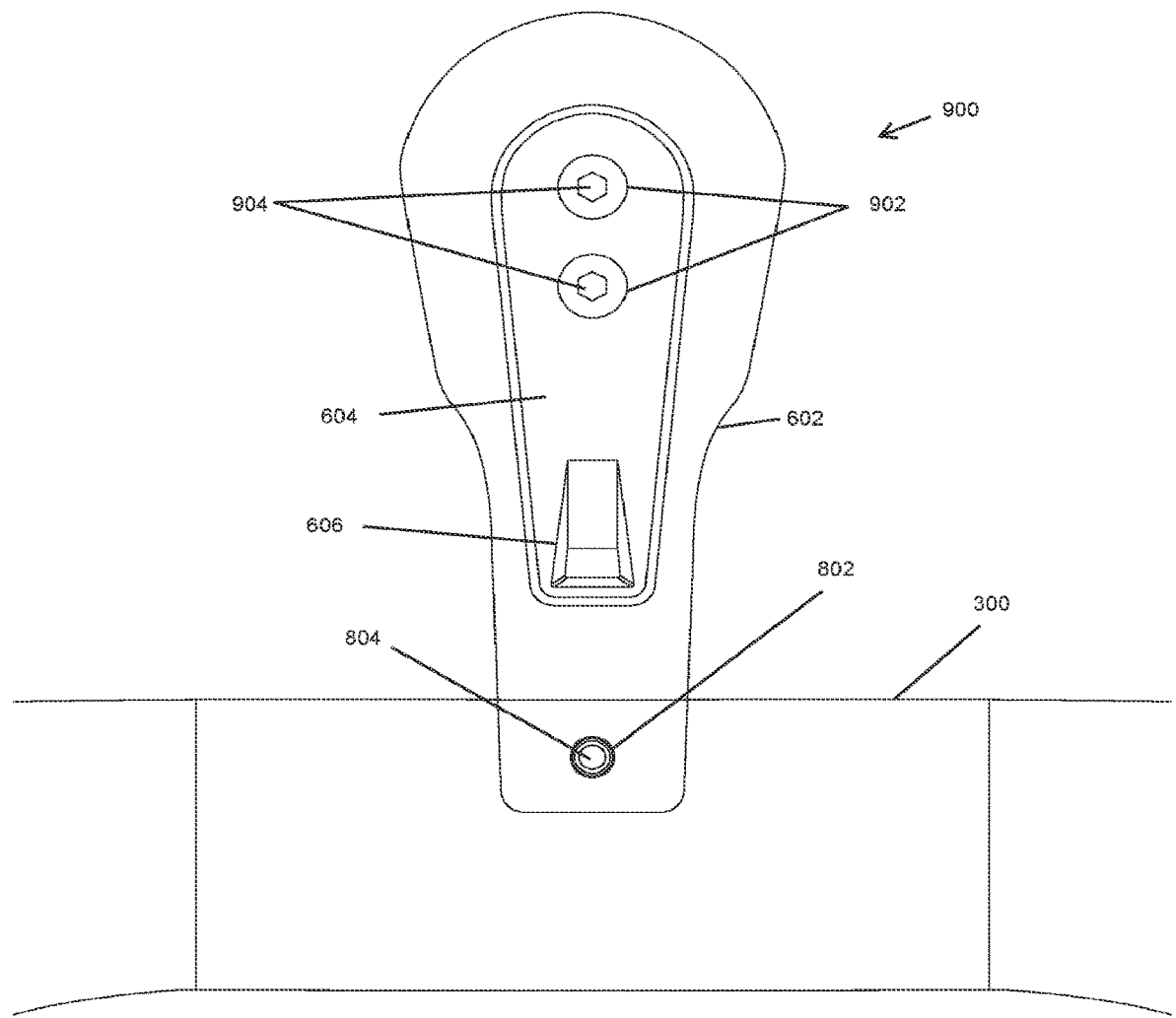
FIGS. 98-104 show a set of views of an embodiment of the bracket of FIGS. 91-97 where a plate is fastened according to this disclosure.
Figure 99:
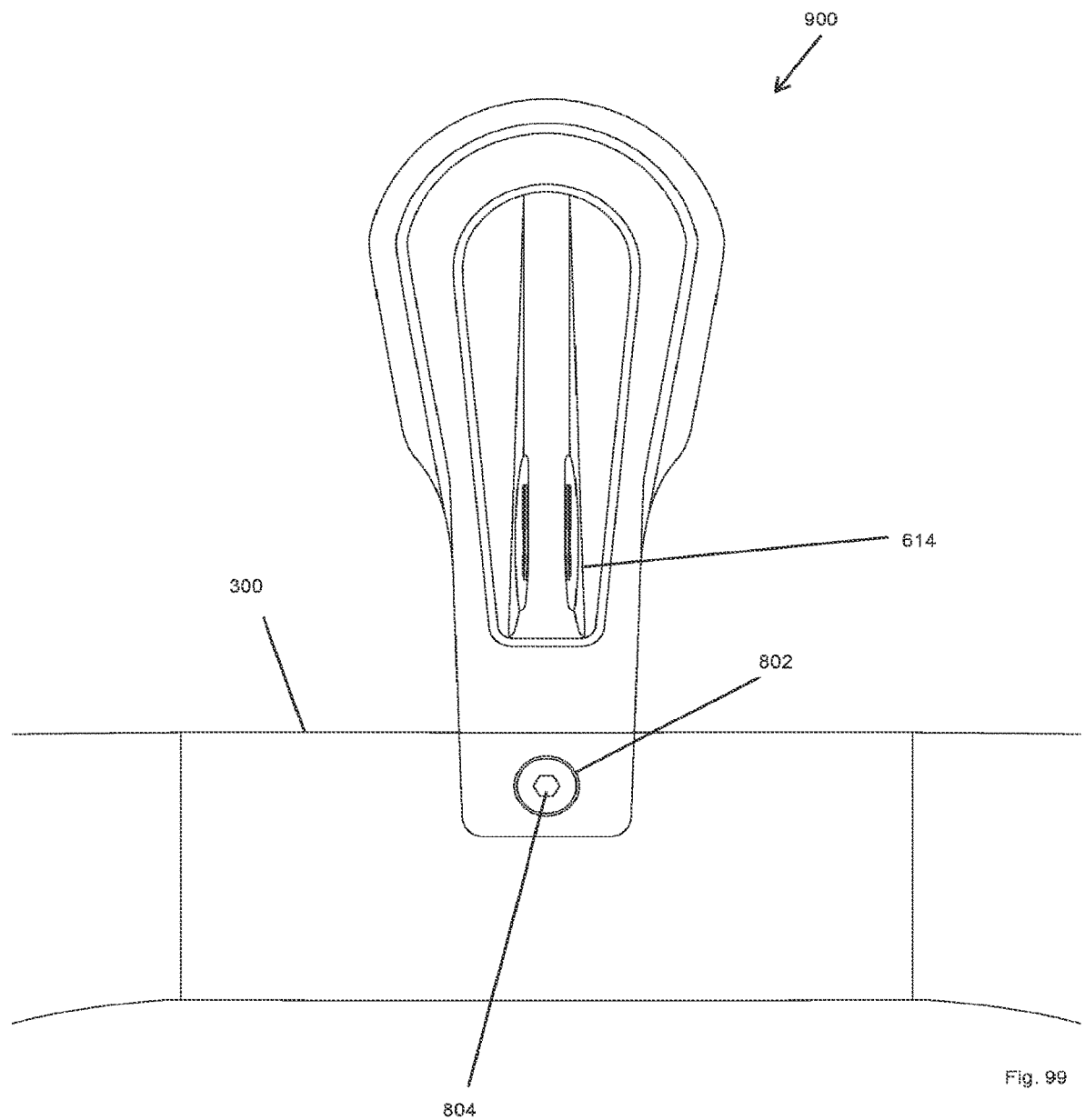
Figure 100:
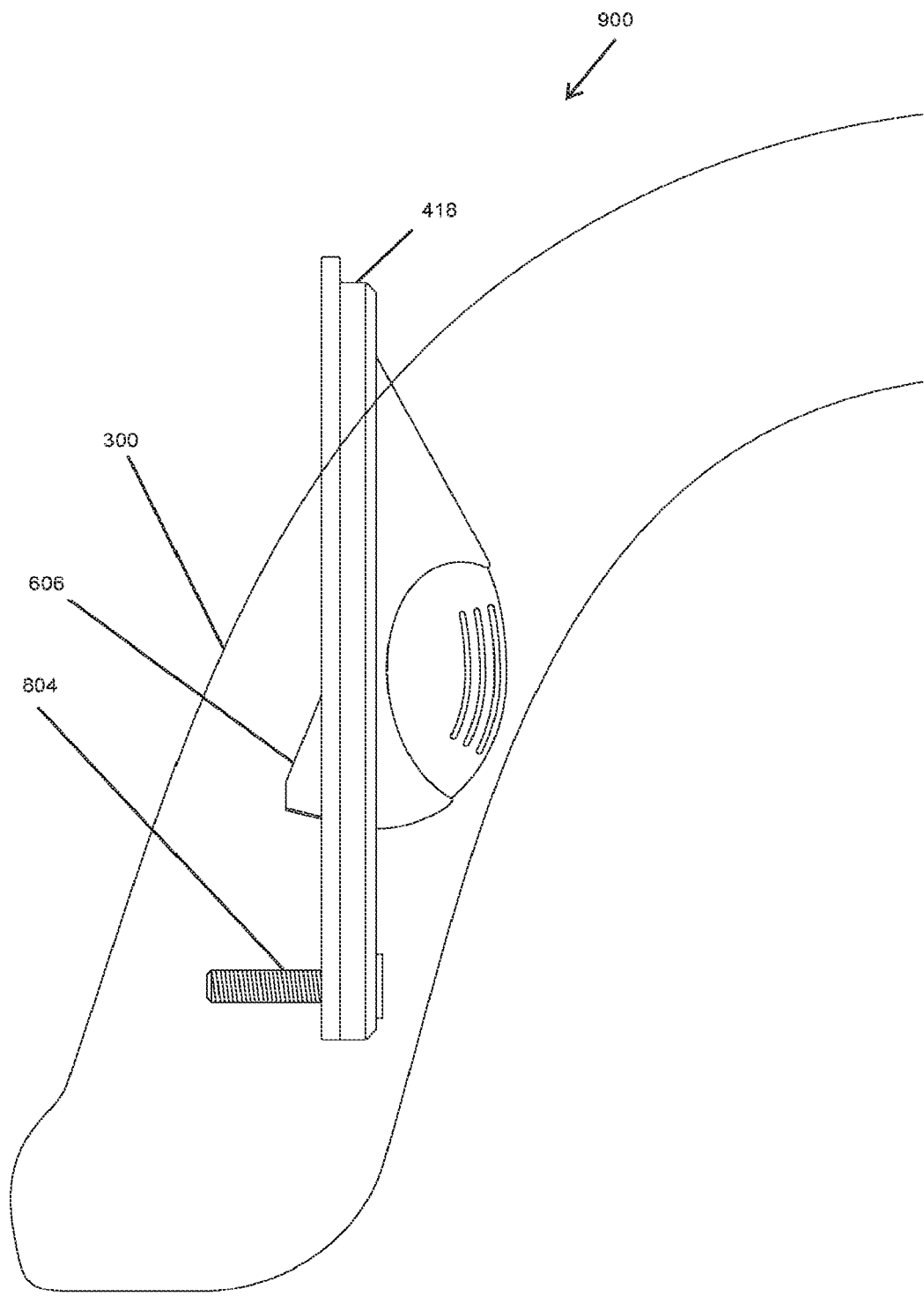
Figure 101:
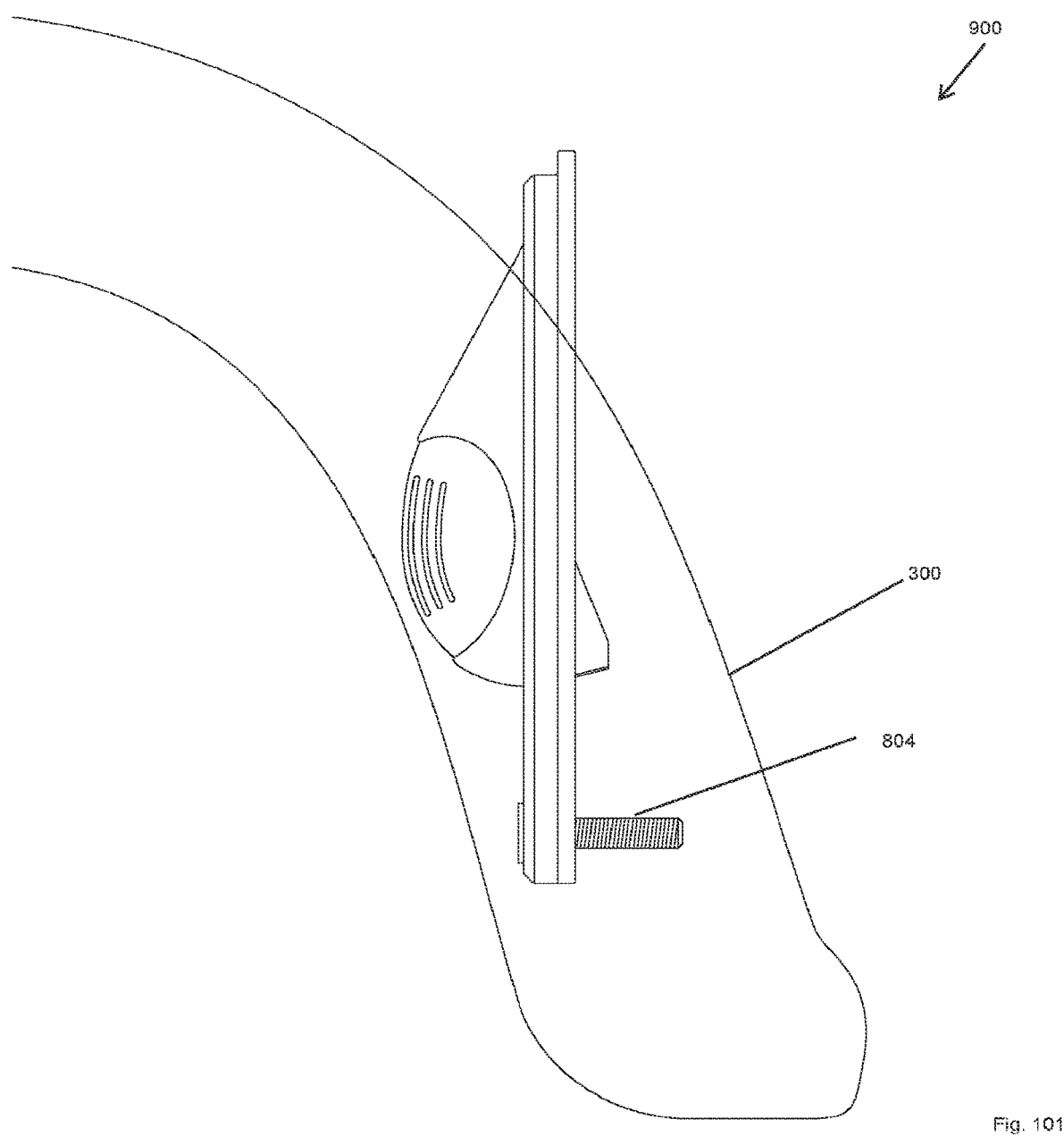
Figure 102:
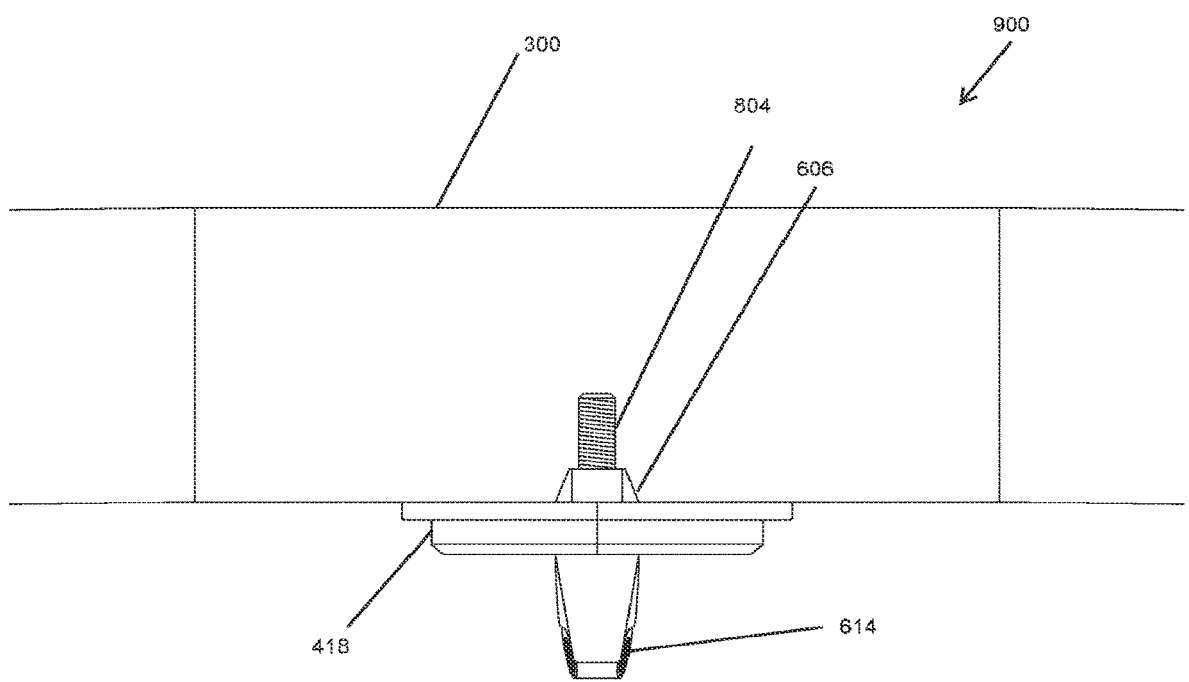
Figure 103:
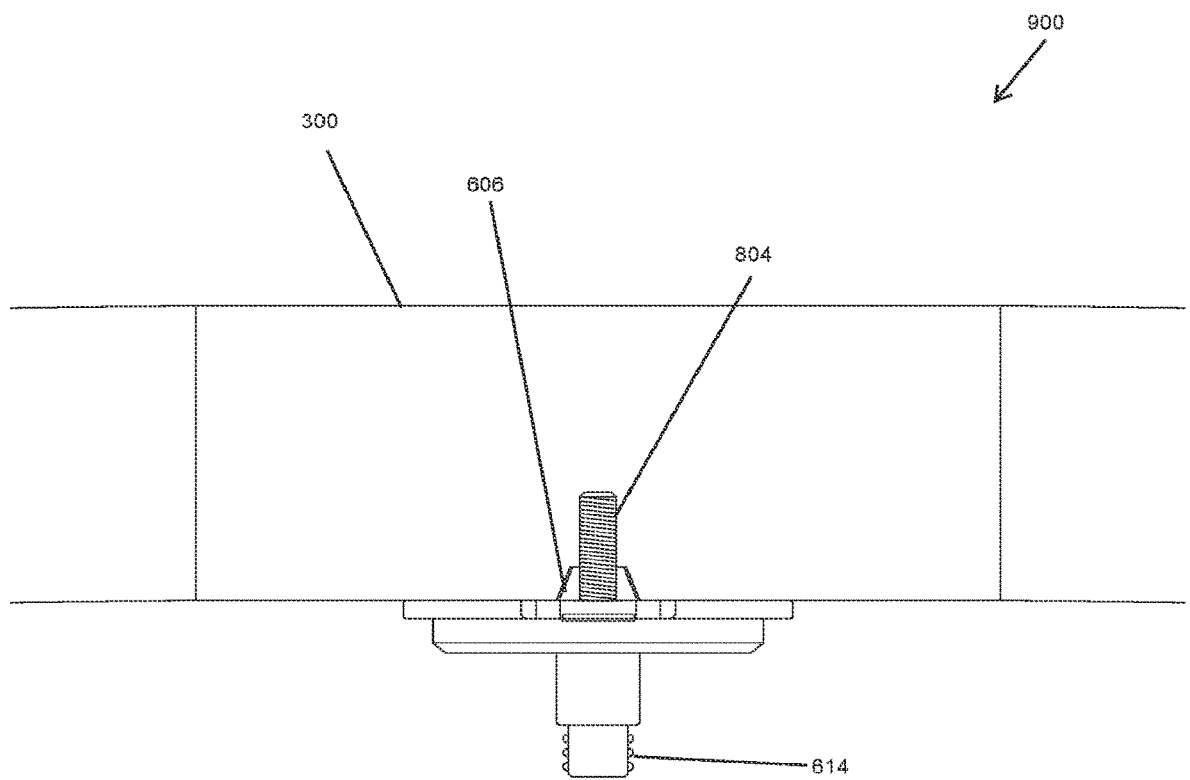
Figure 104:
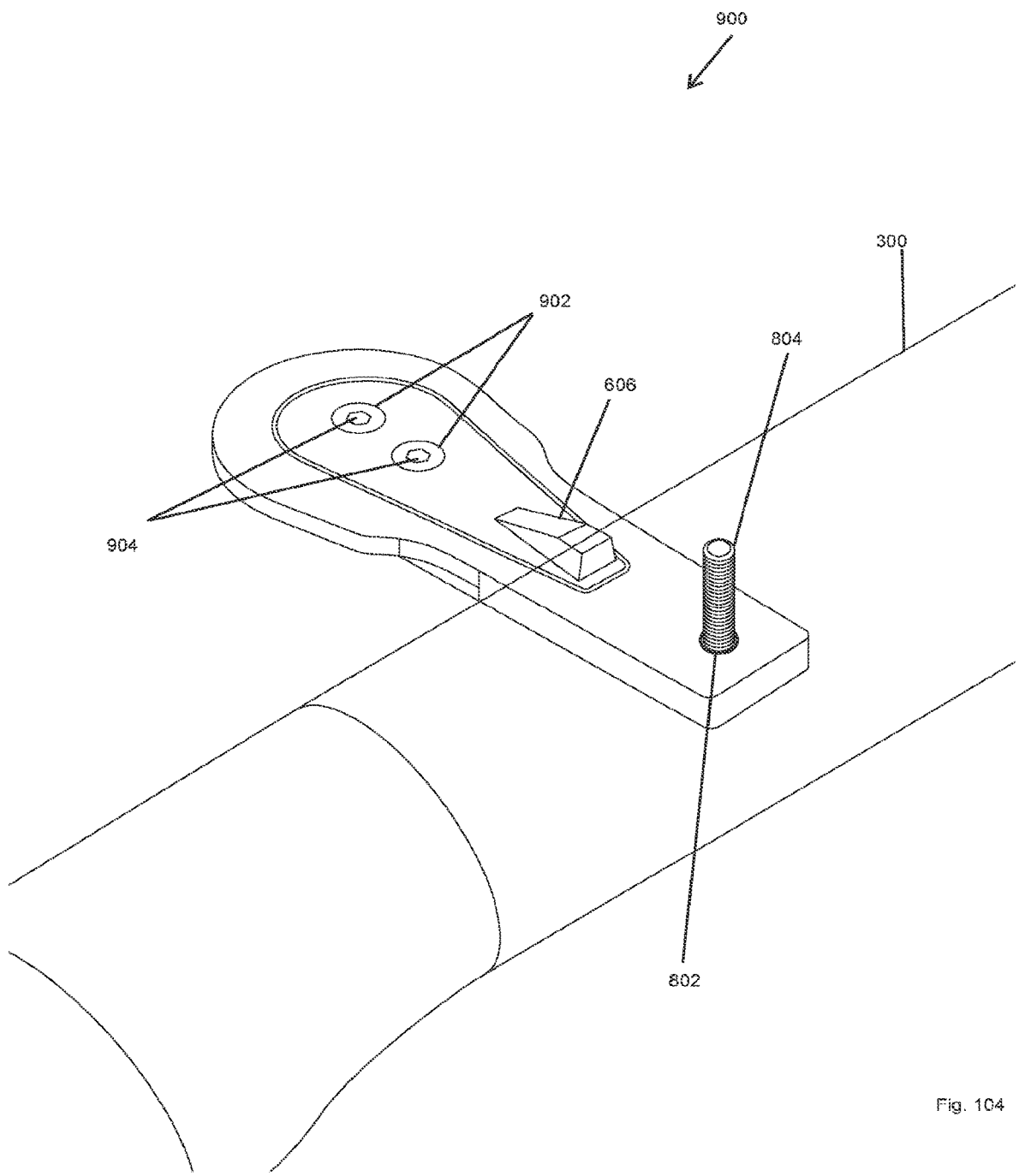
Figure 105:
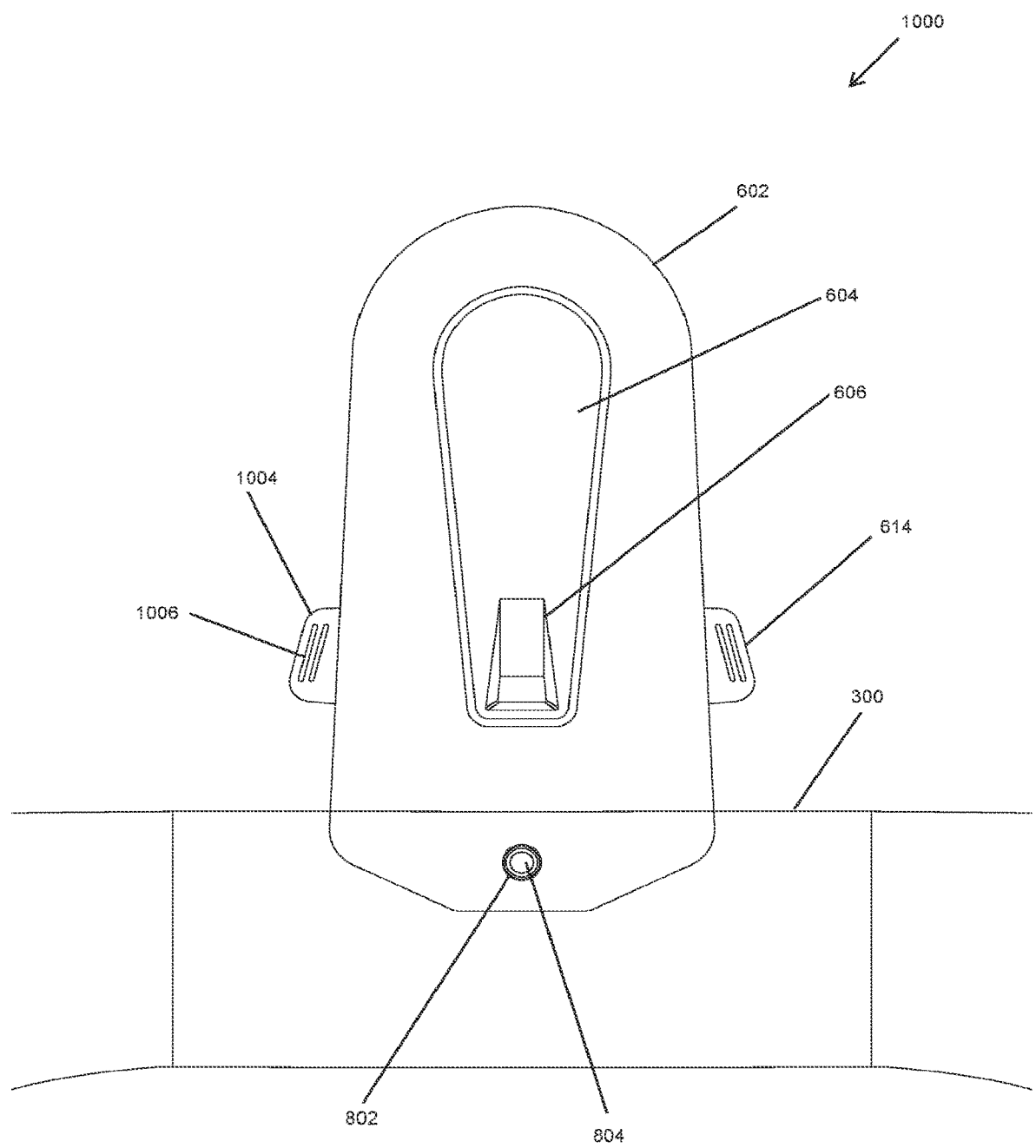
FIGS. 105-111 show a set of views of an embodiment of the bracket of FIGS. 91-97 where a plate is moveable by a user input element according to this disclosure.
Figure 106:
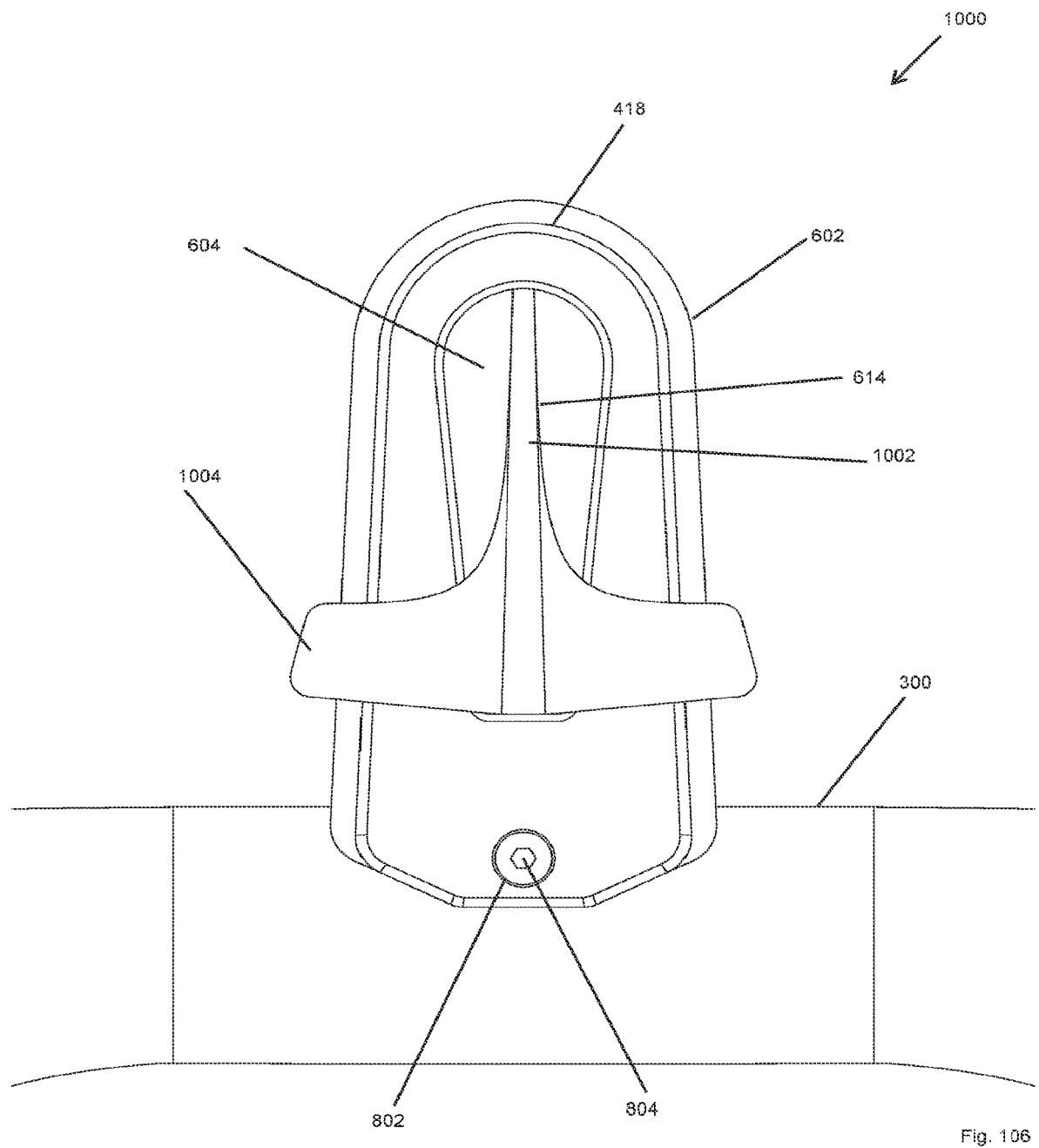
Figure 107:
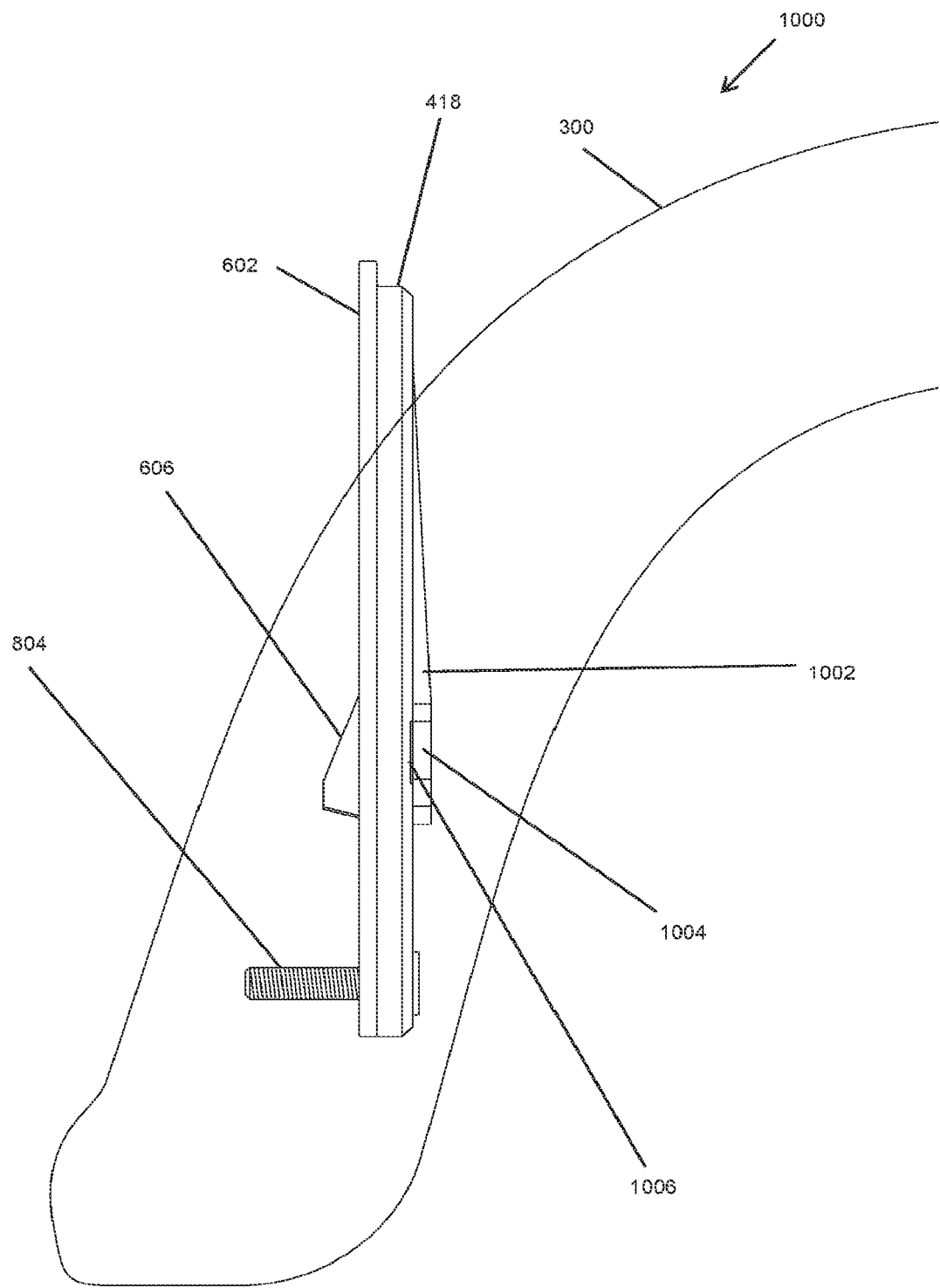
Figure 108:
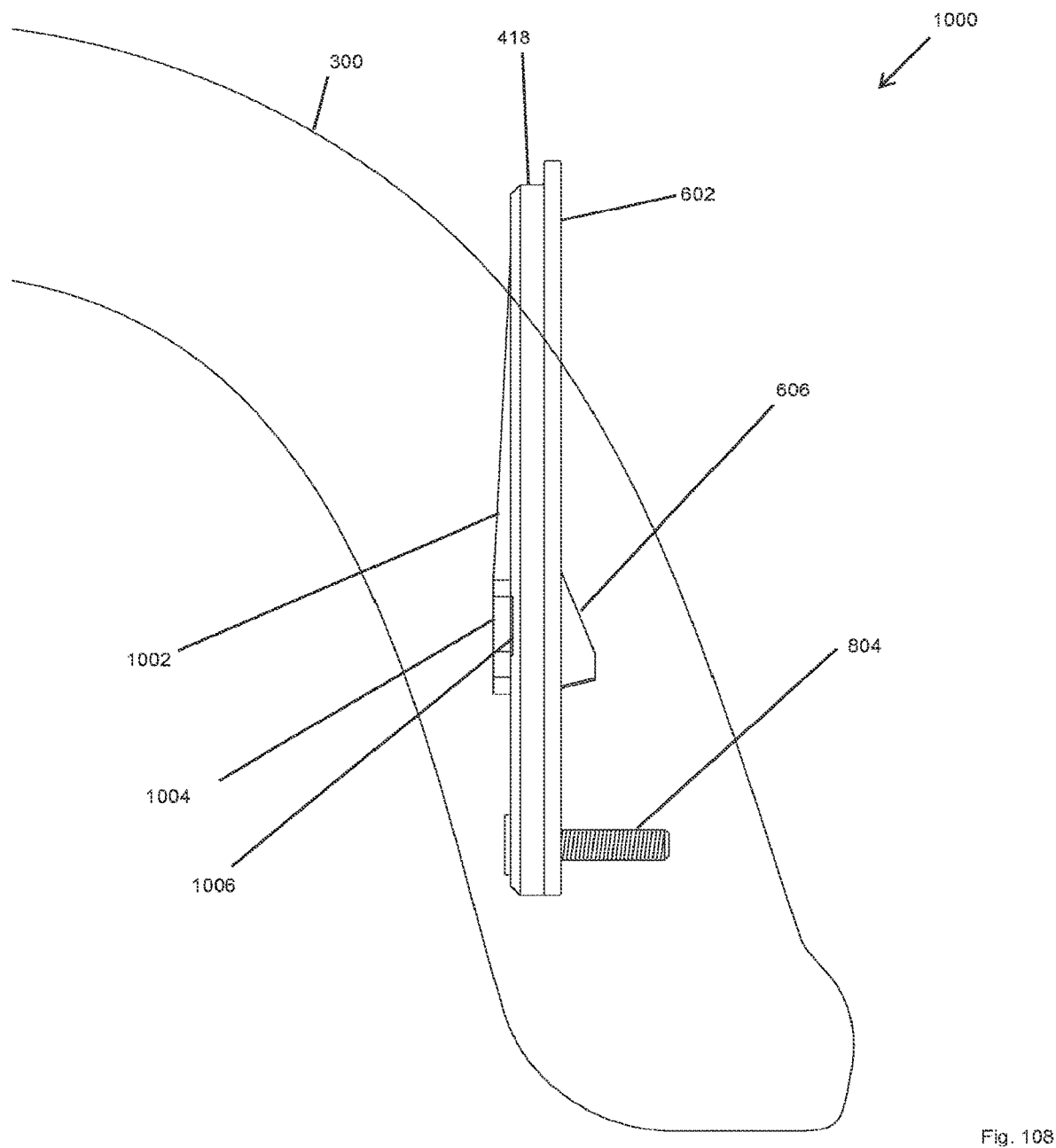
Figure 109:
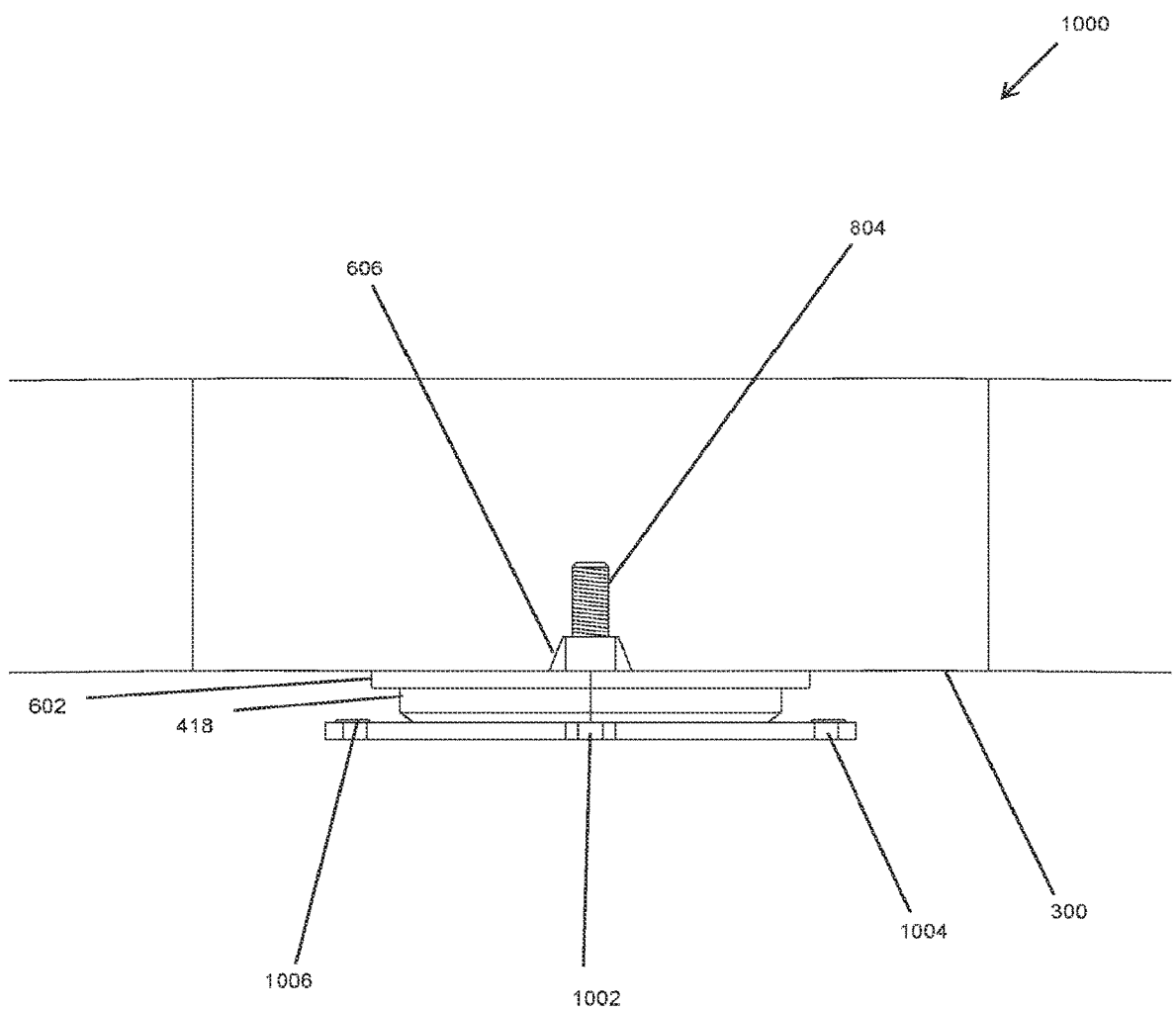
Figure 110:
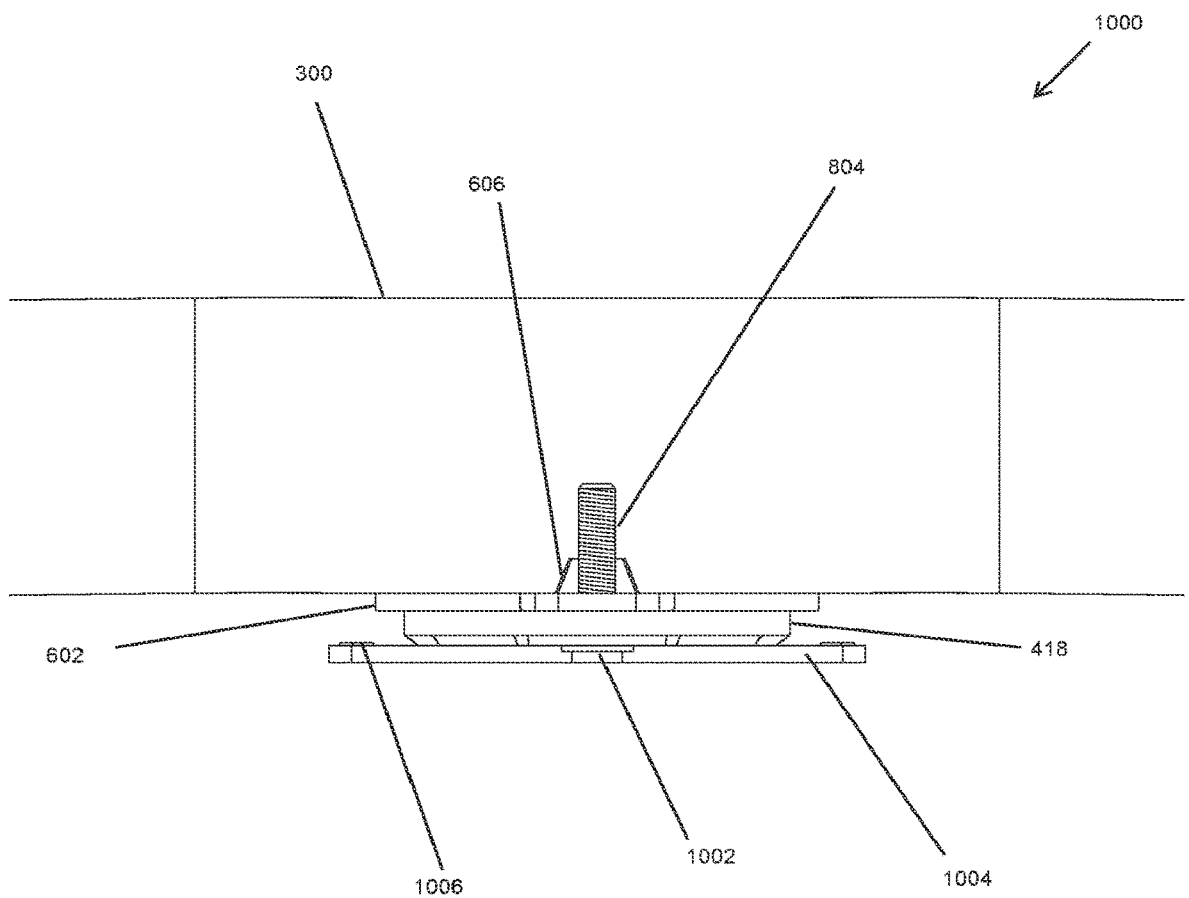
Figure 111:
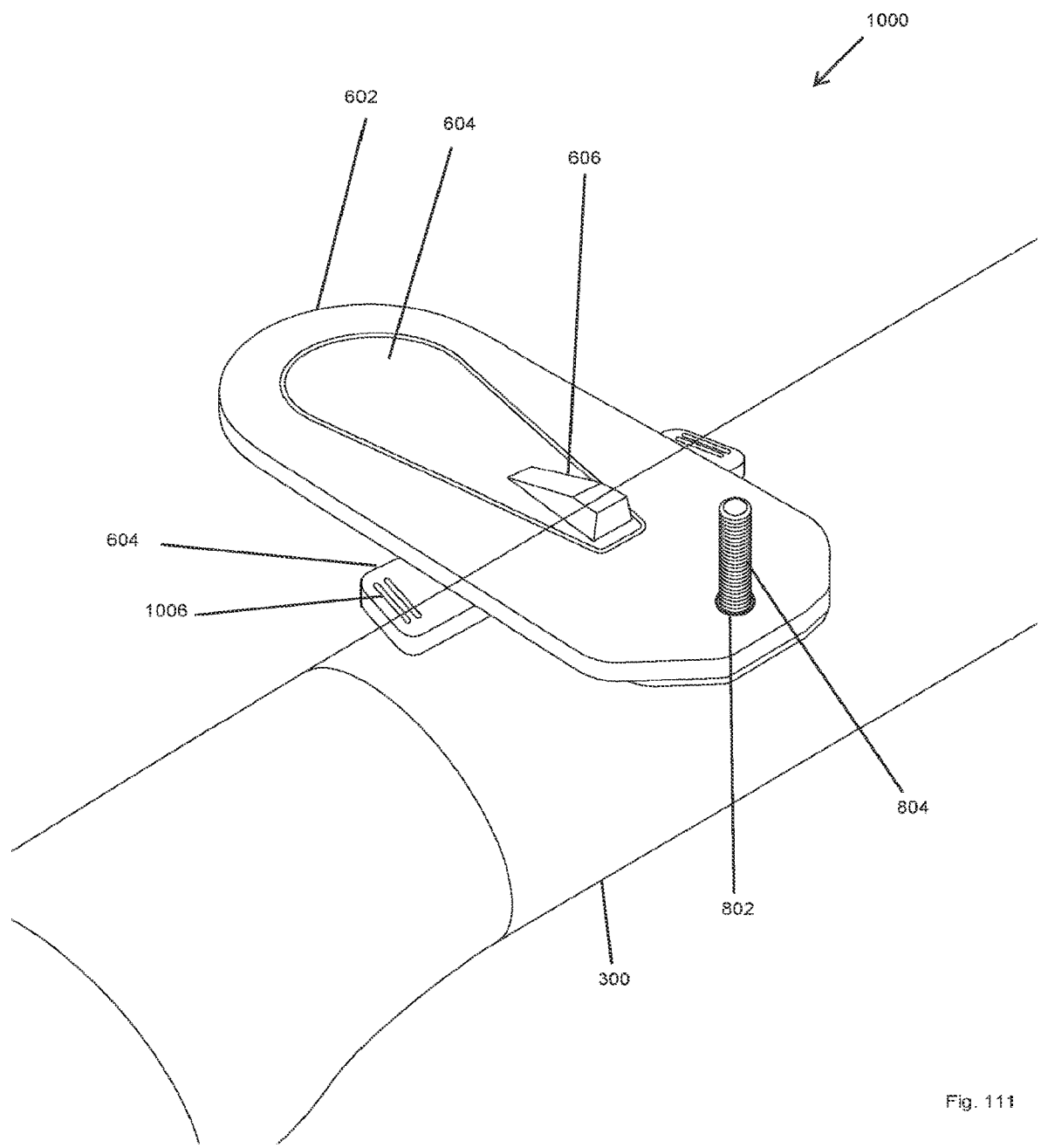
Figure 112:
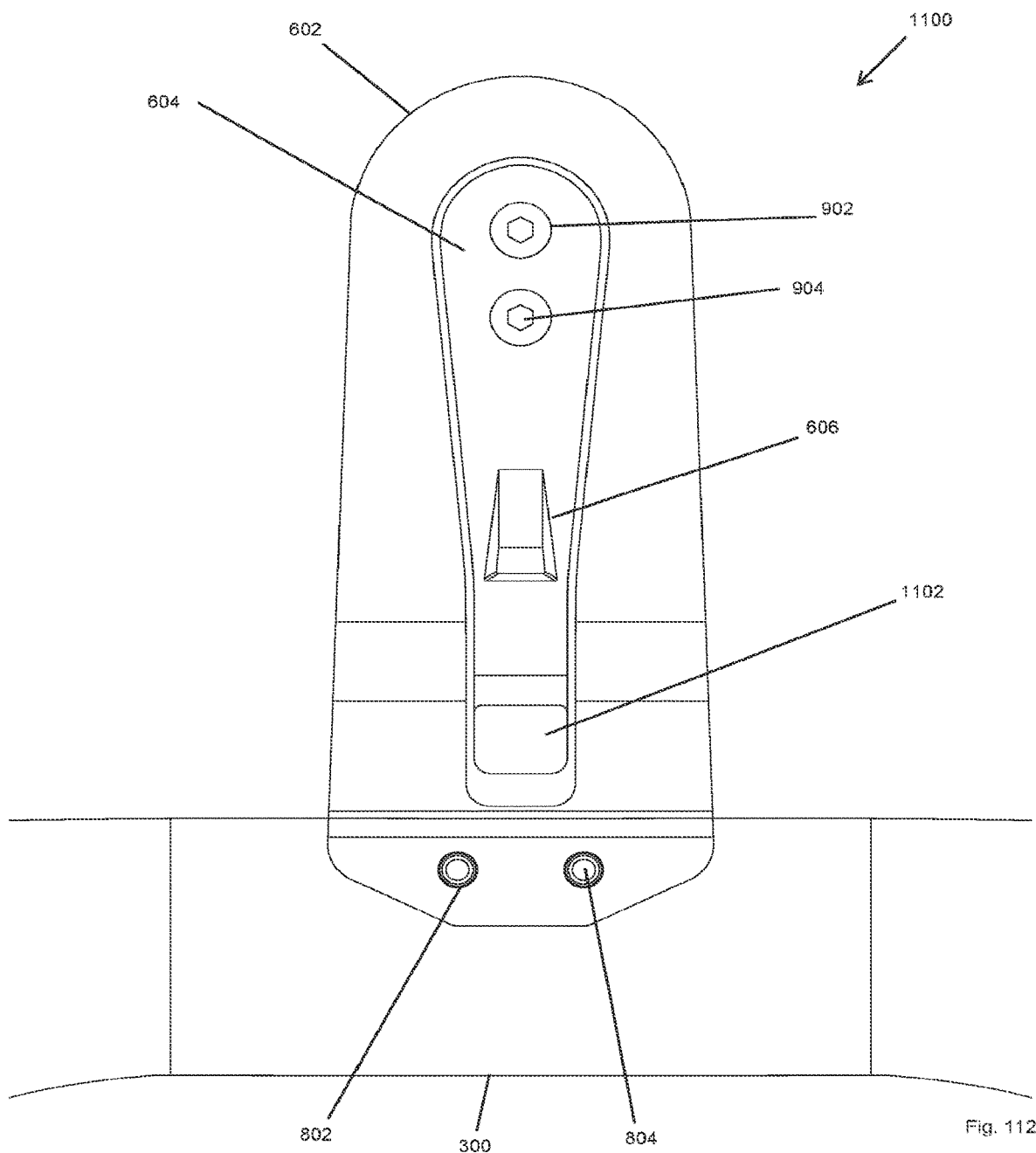
FIGS. 112-118 show a set of views of an embodiment of the bracket of FIGS. 98-104 where a plate is moveable by a user input element according to this disclosure.
Figure 113:
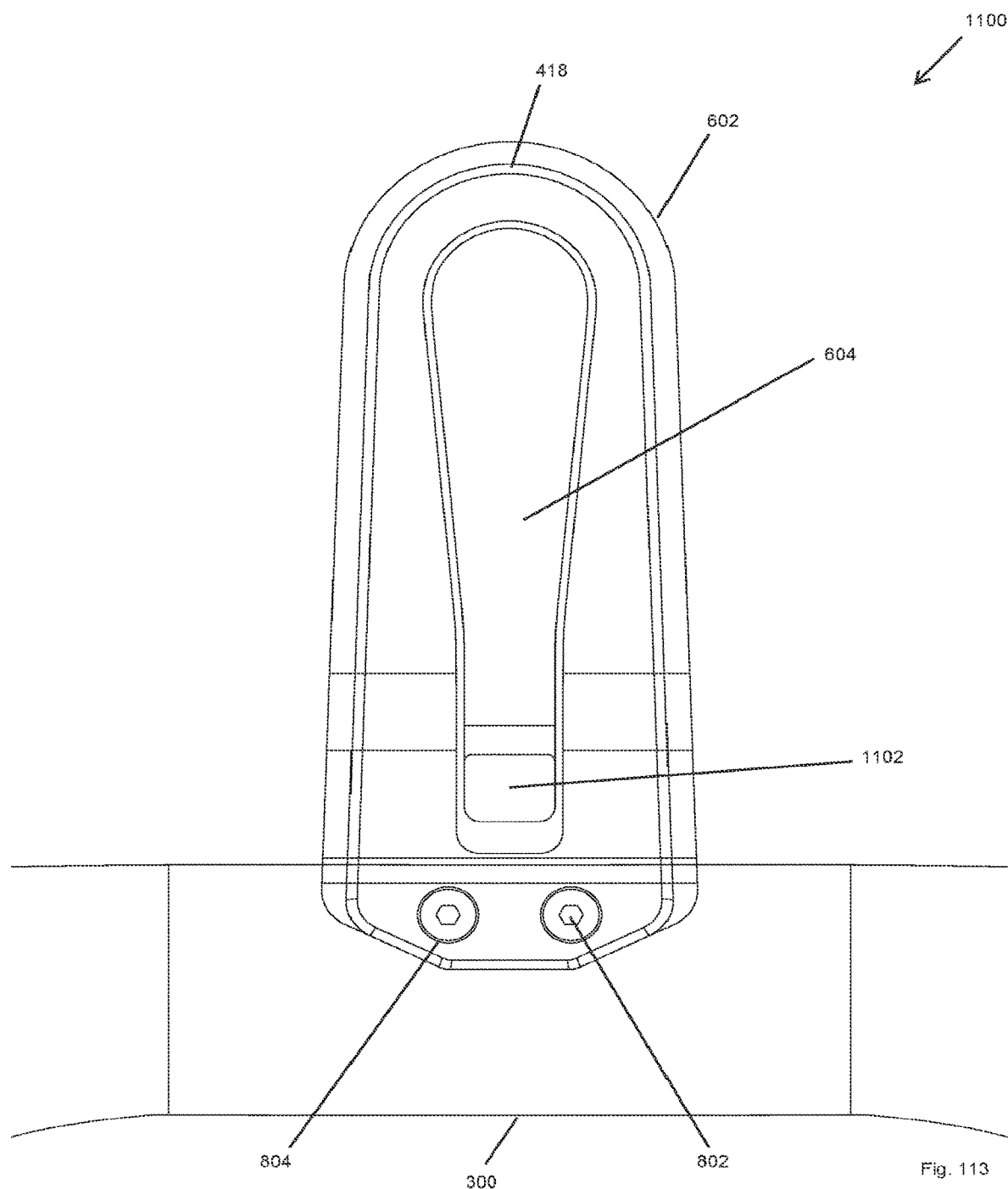
Figure 114:
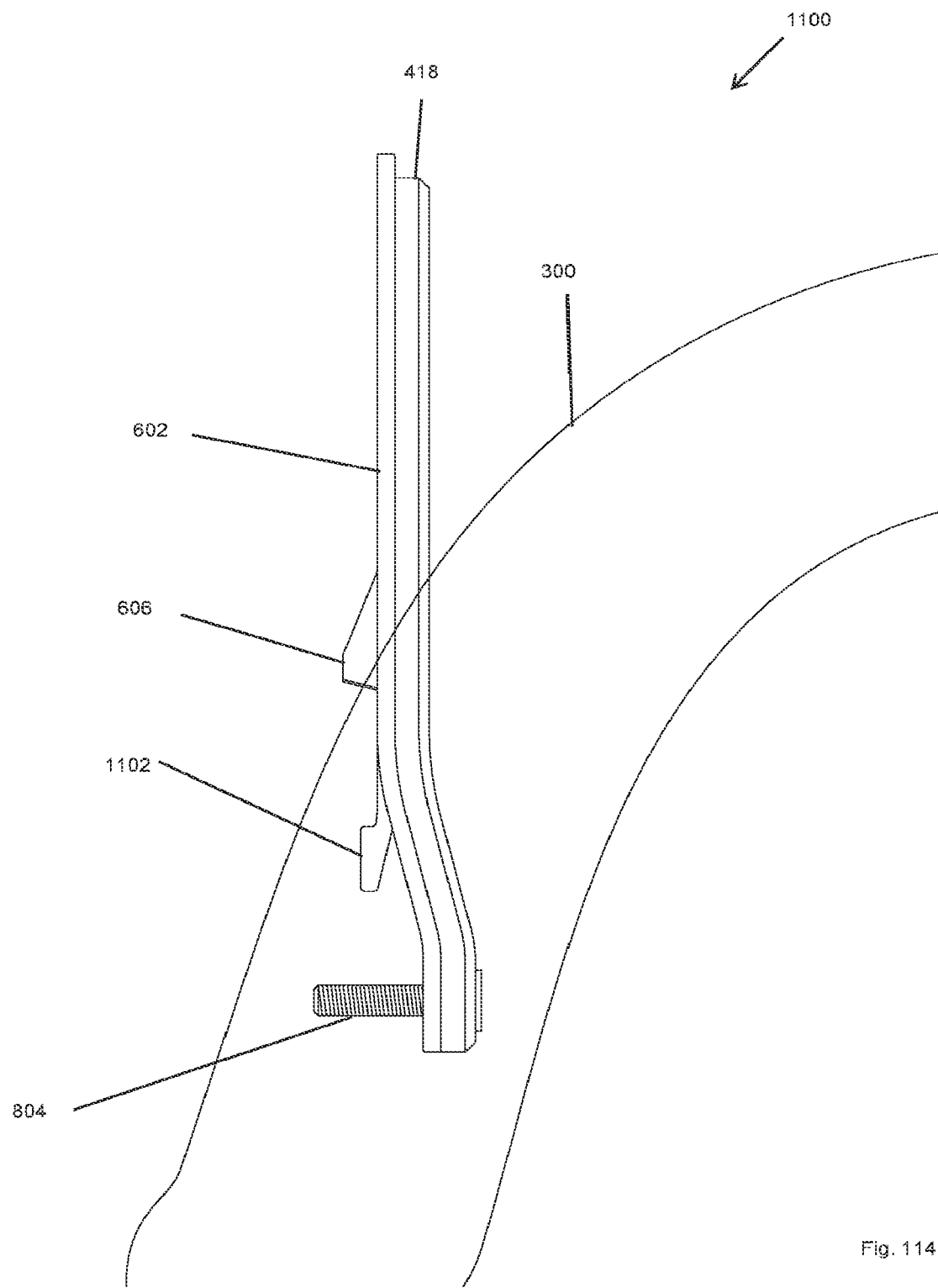
Figure 115:
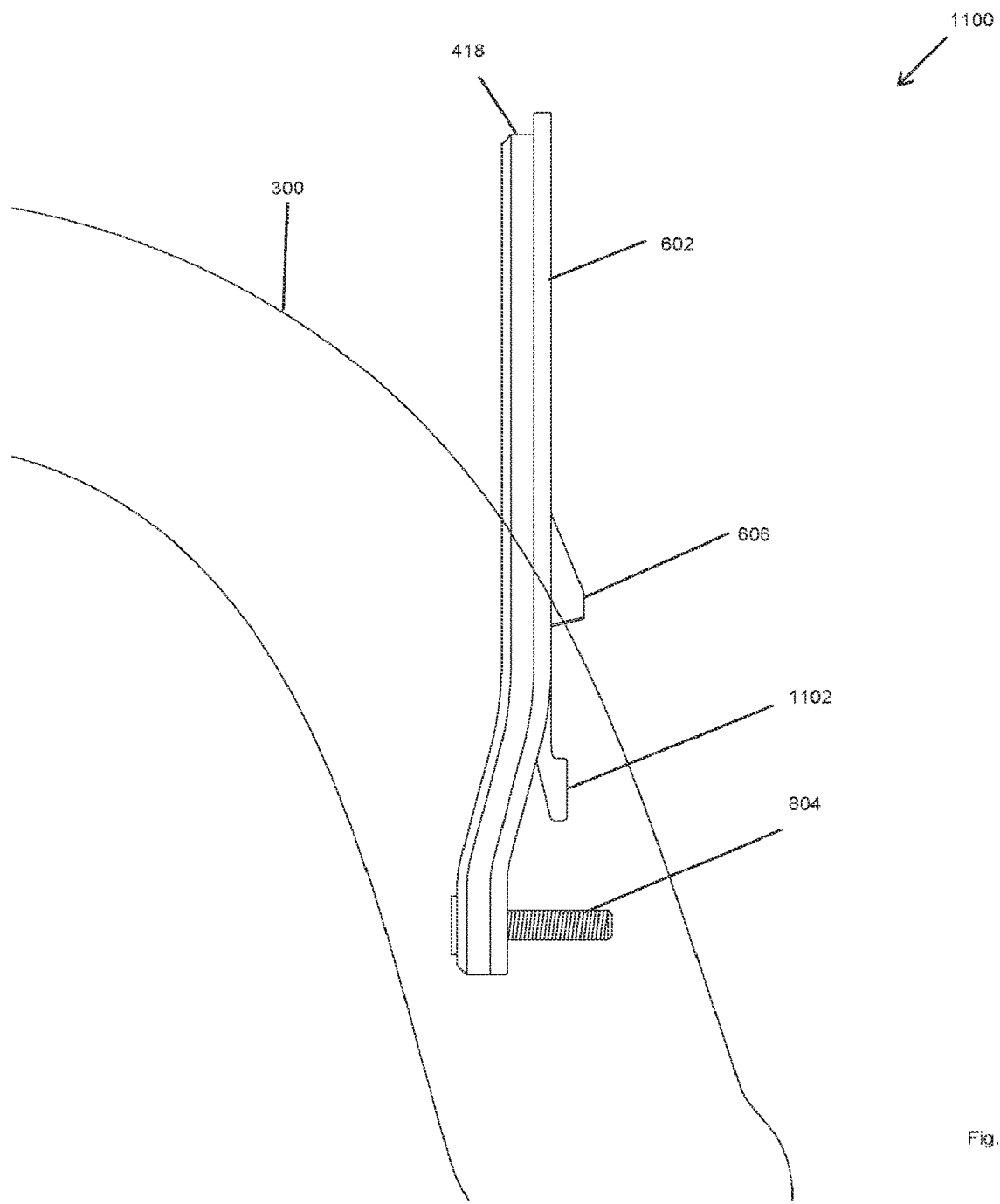
Figure 116:
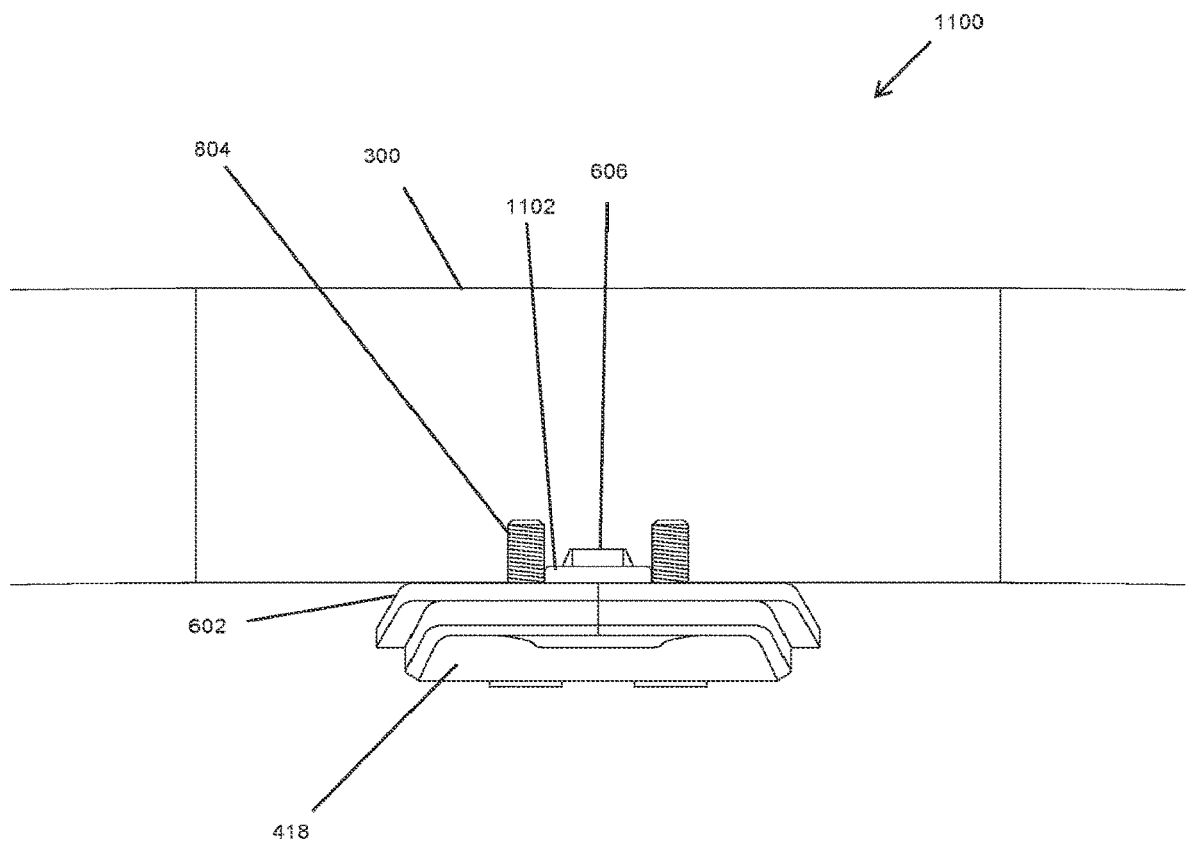
Figure 117:
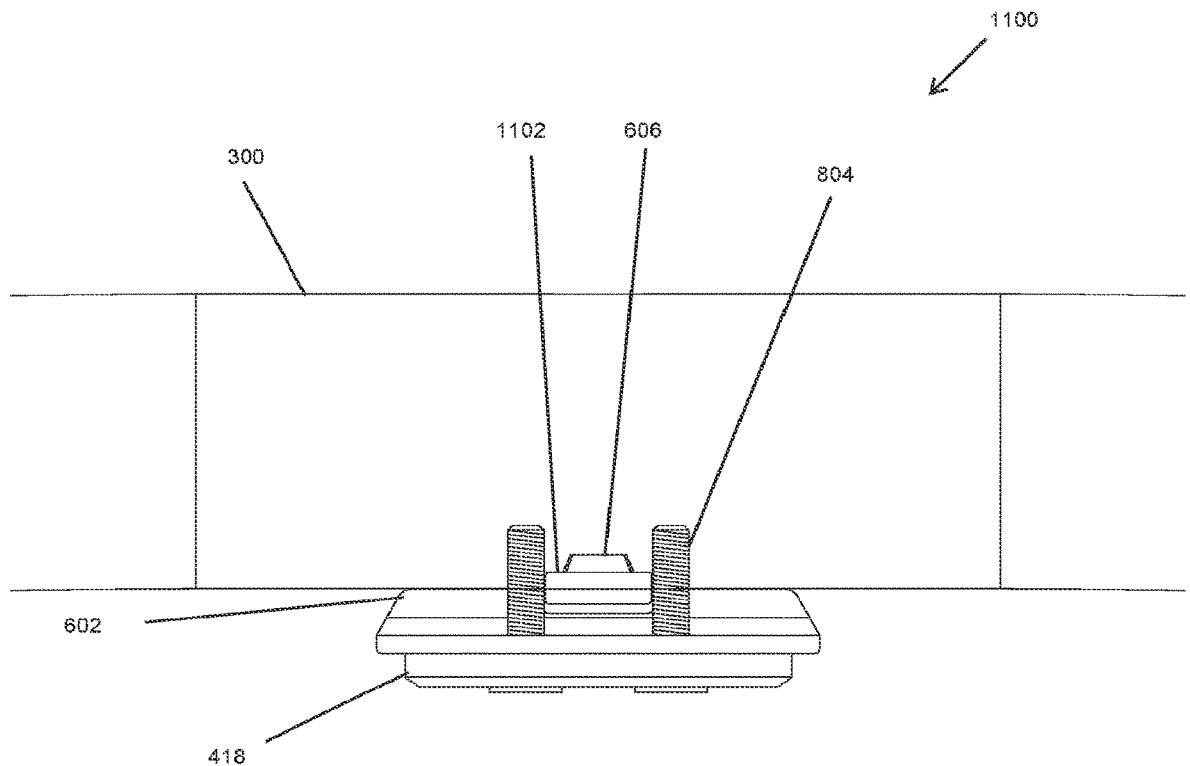
Figure 118:
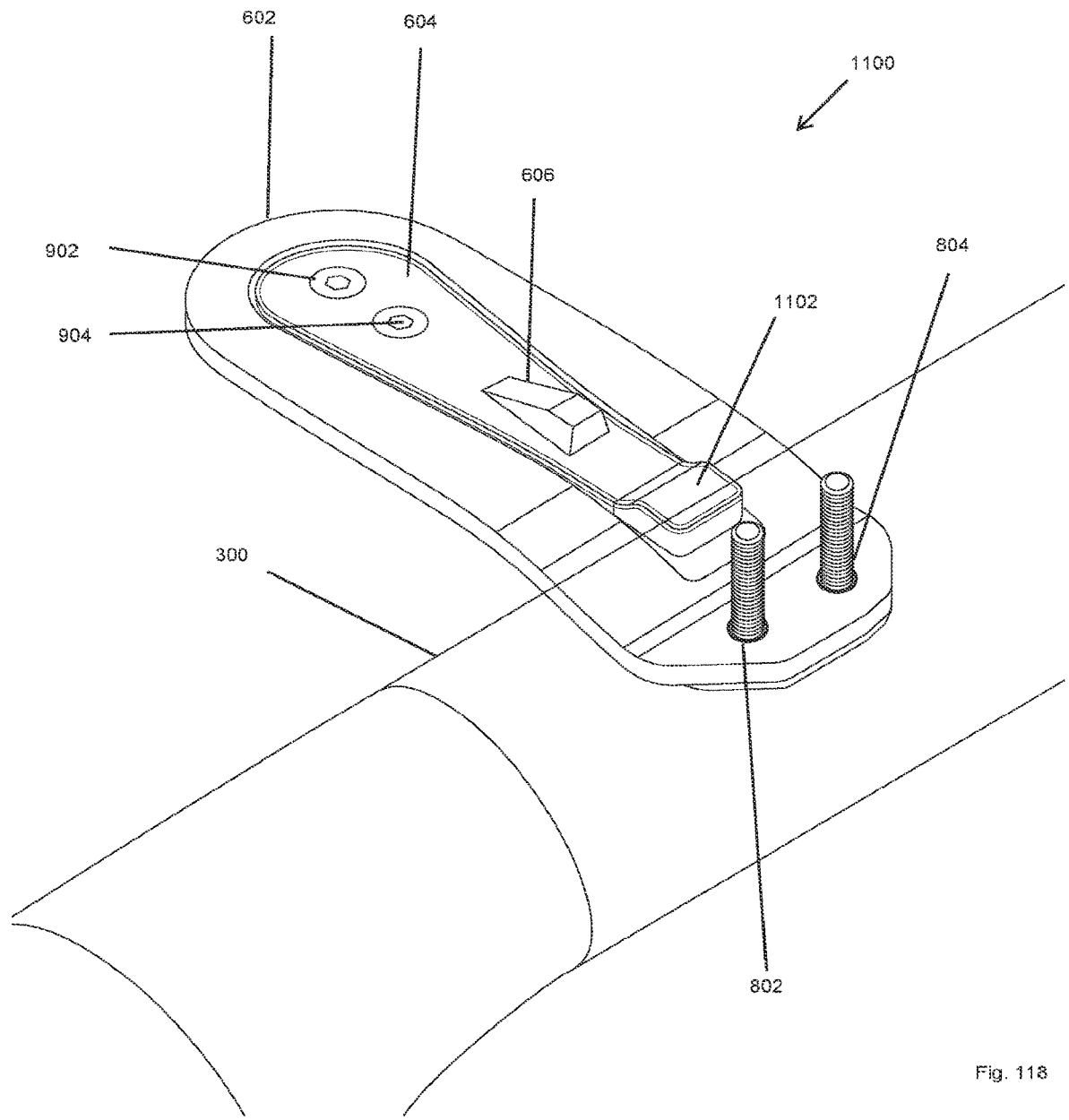

FIGS. 81-91 show a set of views of an embodiment of a bracket of FIGS. 42-62 where the bracket has a latched end portion for engaging with a handlebar of a vehicle according to this disclosure. In particular, a bracket 700, which is similar to the bracket 400. The bracket 700 includes a plate 702, a plate 704, the container 418, a latch 706, and a latched end portion 708. The plate 702 is similar to the plate 406 and encloses the plate 704 and extends over the container 418. The plate 702 can be secured (e.g., fastened, mated, adhered, interlocked) to the container 418. The plate 704 is similar to the plate 408 and hosts the latch 706. The plate 702 over the container 418 and can be secured (e.g., fastened, mated, interlocked, adhered) to the container 418. The plate 702 does not taper, narrowing in width, toward the latched end portion 708. The plate 702 increases (or remains same) in width towards the latched end portion 708. The plate 704 tapers, narrowing in width, towards the latched end portion 708. The plate 704 can resiliently or elastically bend or flex such that latch 706 can engage a corresponding detent, similar to the plate 408. However, whether additionally or alternatively, note that the plate 704 can include the user input element 614, as shown in FIGS. 63-80. As such, the plate 704 can move based on the user input element 614 moving or being moved. The latched end portion 708 is bent or has a bend to be J-shaped (or L-shaped) towards the latch 706 in order to latch onto a handlebar of a vehicle (e.g., a stationary bicycle, a mobile bicycle, a motorcycle, a jet ski), as shown in FIGS. 88-90. For example, the latched end portion 708 is bent towards the latch 706.

FIGS. 91-97 show a set of views of an embodiment of the bracket of FIGS. 73-80 secured to the bar of FIGS. 26-33 and not configured to enable power and data transfer according to this disclosure. In particular, a bracket 800 similar to the bracket 600. The bracket 800 includes the plate 602, the plate 604, the container 418, the latch 606, the user input element 614, an opening 802, and a bolt 804 (or a screw). The plate 602 includes the opening 802. The bracket 800 secures to the bar 300 or vice versa based on the bolt 804 fastenably extending through the opening 802 and then the bar 300 or vice versa. The plate 602 extends between the bar 300 and the user input element 614.

Note that there may be a nut fastening onto the bolt 804 or the nut may be omitted. Likewise, note that the opening 802 and the bolt 804 may be omitted and the bracket 800 may be secured to the bar 300 in other ways (e.g., mating, magnetizing, adhering, interlocking). Similarly, note that the bracket 800 can be configured to enable power and data transfer in various ways. For example, the bracket 800 can be configured to enable power and data transfer, as described above. For example, the bracket 800 can be configured to enable power and data transfer, as shown in FIGS. 63-80.

FIGS. 98-104 show a set of views of an embodiment of the bracket of FIGS. 91-97 where a plate is fastened according to this disclosure. In particular, a bracket 900 is similar to the bracket 800. The bracket 900 includes the plate 602, the plate 604, the container 418, the latch 606, the user input element 614, a pair of openings 902, and a pair of bolts 904 (or a pair of screws). The plate 604 includes the pair of openings 902. The plate 604 is fastened to the container 418 via the pair of bolts 904 fastenably extending through the openings 902 and then the container 418 or vice versa.

FIGS. 105-111 show a set of views of an embodiment of the bracket of FIGS. 91-97 where a plate is moveable by a user input element according to this disclosure. In particular, a bracket 1000 is similar to the bracket 800. The bracket 1000 includes the plate 602, the plate 604, the container 418, the latch 606, the user input element 614, the opening 802, and the bolt 802. The bracket 1000 is secured to the bar 300 via the bolt 804 fastenably extending through the opening 802 and then the bar 300 or vice versa.

The user input element 614 includes a spine 1002 and a pair of wings 1004. The spine 1002 (e.g., a wall, a plate) and the pair of wings 1004 (e.g., a pair of walls, a pair of plates) are monolithic (e.g., injection molded, 3D printed), but can be assembled with each other (e.g., fastening, mating, interlocking, adhering, magnetizing). The spine 1002 extends from the plate 604 away from the latch 606, which can be through the container 418, such that the spine 1002 is interposed between the pair of wings 1004.

The pair of wings 1004 extends away from the spine 1002, which may be cantileveredly. The pair of wings 1004 extend from the spine 1002 opposite each (although such opposition is not required). The pair of wings 1004 extend from the spine 1002 away from the each other past the plate 602 (although not passing the plate 602 is possible). The pair of wings 1004 are solid, but can be perforated. The pair of wings 1004 have a pair of closed shapes, but such shaping can be of any suitable shape, whether open or closed, whether symmetrical or asymmetrical. Note that the pair of wings 1004 can be omitted and there can be a single wing 1004 or another suitable object (e.g., a chain, a cable, a rope, a bar) extending from the spine 1002 that can be used, as further described below.

The pair of wings 1004 include a pair of externally textured portions 614. The pair of externally textured portions 614 are projected outwards, but can be depressed inwards. For example, the pair of externally textured portions 614 can be grooved, paralleled, crisscross, knurled, rough, or other suitable forms of tactile texture. Note that the pair of externally textured portions 614 can be omitted.

When a pressure is applied to or exerted on the pair of wings 1004 in a direction away from the bar 300 (e.g., when a user presses on the pair of wings 1004), then the plate 604 resiliently or elastically bends or flexes, as described above, thereby causing the latch 606 to move accordingly therewith, as described above. The pressure can be applied or exerted on the pair of wings 1004 onto the pair of externally textured portions 614 or areas on the pair of wings 1004 lateral thereto. The pressure can be applied or exerted on the pair of wings 1004 in the direction that is parallel to the bolt 804, perpendicular to the plate 602, or perpendicular to the container 418. For example, the when the bar 300 is a handlebar of a bicycle, then the pressure can be applied or exerted on the pair of wings 1004 in the direction towards a wheel of the bicycle or towards a ground surface on which the bicycle is stationed or moving. Likewise, when the user input element 614 is let go or reversibly moved, then the area of the plate 604 hosting the latch 606 can move accordingly such that the latch 606 retracts back from the plate 602.

FIGS. 112-118 show a set of views of an embodiment of the bracket of FIGS. 98-104 where a plate a moved by a user input element according to this disclosure. In particular, a bracket 1100 is similar to the bracket 900 or the bracket 1000. The bracket 1100 includes the plate 602, the plate 604, the container 418, the latch 606, the pair of openings 802, the pair of bolts 806, the pair of openings 902, the pair of bolts 904, and a block 1102. The plate 602 encloses the plate 604. The plate 604 hosts the latch 606 between the pair of openings 902 and the block 1102. The plate 604 hosts the block 1101 such that the latch 606 is positioned between the block 1102 and the pair of openings 902 or the pair of bolts 904. The bracket 1100 is secured to the bar 300 via the pair of bolts 804 fastenably extending through the pair of openings 802 and then the bar 300 or vice versa.

The block 1102 extends between the latch 606 and the bar 300. The block 1102 extends between the pair of openings 802 and the latch 600. The block 1102 extends between the pair of bolts 804 and the latch 600. The block 1102 extends between the pair of openings 902 and the pair of openings 802. The block 1102 extends between the pair of openings 902 and the pair of bolts 804. The block 1102 extends between the pair of bolts 904 and the pair of openings 802. The block 1102 extends between the pair of bolts 904 and the pair of bolts 902. The block 1102 can include an externally textured portion 614.

When a pressure is applied to or exerted on the block 1102 in a direction away from the bar 300 (e.g., when a user presses on the block 1102), then the plate 604 resiliently or elastically bends or flexes, as described above, thereby causing the latch 606 to move accordingly therewith, as described above. The pressure can be applied onto the externally textured portion 614. The pressure can be applied or exerted on the block 1102 in the direction that is parallel to the bolt 804, perpendicular to the plate 602, or perpendicular to the container 418. For example, when the bar 300 is a handlebar of a bicycle, then the pressure can be applied or exerted on the block 1102 in the direction towards a wheel of the bicycle or towards a ground surface on which the bicycle is stationed or moving. Likewise, when the block 1102 is let go or reversibly moved, then the area of the plate 604 hosting the latch 606 can move accordingly such that the latch 606 retracts back from the plate 602.

As described above, in some embodiments, these brackets can provide a mechanical mounting interface between a bicycle handlebar and a removable cycling accessory (e.g., Karoo cycling computer). For example, the mechanical coupling interface can be configured for linear mounting of the removable cycling accessory and rotary un-mounting of the removable cycling accessory. This functionality can increase ease of mounting of the removable cycling accessory or can allow the removable cycling accessory to mount closer to a bicycle stem. For example, the mechanical coupling interface can provide a two-step rotary release that can include a set of fully locked, safe zone, and released positions thereby effectively reducing at least some risk of an accidental un-mounting of the removable cycling accessory. For example, the mechanical coupling interface can provide a spring force preloading in the plate that can effectively eliminates in-ride rattle. For example, the mechanical coupling interface can provide more surface area (e.g., 5 times) of contact rails than various conventional brackets. For example, the arm can have a "dual tube" construction that increases a strength-to-weight ratio and effectively eliminates, reduces, or minimizes at least some need for at least some external ribbing when injection molding in most common plastic. For example, the arm has a distinctive low-profile shape that helps to effectively reduce or minimize drag and effectively improve aerodynamics. For example, the arm can connect to a variety of proprietary handlebar mounting interfaces from different bike manufacturers. For example, the bracket and the mounting interface may enable rotary unmounting system, as described above, while also enabling linear unmounting that are actuated by the user pushing, pulling, or otherwise manipulating a lever arm (or another user input element) that may take various forms. For example, the bracket can include electrification functionality for charging or data transfer. For example, the mechanical coupling interface can interface with a fully integrated cycling technology system. This may include sensors, monitors, batteries, data processors, lights, and any number of other sub-systems or electrical loads of various types. For example, the electronic device with the housing may have a docking port that may or may not be housed within an "aero" style integrated handlebar and stem. For example, the bracket may include a universal serial bus (USB) instance, where at least some linear mounting allows for docking into a USB type C or other power/data port in both stationary indoor bicycles and traditional outdoor bicycles. Likewise, the bracket can include a loaded tab latching system that allows for linear un-mounting with an addition of a user actuated vertical release lever. For example, the bracket may include a connection interface, where a combination of at least some linear mounting and spring force preloading in the plate allows for the invention of a "floating" power/data interface that may be released with a rotary action. This floating interface may or may not be housed within an "aero" style integrated handlebar and stem. For example, the mounting interface (e.g., the puck) may be built using a modular approach and may be replaced by an electrified version that transfers power and/or data between the main device (through Shell A) and either (1) the bicycle or (2) peripheral devices mounted on the underside of the main bracket arm. Likewise, the accessory may enables linear unmounting. For example, a modification to the Shell B component of accessory may redirect electrical and data in/out connections from the USB port to pins on the underside of the accessory. These pins may be paired with a proprietary connector that may match their shape on the mounting interface. Wires connect this mount interface to other components on the bike that may include an E-Bike motor controller, E-Bike motor, E-Bike battery, other battery pack, lights, sensors, or any other electronic component. Note that at least some linear mounting and rotary un-mounting system may be applied to any number of cycling accessories including but not limited to lights, sensors, water-bottle holders, panier bags, or any other loads, whether physical, gravitational, electrical, or mechanical.

Note that any bracket, as disclosed herein, or any accessory, as disclosed herein, may be packaged in a kit, alone or in combination with one other items, as disclosed herein. For example, the kit can include a package (e.g., an envelope, a box, an intermodal container) containing a bracket, as disclosed herein, and an accessory herein. For example, the kit can include a package (e.g., an envelope, a box, an intermodal container) containing a bracket, as disclosed herein, or an accessory herein.

Features described with respect to certain embodiments may be combined in or with various some embodiments in any permutational or combinatory manner. Different aspects or elements of example embodiments, as disclosed herein, may be combined in a similar manner.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Various corresponding structures, materials, acts, and equivalents of all means or step plus function elements in various claims below are intended to include any structure, material, or act for performing the function in combination with other claimed elements as specifically claimed. Various embodiments were chosen and described in order to best disclose various principles of this disclosure and various practical applications thereof, and to enable others of ordinary skill in a pertinent art to understand this disclosure for various embodiments with various modifications as are suited to a particular use contemplated.

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

This detailed description has been presented for various purposes of illustration and description, but is not intended to be fully exhaustive or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. Scope of this disclosure is defined by various claims, which include known equivalents and unforeseeable equivalents at a time of filing of this disclosure.

The invention claimed is:

1. A system comprising:
a mounting interface including a latch and a plate hosting the latch, wherein the latch including a block with a ramp and a platform extending off the ramp, wherein the plate including an exterior surface, wherein the ramp extending between the exterior surface and the platform;
and an accessory configured to engage the mounting interface, the accessory including a detent with a ramp complement and a platform complement extending off the ramp complement such that the latch engages the detent and the ramp progressively engages the ramp complement until the platform engages the platform complement based on the plate rectilinearly and guidably sliding into the accessory over the detent.

2. The system of claim 1, wherein the mounting interface is configured to disengage from the accessory based on the accessory being laterally rotated relative to the plate such that the latch does not extend over the detent.

3. The system of claim 2, wherein the mounting interface is configured to disengage from the accessory based on the accessory being laterally rotated about 30 degrees or less relative to the plate such that the latch does not extend over the detent.

4. The system of claim 1, wherein the mounting interface including a container supporting the plate, wherein the plate includes a first area and a second area, wherein the first area contains the latch, wherein the mounting interface is configured to engage the accessory including the detent with the ramp complement and the platform complement extending off the ramp complement such that the latch engages the detent and the ramp progressively engages the ramp complement until the platform engages the platform complement based on the plate rectilinearly and guidably sliding into the accessory over the detent based on the first area resiliently or elastically bending or flexing relative to the second area and the container.

5. The system of claim 4, further comprising an arm extending from the container.

6. The system of claim 5, further comprising a clamp extending from the arm, wherein the clamp is configured to clamp onto a handlebar of an outdoor bicycle such that the plate avoids contact with the handlebar.

7. The system of claim 4, wherein the container is fastened to the plate when the mounting interface engages the accessory.

8. The system of claim 5, wherein the container avoids rotation relative to the arm when the mounting interface engages the accessory.

9. The system of claim 5, wherein the container and the arm form a monolithic piece when the mounting interface engages the accessory.

10. The system of claim 1, wherein the latch is configured to engage the detent such that the plate provides an elastic or resilient force onto the accessory when the mounting interface engages the accessory.

11. The system of claim 1, wherein the accessory including a lip, wherein the latch is configured to engage the detent such that the plate engages the lip when the mounting interface engages the accessory.

12. The system of claim 1, wherein the plate including an electrical contact.

13. The system of claim 1, wherein the plate is a single plate.

14. The system of claim 1, wherein the plate is a set of plates positioned immediately adjacent to each other.

15. The system of claim 1, wherein the latch is configured to be immobile relative to the plate when the plate rectilinearly and guidably slides into the accessory over the detent.

16. The system of claim 1, wherein the latch is configured to be mobile relative to the plate when the plate rectilinearly and guidably slides into the accessory over the detent.

17. The system of claim 1, further comprising an arm, wherein the mounting interface cantileveredly extends from the arm.

18. The system of claim 1, wherein the mounting interface includes a user interface configured to receive a user input and move the block relative to the plate responsive to the user input in order to enable the mounting interface to (a) engage the accessory based on the plate rectilinearly and guidably sliding into the accessory over the detent or (b) disengage the accessory based on the detent not extending over the latch.

19. The system of claim 1, wherein the mounting interface is configured to disengage the accessory such that the latch disengages the detent, the platform disengages the platform complement, and the ramp progressively disengages the ramp complement based on the plate rectilinearly and guidably sliding off the accessory over the detent.

20. The system of claim 1, wherein the accessory includes a first electrical connector, where the plate includes a second electrical connector configured to engage or connect with the first electrical connector when the platform engages the platform complement based on the plate rectilinearly and guidably sliding into the accessory over the detent.

\* \* \* \* \*